US012568414B2

(12) United States Patent
Kim et al.

(10) Patent No.: US 12,568,414 B2
(45) Date of Patent: Mar. 3, 2026

(54) METHOD AND DEVICE FOR DUAL ACTIVE PROTOCOL STACK (DAPS) HANDOVER IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Taehyoung Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 17/918,736

(22) PCT Filed: Apr. 16, 2021

(86) PCT No.: PCT/KR2021/004780
§ 371 (c)(1),
(2) Date: Oct. 13, 2022

(87) PCT Pub. No.: WO2021/210937
PCT Pub. Date: Oct. 21, 2021

(65) Prior Publication Data
US 2023/0247501 A1 Aug. 3, 2023

(30) Foreign Application Priority Data

Apr. 16, 2020 (KR) ........................ 10-2020-0046220
May 14, 2020 (KR) ........................ 10-2020-0057937

(51) Int. Cl.
*H04W 36/06* (2009.01)
*H04W 36/00* (2009.01)
(Continued)

(52) U.S. Cl.
CPC ....... *H04W 36/06* (2013.01); *H04W 36/0069* (2018.08); *H04W 36/00725* (2023.05);
(Continued)

(58) Field of Classification Search
CPC ... H04W 36/185; H04W 76/27; H04W 76/19; H04W 36/0069; H04W 36/00
See application file for complete search history.

(56) References Cited

U.S. PATENT DOCUMENTS 9,603,073 B2    3/2017 Jung et al.
10,917,879 B2    2/2021 Agiwal et al.
(Continued)

FOREIGN PATENT DOCUMENTS

CN        103202067 A    7/2013
CN        109804697 A    5/2019
(Continued)

OTHER PUBLICATIONS

Ericsson, Subsequent RRC procedures after DAPS handover, R2-2002591, 3GPP TSG-RAN WG2 Meeting #109bis-e, Apr. 9, 2020, Elbonia.
(Continued)

*Primary Examiner* — Yee F Lam
(74) *Attorney, Agent, or Firm* — Jefferson IP Law, LLP

(57) ABSTRACT

The present disclosure relates to a communication technique merging IoT technology with a 5th generation (5G) or pre-5G communication system for supporting a data transmission rate higher than that of a 4th generation (4G) communication system such as long term evolution (LTE), and a system therefor. The present disclosure may be applied to intelligent services (for example, smart homes, smart buildings, smart cities, smart cars or connected cars, health care, digital education, retail, and security and safety related services) on the basis of 5G communication technologies
(Continued)

and IoT-related technologies. Various embodiments of the present disclosure may provide a method and a device for bandwidth part switching in consideration of a dormant bandwidth part.

13 Claims, 44 Drawing Sheets

(51) Int. Cl.

| | |
|---|---|
| *H04W 36/18* | (2009.01) |
| *H04W 72/0457* | (2023.01) |
| *H04W 74/0833* | (2024.01) |
| *H04W 74/0836* | (2024.01) |
| *H04W 74/0838* | (2024.01) |

(52) U.S. Cl.
CPC ..... *H04W 36/185* (2023.05); *H04W 72/0457* (2023.01); *H04W 74/0833* (2013.01); *H04W 74/0836* (2024.01); *H04W 74/0838* (2024.01)

(56) References Cited

U.S. PATENT DOCUMENTS

| | | | |
|---|---|---|---|
| 2013/0223409 A1 | 8/2013 | Jung et al. | |
| 2018/0103465 A1 | 4/2018 | Agiwal et al. | |
| 2020/0314714 A1* | 10/2020 | Jung | H04W 76/27 |
| 2020/0314716 A1* | 10/2020 | Kim | H04W 36/0079 |
| 2021/0105674 A1* | 4/2021 | Kim | H04L 69/04 |
| 2021/0105675 A1* | 4/2021 | Kim | H04W 12/10 |
| 2021/0250156 A1 | 8/2021 | Kim et al. | |

FOREIGN PATENT DOCUMENTS

| | | |
|---|---|---|
| KR | 10-1505762 B1 | 3/2015 |
| KR | 10-2019-0052696 A | 5/2019 |
| KR | 10-2021-0101985 A | 8/2021 |
| WO | 2019/031884 A1 | 2/2019 |

OTHER PUBLICATIONS

VIVO, Summary of DAPS MAC, R2-2002099, 3GPP TSG-RAN WG2 Meeting #109e, Mar. 11, 2020, Elbonia.

Samsung, [S350] Discussion on radio bearer handling during DAPS, R2-2003326, 3GPP TSG RAN WG2 Meeting #109-e-bis, Apr. 10, 2020, e-Meeting.

3rd Generation Partnership Project; Technical Specification Group Radio Access Network; NR; Multiplexing and channel coding (Release 16), 3GPP TS 38.212 V16.1.0 (Mar. 2020), Apr. 3, 2020, Valbonne, France.

China Telecom, 36300CR for introduction of even further mobility enhancement in E-UTRAN, 3GPP TSG-RAN2 Meeting #109bis-e, R2-2003262, Apr. 10, 2020.

Ericsson, China Telecom, Introduction or Even further Mobility enhancement, in E-UTRAN, 3GPP TSG-RAN2 Meeting #109-e, R2-2001753, Mar. 12, 2020.

Extended European Search Report dated Aug. 16, 2024, issued in European Application No. 21788445.1-1215.

Korean Office Action with English translation dated Jun. 13, 2025; Korean Appln. No. 10-2020-0057937.

Chinese Office Action with English translation dated Jun. 14, 2025; Chinese Appln. No. 202180028940.X.

* cited by examiner

Figure 10:
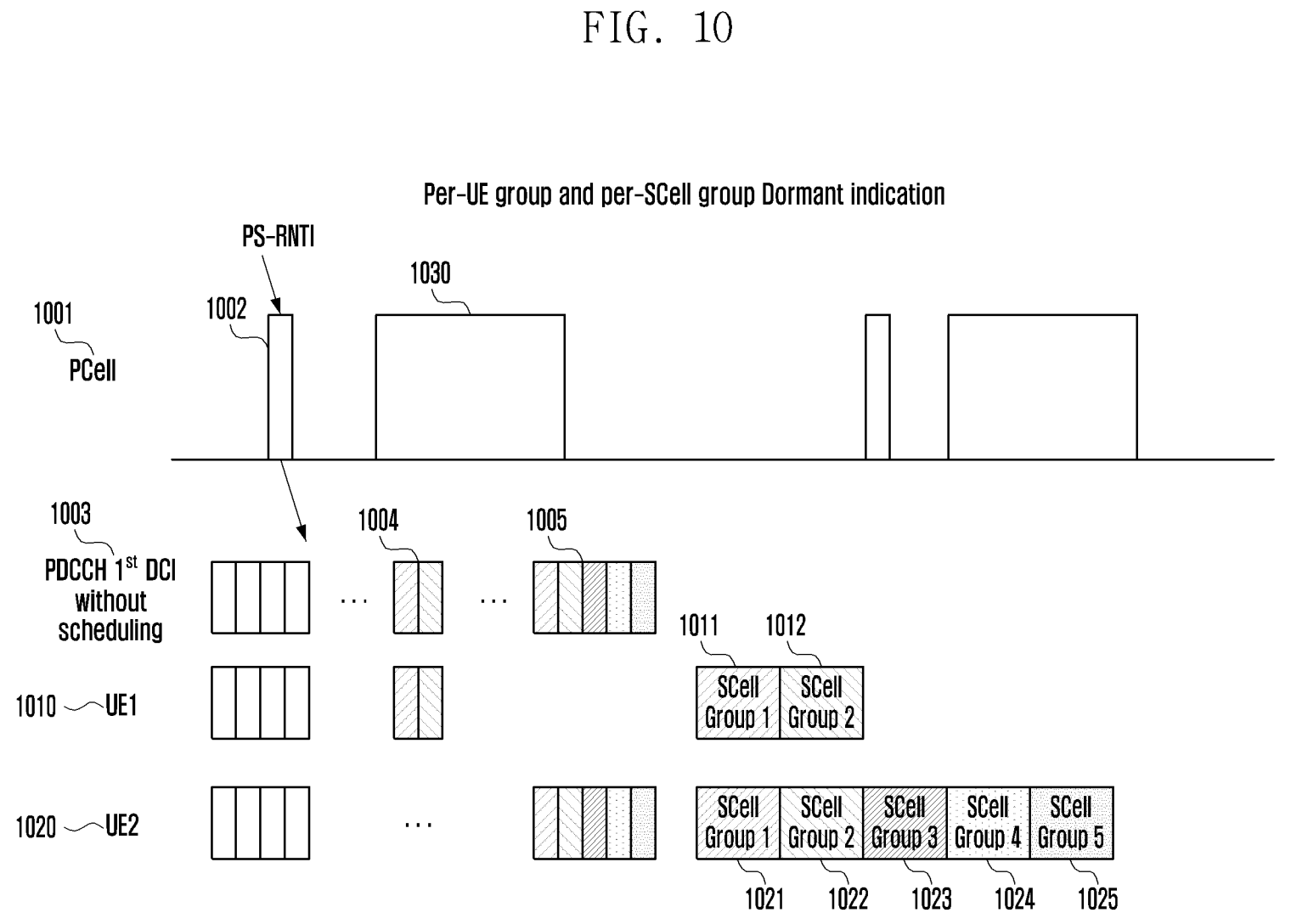

Per-UE group and per-SCell group Dormant indication

1001 PCell

PS-RNTI
1002

1030

1003 PDCCH 1st DCI without scheduling

1004

1005

1010 UE1

1011 SCell Group 1
1012 SCell Group 2

1020 UE2

1021 SCell Group 1
1022 SCell Group 2
1023 SCell Group 3
1024 SCell Group 4
1025 SCell Group 5

Figure 15:
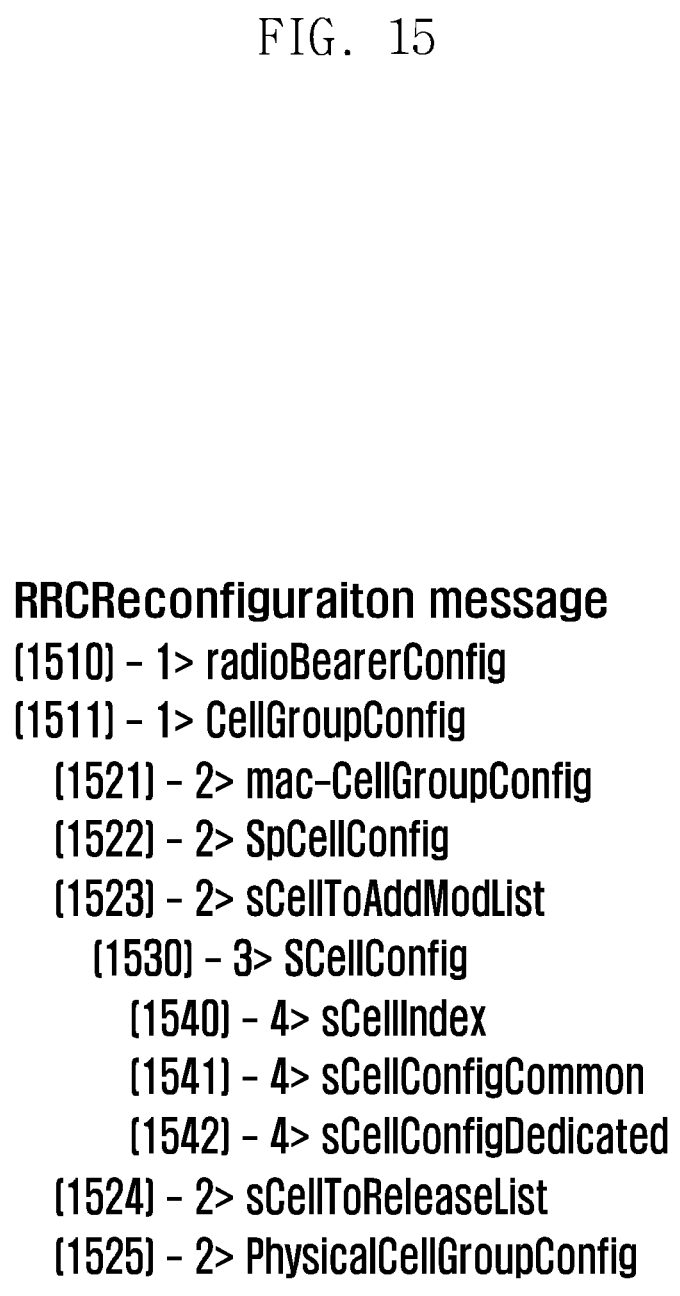

RRCReconfiguraiton message
(1510) – 1> radioBearerConfig
(1511) – 1> CellGroupConfig
   (1521) – 2> mac-CellGroupConfig
   (1522) – 2> SpCellConfig
   (1523) – 2> sCellToAddModList
      (1530) – 3> SCellConfig
         (1540) – 4> sCellIndex
         (1541) – 4> sCellConfigCommon
         (1542) – 4> sCellConfigDedicated
   (1524) – 2> sCellToReleaseList
   (1525) – 2> PhysicalCellGroupConfig

1705

| $C_7$ | $C_6$ | $C_5$ | $C_4$ | $C_3$ | $C_2$ | $C_1$ | R | Oct 1 |

1710

| $C_7$ | $C_6$ | $C_5$ | $C_4$ | $C_3$ | $C_2$ | $C_1$ | R | Oct 1 |
|-------|-------|-------|-------|-------|-------|-------|---|-------|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

1715

| Cell ID | DL UL | BWP ID | State |

METHOD AND DEVICE FOR DUAL ACTIVE PROTOCOL STACK (DAPS) HANDOVER IN NEXT GENERATION MOBILE COMMUNICATION SYSTEM

CROSS-REFERENCE TO RELATED APPLICATION(S)

This application is a U.S. National Stage application under 35 U.S.C. § 371 of an International application number PCT/KR2021/004780, filed on Apr. 16, 2021, which is based on and claims priority of a Korean patent application number 10-2020-0046220, filed on Apr. 16, 2020, in the Korean Intellectual Property Office, and of a Korean patent application number 10-2020-0057937, filed on May 14, 2020, in the Korean Intellectual Property Office, the disclosure of each of which is incorporated by reference herein in its entirety.

TECHNICAL FIELD

The disclosure relates to a method and apparatus for efficiently managing a dormant bandwidth part in a next-generation mobile communication system. In addition, the disclosure relates to a method and apparatus for performing a fallback, when a handover fails, in a case where an efficient handover method without data transmission/reception interruption during handover is performed in a next-generation mobile communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system.

In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G system is considering support for various services compared to the existing 4G system. For example, the most representative services include enhanced mobile broad band (eMBB), ultra-reliable and low latency communication (URLLC), and massive machine type communication (mMTC), evolved multimedia broadcast/multicast service (eMBMS), and the like. In addition, a system providing the URLLC service may be referred to as a URLLC system, and a system providing the eMBB service may be referred to as an eMBB system. Also, the terms service and system may be used interchangeably.

Among them, the URLLC service is a service newly considered in the 5G system, unlike the existing 4G system, and requires to satisfy conditions of ultra-high reliability (e.g., about $10^{-5}$ packet error rate) and low latency (e.g., about 0.5 msec) compared to other services. In order to satisfy such strict requirements, the URLLC service may need to apply a shorter transmission time interval (TTI) than the eMBB service, and various operating methods using this are being considered.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

DISCLOSURE OF INVENTION

Technical Problem

In a next-generation mobile communication system, carrier aggregation may be used to provide a service having a high data transmission rate and low transmission latency to a UE. However, a method of preventing processing latency that may be generated when carrier aggregation is configured in a UE having a connection with a network and is activated or when carrier aggregation is deactivated after being used is needed. Particularly, if the UE maintains a plurality of cells in an activated state in order to use the carrier aggregation, the UE is required to monitor a physical downlink control channel (PDCCH) for each cell, so that battery consumption of the UE may increase. On the other hand, if the plurality of cells remain in an deactivated state in order to reduce battery consumption of the UE, data transmission/reception latency may occur due to latency generated when the plurality of cells are activated through the use of carrier aggregation.

An efficient handover method is necessary in a next-generation mobile communication system such that, together with a low transmission latency, a service having no data interruption can be supported. In addition, there is a need for a method wherein, if a handover fails, a fallback can be performed while minimizing the data interruption time.

The technical problems to be achieved in the disclosure are not limited to the above-mentioned problems, and other technical problems not mentioned are clearly understood from the following description by a person skilled in the art to which the disclosure belongs.

Solution to Problem

According to an embodiment of the disclosure, a method performed by a terminal in a wireless communication system may include receiving, from a source base station, a radio resource control (RRC) message for a dual active protocol stack (DAPS) handover; establishing a medium access control (MAC) layer device, based on receiving the RRC message; transmitting, to a target base station, a preamble for random access; receiving a random access response message, from the target base station, in response to transmitting the preamble; selecting only a logical channel related to the DAPS handover among at least one logical channel, for uplink transmission corresponding to the random access response message; and transmitting data corresponding to the selected logical channel to the target base station.

According to another embodiment of the disclosure, a method performed by a target base station in a wireless communication system may include transmitting, to a source base station, a command message related to a dual active protocol stack (DAPS) handover for an arbitrary terminal; receiving, from the terminal, a preamble for random access, based on transmitting the command message; transmitting, to the terminal, a random access response message in response to receiving the preamble; and receiving, from the terminal, data corresponding to a logical channel, wherein the logical channel is selected only from a logical channel related to the DAPS handover among at least one logical channel, for uplink transmission corresponding to the random access response message.

In addition, according to another embodiment of the disclosure, a terminal in a wireless communication system may include a transceiver; and a controller configured to receive, from a source base station through the transceiver, a radio resource control (RRC) message for a dual active protocol stack (DAPS) handover, to establish a medium access control (MAC) layer device, based on receiving the RRC message, to transmit, to a target base station through the transceiver, a preamble for random access, to receive a random access response message, from the target base station through the transceiver, in response to transmitting the preamble, to select only a logical channel related to the DAPS handover among at least one logical channel, for uplink transmission corresponding to the random access response message, and to transmit data corresponding to the selected logical channel to the target base station through the transceiver.

In addition, according to another embodiment of the disclosure, a target base station in a wireless communication system may include a transceiver; and a controller configured to transmit, to a source base station through the transceiver, a command message related to a dual active protocol stack (DAPS) handover for an arbitrary terminal, to receive, from the terminal through the transceiver, a preamble for random access, based on transmitting the command message, to transmit, to the terminal through the transceiver, a random access response message in response to receiving the preamble, and to receive, from the terminal through the transceiver, data corresponding to a logical channel, wherein the logical channel is selected only from a logical channel related to the DAPS handover among at least one logical channel, for uplink transmission corresponding to the random access response message.

Advantageous Effects of Invention

The disclosure proposes a new dormant mode to allow a UE in a radio resource control (RRC)-connected mode having a connection with a network to rapidly activate and deactivate carrier aggregation in a next-generation mobile communication system. The disclosure proposes a method of operating a new dormant (or hibernation) mode in units of bandwidth parts (bandwidth part-levels) to rapidly activate the carrier aggregation and save a battery of the UE.

In addition, according to an embodiment of the disclosure, various efficient handover methods are proposed to prevent the data interruption time due to handover when handover is performed in a next-generation mobile communication system, thereby supporting a service without data interruption. Also, when the handover fails, an efficient method for quickly falling back to a source base station is supported.

Effects obtainable in the disclosure are not limited to the above-mentioned effects, and other effects not mentioned will be clearly understood by those of ordinary skill in the art to which the disclosure belongs from the description below.

BRIEF DESCRIPTION OF DRAWINGS

FIGS. 5A and 5B are diagrams illustrating operations of providing a service to a UE through the efficient use of a wide frequency bandwidth in a next-generation mobile communication system according to an embodiment of the disclosure.

FIG. 10 is a diagram illustrating a first embodiment that embodies the concept of the method of operating the dormant BWP in the activated SCell described with reference to FIG. 9 of the disclosure.

FIG. 14 is a diagram illustrating a problem occurring due to a temporal difference between instructions or indications of PDCCH DCI transmitted by a base station or received by a UE from the base station according to an embodiment of the disclosure.

FIG. 15 is a diagram illustrating the structure of an RRC message for configuring configuration information according to an embodiment of the disclosure.

FIG. 20 is a diagram illustrating a block constitution of a TRP in a wireless communication system according to an embodiment of the disclosure.

FIG. 28 is a diagram illustrating operations of a UE, a source base station, and a target base station regarding an efficient handover method for minimizing a data interruption time due to handover applied to a second embodiment of the disclosure.

FIGS. 29A and 29B are diagrams illustrating the structures of an efficient PDCP layer device applied in a DAPS handover method of an efficient handover method applied to a second embodiment of the disclosure, and a method for applying the structures.

Figure 31A:
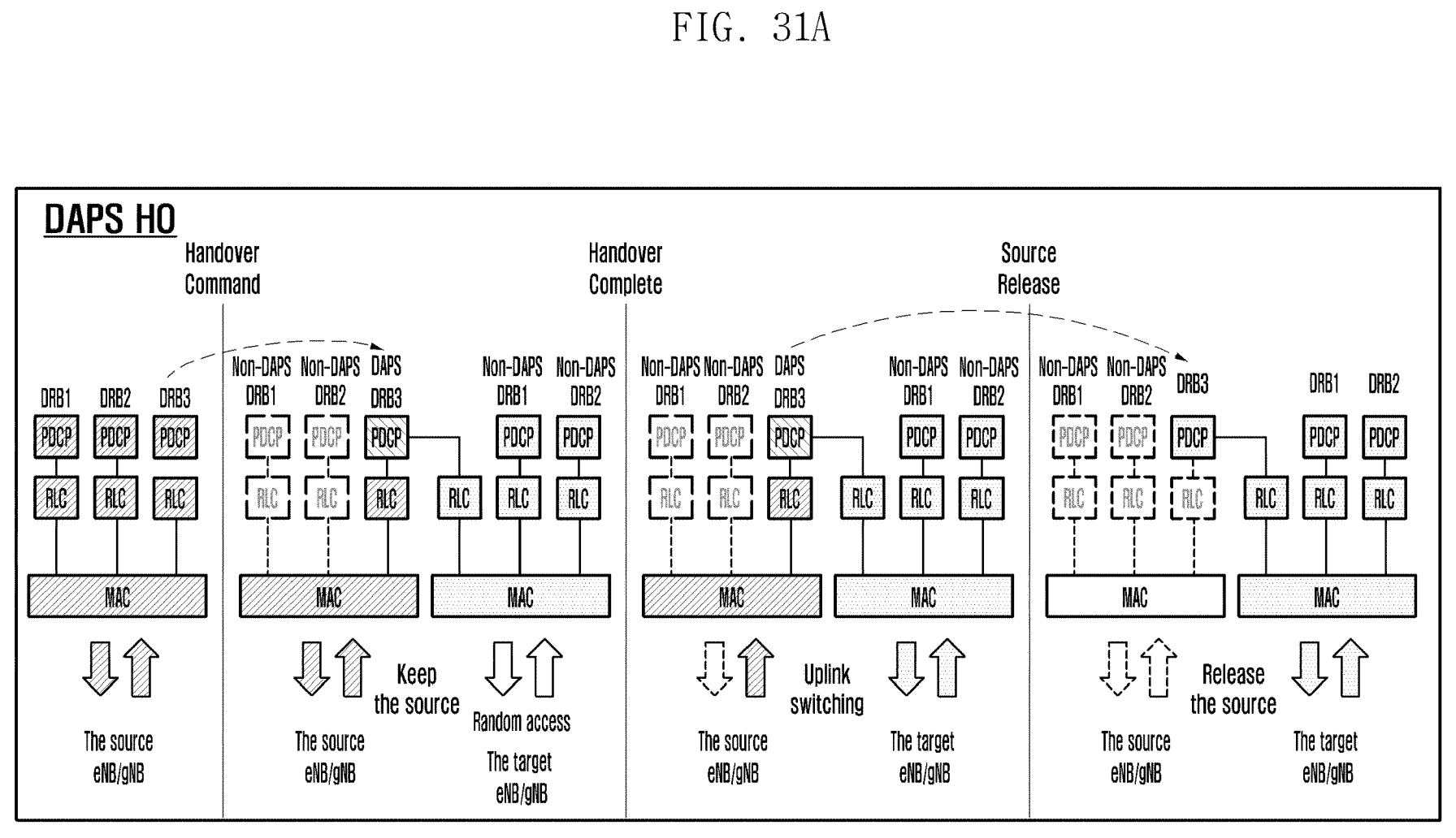

FIGS. 31A, 31B, 32A, 32B, 33A, 33B, 34A, and 34B are diagrams illustrating, when a DAPS handover method which is a second embodiment of an efficient handover method proposed in an embodiment of the disclosure is indicated for each bearer through an RRCReconfiguration message or an RRCConnectionReconfiguration message, a method for a UE having received the message to drive different bearer-specific protocol layer devices for a bearer in which SRB or the DAPS handover method is configured or for bearers in which the DAPS handover method is not configured.

FIG. 38 is a diagram illustrating a block constitution of a TRP in a wireless communication system according to an embodiment of the disclosure.

MODE FOR THE INVENTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term 'eNB' may be interchangeably used with the term 'gNB'. That is, a base station described as 'eNB' may indicate 'gNB'.

Figure 1:
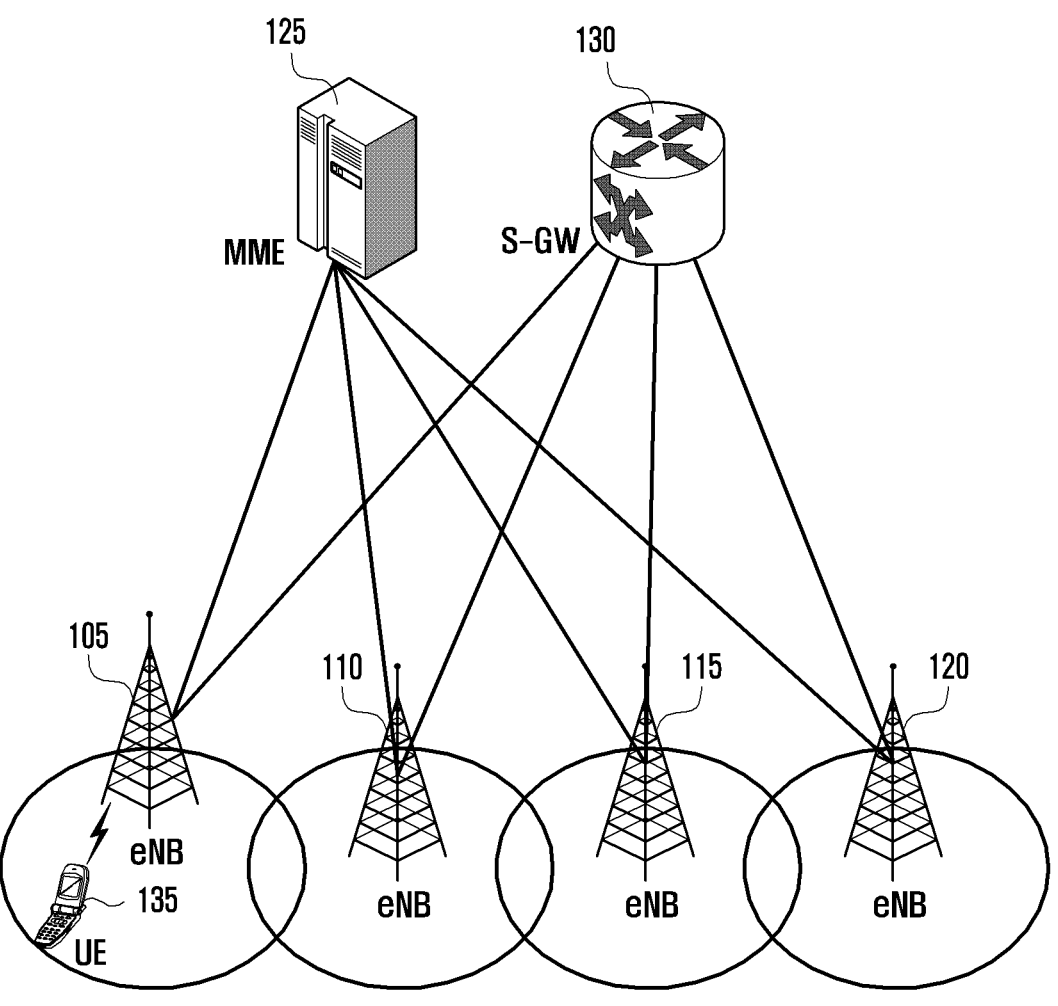
FIG. 1 is a diagram illustrating the structure of an LTE system according to an embodiment of the disclosure.

FIG. 1 is a diagram illustrating the structure of an LTE system according to an embodiment of the disclosure.

Referring to FIG. 1, a radio access network of the LTE system may include next-generation evolved node Bs (hereinafter, referred to as eNBs, Node Bs, or base stations) 105, 110, 115 and 120, a mobility management entity (MME) 125, and a serving-gateway (S-GW) 130. A user equipment 135 (hereinafter, referred to as a UE or a terminal) may access an external network through the eNBs 105 to 120 and the S-GW 130.

In FIG. 1, the eNBs 105 to 120 may correspond to conventional Node Bs of a universal mobile telecommunications system (UTMS). The eNB is connected to the UE 135 through a radio channel, and may perform a more complicated role than the conventional node B. In the LTE system, since all user traffic including a real time service such as a voice over IP (VoIP) through an Internet protocol are serviced through a shared channel, an apparatus for collecting and scheduling status information on buffer statuses of UEs, available transmission power status, and channel statuses is required, and the eNBs 105 to 120 may serve as this apparatus. In general, one eNB may control a plurality of cells. For example, in order to implement a transmission rate of 100 Mbps, the LTE system may use orthogonal frequency-division multiplexing (OFDM) as a wireless access technology in a bandwidth of 20 MHz. Furthermore, an adaptive modulation and coding (AMC) scheme of determining a modulation scheme and a channel-coding rate may be applied depending on the channel status of the UE. The S-GW 130 is a device for providing a data bearer, and may generate or remove the data bearer under a control of the MME 125. The MME is a device for performing not only a function of managing the mobility of the UE but also various control functions, and may be connected to a plurality of eNBs 105 to 120.

Figure 2:
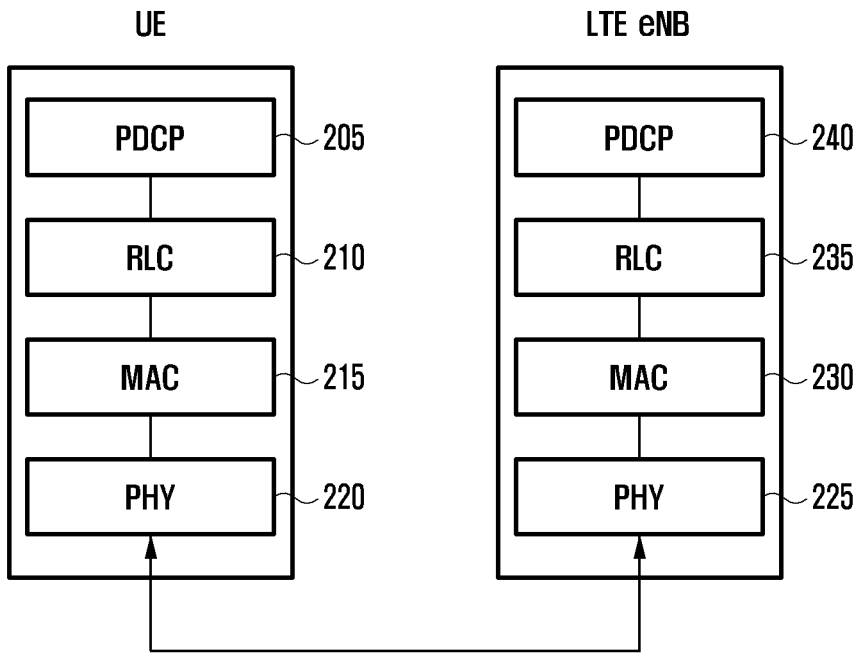
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, the UE and the eNB may include Packet data convergence protocols (PDCPs) 205 and 240, radio link controls (RLCs) 210 and 235, medium access controls (MACs) 215 and 230, respectively, in the radio protocol of the LTE system. The packet data convergence protocols (PDCPs) 205 and 240 may perform an operation of compressing/reconstructing an IP header. The main functions of the PDCP are described below.

Header compression and decompression function (Header compression and decompression: ROHC only)
User data transmission function (transfer of user data)
Sequential delivery function (in-sequence delivery of upper-layer PDUs at PDCP reestablishment procedure for RLC AM)
Sequence re-arrangement function (For split bearers in DC (only support for RLC AM): PDCP PDU routing for transmission and PDCP PDU reordering for reception)
Duplicate detection function (duplicate detection of lower-layer SDUs at PDCP reestablishment procedure for RLC AM)
Retransmission function (retransmission of PDCP SDUs at handover and, for split bearers in DC, of PDCP PDUs at PDCP data recovery procedure, for RLC AM)
Ciphering and deciphering function (Ciphering and deciphering)

Timer-based SDU removal function (timer-based SDU discard in uplink)
Radio Link Control (RLC) 210 or 235 reconfigures the PDCP Packet Data Unit (PDU) to be the proper size and performs an ARQ operation. The main functions of the RLC are summarized below.
Data transmission function (transfer of upper-layer PDUs)
ARQ function (Error Correction through ARQ (only for AM data transfer))
Concatenation, segmentation, and reassembly function (Concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer))
Duplication detection function (duplicate detection (only for UM and AM data transfer))
Error detection function (protocol error detection (only for AM data transfer))
RLC SDU deletion function (RLC SDU discard (only for UM and AM data transfer))
RLC reestablishment function (RLC reestablishment)
The MACs 215 and 230 are connected with various RLC layer devices configured in one UE, and perform an operation for multiplexing RLC PDUs to the MAC PDU and de-multiplexing the RLC PDUs from the MAC PDU. The main functions of the MAC are summarized below.
Mapping function (Mapping between logical channels and transport channels)
Multiplexing and demultiplexing function (Multiplexing/demultiplexing of MAC SDUs belonging to one or multiple different logical channels into/from transport blocks (TB) delivered to/from the physical layer on transport channels)
Scheduling information report function (scheduling information reporting)
HARQ (hybrid automatic repeat request) function (error correction through HARQ)
Logical channel priority control function (priority handling between logical channels of one UE)
UE priority control function (priority handling between UEs by means of dynamic scheduling)
MBMS service identification function (MBMS service identification)
Transport format selection function (transport format selection)
Padding function (padding)
The PHY layers 220 and 225 may perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 3:
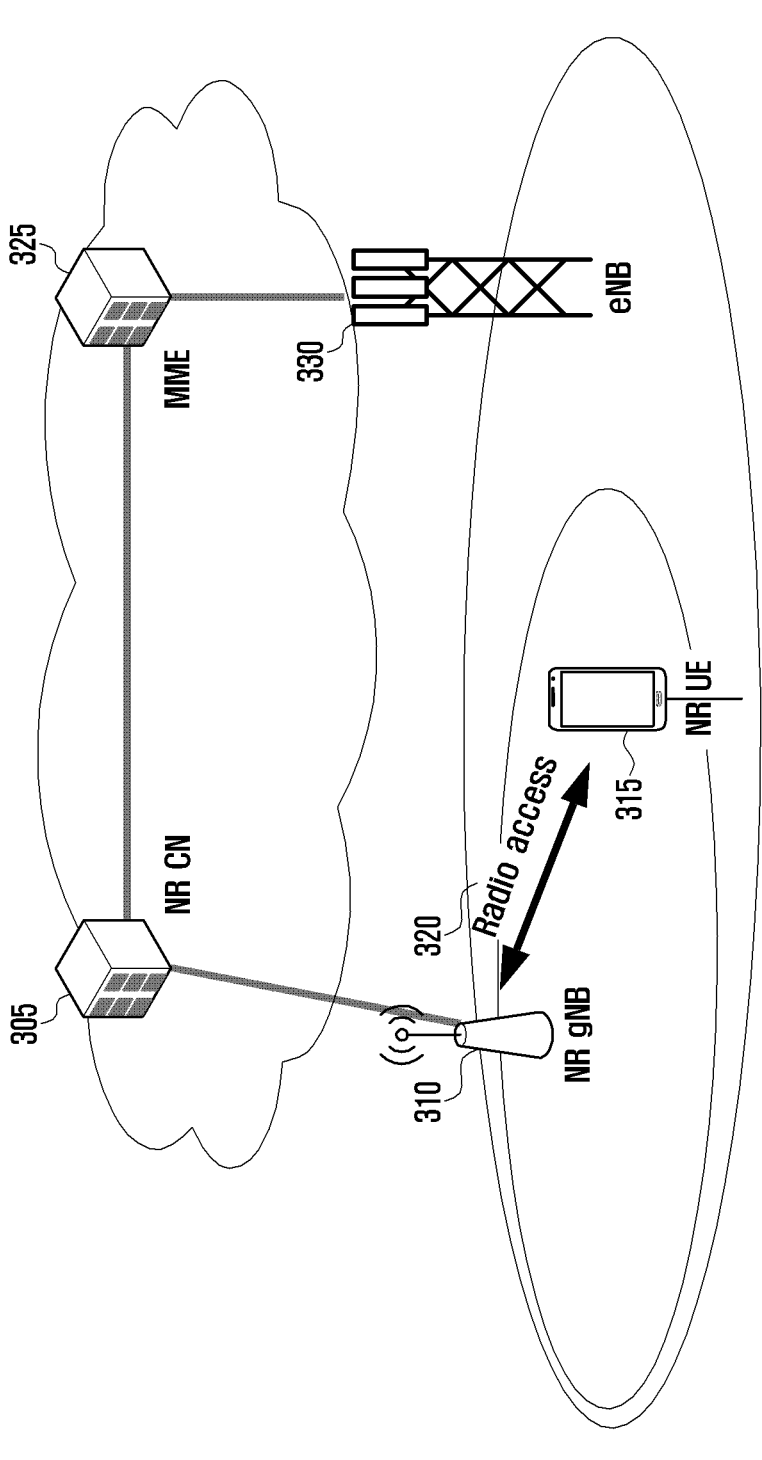
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

Referring to FIG. 3, a radio access network of the next-generation mobile communication system (hereinafter, referred to as NR or 5G) may include a next-generation base station 310 (new radio node B, hereinafter, referred to as an NR NB, a gNB, or an NR gNB) and a new radio core network (NR CN) 305. A user terminal 315 (hereinafter, referred to as a new radio user equipment (NR UE) or a terminal) may access an external network through the NR gNB 310 and the NR CN 305.

In FIG. 3, the NR gNB 310 may correspond to an evolved Node B (eNB) in a conventional LTE system. The base station may be connected to the NR UE 315 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, and corresponds to the NR NB 310. One NR gNB 310 may generally control a plurality of cells. The base station may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology. Further, an adaptive modulation and coding (AMC) scheme of determining a modulation scheme and a channel-coding rate may be applied depending on the channel status of the NR UE. The NR CN 305 may perform a function of supporting mobility, configuring a bearer, and configuring QoS. The NR CN 305 is a device for performing a function of managing the mobility of the NR UE 315 and various control functions, and may be connected to a plurality of base stations 310. Further, the next-generation mobile communication system may be linked to the conventional LTE system, and the NR CN 305 may be connected to an MME 325 through a network interface. The MME 325 may be connected to an eNB 330, which is a conventional base station.

Figure 4:
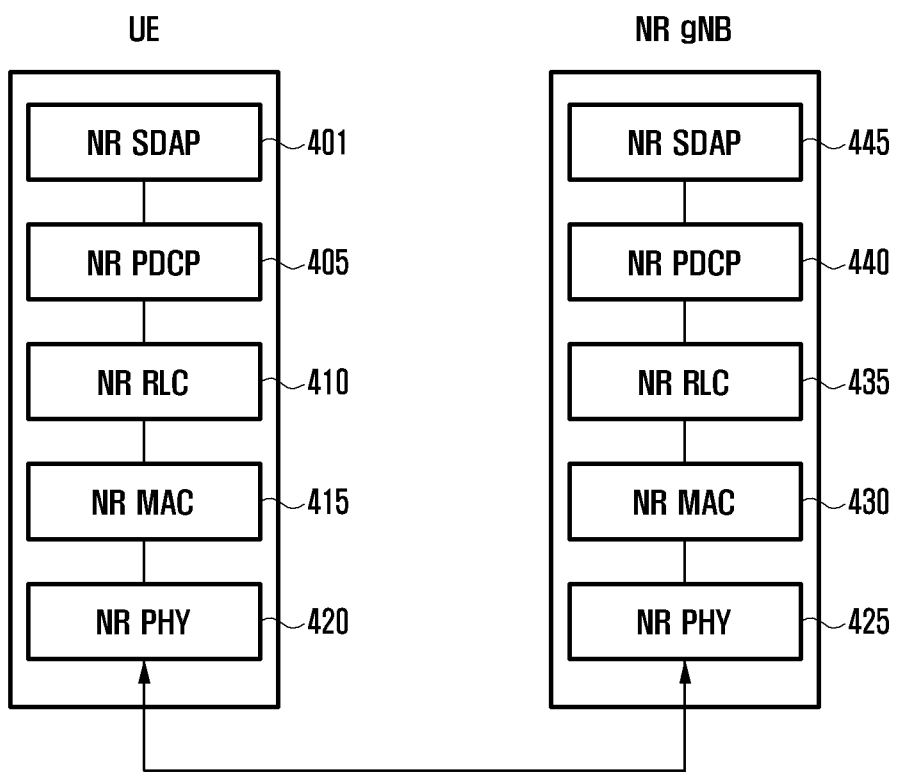
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, the UE and the MR base station may include NR SDAPs 401 and 445, NR PDCPs 405 and 440, NR RLCs 410 and 435, and NR MACs 415 and 430 in the radio protocol of the next-generation mobile communication system.

The main functions of the NR SDAPs 401 and 445 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 405 and 440 may include some of the following functions.

Header compression and decompression function (Header compression and decompression: ROHC only)

User data transmission function (transfer of user data)

Sequential delivery function (in-sequence delivery of upper-layer PDUs)

Non-sequential delivery function (out-of-sequence delivery of upper-layer PDUs)

Reordering function (PDCP PDU reordering for reception)

Duplicate detection function (duplicate detection of lower-layer SDUs)

Retransmission function (retransmission of PDCP SDUs)

Ciphering and deciphering function (Ciphering and deciphering)

Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLCs 410 and 435 may include some of the following functions.

Data transmission function (transfer of upper-layer PDUs)

Sequential delivery function (in-sequence delivery of upper-layer PDUs)

Non-sequential delivery function (out-of-sequence delivery of upper-layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 415 and 430 may be connected to a plurality of NR RLC layer devices configured in one UE and main functions of the NR MAC may include some of the following functions.

Mapping function (Mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY layers 420 and 425 perform an operation for channel-coding and modulating higher layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Since a frequency of a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell (special cell) or Scell (secondary cell)) and the UE and the base station may transmit and receive data in one or a plurality of BWPs according to a configuration of the base station.

The disclosure proposes a state transition method or bandwidth part switching method or a detailed operation considering a state of a Scell and a plurality of bandwidth parts configured in the Scell when a dormant bandwidth part proposed in the disclosure is introduced. Further, the disclosure manages a dormant mode in units of bandwidth parts (BWP-levels) and proposes a state transition method or a bandwidth part switching method, and also proposes a detailed operation in a bandwidth part according to a state of each Scell or a state or a mode (active, inactive, or dormant) of each bandwidth part.

In addition, the disclosure configures a plurality of bandwidth parts for each downlink or uplink in one cell (Spcell, Pcell (primary cell), Pscell (primary secondary cell), or Scell) and configures and operates active bandwidth part (active DL or UL BWP,) a dormant BWP (or dormant DL BWP), or an inactive bandwidth part (inactive or deactivated DL/UL BWP) through bandwidth part switching. That is, it is possible to increase a data transmission rate through a method similar to the carrier aggregation by transitioning a downlink or uplink BWP to an activated state for one cell. Further, the UE does not monitor a PDCCH to save a battery by transitioning or switching the downlink BWP to a dormant BWP. Further, the UE may measure a channel for the downlink BWP and report a channel measurement result, thereby supporting rapid activation of a cell or a BWP in the future. Further, it is possible to save the batter of the UE by transitioning the downlink (or uplink) BWP to a deactivated state in one cell. An indication of the state transition between BWPs for each cell or BWP switching may be configured through an RRC message, a MAC CE, or downlink control information (DCI) of a PDCCH.

In the disclosure, the BWP may be used without distinction between the uplink and the downlink, and the meaning thereof may be each of an uplink BWP and a downlink BWP according to the context.

In the disclosure, a link may be used without distinction between the uplink and the downlink, and the meaning thereof may indicate the uplink or the downlink according to the context.

The disclosure configures and introduces a dormant BWP for the SCell of the UE performing carrier aggregation. The UE configured with the dormant BWP does not monitor a PDCCH in the dormant BWP so as to reduce battery consumption of the UE, and measures a channel (for example, measures or reports channel state information (CSI) or channel quality information (CQI)) or perform beam measurement, beam tracking, or beam operation, thereby performing switching or activation to a normal BWP and thus rapidly starting data transmission in the normal BWP in the case in which data transmission is needed. The dormant BWP may not be configured or applied to the SpCell (the PCell of the MCG (master cell group) or the PCell (or the PSCell) of the SCG (secondary cell group) in which a signal should be continuously monitored, a feedback is transmitted or received, or synchronization is identified or maintained or the SCell in which a PUCCH is configured.

The disclosure proposes various embodiments realized on the basis of PDCCH DCI, a MAC CE, or an RRC message in order to operate the dormant BWP proposed in the disclosure for the SCell of the UE.

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station). The Pcell and the Pscell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the base station operates a plurality of Scells as well as the Spcell to increase uplink or downlink transmission resources is referred to as carrier aggregation (CA).

When the UE receives a configuration of a Spcell and a plurality of Scells through an RRC message, the UE may receive a configuration of a state or mode for each Scell or a BWP of the SCell through the RRC message, the MAC CE, or the PDCCH DCI. The state or mode of the Scell may be configured as an active mode or activated state, or a deactivated mode or deactivated state. The active mode or the activated state of the Scell may mean that the UE may exchange uplink or downlink data with the gNB in an activated BWP of the SCell, or an activated normal BWP or a BWP other than an activated dormant BWP of the Scell in the active mode or the activated Scell. Further, the active mode or the activated state of the Scell may mean that the UE may monitor a PDCCH to identify an indication of the gNB, measure a channel for a downlink of the Scell in the active mode or the activated state (or an activated BWP, an activated normal BWP, or a BWP other than an activated dormant BWP of the Scell), periodically report measurement information, and periodically transmit a pilot signal (sounding reference signal (SRS)) to the gNB so that the gNB can measure an uplink channel.

However, the deactivated mode or the deactivated state of the SCell may mean that the UE does not monitor a PDCCH to identify an indication of the gNB, does not measure a channel, does not transmit a measurement report, and does not transmit a pilot signal since BWPs configured in the Scell is in the deactivated state, the configured BWPs are not activated, or there is no activated BWP among the configured BWPs.

Accordingly, in order to activate Scells in the inactive mode, the base station first configures measurement configuration information in the UE through an RRC message, and the UE measures a cell or a frequency on the basis of the measurement configuration information. After receiving the cell or frequency measurement report of the UE, the base station may activate the deactivated Scells on the basis of the frequency/channel measurement information. Therefore, much latency may be generated when the gNB activates carrier aggregation for the UE and start data transmission or reception.

The disclosure proposes a dormant mode or a dormant state for a BWP of each activated Scell (or active SCell) or proposes configuration or introduction of a dormant bandwidth part (BWP) for each activated SCell in order to reduce a battery of the UE and rapidly start data transmission or reception.

In a BWP in a dormant mode of the activated Scell or a dormant BWP (dormant BWP in the activated SCell) or when the dormant BWP is activated, the UE cannot exchange data with the gNB, does not monitor a PDCCH to identify an indication from the gNB, or does not transmit a pilot signal but measures a channel, but transmits a report on the measurement result of the measured frequency/cell/channel according to a configuration of the gNB periodically or when an event is generated. Accordingly, since the UE does not monitor the PDCCH in the dormant BWP in the activated Scell and does not transmit the pilot signal, the UE may save a battery compared to a normal BWP (or a BWP other than the dormant BWP or compared to the case in which a normal BWP (or a BWP other than the dormant BWP) of the activated Scell is activated, and the base station may reduce a transmission delay by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

The active mode or the activated state of the Scell may mean that the UE may exchange uplink or downlink data with the gNB in an activated BWP of the SCell, an activated normal BWP, or a BWP other than an activated dormant BWP, in the Scell of the active mode or the activated Scell. Further, the active mode or the activated state of the Scell may mean that the UE may monitor a PDCCH to identify an indication of the gNB, measure a channel for a downlink of the Scell in the active mode or the activated state (or an activated BWP, an activated normal BWP, or a BWP other than an activated dormant BWP of the Scell), periodically report measurement information, and periodically transmit a pilot signal (sounding reference signal (SRS)) to the gNB so that the gNB can measure an uplink channel. In the disclosure, the active mode or the activated state of the Scell may mean that the UE cannot exchange uplink or downlink data with the gNB in an activated dormant BWP of the Scell, the UE cannot monitor a PDCCH to identify an indication of the gNB, but the UE can measure a channel for the downlink of the activated dormant BWP of the Scell in the active mode or the activated state, and the UE can periodically report measurement information to the gNB in the Scell in the active mode or the activated Scell.

In the disclosure, the dormant BWP may be a state of the BWP or may be used as a name of the logical concept indicating a specific BWP. Accordingly, the dormant BWP may be activated, deactivated, or switched. For example, an indication indicating switching of an activated second BWP of a first Scell to a dormant BWP, an indication indicating transition of a the first SCell to a dormant state or a dormant mode, or an indication indicating activation of the dormant BWP of the first SCell may be interpreted as the same meaning.

In the disclosure, the normal BWP may indicate a BWP other than a dormant BWP among a BWP configured in each SCell of the UE through an RRC message. In the normal BWP, the UE may exchange uplink or downlink data with the gNB, monitor a PDCCH to identify an indication of the gNB, measure a channel for the downlink, periodically report measurement information to the gNB, and periodically transmit a pilot signal (sounding reference signal (SRS)) to the gNB to allow the gNB to measure an uplink channel. Further, the normal BWP may indicate a first active BWP, a default BWP, a first active BWP activated from a dormant state, or an initial BWP.

Among BWPs configured in each SCell of the UE, only one dormant BWP may be configured for the downlink. In another method, among BWPs configured in each SCell of the UE, one dormant BWP may be configured for the uplink or the downlink.

Figure 5A:
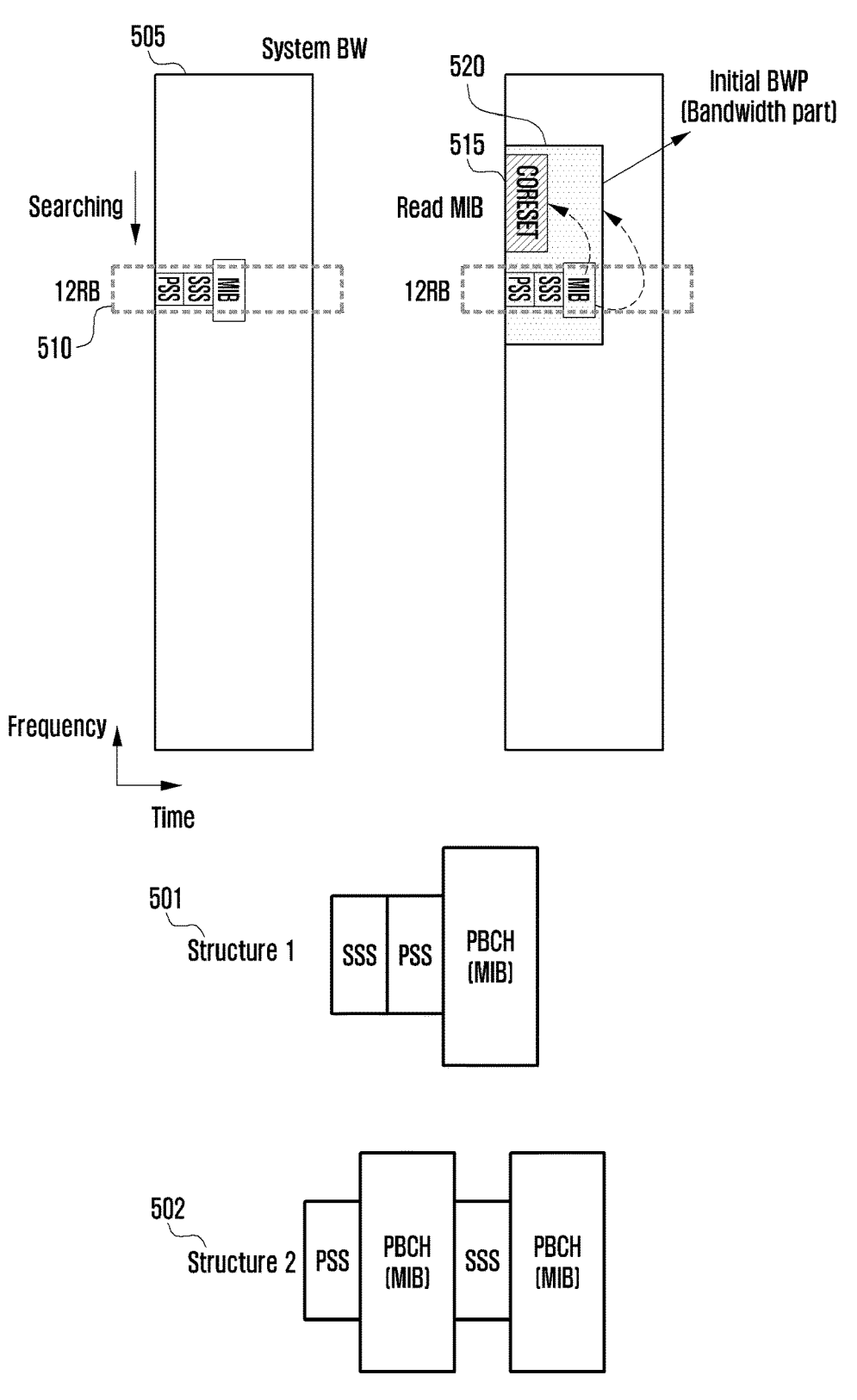
Figure 5B:
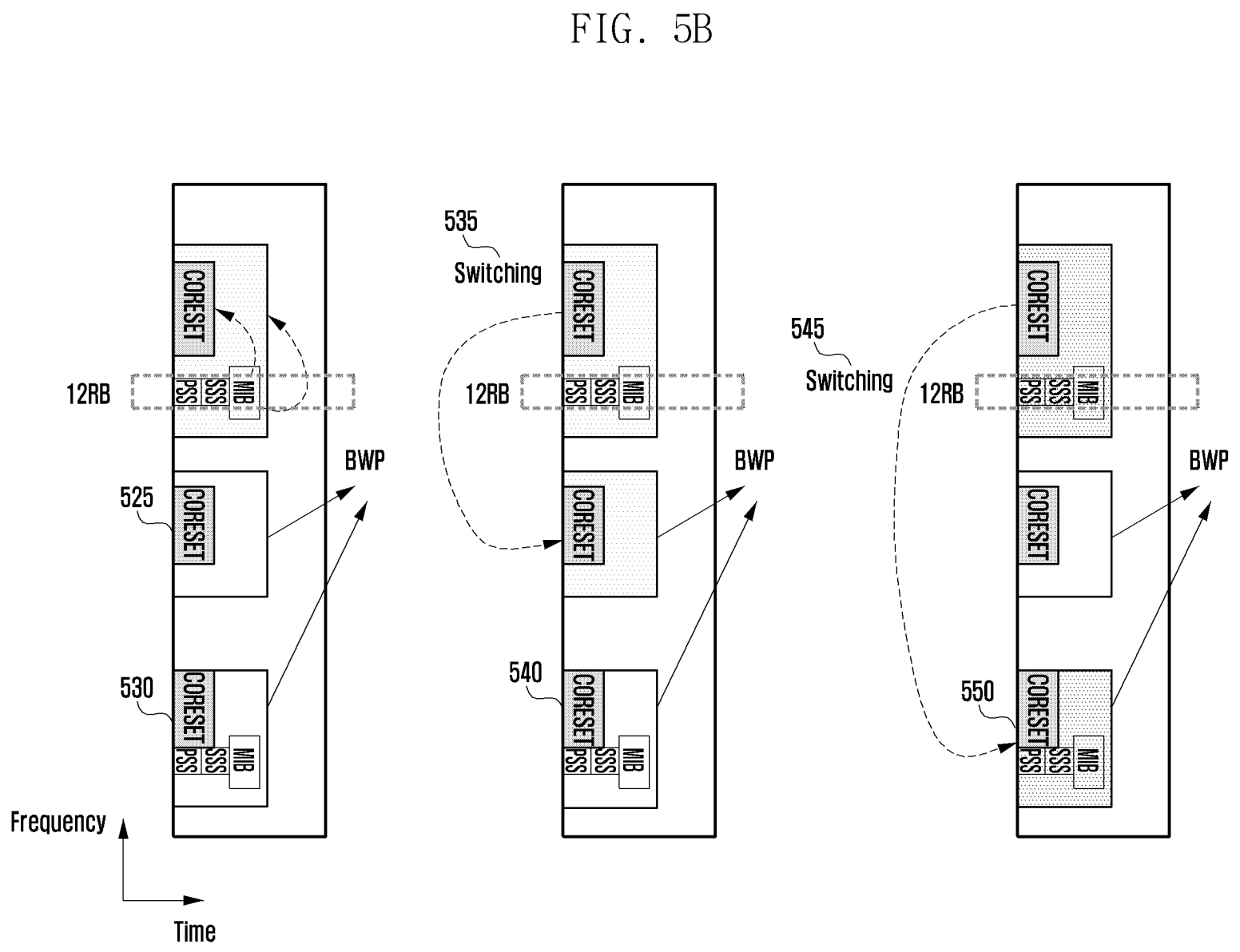

FIGS. 5A and 5B are diagrams illustrating operations of providing a service to a UE through the efficient use of a wide frequency bandwidth in a next-generation mobile communication system according to an embodiment of the disclosure.

In FIGS. 5A and 5B, a method of providing a service to UEs having different capabilities or categories by efficiently using a significantly wide frequency bandwidth and saving a battery in the next-generation mobile communication system is described.

One cell to which a base station provides a service may serve a significantly wide frequency band as indicated by reference numeral 505. However, in order to provide a service to UEs having different capabilities, the wide frequency bandwidth may be divided into a plurality of band-width parts to manage one cell.

Referring to FIGS. 5A and 5B, the UE, when power thereof is initially turned on, may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks as indicated by reference numeral 510. If the UE searches for the PSS/SSS 501 or 502 in units of resource blocks and then detects the signals, the UE may read the signals, analyze (decode) the signals, and identify a boundary between a subframe and a radio transmission resource frame (radio frame). Accordingly, the subframe may be separated in units of 1 ms, and the UE synchronizes a downlink signal with the base station. The resource block (RB) is the size of a predetermined frequency resource and a predetermined time resource, and may be defined as a two-dimensional unit. For example, the RB may be defined in units of 1 ms as time resources and defined by 12 subcarriers (1 carrier×15 kHz=180 kHz) as frequency resources. If the UE completes synchronization, the UE may identify information on a control resource set (CORESET) by checking a master system information block (MIB) or minimum system information (MSI) and identify initial access bandwidth part (BWP) information as indicated by reference numerals 515 and 520. CORESET information refers to the location of time/frequency transmission resources through which a control signal is transmitted from the base station, and may be, for example, the location of resources through which a PDCCH channel is transmitted. That is, the CORESET information is information indicating resources through which first system information (system information block 1, SIB 1) is transmitted and indicates frequency/time resources through which a PDCCH is transmitted. The UE may identify information on an initial BWP by reading the first system information. As described above, if the UE completes synchronization of the downlink signal with the base station and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and a plurality of BWPs may be configured for the uplink separately.

The plurality of BWPs may be indicated and configured by a bandwidth part identifier (BWP identifier) to be used as an initial BWP, a default BWP, a first active BWP, a dormant BWP, or a first active BWP activated from a dormant state (first active BWP from dormant).

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1, SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random-access response (RAR) message in the initial BWP, which all UEs can read, during the random-access procedure.

The first active BWP may be configured to be UE-specific and may be designated and indicated by a BWP identifier among a plurality of BWPs. The first active BWP may be configured for each of the downlink and the uplink, and include a first active downlink BWP and a first active uplink BWP configured with respective BWP identifiers. When a plurality of BWPs are configured in one cell, the first active BWP may be used to indicate which BWP is to be activated and used first. For example, when a Pcell or Pscell and a plurality of Scells are configured in the UE and a plurality of BWPs are configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving information indicating activation of the Scell or the BWP in a deactivated state through an RRC message, MAC control information, or DCI, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, the UE may perform the operation when receiving an indication indicating transition of the Scell or the BWP to the dormant state through an RRC message, MAC control information, or DCI.

This is because the base station can effectively use carrier aggregation only by measuring and reporting a frequency/channel for the first active downlink/uplink BWP even when a channel measurement report is transmitted in the dormant state since the current or activated downlink BWP is switched to activate the first active downlink BWP (or the BWP configured or indicated by the RRC message) or the uplink BWP is switched to activate the first active uplink BWP (or the BWP configured or indicated by the RRC message) when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated Scell or a dormant BWP (dormant BWP in the activated Scell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated Scell and does not transmit the pilot signal, the UE may save a battery compared to a normal BWP (or a BWP which is not the dormant BWP) of the activated SCell or compared to the case in which a normal BWP (or a BWP which is not the dormant BWP) of the activated Scell is activated, and the base station may reduce transmission latency by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

A first active BWP activated from a dormant state after switching from a dormant state or a dormant BWP (or a first active non-dormant BWP or a BWP configured or indicated through an RRC message) may be a BWP which should be activated by switching the current or activated BWP of the activated SCell by the UE or a BWP which should be activated from a dormant state configured in the RRC message according to an indication in the case in which the UE receives an indication of switching a BWP of the activated SCell from a dormant BWP to a normal BWP (or a BWP which is not the dormant BWP) from the base station through PDCCH DCI, a MAC CE, or an RRC message, receives an indication of switching or transitioning an active BWP from a dormant BWP to a normal BWP, or receives an indication indicating switching or transitioning the active BWP from the dormant BWP to the normal BWP (for example, a first active BWP activated from a dormant state) when the UE operates a BWP of one activated SCell as a dormant BWP or when an activated BWP of the activated SCell is a dormant BWP or is switched to a dormant BWP in the SCell.

Figure 6:
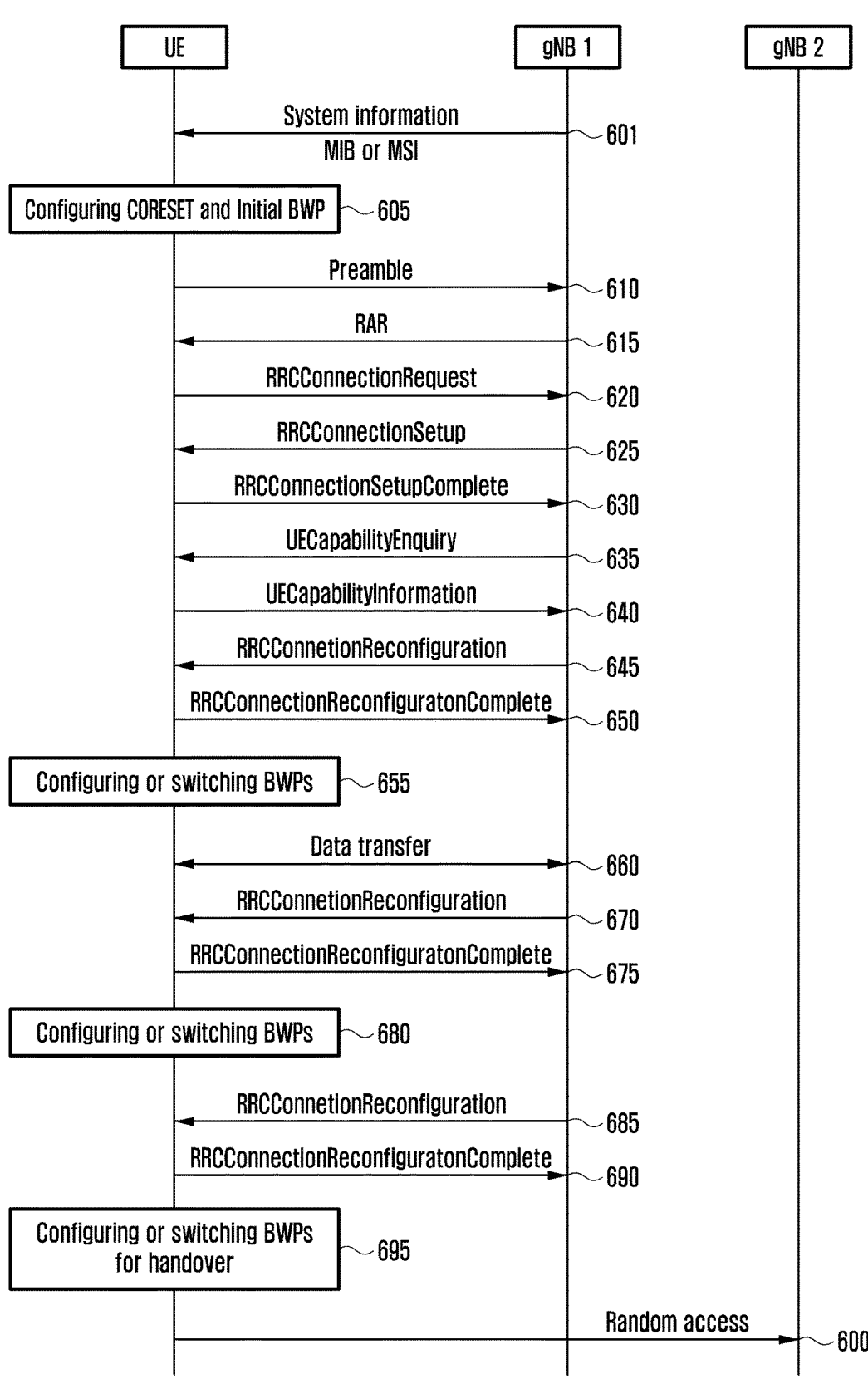
FIG. 6 is a diagram illustrating operations between a UE and a base station for the UE to transition from an RRC-idle mode to an RRC-connected mode in the next-generation mobile communication system according to an embodiment of the disclosure, and illustrating operations of configuring a plurality of bandwidth parts (BWPs) and configuring a default BWP or a first active BWP.

FIG. 6 is a diagram illustrating operations between a UE and a base station for the UE to transition from an RRC-idle mode to an RRC-connected mode in the next-generation mobile communication system according to an embodiment of the disclosure, and illustrating operations of configuring a plurality of bandwidth parts (BWPs) and configuring a default BWP or a first active BWP.

Referring to FIG. 6, one cell to which the base station provides service may serve a very wide frequency band. First, the UE may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks. If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial access bandwidth part (BWP) information by reading system information in steps 601 and 605. CORESET information refers to the location of time/frequency transmission resources through which a control signal is transmitted from the base station, and may be, for example, the location of resources through which a PDCCH channel is transmitted.

As described above, if the UE completes synchronization of the downlink signal with the base station and is able to receive a control signal, the UE may perform a random-access procedure in the initial BWP, receive a random-access response, make a request for configuring an RRC connection, receive an RRC message, and configure the RRC connection in steps 610, 615, 620, 625, and 630.

If the basic RRC connection is completely configured, the base station may transmit an RRC message which asks about a UE capability to the UE (UECapabilityEnquire) in order to identify the UE capability in 635. In another method, the base station may ask (request) the MME or the AMF about the UE capability in order to identify the UE capability. This is because the MME or the AMF may have UE capability information if the UE previously accessed the MME or the AMF. If there is no UE capability required by the base station, the base station may make a request for UE capability to the UE.

The reason why the base station transmits the RRC message to the UE to identify the UE capability is to identify the UE capability, for example, information indicating a frequency band that the UE can read or an area of the frequency band that the UE can read. After identifying the UE capability, the base station may configure an appropriate BWP in the UE. If the UE receives the RRC message which asks about the UE capability, the UE may indicate a range of a bandwidth which the UE supports, indicate an offset from a reference center frequency to inform of a range of a bandwidth supported in the current system bandwidth, directly indicate a start point and a last point of the supported frequency bandwidth, or indicate a center frequency and a bandwidth in step 640.

The BWP may be configured through an RRCSetup message or an RRCResume message of the RRC connection configuration in step 625 or an RRCReconfiguration message in step 645, the RRC message may include configuration information of a PCell, a Pscell, or a plurality of Scells, and a plurality of BWPs may be configured for each cell (PCell, Pscell, or Scell). When a plurality of BWPs is configured for each cell, a plurality of BWPs to be used in the downlink of each cell may be configured. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

The information for configuring the BWP of each cell (PCell, Pscell, or Scell) may include some of the following information.

Downlink BWP configuration information of the cell

Initial downlink BWP configuration information

A plurality of pieces of BWP configuration information and BWP IDs corresponding to the respective BWPs Initial state configuration information of the downlink BWP of the cell (for example, activated state, dormant state, or deactivated state)

A BWP ID indicating a first active downlink BWP

A BWP identifier indicating a default BWP

Configuration information for monitoring a PDCCH for each BWP.

For example, the configuration information includes CORESET information, search space resource information, PDCCH transmission resources, periodicity, and subframe number information A BWP identifier indicating a dormant BWP or a 1-bit indicator indicating a dormant BWP for each BWP in the BWP configuration information A BWP identifier indicating a first active BWP activated from a dormant state or a 1-bit indicator indicating a first active BWP activated from a dormant state for each BWP in the BWP configuration information BWP inactivity timer configuration and a timer value Uplink BWP configuration information of the cell Initial uplink BWP configuration information A plurality of pieces of BWP configuration information and BWP IDs corresponding to the respective BWPs Initial state configuration information of the downlink BWP of the cell (for example, activated state, dormant state, or deactivated state)

A BWP identifier indicating a dormant BWP or a 1-bit indicator indicating a dormant BWP for each BWP in the BWP configuration information A BWP identifier indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization. The base station may configure an initial downlink BWP to be used in downlink and an initial uplink BWP to be used in uplink for each cell. Configuration information of the initial BWP may be broadcasted through first system information (system information 1, SIB 1) indicated by the CORESET, and may be configured again in the UE which accesses the base station through an RRC message. The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the base station can transmit a random-access response (RAR) message in the initial BWP, which all UEs can read, during the random-access procedure.

The first active BWP may be configured to be UE specific and may be designated and indicated by a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of any Scell or a BWP of any activated Scell in a deactivated state or a dormant state or switching or activation from an inactive or dormant bandwidth to a normal BWP through an RRC message, MAC control information, or DCI of a PDCCH, the UE may perform an operation of switching the current or activated downlink BWP of the Scell to activate the first active downlink BWP (or a BWP configured or indicated by an RRC message) or switching the current or activated uplink BWP to activate the first active uplink BWP (or a BWP configured or indicated by an RRC message). Further, upon receiving an indication indicating transition of the activated Scell or the BWP to the dormant state or an indication indicating switching or activation to the dormant BWP through the RRC message, MAC control information, or the DCI Of the PDCCH, the UE may switch the BWP to the dormant BWP, activate the BWP, or make the BWP be the dormant state.

Making the BWP be in the dormant state, switching the BWP to the dormant BWP, or activating the dormant BWP may indicate the performance of an operation proposed in the dormant state in the disclosure. That is, an operation of measuring a channel in a downlink BWP (or a dormant BWP) and transmitting a report to the base station without monitoring a PDCCH may be performed. In another method, when the activated SCell or BWP is activated or switched to the normal BWP, a first active downlink BWP may be activated by switching a downlink BWP and a first active uplink BWP may be activated by switching an uplink BWP, and thus the dormant BWP may be configured as the first active downlink or uplink BWP or a default BWP. The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform base station scheduling because the base station allows the UE to receive an indication of the base station (for example, DCI of a PDCCH) by falling back to the default BWP for each cell after a predetermined time. For example, if the base station configures the default BWP of the UEs accessing one cell as the initial BWP, the base station may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the base station, the default BWP may be defined and configured for the uplink and thus used like the default BWP of the downlink.

The dormant BWP refers to a BWP in a dormant mode of the activated Scell or a dormant BWP (dormant BWP in the activated Scell). When the dormant BWP is activated, the UE cannot exchange data with the base station, does not monitor a PDCCH to identify an indication from the base station, or does not transmit a pilot signal but measures a channel, and transmits a report on the measurement result of the measured frequency/cell/channel according to a configuration of the base station periodically or when an event is generated. Accordingly, since the UE does not monitor the PDCCH in the dormant BWP in the activated Scell and does not transmit the pilot signal, the UE may save a battery compared to a normal BWP (or a BWP other than the dormant BWP or compared to the case in which a normal BWP (or a BWP other than the dormant BWP) of the activated Scell is activated, and the base station may reduce a transmission delay by rapidly activating the normal BWP of the activated SCell based on the measurement report or the measurement report of the dormant BWP of the activated Scell to promptly use the carrier aggregation since the channel measurement report is transmitted unlike the case in which the SCell is deactivated.

The first active BWP activated from a dormant state (or a first active non-dormant BWP) may be a first active BWP activated from a dormant state, that is, BWP which the UE should switch or activate in the activated SCell, configured in the RRC message according to an indication in the case in which the UE receives an indication indicating switching of the BWP of the activated SCell from a dormant BWP to a normal BWP (or a BWP which is not the dormant BWP) through PDCCH DCI, a MAC CE, or an RRC message from the base station, receives an indication indicating switching or transmission of the active BWP from a dormant BWP to a normal BWP, and receives an information indicating switching, transition, or activation of the active BSP from a dormant BWP to a normal BWP (for example, a first active BWP activated from a dormant state).

In the disclosure, switching a first BWP to a second BWP may be activating the second BWP or may be deactivating the activated first BWP and activating the second BWP.

In an RRCSetup message of the RRC connection configuration, an RRCResume message of step 625, or an RRCReconfiguration message of step 645, a state transition timer may be configured to allow the UE to transition the state by itself even though the UE does not receive an indication through an RRC message, MAC control information, or DCI of a PDCCH. For example, if a cell deactivation timer (ScellDeactivationTimer) is configured for each Scell and the cell deactivation timer expires, the Scell may transition to the deactivated state. Alternatively, a downlink (or uplink) BWP hibernation timer (DLBWPHibernationTimer or ULBWPHibernationTimer) may be configured for each SCell or each SCell BWP and a cell hibernation timer (ScellHibernationTimer) may be configured for each SCell. If the cell hibernation timer or the downlink (or uplink) BWP hibernation timer expires, the Scell or the downlink (or uplink) BWP may be transitioned to a dormant state or switched to a dormant BWP. For example, when the cell hibernation timer or the downlink (uplink) BWP hibernation timer expires, the SCell or downlink (uplink) BWP in an activated state may be transitioned or switched to a dormant BWP, and the Scell or downlink (or uplink) BWP in a deactivated state or the dormant state may not be transitioned to a dormant state or a dormant BWP. The BWP hibernation timer may start when an indication indicating switching or activating a BWP is received through an RRC message, a MAC CE, or PDCCH DCI or may stop when an indication indicating switching to a dormant BWP, an indication hibernation of the BWP, or an indication indicating activation of a dormant BWP is received through an RRC message, a MAC CE, or PDCCH DCI. Further, a dormant cell deactivation timer (dormantScellDeactivationTimer) or a dormant or downlink (or uplink) dormant BWP inactivity timer (dormantDLDeactivationTimer or dormantULDeactivationTimer) may be configured for each Scell or downlink (uplink) BWP, and a Scell or downlink (uplink) dormant BWP in a dormant state may be transitioned to a deactivated state. When the dormant cell deactivation timer or the dormant or downlink (uplink) BWP inactivity timer expires, only the Scell or downlink (or uplink) BWP in a dormant state is transitioned to a deactivated state, but the Scell or BWP in an activated state or a deactivated state is not transitioned to the deactivated state. Further, the dormant BWP hibernation timer may start when an indication indicating switching, hibernation, or activation of the dormant BWP is received through an RRC message, a MAC CE, or PDCCH DCI or may stop when an indication indicating deactivation or activation of the BWP or the SCell or an indication indicating activation of a normal BWP (for example, a BWP which is not a dormant BWP configured through RRC) is received through an RRC message, a MAC CE, or PDCCH DCI. If the cell deactivation timer (ScellDeactivationTimer) (or the downlink (or uplink) BWP hibernation timer) and the cell hibernation timer (ScellHibernationTimer) (or the downlink (or uplink) dormant BWP inactivity timer) are configured together, the cell hibernation timer (ScellHibernationTimer) (or the downlink (or uplink) dormant BWP hibernation timer) is prioritized. That is, if the cell hibernation timer (ScellHibernationTimer) (or the downlink (or uplink) BWP hibernation timer) is configured, the corresponding Scell or downlink (or uplink) BWP is not deactivated even though the cell deactivation timer (ScellDeactivationTimer) (or the downlink (or uplink) dormant BWP inactivity timer) expires. In other words, when the cell hibernation timer (or the downlink (or uplink) BWP hibernation timer) is configured, the Scell or downlink (or uplink) BWP may be first transitioned from an activated state to a dormant state or switched to a dormant BWP, and then the cell or BWP which has been transitioned to the dormant state may be transitioned to the deactivated state due to expiration of the dormant cell or BWP inactivity timer. Accordingly, when the cell hibernation timer or the BWP hibernation timer is configured, the cell deactivation timer or the dormant BWP inactivity timer does not influence the state transition of the Scell or downlink (or uplink) BWP. The Scell or downlink (or uplink) BWP is not directly transitioned to the deactivated state if the cell hibernation timer or the BWP hibernation timer is configured even though the cell deactivation timer or the dormant BWP inactivity timer expires.

If the cell deactivation timer (or the downlink (or uplink) BWP hibernation timer) is not configured in the RRC message, the UE may consider the cell deactivation timer (or the downlink (or uplink) BWP hibernation timer) to be set to an infinite value.

In the RRCSetup message of the RRC connection configuration, the RRCResume message of step 625, or the RRCReconfiguration message of step 645, frequency measurement configuration information (measurement configuration) and frequency measurement gap configuration information (measurement gap information) may be configured, and frequency measurement object information may be included. Further, in the RRCSetup message of the RRC connection configuration, the RRCResume message of step 625, or the RRCReconfiguration message of step 645, a function for reducing power consumption of the UE (power saving mode) may be configured, or configuration information such as a discontinuous reception (DRX) cycle, an offset, an on-duration interval (an interval in which the UE should monitor a PDCCH), or time information, time information indicating when the UE should monitor or search for a PDCCH from the gNB before the on-duration interval during the DRX cycle, or short time period information may be configured together with the function for reducing power consumption. If the function for reducing power consumption of the UE is configured, the UE may configure a DRX cycle and search for a wake-up signal (WUS) in an interval configured to monitor the PDCCH by the gNB before the on-duration interval, and the gNB may indicate whether to skip (or not perform) or perform monitoring of the PDCCH in the on-duration interval to the UE through DCI of the PDCCH of the WUS. The UE should monitor the PDCCH in the on-duration interval, but the gNB may allow the UE to reduce battery consumption by making the UE not monitor the PDCCH in the on-duration interval through the WUS.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the gNB may indicate one BWP to be activated. The gNB may indicate activation of the BWP through the RRC message, MAC control information (MAC CE), or L1 signaling (PHY layer control signal such as DCI of the PDCCH) to indicate switching of the initial access BWP to a new BWP. In another method, the UE may define new bitmap information through DCI of the PDCCH and indicate activation, hibernation, or deactivation. In another method, the UE may indicate whether to activate the normal BWP (for example, the first active BWP activated from the dormant state), activate the dormant BWP, switch the dormant BWP, or switch the BWP through the bitmap. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information in order to reduce signaling overhead.

Hereinafter, the disclosure newly proposes the dormant BWP in the next-generation mobile communication system and proposes in detail the UE operation in each BWP when each BWP is transitioned or switched.

Figure 7:
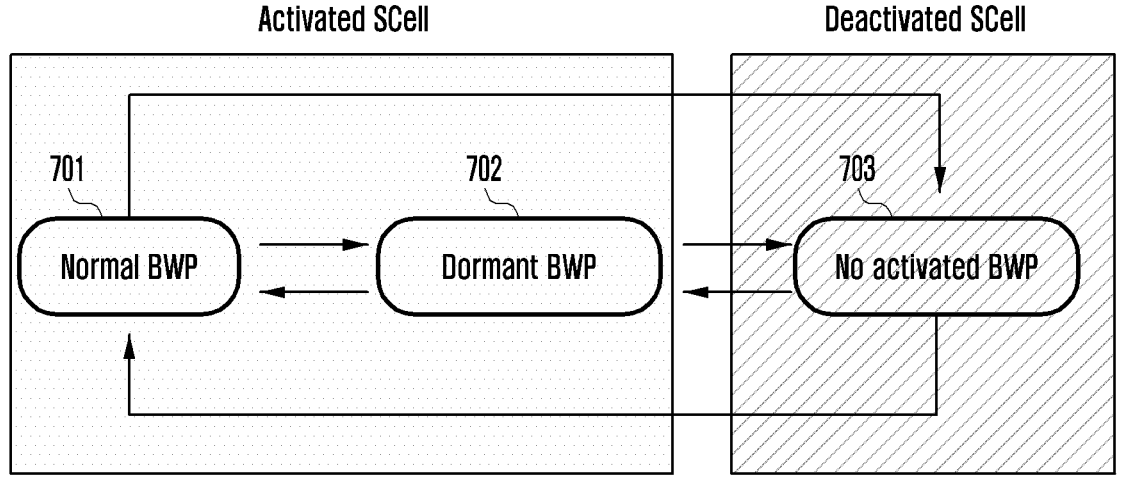
FIG. 7 is a diagram illustrating a procedure of transitioning a state for each BWP or switching the BWP according to an embodiment of the disclosure.

FIG. 7 is a diagram illustrating a procedure of transitioning a state for each BWP or switching the BWP according to an embodiment of the disclosure.

Referring to FIG. 7, the BWP of each cell (for example, SCell) of the UE may be activated to a normal BWP as indicated by reference numeral 701, activated to a dormant BWP as indicated by reference numeral 702, or deactivated as indicated by reference numeral 703, and the normal BWP or the dormant BWP may be activated or deactivated through an indication by configuration information of the RRC message, MAC control information, or DCI of the PDCCH. In another method, the BWP of each cell of the UE may have an activated state 701, a deactivated state 703, or a dormant state 702, and may perform state transition due to an indication by configuration information of the RRC message, MAC control information, or DCI of the PDCCH.

The operation of transitioning the state (activated, dormant, or deactivated state) for each BWP of the Scell proposed in the disclosure, or the operation of activating the normal BWP or the dormant BWP, activating the first active BWP activated from the dormant state, or deactivating the normal BWP or the dormant BWP may be performed by an indication or configuration of one of the following cases.

If the state of the BWP of the Scell is configured through the RRC message, or the BWP of each SCell is configured through RRC message, and if the dormant BWP is configured to the SCell, or the first active BWP is configured as the dormant BWP, the SCell starts through switching to or activating the dormant BWP and performs operation in the dormant BWP.

The case in which Scell activation or deactivation, or dormant MAC CEs are received, The case in which a MAC CE indicating activation or deactivation of the normal BWP or the first active BWP or the dormant BWP from the dormant state is received, The case in which DCI of a PDCCH indicating activation, deactivation, or switching of the normal BWP or the first active BWP or the dormant BWP from the dormant state is received, The case in which a cell hibernation timer is not configured in an active-state Scell and a configured cell deactivation timer expires, The case in which a BWP hibernation timer is not configured in the active BWP and a configured BWP inactivity timer (for example, a bwpDeactivatedTimer) expires, The case in which a cell hibernation timer configured in an active Scell expires, The case in which a BWP hibernation timer configured in an active BWP expires, The case in which a dormant Scell deactivation timer configured in a dormant Scell expires, The case in which a dormant BWP inactivity timer (dormantBWPDeactivatedTimer) configured in the dormant BWP expires, Further, the state transition operation or the dormant BWP operation method proposed in the disclosure have the following features.

No dormant BWP may be configured in the Spcell (Pcell or Pscell) (or downlink BWP or uplink BWP of the cell)

but only a normal BWP is configured therein and is in an activated state. The Spcell performs synchronization and transmits/receives a primary control signal, and thus if the BWP of the Spcell is dormant or inactive or operated as the dormant BWP, the connection with the base station is released, so that the Spcell should be maintained in the activated state.

If a PUCCH is configured in spite of the Scell or the BWP of the SCell, a dormant state or a dormant BWP cannot be configured. The Scell should be in the activated state or use a normal BWP after activating the same since there may be another cell which should transmit a feedback of HARQ ACK/NACK through the PUCCH.

Due to such a characteristic, the cell deactivation timer (ScellDeactivationTimer) or the BWP hibernation timer may not be applied to the Spcell or the BWP of the Spcell and the Scell or the BWP of the SCell in which the PUCCH is configured, and may be driven only for the other Scells.

The cell or BWP hibernation timer (ScellHibernation-Timer) is prioritized than the cell or BWP inactivity timer (ScellDeactivationTimer). If one value is set as a timer value through the RRC message, the same value may be applied to all cells. In another method, the base station may configure different timer values for Scells or BWPs in consideration of the characteristics of each Scell or BWP.

If the Scell or BWP is not indicated as being active or dormant through the RRC message, the Scell or BWP may fundamentally operate in the deactivated state initially.

In the disclosure, an uplink may indicate an uplink BWP and a downlink may indicate a downlink BWP. This is because only one active or dormant BWP can be operated for each uplink or downlink.

Hereinafter, the disclosure proposes in detail a method of operating the state transition in units of BWPs (bandwidth part-level) proposed in the disclosure to rapidly activate the carrier aggregation and save the battery of the UE.

In the disclosure, the BWP may be configured for each cell in the RRCSetup message, the RRCReconfiguration message, or the RRCResume message as described with reference to FIG. 6. The RRC message may include configuration information for a PCell, a Pscell, or a plurality of Scells and configure a plurality of BWPs for each cell (PCell, Pscell, or Scell). When the plurality of BWPs are configured for each cell, a plurality of BWPs to be used in the downlink of each cell may be configured in the RRC message. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

In a first method of the information configuration method for configuring the BWP of each cell (PCell, Pscell, or Scell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, whether the BWP is a dormant BWP or not may be indicated through a BWP identifier.

Downlink BWP configuration information of each cell
Initial downlink BWP configuration information
A plurality of pieces of BWP configuration information and BWP IDs corresponding to the respective BWPs Downlink initial state configuration information of the cell (for example, activated state, dormant state, or deactivated state)
A BWP identifier indicating a first active downlink BWP
A BWP identifier indicating a default BWP
A BWP identifier indicating a dormant BWP or a 1-bit indicator indicating a dormant BWP for each BWP in the BWP configuration information
BWP inactivity timer configuration and a timer value
Uplink BWP configuration information of each cell
Initial uplink BWP configuration information
A plurality of pieces of BWP configuration information and BWP identifiers (IDs) corresponding to the respective BWPs
Uplink initial state configuration information of the cell (for example, activated state, dormant state, or deactivated state)
A BWP identifier indicating a first active uplink BWP
A BWP identifier indicating a dormant BWP or a 1-bit indicator indicating a dormant BWP for each BWP in the BWP configuration information As another method of the information configuration method of configuring the BWP of each cell (PCell, Pscell, or Scell), a second method may separate configuration information by not configuring configuration information (for example, a search space, PDCCH transmission resources, and periodicity) required to read a PDCCH for a BWP corresponding to a dormant BWP may not be configured (in another method, periodicity may be configured to be very long along with other configuration information) and configuring configuration information (for example, a search space, PDCCH transmission resources, and periodicity) required to read a PDCCH for a normal BWP. This is because the dormant BWP is a BWP to reduce battery consumption of the UE by not reading a PDCCH and may measure a channel and reporting a channel measurement result to the PCell so as to rapidly activate the BWP or the cell, thereby promptly allocating uplink or downlink transmission resources. Accordingly, in the disclosure, the dormant BWP may be a BWP in which configuration information (for example, a search space, PDCCH transmission resources, and periodicity) for PDCCH monitoring is not configured or indicate a BWP indicated by a dormant BWP identifier or a BWP configured to be monitored with very long periodicity even though configuration information for PDCCH monitoring is configured therein. In another method, in the disclosure, the dormant BWP may a BWP in which PDCCH transmission resources and periodicity are not configured in configuration information for PDCCH monitoring and thus the PDCCH monitoring is not performed in the cell in which the dormant BWP is configured but search space information or cross-carrier scheduling configuration information is configured and thus switching or an indication for the dormant BWP is received in another cell through cross-carrier scheduling. Since data transmission/reception is not possible in the dormant BWP, only PDCCH configuration information (PDCCH-config) is configured for the dormant BWP (or a first BWP) (for example, only search space information is configured). On the other hand, PDCCH monitoring should be performed in a normal BWP (or a second BWP) which is not the dormant BWP and also data transmission/reception should be possible, and thus PDCCH configuration information (for example, CORESET configuration information, search space configuration information, PDCCH transmission resources, or periodicity) and PDSCH configuration information, PUSCH configuration information, or random access-related configuration information may be further configured.

Accordingly, as described above, the uplink or downlink normal BWP should be configured for each cell, but the dormant BWP may be or may not be configured for each cell, and the configuration thereof may be handled by base station implementation according to the purpose thereof. Further, a first active BWP, a default BWP, or an initial BWP may be configured as the dormant BWP according to base station implementation.

In the dormant BWP, the UE cannot exchange data with the base station, does not monitor a PDCCH to identify an indication of the base station, does not a pilot signal, but measures a channel, and reports a measurement result for the measured frequency/cell/channel periodically or when an event is generated according to a configuration of the base station. Accordingly, the UE does not monitor the PDCCH and not transmit the pilot signal in the dormant BWP, thereby reducing a battery compared to the active mode. Unlike the deactivated mode, the UE transmits a channel measurement report, so that the base station may rapidly activate the cell in which the dormant BWP is configured on the basis of the measurement report of the dormant BWP to use carrier aggregation. Further, in the disclosure, the dormant BWP is configured in downlink BWP configuration information and is used only for the downlink BWP.

In the disclosure, the UE operation for the dormant BWP (dormant bandwidth part) or the UE operation for the activated SCell when the dormant BWP is activated is described below.

When the UE receives an indication indicating operation as or activation to a dormant BWP for a serving cell (PCell or SCell) from the PCell or SpCell, receives an indication indicating hibernating a BWP (for example, a downlink BWP) of a serving cell (for example, SCell) or the serving cell (for example, SCell) or an indication indicating activation of a dormant BWP through PDCCH DCI (L1 control signal), a MAC CE, or an RRC message, receives an indication indicating switching of a BWP (for example, a downlink BWP) to a dormant BWP through PDCCH DCI (L1 control signal), a MAC CE, or an RRC message (when the indication is received through PDCCH L1 control signal, the indication may be received by the PDCCH of its own cell through self-scheduling or received by the PDCCH of the PCell through cross-carrier scheduling), a BWP hibernation timer is configured and expires, an activated BWP of the activated Scell is a dormant BWP, or the activated BWP of the activated SCell is not a normal BWP, one or a plurality of operations among the following operations may be performed.

The uplink BWP or the downlink BWP is switched to a BWP (for example, a dormant BWP) configured through RRC, and the BWP is activated or hibernated.

The cell deactivation timer configured or driven in the cell or BWP is stopped.

The BWP hibernation timer is stopped when the BWP hibernation timer is configured in the BWP of the cell.

The dormant BWP inactivity timer starts or restarts in the BWP of the cell.

The BWP inactivity timer configured for the BWP of the cell is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP transitions from the inactive state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term 'suspend' means that transmission resource configuration information configured through the RRC message is stored in the UE but is not used anymore. The proposed method, that is, the operation of suspending the periodic uplink transmission resources (configured uplink grant Type 1) may be performed only when the BWP transitions from the active state to the dormant state. This is because periodic transmission resources are not used when the BWP transitions from the inactive state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

The UE measures a channel (CSI, CQI, PMI, RI, PTI, or CRI) for the downlink in the BWP of the cell according to the configuration of the gNB and reports the measurement. For example, the UE may periodically report the channel or frequency measurement.

The UE does not transmit uplink data through a UL-SCH in the BWP of the cell.

The UE does not perform a rand access procedure for the BWP of the cell.

The UE does not monitor a PDCCH in the BWP of the cell.

The UE does not monitor a PDCCH for the BWP of the cell. However, in the case of cross-scheduling, an indication may be received by monitoring a PDCCH for the cell (for example, SCell) in the scheduled cell (for example, PCell).

No PUCCH or SPUCCH transmission is performed in the BWP of the cell.

The downlink BWP may be hibernated, and a channel measurement may be performed and reported. Further, the uplink BWP of the cell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

If an indication indicating activation or switching to the dormant BWP for the downlink is made or an indication indicating hibernation of the BWP is made, a random access procedure is performed without cancelling the same. This is because a preamble is transmitted through the uplink and a random access response is received through the downlink of the Pcell when the random access procedure is performed in the Scell. Accordingly, even though the downlink BWP is hibernated or switched to the dormant BWP, a problem does not occur.

In the disclosure, the UE operation when the normal BWP (active bandwidth part (BWP) of the activated SCell is activated or when a BWP which is not the dormant BWP is activated is described below.

If an indication indicating activation of a normal BWP (for example, a downlink BWP) of the current cell (PCell or SCell) or a normal BWP which is not a dormant BWP or an indication indicating activation of the cell is received through DCI (L1 control signal) of a PDCCH, a MAC CE, or an RRC message, if an indication indicating switching of a BWP (for example, a downlink BWP) to an active BWP (or a BWP which is not the dormant BWP) is received through DCI (L1 control signal) of a PDCCH, a MAC CE, or an RRC message, if the activated BWP of the current activated cell is a normal BWP, or if the activated BW of the current activated cell is not a dormant BWP (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

The BWP is switched to the indicated uplink or downlink BWP or activated. Alternatively, the uplink or down-link BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP inactivity timer or cell deactivation timer starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If there are type 1 configuration transmission resources of which the use is suspended, the stored type 1 transmission resources may be initialized and used. The type 1 configuration transmission resources are periodic (up-link or downlink) transmission resources pre-allocated through an RRC message, which can be used after being activated through the RRC message.

A PHR is triggered for the BWP.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross-scheduling in the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP, the BWP hibernation timer starts or restarts for the BWP.

In the disclosure, the UE operation when an active BWP (active bandwidth part (BWP)), a BWP, or a SCell is deactivated is described below.

If an indication indicating deactivation of a BWP (for example, a downlink BWP) of the current cell (PCell or SCell) is received through DCI (L1 control signal) of a PDCCH, a MAC CE, or an RRC message, if an indication indicating deactivation of a BWP (for example, a downlink BWP) or an indication indicating switching to an inactive BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), if the BWP inactivity timer or cell deactivation timer expires in the cell, if the activated SCell is deactivated, or if the BWP of the SCell is deactivated, one or a plurality of operations of the following operations may be performed.

The cell of the indicated uplink or downlink BWP is deactivated.

The UE stops the BWP inactivity timer (for example, a deactivation timer for a downlink BWP) configured and driven in the cell or BWP.

Periodic downlink transmission resources (DL SPS or configured downlink assignment) or periodic uplink transmission resources (UL SPS or configured uplink grant Type 2) configured in the cell or BPW may be released (cleared). The term 'release (clear)' means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. Further, the operation of releasing (clearing) the periodic transmission resources may be performed only when the Scell transitions from the active state to the inactive state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the cell or BWP may be suspended. The term 'suspend' means that transmission resource configuration information configured through the RRC message is stored in the UE but is not used anymore. The periodic transmission resources may be called type 1 configuration transmission resources. Further, the operation of releasing (clearing) the periodic transmission resources may be performed only when the Scell transitions from the active state to the inactive state. This is because the releasing (clearing) operation is not needed when the transition is made from the dormant state to the inactive state because there are no periodic transmission resources in the dormant state. In another method, the periodic transmission resources may be released only when the periodic downlink transmission resources or the periodic uplink transmission resources are configured or when the transmission resources are configured and used.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The UE does not transmit an SRS for the cell or BWP.

The UE neither measures a channel (CSI, CQI, PMI, RI, PTI, or CRI) for the downlink nor reports the channel measurement for the cell or BWP.

The UE does not transmit uplink data through a UL-SCH in the cell or BWP.

The UE does not perform a random access procedure for the cell or BWP.

The UE does not monitor a PDCCH in the cell or BWP.

The UE does not monitor a PDCCH for the cell or BWP. Further, in the case of cross-scheduling, a PDCCH for the cell is not monitored in the scheduled cell.

A PUCCH or an SPUCCH is not transmitted in the cell or BWP.

In the disclosure, the activated state, the deactivated state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an activated state to a dormant state or switched to a dormant BWP (or activated), the BWP may be transitioned to the dormant state or switched to the dormant BWP (or activated).

In the disclosure, BWP switching means that, if BWP switching is indicated with a BWP identifier through PDCCH DCI while downlink assignment is allocated, the downlink BWP is switched to a BWP indicated by the BWP identifier, and if BWP switching is indicated with a BWP identifier through PDCCH DCI while a UL grant is allocated, the uplink BWP is switched to a BWP indicated by the BWP identifier. The UE operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, detailed embodiments for expanding and applying the content proposed in the disclosure are described.

Figure 8:
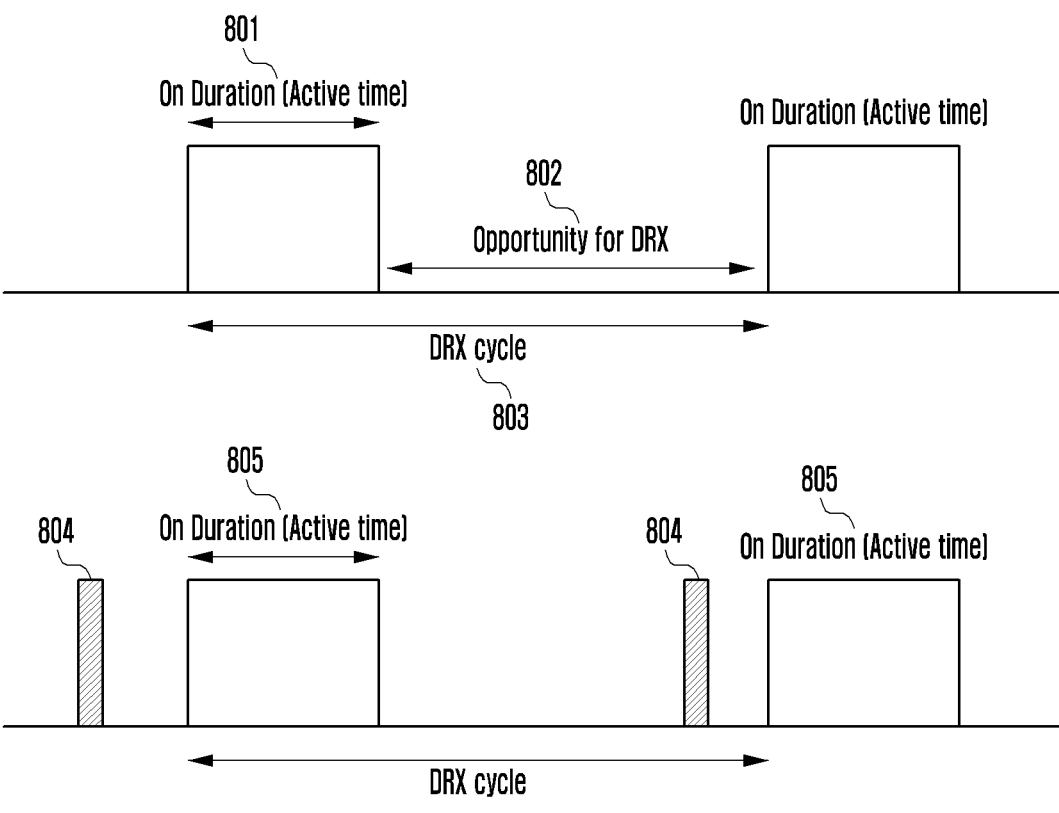
FIG. 8 is a diagram illustrating a DRX configuration or DRX operation method to save a UE battery according to an embodiment of the disclosure.
Figure 8:
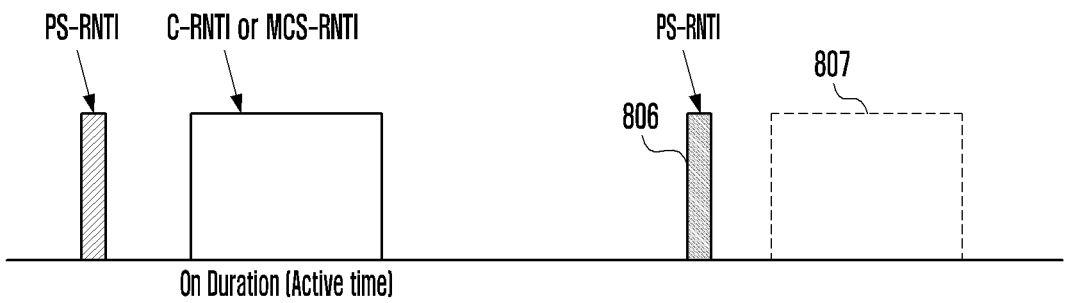

FIG. 8 is a diagram illustrating a DRX configuration or DRX operation method to save a UE battery according to an embodiment of the disclosure.

Referring to FIG. 8, the gNB may configure a DRX function such as a DRX cycle, a start point, an offset, or on-duration (active time) in the PCell, the SCell, or the PSCell for the UE through the RRC message as illustrated in FIG. 6. The disclosure considers configuration of the DRX function in the PCell, SpCell, or the PSCell.

As described above, if the DRX function is configured in the PCell (SpCell or PSCell), the UE may consider a DRX cycle 803, a DRX start time, or an offset to apply the DRX function. When the DRX function is applied, the UE may monitor a PDCCH or DCI of the PDCCH which can be received from the gNB in the PCell only within the active time 801 (on-duration) of the DRX. Further, the UE does not need to monitor the PDCCH or the DCI of the PDCCH outside the active time 802 of the DRX function, thereby reducing battery consumption of the UE.

In FIG. 6, the gNB may configure a power saving function (power saving mode) in the UE through the RRC message in order to further reduce battery consumption of the UE. When the power saving function is configured along with the DRX function, the PDCCH is monitored outside the active time during a short time interval 804 configured through the RRC before the active time 801 in which the UE should monitor the PDCCH, and a wake up signal (WUS) is monitored and received outside the active time. The gNB may indicate whether the UE should monitor the PDCCH or not in the next active time 805 or 807 through a bit of the DCI of the PDCCH of the WUS.

That is, the UE in which the power saving function or the DRX function is configured may monitor the WUS during the short time interval 804 configured in the RRC message before the active time 805. If a bit value of the DCI of the PDCCH for the next active time 805 or 807 is 0 (or 1) in the WUS, it may indicate that the UE does not monitor the PDCCH within the next active time 807 or indicate that the UE does not monitor the PDCCH by not driving a timer corresponding to the next active time in the MAC layer device. If the bit value of the DCI of the PDCCH for the next active time 805 or 807 is 1 (or 0) in the received WUS, it may indicate that the UE monitors the PDCCH within the next active time 805 or may indicate that the UE monitors the PDCCH by driving a timer corresponding to the next active time in the MAC layer device.

Further, the UE may not monitor the WUS or the PDCCH for searching for the WUS within the active time.

When monitoring the WUS during the short time interval 804 configured in the RRC message before the active time 805, the UE in which the power saving function or the DRX function is configured may search for a signal by identifying the PDCCH through a first RNTI (for example, a PS-RNTI). The first RNTI (for example, the PS-RNTI) may be configured in a plurality of UEs, and the gNB may indicate at once whether to monitor the PDCCH within the next active time to the plurality of UEs through the first RNTI (for example, P S-RNTI).

When monitoring and searching for the PDCCH in the active time 805, the UE in which the power saving function or the DRX function is configured may search for a signal on the basis of a second RNTI (for example, a C-RNTI), a third RNTI (for example, an MCS-C-RNTI), or a fourth RNTI (SPS-C-RNTI) uniquely configured in the UE through the RRC message. The second RNTI (for example, C-RNTI) may be used to indicate general UE scheduling, the third RNTI (for example, MCS-C-RNTI) may be used to indicate a modulation and coding scheme of the UE, and the fourth RNTI (SPS-C-RNTI) may be used to indicate periodic transmission resources of the UE.

Figure 9:
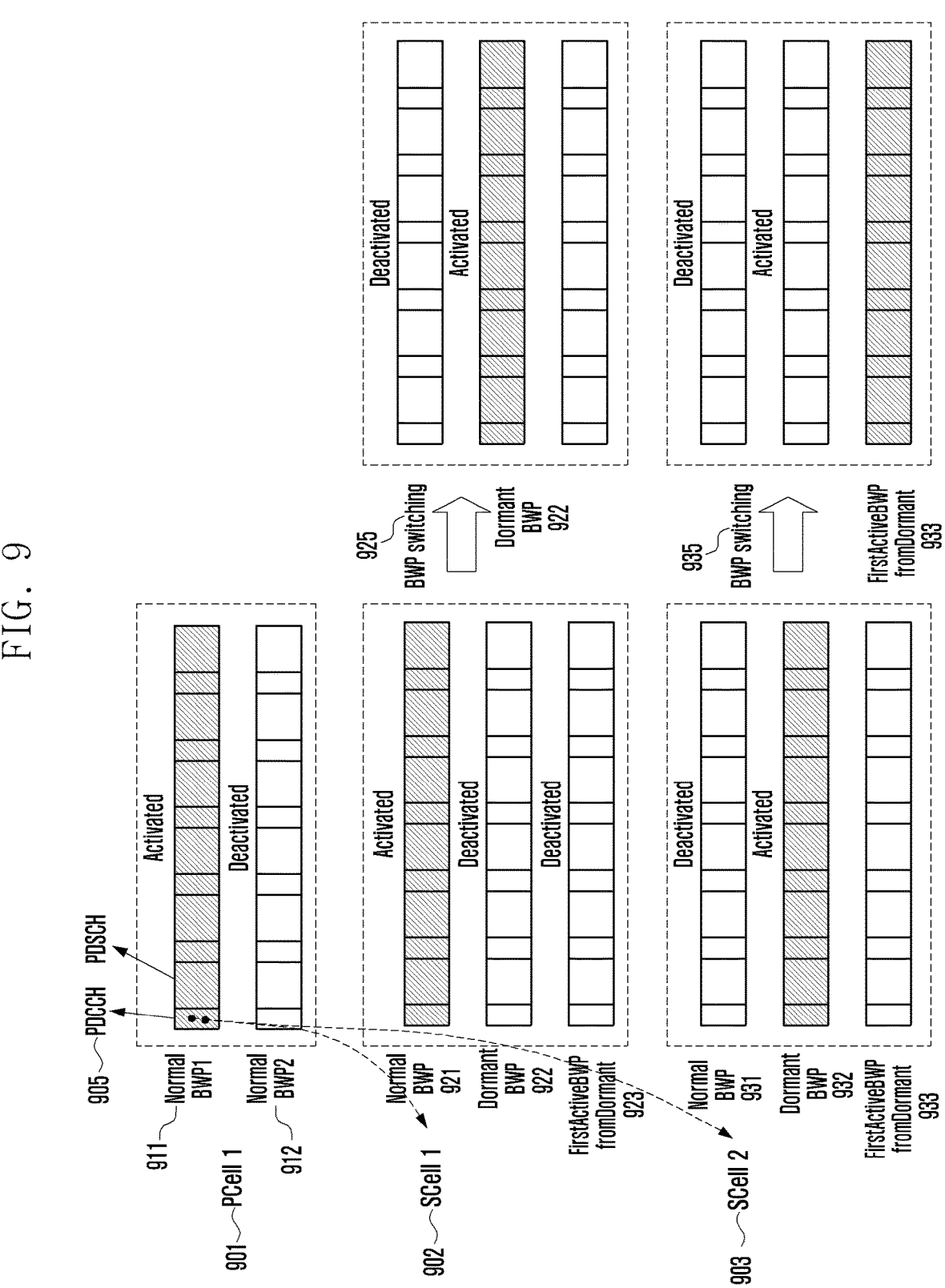
FIG. 9 is a diagram illustrating the concept of a method of operating a dormant BWP in an activated SCell according to an embodiment of the disclosure.

FIG. 9 is a diagram illustrating the concept of a method of operating a dormant BWP in an activated SCell according to an embodiment of the disclosure.

The gNB may configure a plurality of SCells to the UE for carrier aggregation, allocate each SCell identifier, and configure a dormant BWP for each SCell through the RRC message as illustrated in FIG. 6. Further, the plurality of SCells may be included in each SCell group, and one SCell group may include a plurality of SCells. A SCell group identifier may be allocated to each SCell group, and a plurality of SCell identifier may be included in or mapped to each SCell group identifier. A SCell identifier value or an SCell group identifier value may be allocated as a predetermined bit value and have an integer value (or a natural number value).

In FIG. 9, the gNB may define a new bitmap for PDCCH DCI transmitted in the PCell, map bit values such that each bit value of the bitmap indicates each SCell identifier value or each SCell group identifier value, and define each bit value to indicate whether to switch the SCell or SCells belonging to the SCell group corresponding to the bit to a dormant BWP or activate the dormant BWP thereof. Further, the gNB may indicate whether to switch the SCell or SCells belonging to the SCell group corresponding to the bit from a dormant BWP to a normal BWP (for example, a first active BWP activated from a dormant state) or activate the normal BWP (for example, first active BWP activated from a dormant state).

In FIG. 9, the UE may receive the PDCCH DCI in the PCell 901, read the DCI, and then identify whether there is a bitmap including an indication for BWPs of SCells or SCell groups (for example, switching to or activating the dormant BWP, or switching to or activating the normal BWP). If there is the bitmap, the UE may switch to or activate the BWP according to the bit value for the SCell or SCells 902, 903 belonging to the SCell group indicated by each bit. For example, if the bit of the bitmap indicates a first SCell 902 (or a first SCell identifier) or an SCell group including the first SCell (or an SCell group identifier) and the bit value is 0 (or 1), the UE may activate a BWP 921 to a dormant BWP 922 for the first SCell 902 or switch the current BWP to the dormant BWP 922 or, if the current BWP is not a dormant BWP, switch or activate the currently activated BWP 921 to the dormant BWP 922 as indicated by reference numeral 925.

In FIG. 9, the UE may receive the PDCCH DCI in the PCell 901, read the DCI, and then identify whether there is a bitmap including an indication for BWPs of SCells or SCell groups (for example, switching to or activating the dormant BWP, or switching to or activating the normal BWP). If there is the bitmap, the UE may switch to or activate the BWP according to the bit value for the SCell or SCells 902, 903 belonging to the SCell group indicated by each bit. For example, if the bit of the bitmap indicates the second SCell 903 (or a second SCell identifier) or a Scell group including the second Scell (or an SCell group identifier) and the bit value is 1 (or 0), the UE may switch or activate a BWP of the second Scell 903 to a BWP configured through an RRC message (for example, a first active BWP from a dormant state 933) as indicated by reference numeral 935, if the current activated BWP for the second Scell 903 is a dormant BWP 932, the current activated BWP is not a normal BWP, or the current BWP (or cell) is activated and is activated to the dormant BWP 932 (or activated to a BWP which is not the normal BWP). When the bit value is 1 (or 0) and thus a Scell or Scells belonging to a Scell group indicated by the bit should be switched or activated to the first active BWP from the dormant state, the Scell or Scells belonging to the Scell group may not apply the bit value, may ignore the bit value, or may not read the bit value if the state of the Scell is in a deactivated state or the state of the Scell is in an activated state and an activated BWP is not a dormant BWP (or is a normal BWP).

FIG. 10 is a diagram illustrating a first embodiment that embodies the concept of the method of operating the dormant BWP in the activated SCell described with reference to FIG. 9 of the disclosure.

In the first embodiment, the gNB may configure a plurality of SCell to the UE for carrier aggregation, allocate each SCell identifier, configure a dormant BWP for each SCell, and may not configure a dormant BWP for some SCells through the RRC message as described in FIG. 6. Further, the plurality of SCells may be included in each SCell group, and one SCell group may include a plurality of SCells. A SCell group identifier may be allocated to each SCell group, and a plurality of SCell identifier may be included in or mapped to each SCell group identifier. A SCell identifier value or an SCell group identifier value may be allocated as a predetermined bit value and have an integer value (or a natural number value). SCell groups or SCell group identifiers configured to realize or apply the first embodiment of the disclosure may be referred to as first SCell groups. The first SCell groups may indicate group identifiers to which the operation indicated by a DCI bitmap value included in a PDCCH DCI monitored and received within a short time interval or out of active time by the UE is applied in the first embodiment of the disclosure.

In FIG. 10, the gNB may configure a power saving function or a DRX function to each of a plurality of UEs through the RRC message as described in FIG. 6. The gNB may configure time information of a short time interval 1002 for detecting a first DCI format or a WUS before the active time 1030 of the DRX cycle in the PCell or SpCell or configure configuration information of the first DCI format through the RRC message. The gNB may configure the location of a bitmap including an indication for the first SCell groups of each UE in the first DCI format through the RRC message for the first DCI format detected within the short time interval 1002 in the PCell or SpCell by the UE. Further, the gNB may configure a search space of PDCCH monitoring or a UE identifier (for example, PS-RNTI) for searching for the first DCI format within the short time interval 1002 to the UE through the RRC message. When the SCell is switched or activated to the dormant BWP, the UE does not monitor PDCCH DCI, and thus it is very inefficient for the UE to receive the PDCCH DCI or the bitmap proposed in the disclosure in the SCell instead of the PCell or SpCell. Accordingly, the disclosure proposes monitoring of the PDCCH DCI in the PCell or SpCell.

For example, as described above, the gNB may configure the power saving function or the DRX function to a plurality of UEs and transmit the first DCI format on PDCCH transmission resources in the short time interval 1002 configured before the next active time 1030 of the DRX cycle configured to the UEs as indicated by reference numeral

1003, and the first DCI format may include bitmaps 1004, 1005 including indication information for dormant BWPs of the first SCell groups configured to each of the plurality of UEs.

A first UE 1010 applying information configured through the RRC message may monitor the PDCCH on the basis of the PS-RNTI which is an identifier configured within the short time interval 1002 configured before the next active time 1030 of the DRX cycle and search for the first DCI format 1003 from the gNB in the search space. If the first DCI format 1003 is detected, the first UE may read the bitmap 1004 including indication information for the dormant BWPs of the first SCell groups of the first UE in the first DCI format 1003 based on time information or location information configured through the RRC message. The length of the bitmap may be configured to be the same as the number of first SCell groups configured in the first UE or maximally configured to a predetermined number (for example, 5). Further, each bit value of the bitmap may be mapped to or indicate each first SCell group in an ascending order of SCell group identifier values of the first SCell groups configured to the first UE from the right bit (for example, from the least significant bit (LSB)) of the bitmap. In another method, each bit value of the bitmap may be mapped to or indicate each first SCell group in a descending order of SCell group identifier values of the first SCell groups configured in the first UE from the right bit (for example, from the least significant bit (LSB)) of the bitmap. In another method, each bit value of the bitmap may be mapped to or indicate each first SCell group in an ascending order of SCell group identifier values of the first SCell groups configured in the first UE from the left bit (for example, from the most significant bit (MSB)) of the bitmap. In another method, each bit value of the bitmap may be mapped to or indicate each first SCell group in a descending order of SCell group identifier values of the first SCell groups configured in the first UE from the left bit (for example, from the most significant bit (MSB)) of the bitmap.

When a bit value of the bitmap 1011 or 1012 is 0, the bit value of 0 may indicate switching to a dormant BWP or activation of a dormant BWP for each activated SCell among SCells included in the first SCell group corresponding to the bit (if the dormant BWP is configured). In another method, when the bit value of the bitmaps is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

A second UE 1020 applying information configured through the RRC message may monitor the PDCCH on the basis of the PS-RNTI which is an identifier configured within the short time interval 1002 configured before the next active time 1030 of the DRX cycle and search for the first DCI format from the gNB in the search space as indicated by reference numeral 1003. If the first DCI format 1003 is detected, the second UE may read the bitmap 1005 including indication information for the dormant BWPs of the first SCell groups of the second UE in the first DCI format 1003 based on time information or location information configured through the RRC message. The length of the bitmap may be configured to be the same as the number of first SCell groups configured in the second UE or maximally configured to a predetermined number (for example, 5). Further, each bit value of the bitmap may be mapped to or indicate each first SCell group in an ascending order of SCell group identifier values of the first SCell groups configured in the second UE from the right bit (for example, from the least significant bit (LSB)) of the bitmap. In another method, each bit value of the bitmap may be mapped to or indicate each first SCell group in a descending order of SCell group identifier values of the first SCell groups configured in the second UE from the right bit (for example, from the least significant bit (LSB)) of the bitmap. In another method, each bit value of the bitmap may be mapped to or indicate each first SCell group in an ascending order of SCell group identifier values of the first SCell groups configured in the second UE from the left bit (for example, from the most significant bit (MSB)) of the bitmap. In another method, each bit value of the bitmap may be mapped to or indicate each first SCell group in a descending order of SCell group identifier values of the first SCell groups configured in the second UE from the left bit (for example, from the most significant bit (MSB)) of the bitmap.

When a bit value of the bitmap 1021, 1022, 1023, 1024 or 1025 is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmap is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The first embodiment of the disclosure is realized as described above, and the first DCI format of the PDCCH proposed by the first embodiment may be used within the short time interval and is not accompanied by downlink transmission resources (for example, PDSCH) or uplink transmission resources (for example, PUSCH) for the UE. Accordingly, the UE may receive the first DCI format of the PDCCH and may not transmit ACK or NACK information thereof (for example, HARQ ACK or NACK) in the first embodiment.

The first embodiment proposed in the disclosure may be more specifically realized as follows.

In the first embodiment of the disclosure, a dormancy or non-dormancy operation for SCells of the UE and an operation for a PDCCH monitoring indicator are described below.

The UE in which the DRX function or the power saving function for the PCell or SpCell is configured may monitor the PDCCH within the short time interval 804 of FIG. 8 or 1002 of FIG. 10 and may follow the operation described below. Further, the UE may monitor the PDCCH in an activated downlink BWP of the PCell or SpCell.

The UE may monitor the PDCCH and search for the first DCI format (for example, DCI format 2-6) or the WUS with the PS-RNTI.

The UE may receive a configuration of a plurality of search spaces and apply the same in order to monitor the PDCCH for searching for the first DCI format (for example, DCI format 2-6) or the WUS in the activated downlink BWP of the PCell or SpCell according to a common search space configured through the RRC message.

The size of data (payload) of the first DCI format may be determined as a size configured through RRC (for example, SizeDCI_2-6).

When the WUS or the first DCI format is detected, the UE may identify the location of a PDCCH monitoring indicator of the WUS configured through RRC, and if a value of the PDCCH monitoring indicator is 0, the UE may not start a timer for the active time (or on-duration) of the next longer DRX cycle so as not to monitor the PDCCH within the active time. If the value of the PDCCH monitoring indicator is 1, the UE may monitor the PDCCH within the active time by starting the timer for the active time (or on-duration) of the next longer DRX cycle.

When the WUS or the first DCI format is detected, the UE may identify the location of the WUS configured through the RRC message, and if a plurality of first SCell groups for the first embodiment of the disclosure are configured through the RRC message, the UE may read the size of a bitmap corresponding to the number of first SCells groups.

The location of the bitmap for the first embodiment of the disclosure may be right behind a PDCCH monitoring indicator.

The size of the bitmap for the first embodiment of the disclosure may be the same as the number of first SCell groups configured to the UE through the RRC message in which SCells are included or configured, and each bit of the bitmap may correspond to each first SCell group (or first SCell group identifier or SCells belonging to the first SCell group) in an ascending order of SCells group identifier values of the configured first SCell group. In another method, each bit of the bitmap may correspond to or mapped to each first SCell group (or first SCell group identifier or SCells belonging to the first SCell group) in a descending order of SCell group identifier values of the configured first SCell group. In another method, each bit of the bitmap may correspond to or may be mapped to each first SCell group (or first SCell group identifier or SCells belonging to the first SCell group) in an ascending order of SCell group identifier values of the first SCell group sequentially from the right bit (from the least significant bit (LSB)) or the left bit (from the most significant bit (MSB)). In another method, each bit of the bitmap may correspond to or may be mapped to each first SCell group (or first SCell group identifier or SCells belonging to the first SCell group) in a descending order of SCell group identifier values of the first SCell group sequentially from the right bit (from the least significant bit (LSB)) or the left bit (from the most significant bit (MSB)).

When the bit value of the bitmap is 0, the bit value of 0 may indicate switching to a dormant BWP or activation of a dormant BWP for each activated SCell among SCells included in the first SCell group corresponding to the bit (if a dormant BWP is configured). In another method, when the bit value of the bitmaps is 0, the bit value of 0 may indicate switching to a dormant BWP or activation of a dormant BWP if a BWP activated for each activated SCell among SCells included in the first SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the first SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the first SCell group corresponding to the bit is a dormant BWP (or is not a normal BWP). Otherwise (if the current or activated BWP for each activated SCell among SCells included in the first SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the first SCell group corresponding to the bit, indicate activation to the normal BWP (for example, the first active BWP activated from the dormant state), or indicate maintenance, continuous use, application, or activation of the current active BWP.

The short time interval 804 of FIG. 8 or 1002 of FIG. 10 within which the PDCCH should be monitored to search for the first DCI format or the WUS may be calculated or indicated by an offset configured in the RRC message, and the first DCI format or the WUS may be detected within a short time interval before the active time of the DRX cycle.

The first DCI format (for example, DCI format 2_6) may not be detected or monitored through unnecessary PDCCH monitoring within the active time of the DRX cycle in order to reduce a battery of the UE.

If the UE did not detect the first DCI format or the WUS within the short time interval 804 of FIG. 8 or 1002 of FIG. 10 even though the power saving function or the DRX function is configured (or the UE is configured to search for the first DCI format within the short time), the UE may perform the basic operation below within the active time of the DRX cycle.

If a search space in which PDCCH monitoring is performed to search for the first DCI format in an activated downlink BWP of the PCell or SpCell is configured or provided and the UE did not detect the first DCI format, if the power saving function is configured in the RRC message or an indicator (for example, power saving (ps)—Wake up Or Not) indicating whether to start a timer (or wake up and perform a search within the active time) to monitor the PDCCH within the next active time for the power saving function or not start the timer (or not perform the search within the active time) is configured (or provided), the UE may or not start the timer for the active time according to the indicator.

if the power saving function is configured in the RRC message or an indicator (for example, power saving (ps)—Wake up Or Not) indicating whether to start a timer (or wake up and perform a search within the active time) to monitor the PDCCH within the next active time for the power saving function or not start the timer (or not perform the search within the active time) is not configured (or not provided), the UE may not start the timer for the active time.

If a search space in which PDCCH monitoring is performed to search for the first DCI format in an activated downlink BWP of the PCell or SpCell is configured or provided and the UE is not configured (or is not required) to search for the first DCI format through PDCCH monitoring within a short time interval before the next active time of the DRX cycle, or if a short time interval within which the first DCI format is detected through PDCCH monitoring before the next active time of the DRX cycle is not configured, the UE should start a timer for the next active time of the DRX cycle.

Another embodiment that is embodied from the first embodiment of the disclosure proposed in the disclosure is described below.

PDCCH Monitoring Indication and Dormancy/Non-Dormancy Behaviour for Scells

A UE configured with DRX mode operation on the PCell or on the SpCell a PS-RNTI for DCI format 2_6 by ps-RNTI a number of search space sets, by dci-Format2-6, to monitor PDCCH for detection of DCI format 2_6 on the active DL BWP of the PCell or of the SpCell according to a common search space a payload size for DCI format 2_6 by SizeDCI_2-6 a location in DCI format 2_6 of a Wake-up indication bit by PSPositionDCI2-6, where the UE may not start the drx-onDurationTimer for the next long DRX cycle when a value of the 'PDCCH monitoring' bit is '0', and the UE starts the drx-onDurationTimer for the next long DRX cycle when a value of the 'PDCCH monitoring' bit is '1' a bitmap, when the UE is provided a number of groups of configured SCells by Scell-group s-for-dormancy-outside-active-time, where the bitmap location is immediately after the 'PDCCH monitoring' bit location the bitmap size is equal to the number of groups of configured SCells where each bit of the bitmap from LSB or MSB corresponds to a group of configured SCells from the number of groups of configured Scells in the ascending order or descending order of configured dormant SCell group identity.

a '0' value for a bit of the bitmap indicates an active DL BWP, provided by dormant-BWP, for the UE for each activated SCell in the corresponding group of configured Scells Option 1.

if the previous DL BWP was a dormant DL BWP or if the active DL BWP is a dormant DL BWP, a '1' value for a bit of the bitmap indicates an active DL BWP, provided by firstActiveDownlinkBWPFromDormant, for the UE for each activated SCell in the corresponding group of configured Scells. Otherwise, it indicates to continue the current active DL BWP.

Option 2.

if the previous DL BWP was not an active DL BWP (normal DL BWP) or if the active DL BWP is not an active DL BWP (normal DL BWP), a '1' value for a bit of the bitmap indicates an active DL BWP, provided by firstActiveDownlinkBWPFromDormant, for the UE for each activated SCell in the corresponding group of configured Scells. Otherwise, it indicates to continue the current active DL BWP.

Option 3.

a '1' value for a bit of the bitmap indicates an active DL BWP switched from dormant DL BWP, provided by firstActiveDownlinkBWPFromDormant or the current active DL BWP, for the UE for each activated SCell in the corresponding group of configured Scells an offset by ps-Offset indicating a time, where the UE starts monitoring PDCCH for detection of DCI format 2_6 according to the number of search space sets, prior to a slot where the drx-onDuarationTimer would start on the PCell or on the SpCell for each search space set, the PDCCH monitoring occasions are the ones in the first Ts slots indicated by duration, or Ts=1 slot if duration is not provided, starting from the first slot of the first Ts slots and ending prior to the start of drx-onDurationTimer.

The UE does not monitor PDCCH for detecting DCI format 2_6 during Active Time.

If a UE reports for an active DL BWP a requirement for a number of slots prior to the beginning of a slot where the UE would start the drx-onDurationTimer, the UE is not required to monitor PDCCH for detection of DCI format 2_6 during the number of slots.

If a UE is provided search space sets to monitor PDCCH for detection of DCI format 2_6 in the active DL BWP of the PCell or of the SpCell and the UE does not detect DCI format 2_6 if the UE is provided ps-WakeupOrNot, the UE is indicated by ps-WakeupOrNot whether the UE may not start or whether the UE may start the drx-onDuration-Timer for the next DRX cycle if the UE is not provided ps-WakeupOrNot, the UE may not start Active Time indicated by drx-onDuration-Timer for the next DRX cycle If a UE is provided search space sets to monitor PDCCH for detection of DCI format 2_6 in the active DL BWP of the PCell or of the SpCell and the UE is not required to monitor PDCCH for detection of DCI format 2_6, for all corresponding PDCCH monitoring occasions outside Active Time prior to a next DRX cycle, or does not have any PDCCH monitoring occasions for detection of DCI format 2_6 outside Active Time of a next DRX cycle the UE shall start by drx-onDurationTimer for the next DRX cycle.

Figure 11:
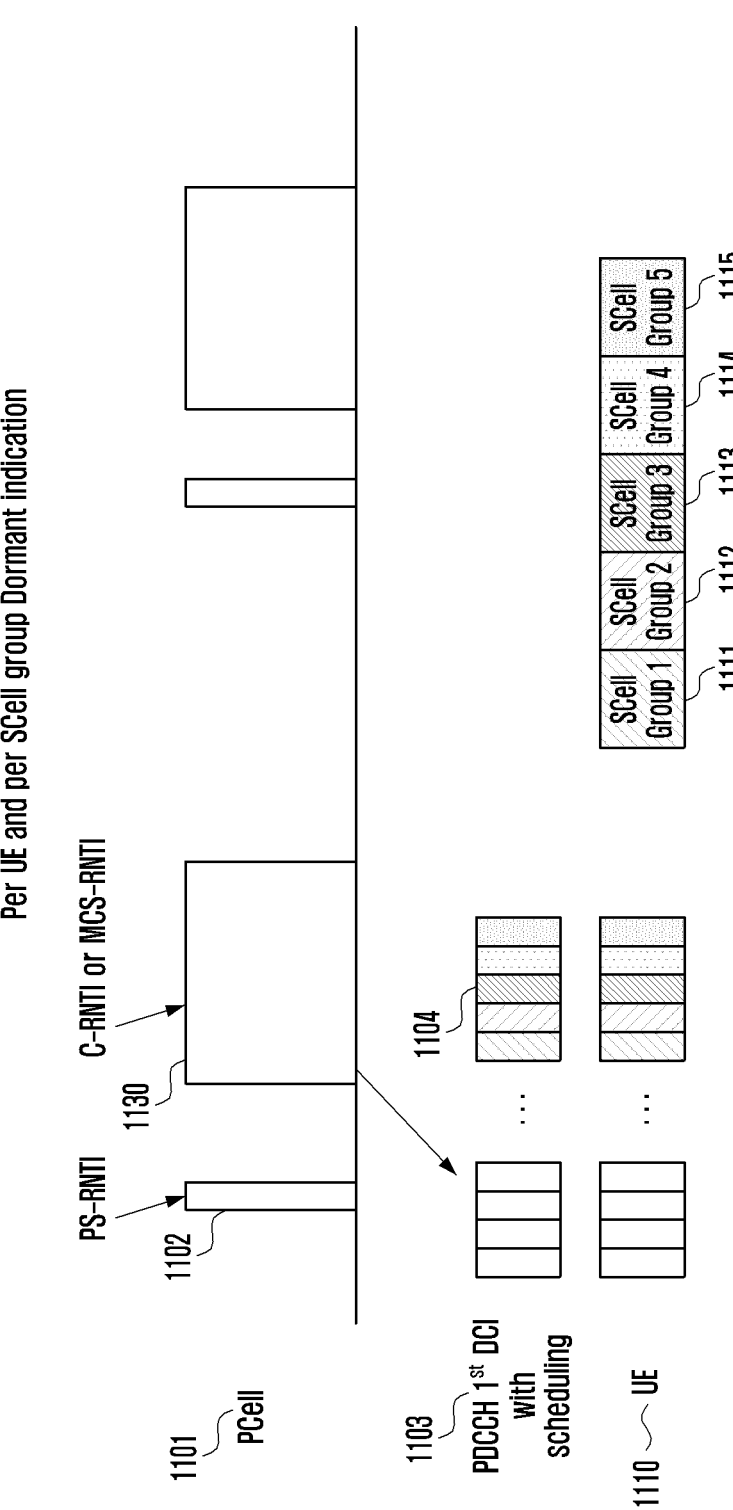
FIG. 11 is a diagram illustrating a second embodiment that embodies the concept of the method of operating the dormant BWP in the activated SCell described with reference to FIG. 9 of the disclosure.

FIG. 11 is a diagram illustrating a second embodiment that embodies the concept of the method of operating the dormant BWP in the activated SCell described with reference to FIG. 9 of the disclosure.

Referring to FIG. 11, in the second embodiment, the gNB may configure a plurality of SCell in the UE for carrier aggregation, allocate each SCell identifier, configure a dormant BWP for each SCell, and may not configure a dormant BWP for some SCells through the RRC message as described in FIG. 6. Further, the plurality of SCells may be included in each SCell, and one SCell group may include a plurality of SCells. A SCell group identifier may be allocated to each SCell group, and a plurality of SCell identifier may be included in or mapped to each SCell group identifier. A SCell identifier value or an SCell group identifier value may be allocated as a predetermined bit value and have an integer value (or a natural number value). SCell groups or SCell group identifiers configured to realize or apply the second embodiment of the disclosure may be referred to as second SCell groups. The second SCell groups may indicate group identifiers to which the operation indicated by a DCI bitmap value included in a PDCCH DCI monitored and received within the active time by the UE is applied in the second embodiment of the disclosure.

In FIG. 11, the gNB may configure a power saving function or a DRX function to the UE through the RRC message as described in FIG. 6. Further, in the RRC message, configuration information of a second DCI format (for example, DCI format 0_1 or DCI format 1_1) for which the UE should search within an active time 1130 of the DRX cycle for the PCell or SpCell may be configured. When the UE detected the second DCI format in the PCell or SpCell, the UE may identify whether a bitmap including an indicator for second SCell groups for the UE in the second DCI format. Further, the gNB may configure a search space of PDCCH monitoring or a UE identifier (for example, C-RNTI, MCS-C-RNTI, or SPS-C-RNTO) for searching for the second DCI format within the active time 1130 in the UE through the RRC message. When the SCell is switched or activated to the dormant BWP, the UE does not monitor PDCCH DCI, and thus it is very inefficient for the UE to receive the PDCCH DCI or the bitmap proposed in the disclosure in the SCell instead of the PCell or SpCell. Accordingly, the disclosure proposes monitoring of the PDCCH DCI in the PCell or SpCell.

For example, the gNB may transmit the second DCI format on PDCCH transmission resources of the active time 1130 in the PCell or SpCell as described above as indicated by reference numeral 1103, and the second DCI format may include a bitmap 1104 indicating indication information for the dormant BWP of the second SCell groups configured to the UE.

As described above, the first UE 1110 applying information configured by the RRC message may monitor the PDCCH on the basis of the UE identifier (for example, C-RNTI, MCS-C-RNTI, or SPS-C-RNTI) which is an identifier configured within the active time 1130 of the DRX cycle and search for the second DCI format 1103 from the gNB in the search space. If the second DCI format 1103 is detected, the first UE may read the bitmap 1104 including indication information for the dormant BWP of the second SCell groups of the first UE 1110 in the second DCI format 1103. The length of the bitmap may be configured to be the same as the number of second SCell groups configured to the first UE or maximally configured to a predetermined number (for example, 5). Further, each bit value of the bitmap may be mapped to or indicate each second SCell group in an ascending order of SCell group identifier values of the second SCell groups configured in the first UE from a right bit (for example, from the least significant bit (LSB)) of the bitmap. In another method, each bit value of the bitmap may be mapped to or indicate each second SCell group in a descending order of SCell group identifier values of the second SCell groups configured in the first UE from a right bit (for example, from the least significant bit (LSB)) of the bitmap. In another method, each bit value of the bitmap may be mapped to or indicate each second SCell group in an ascending order of SCell group identifier values of the second SCell groups configured in the first UE from a left bit (for example, from the most significant bit (MSB)) of the bitmap. In another method, each bit value of the bitmap may be mapped to or indicate each second SCell group in a descending order of SCell group identifier values of the second SCell groups configured in the first UE from a left bit (for example, from the most significant bit (MSB)) of the bitmap.

When a bit value of the bitmaps 1111, 1112, 1113, 1114, or 1115 is 0, the bit value of 0 may indicate switching to a dormant BWP or activation of a dormant BWP for each activated SCell among SCells included in the second SCell group corresponding to the bit (if a dormant BWP is configured). In another method, when the bit value of the bitmap is 0, the bit value of 0 may indicate switching to a dormant BWP or activation of a dormant BWP if a BWP activated for each activated SCell among SCells included in the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell among SCells included in the second SCell group corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell among SCells included in the second SCell group corresponding to the bit is the dormant BWP (or is not the normal BWP). Otherwise (if the current or activated BWP for each activated SCell among SCells included in the second SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the second SCell group corresponding to the bit, indicate activation to the normal BWP (for example, the first active BWP activated from the dormant state), or indicate maintenance, continuous use, application, or activation of the current active BWP.

The second embodiment of the disclosure is realized as described above, and the second DCI format of the PDCCH proposed by the second embodiment may be used within the active time and accompanied by downlink transmission resources (for example, PDSCH) or uplink transmission resources (for example, PUSCH) for the PCell or SpCell of the UE. Accordingly, in the second embodiment, the UE may receive the second DCI format of the PDCCH and transmit ACK or NACK information (for example, HARQ ACK or NACK) for scheduling information (downlink transmission resources or uplink transmission resources) of the PCell or SpCell indicated by the second DCI format, and accordingly the gNB may identify whether the UE success-fully receives an indication of the second DCI format in the second embodiment.

More specifically, the second embodiment proposed in the disclosure may be realized as follows.

In the second embodiment of the disclosure, a dormancy or non-dormancy operation for SCells of the UE and an operation for a PDCCH monitoring indicator are described below.

For the PCell or SpCell, if a search space is configured, provided, or detected to allow the UE to monitor a PDCCH in order to search for the second DCI format (for example, DCI format 0_1 or DCI format 1_1) within the active time 1130 of FIG. 11, and if a bitmap including an indication for the second SCell groups of the UE is included in the second DCI format, the UE may receive the bitmap and operate as follows. Further, the UE may monitor the PDCCH in an activated downlink BWP of the PCell or SpCell.

The UE may monitor the PDCCH and search for the second DCI format (for example, DCI format 0_1 or DCI format 1_1) by a UE identifier (C-RNTI, MCS-C-RNTI, or SPS-C-RNTI).

The UE may receive a configuration of a plurality of search space sets and apply the same in order to monitor the PDCCH for searching for the second DCI format in the activated downlink BWP of the PCell or SpCell according to a common search space configured through the RRC message.

When the second DCI format is detected, the UE may read the size of a bitmap corresponding to the number of second SCell groups if a plurality of second SCell groups for the second embodiment of the disclosure are configured through the RRC message.

The location of the bitmap for the second embodiment of the disclosure may be right behind a PDCCH monitor-ing indicator.

The size of the bitmap for the second embodiment of the disclosure may be the same as the number of second SCell groups configured in the UE through the RRC message in which SCells are included or configured, and each bit of the bitmap may correspond to or may be mapped to each second SCell group (or second SCell group identifier or SCells belonging to the second SCell group) in an ascending order of SCells group identifier values of the configured second SCell group. In another method, each bit of the bitmap may correspond to or may be mapped to each second SCell group (or second SCell group identifier or SCells belonging to the second SCell group) in a descending order of SCell group identifier values of the configured second SCell group. In another method, each bit of the bitmap may corre-spond to or may be mapped to each second SCell group (or second SCell group identifier or SCells belonging to the second SCell group) in an ascending order of SCell group identifier values of the second SCell group sequentially from the right bit (from the least signifi-cant bit (LSB)) or the left bit (from the most significant bit (MSB)). In another method, each bit of the bitmap may correspond to or may be mapped to each second SCell group (or second SCell group identifier or SCells belonging to the second SCell group) in a descending order of SCell group identifier values of the second SCell group sequentially from the right bit (from the least significant bit (LSB)) or the left bit (from the most significant bit (MSB)).

When the bit value of the bitmap is 0, the bit value of 0 may indicate switching to a dormant BWP or activation of a dormant BWP for each activated SCell among SCells included in the second SCell group correspond-ing to the bit (if a dormant BWP is configured). In another method, when the bit values of the bitmaps are 0, the bit value of 0 may indicate switching to a dormant BWP or activation of a dormant BWP if a BWP activated for each activated SCell among SCells included in the second SCell group corresponding to the bit is not a dormant BWP (or is a normal BWP).

When the bit value of the bitmap is 1, the bit value of 1 may indicate switching to a normal BWP (for example, a first active BWP activated from a dormant state) or activa-tion to a normal BWP (for example, a first active BWP activated from a dormant state) for each activated SCell among SCells included in the second SCell group corre-sponding to the bit. In another method, when the bit value of the bitmap is 1, the bit value of 1 may indicate switching to the normal BWP (for example, the first active BWP acti-vated from the dormant state) or activation of the normal BWP (for example, the first active BWP activated from the dormant state) if the current or activated BWP for each activated SCell among SCells included in the second SCell group corresponding to the bit is the dormant BWP (or is not the normal BWP). Otherwise (if the current or activated BWP for each activated SCell among SCells included in the second SCell group corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell among SCells included in the second SCell group corresponding to the bit, indicate activation to the normal BWP (for example, the first active BWP activated from the dormant state), or indicate maintenance, continuous use, application, or activation of the current active BWP.

Another embodiment which is embodied from the second embodiment proposed in the disclosure is described below.

If a UE is provided search space sets to monitor PDCCH for detection of DCI format 0-1 and DCI format 1_1 and if one or both of DCI format 0_1 and DCI format 1_1 include a XYZ field, for PCell, the XYZ field is a bitmap with size equal to a number of groups of configured SCells, provided by Scell-groups-for-dormancy-within-active-time, each bit of the bitmap corresponds to a group of configured SCells from the number of groups of configured Scells in the ascending order or descending order of configured dormant SCell group identity a '0' value for a bit of the bitmap indicates an active DL BWP, provided by dormant-BWP, for the UE for each activated SCell in the corresponding group of configured Scells Option 1.

if the previous DL BWP was a dormant DL BWP, a '1' value for a bit of the bitmap indicates an active DL BWP, provided by first-non-dormant-BWP-ID-for-DCI-inside-active-time, for the UE for each activated SCell in the corresponding group of configured Scells. Otherwise, it indicates to continue the current active DL BWP.

Option 2.

if the previous DL BWP was not an active DL BWP, a '1' value for a bit of the bitmap indicates an active DL BWP, provided by first-non-dormant-BWP-ID-for-DCI-inside-active-time, for the UE for each activated SCell in the corresponding group of configured Scells. Otherwise, it indicates to continue the current active DL BWP.

Option 3.

a '1' value for a bit of the bitmap indicates an active DL BWP switched from dormant DL BWP, provided by first-non-dormant-BWP-ID-for-DCI-inside-active-time or the current active DL BWP, for the UE for each activated SCell in the corresponding group of configured Scells In FIG. 6 of the disclosure, through an RRCSetup message, an RRCResume message 625, or an RRCReconfiguration message 645 of the RRC connection configuration, the gNB may configure first SCell group configuration information which can be applied to the first embodiment proposed in the disclosure and second SCell group configuration information which can be applied to the second embodiment in the UE. In the RRC message, the gNB may allocate a SCell identifier to each SCell of the UE, and may allocate a first SCell group identifier to each of the first SCell groups and a second SCell group identifier to each of the second SCell groups. Further, the gNB may allocate a first SCell group set identifier indicating the first SCell groups and indicate a second SCell group set identifier indicating the second SCell groups. Each SCell identifier may be included in or mapped to each first SCell group or each second SCell group. The gNB may include the SCell or the SCell identifier in the first SCell group or the second SCell group or map the SCell or the SCell identifier to the first SCell group or the second SCell group to configure the SCell or the SCell identifier only when a dormant BWP (for example, a downlink dormant BWP) is configured for the SCell.

Figure 12:
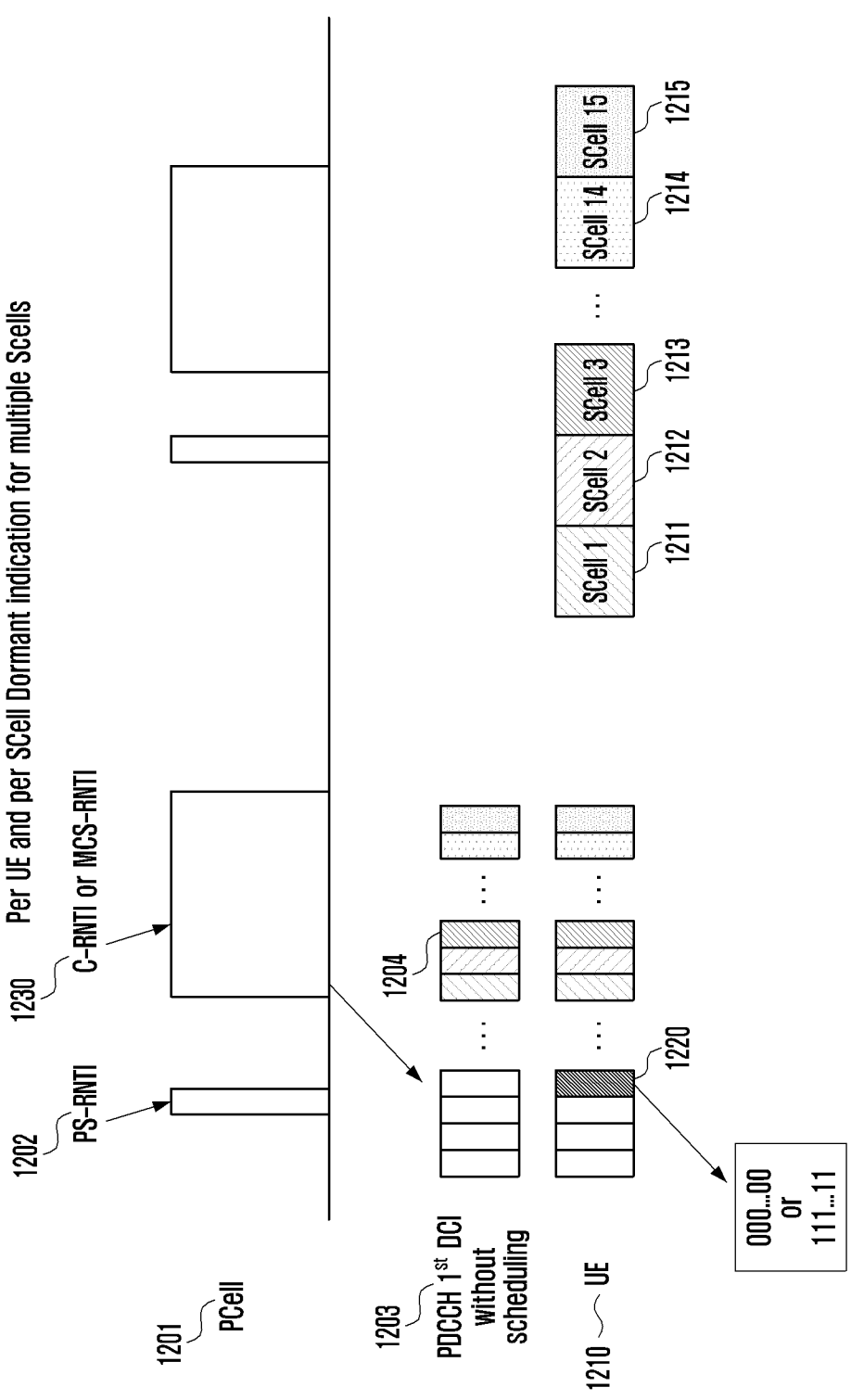
FIG. 12 is a diagram illustrating a third embodiment that embodies the concept of the method of operating the dormant BWP in the activated SCell described with reference to FIG. 9 of the disclosure.

FIG. 12 is a diagram illustrating a third embodiment that embodies the concept of the method of operating the dormant BWP in the activated SCell described with reference to FIG. 9 of the disclosure.

In the third embodiment, the gNB may configure a plurality of SCell to the UE for carrier aggregation, allocate each SCell identifier, configure a dormant BWP for each SCell, and may not configure a dormant BWP for some SCells through the RRC message as described in FIG. 6. A SCell identifier value may be allocated as a predetermined bit value and have an integer value (or a natural number value). In order to realize or apply the third embodiment of the disclosure, SCell identifiers configured in the RRC message may be used. The SCell identifiers may indicate SCells or SCell identifiers to which the operation indicated by a DCI bitmap value included in a PDCCH DCI monitored and received within the active time by the UE is applied in the third embodiment of the disclosure.

In FIG. 12, the gNB may configure a power saving function or a DRX function to the UE through the RRC message as described in FIG. 6. Further, in the RRC message, configuration information of a third DCI format (for example, DCI format 1_t) for which the UE should search within an active time 1230 of the DRX cycle for the PCell or SpCell may be configured. When the UE detected the third DCI format in the PCell or SpCell, the UE may identify whether a bitmap including an indicator for each SCell or SCell identifier of the UE in the third DCI format.

The third DCI format may include a transmission resource type (resourceAllocation) field, a frequency transmission resource allocation (frequency domain resource assignment) field, a modulation and coding scheme (MCS) field, a new data indicator (NDI) field, a redundancy version (RV) field, an HARQ process number field, an antenna port field, or a DMRS sequence initialization (DMRS SI) field.

If the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format, bits or fields located thereafter are not interpreted as the modulation and coding scheme (MCS) field, the new data indicator (NDI) field, the redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation. However, if the type indicated by the transmission resource type field (for example, resourceAllocation) is the first type (for example, resourceAllocationType0) and all bits of the frequency transmission resource allocation field are not 0 or if the type indicated by the transmission resource type field (for example, resourceAllocation) is a second type (for example, resourceAllocationType1) and all bits of the frequency transmission resource allocation field are not 1 in the detected third DCI format, bits or fields located thereafter are interpreted, read, and applied as the modulation and coding scheme (MCS) field, the new data indicator (NDI) field, the redundancy version (RV) field, the HARQ process number field, the antenna port field, or the DMRS sequence initialization (DMRS SI) field.

When the UE detected the third DCI format of the PDCCH, if the third DCI format is scrambled with a second UE identifier (for example, SPS-C-RNTI) or detected thereby, a special instruction indicating activation or release of periodic transmission resources configured in the UE may be indicated when the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the detected third DCI format.

Accordingly, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format only when the third DCI format of the PDCCH is detected through scrambling with the first UE identifier (for example, C-RNTI or MCS-C-RNTI), the third embodiment of the disclosure proposes interpretation of the fields thereafter as the bitmap indicating the dormant BWP operation for each SCell of the UE.

Further, the gNB may configure a search space of PDCCH monitoring or a UE identifier (for example, C-RNTI or MCS-C-RNTI) for searching for the third DCI format within the active time 1230 in the UE through the RRC message.

For example, the gNB may transmit the third DCI format on PDCCH transmission resources of the active time 1230 in the PCell or SpCell as described above as indicated by reference numeral 1203, and may include a bitmap 1204 indicating indication information for the dormant BWP of the third SCell groups configured to the UE.

As described above, the first UE 1210 applying information configured through the RRC message may monitor the PDCCH on the basis of (or through scrambling with) the first UE identifier (for example, C-RNTI or MCS-C-RNTI) which is an identifier configured within the active time 1230 of the DRX cycle to search for the third DCI format from the gNB in the search space as indicated by reference numeral 1203. If the third DCI format 1203 is detected and the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format 1203 as indicated by reference numeral 1220, fields thereafter may be interpreted as the bitmap indicating the dormant BWP operation for each SCell of the UE and the first UE may read the bitmap 1204 including indication information for the dormant BWP for a plurality of SCells (or SCell identifiers) configured in the first UE.

When the proposed condition is met, the bitmap may have a fixed length, for example, 15 bits or 16 bits since the bitmap is considered to replace the conventional MCS field, NDI field, RV field, HARQ process number field, antenna port field, or DMRS SI field.

In the third embodiment proposed in the disclosure, embodiment 3-1 to which a first bitmap mapping method is applied is described below.

In the first bitmap mapping method, each bit value of the bitmap may be mapped to and indicate each SCell in an ascending order or a descending order of SCell identifier values of SCells configured in the first UE from a right bit (for example, from the least significant bit (LSB)) of the bitmap or from a left bit (for example, from the most significant bit (MSB)).

In another method, in the first bitmap mapping method, each bit value of the bitmap may be mapped to and indicate each SCell in an ascending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in a descending order of SCell identifier values of SCells of a cell group (a master cell group (MCG) or a secondary cell group (SCG)) configured in the first UE from a right bit (for example, from the least significant bit (LSB)) of the bitmap. If the UE receives the third DCI format in the PCell, the SCell identifier values may be mapped to the bitmap in a descending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in an ascending order of SCell identifier values of SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in an ascending order only for SCells belonging to the cell group of the MCG. If the UE receives the third DCI format in the PSCell, the SCell identifier values may be mapped to the bitmap in an ascending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

In another method, in the first bitmap mapping method, each bit value of the bitmap may be mapped to and indicate each SCell in a descending order of SCell identifier values of SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in a descending order only for SCells belonging to the cell group of the MCG. If the UE receives the third DCI format in the PSCell, the SCell identifier values may be mapped to the bitmap in a descending order only for SCells belonging to the cell group of the SCG. The reason why the SCells mapped to the bitmap are restricted to the SCells of one cell group is that the number of SCell identifiers which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When a bit value of the bitmap 1211, 1212, 1213, 1214, or 1215 is 0, the bit value of 0 may indicate switching to a dormant BWP or activation of a dormant BWP for each activated SCell corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if a BWP activated for each activated SCell corresponding to the bit is not a dormant BWP (or is a normal BWP). If the dormant BWP is not configured in the activated SCell corresponding to the bit of the bitmap, the UE may ignore or may not read or apply the bit value.

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. If the dormant BWP is not configured in the activated SCell corresponding to the bit of the bitmap, the UE may ignore or may not read or apply the bit value.

In the third embodiment proposed in the disclosure, embodiment 3-2 to which a second bitmap mapping method is applied is described below.

In the second bitmap mapping method, each bit value of the bitmap may be mapped to and indicated by each SCell in an ascending order or a descending order of SCell identifier values of SCells included in a first SCell group or a second SCell group or in which a dormant BWP is configured among SCells configured in the first UE from a right bit (for example, from the least significant bit (LSB)) of the bitmap or from a left bit (for example, from the most significant bit (MSB)).

In another method, in the second bitmap mapping method, each bit value of the bitmap may be mapped to and indicate each SCell in an ascending order of SCell identifier values of SCells included in a first SCell group or a second SCell group or in which a dormant BWP is configured among SCells of a cell group (a master cell group (MCG) or a secondary cell group (SCG)) configured in the first UE from a right bit (for example, from the least significant bit (LSB)). If the UE receives the third DCI format in the PCell, Scells included in the first SCell group or the second SCell group or in which the dormant BWP is configured among the SCells belonging to the cell group of the MCG may be mapped to the bitmap in an ascending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicate each SCell in a descending order of SCell identifier values of SCells included in a first SCell group or a second SCell group or in which a dormant BWP is configured among SCells of a cell group (a master cell group (MCG) or a secondary cell group (SCG)) configured in the first UE from a right bit (for example, from the least significant bit (LSB)) of the bitmap. If the UE receives the third DCI format in the PCell, Scells included in the first SCell group or the second SCell group or in which the dormant BWP is configured among the SCells belonging to the cell group of the MCG may be mapped to the bitmap in a descending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicate each SCell in an ascending order of SCell identifier values of SCells included in a first SCell group or a second SCell group or in which a dormant BWP is configured among SCells of a cell group (a master cell group (MCG) or a secondary cell group (SCG)) configured in the first UE from a left bit (for example, from the most significant bit (MSB)) of the bitmap. If the UE receives the third DCI format in the PCell, Scells included in the first SCell group or the second SCell group or in which the dormant BWP is configured among the SCells belonging to the cell group of the MCG may be mapped to the bitmap in an ascending order of the SCell identifier values. Further, if the UE receives the third DCI format in the PSCell, Scells included in the first SCell group or the second SCell group or in which the dormant BWP is configured among the SCells belonging to the cell group of the SCG may be mapped to the bitmap in an ascending order of the SCell identifier values. The reason why the SCells belonging to one cell group are mapped to the bitmap is that the number of SCell identifiers which can be configured in one UE is 32 and the bitmap is 15 bits or 16 bits.

In another method, in the second bitmap mapping method, each bit value of the bitmap may be mapped to and indicated by each SCell in a descending order of SCell identifier values of SCells included in a first SCell group or a second SCell group or in which a dormant BWP is configured among SCells of a cell group (a master cell group (MCG) or a secondary cell group (SCG)) configured in the first UE from a left bit (for example, from the most significant bit (MSB)) of the bitmap. If the UE receives the third DCI format in the PCell, the SCell identifier values may be mapped to the bitmap in a descending order only for SCells belonging to the cell group of the MCG. Further, if the UE receives the third DCI format in the PSCell, Scells included in the first SCell group or the second SCell group or in which the dormant BWP is configured among the SCells belonging to the cell group of the SCG may be mapped to the bitmap in a descending order of the SCell identifier values. The reason why the SCells belonging to one cell group are mapped to the bitmap is that the number of SCells which can be configured in one UE is 32 and the bitmap is 15 bits or 16 bits.

When the mapping rule from the left bit or the right bit of the bitmap is applied, it is possible to reduce the number of bitmaps which the UE should read, thereby enabling more rapid UE processing.

When a bit value of the bitmap 1211, 1212, 1213, 1214 or 1215 is 0, the bit value of 0 may indicate switching to a dormant BWP or activation of a dormant BWP for each activated SCell corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if a BWP activated for each activated SCell corresponding to the bit is not a dormant BWP (or is a normal BWP).

When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP.

The third embodiment of the disclosure is realized as described above, and the third DCI format of the PDCCH proposed by the third embodiment may be used within the active time and is not accompanied by downlink transmission resources (for example, PDSCH) or uplink transmission resources (for example, PUSCH) for the PCell or SpCell of the UE. Accordingly, in the third embodiment, the UE may receive the third DCI format of the PDCCH and may not transmit ACK or NACK information (for example, HARQ ACK or NACK) for the indication in the third DCI formation.

More specifically, the third embodiment proposed in the disclosure may be realized as follows.

In the third embodiment of the disclosure, a dormancy or non-dormancy operation for SCells of the UE and an operation for a PDCCH monitoring indicator are described below.

For the PCell or SpCell, if a search space is configured, provided, or detected to allow the UE to monitor a PDCCH in order to search for the third DCI format (for example, DCI format 1_1) through scrambling with or on the basis of a first UE identifier (for example, C-RNTI or MCS-C-RNTI) within the active time as indicated by reference numeral 1230 of FIG. 12 and if the type indicated by a transmission resource type field (for example, resourceAllocation) in the third DCI format is a first type (for example, resourceAllocationType0) and all bits of a frequency transmission resource allocation field are 0 or if the type indicated by the transmission resource type field (for example, resourceAllocation) is a second type (for example, resourceAllocationType1) and all bits of the frequency transmission resource allocation field are 1, the UE may consider that the third DCI format includes information on an indication indicating activation or switching of a downlink BWP activated for each activated SCell configured in the UE (or in which a dormant BWP is configured) to the dormant BWP or to a BWP first activated from a dormant state, analyze fields after the transmission resource field or the frequency transmission resource allocation field as a bitmap indicating a dormant BWP operation for each SCell of the UE, and read a bitmap 1204 including indication information for dormant BWPs for a plurality of SCells (or SCell identifiers) configured in the UE.

That is, if the type indicated by the transmission resource type field (for example, resourceAllocation) is a first type (for example, resourceAllocationType0) and all bits of the frequency transmission resource allocation field are 0 or if the type indicated by the transmission resource type field (for example, resourceAllocation) is a second type (for example, resourceAllocationType1) and all bits of the frequency transmission resource allocation field are 1 in the third DCI format, bits or fields located thereafter are not analyzed by the modulation and coding scheme (MCS) field, the new data indicator (NDI) field, the redundancy version (RV) field, the HARQ process number field, the antenna port field, or the DMRS sequence initialization (DMRS SI) field, but information indicated by the bitmap may be applied by considering and reading bitmap fields indicating switching to the dormant BWP for each SCell configured in the UE or activation or indicating switching of the dormant BWP to the normal BWP or the activation.

When the condition is met in the third DCI format and the UE reads the bitmap, the first bitmap mapping method or the second bitmap mapping method proposed in the disclosure may be applied.

When the bit value of the bitmap is 0, the bit value of 0 may indicate switching to a dormant BWP or activation of a dormant BWP for each activated SCell or SCell identifier corresponding to the bit (if a dormant BWP is configured or is included in a first SCell group or a second SCell group). In another method, when the bit value of the bitmap is 0, the bit value of 0 may indicate switching to a dormant BWP or activation of a dormant BWP if the dormant BWP is configured for each activated SCell corresponding to the bit or is included in a first SCell group or a second SCell group, or if the activated BWP is not the dormant BWP (or is a normal BWP). In another method, when the bit value of the bitmap is 0, the bit value of 0 may indicate switching to a dormant BWP or activation of a dormant BWP for each activated SCell (in which a dormant BWP is configured or included in a first SCell group or a second SCell group) or SCell identifier corresponding to the bit. In another method, when the bit value of the bitmap is 0, the bit value of 0 may indicate switching to a dormant BWP or activation of a dormant BWP for each activated SCell or SCell identifier corresponding to the bit. If the bit of the bitmap indicates the SCell in which no dormant BWP is configured or the SCell identifier, the UE may ignore the bit to not read or apply the bit. When the bit value of the bitmap is 1, the bit value of 1 may indicate switching to a normal BWP (for example, a first active BWP activated from a dormant state) or activation to a normal BWP (for example, a first active BWP activated from a dormant state) for each activated SCell corresponding to the bit. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate switching from the dormant BWP to the normal BWP (for example, the first active BWP activated from the dormant state) for each activated SCell corresponding to the bit, indicate activation to the normal BWP (for example, the first active BWP activated from the dormant state), or indicate maintenance, continuous use, application, or activation of the current active BWP. In another method, when the bit value of the bitmap is 1, the bit value of 1 may indicate switching to the normal BWP (for example, the first active BWP activated from the dormant state) or activation to the normal BWP (for example, the first active BWP activated from the dormant state) if the current or activated BWP for each activated SCell corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated.

Another embodiment which is further embodied from the third embodiment proposed in the disclosure is described below.

If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1 modulation and coding scheme new data indicator redundancy version and of

HARQ process number

Antenna port(s)

DMRS sequence initialization as providing a bitmap to each configured SCell from LSB or MSB, in an ascending order of the SCell index for the cell group, where—a '0' value for a bit of the bitmap indicates an active DL BWP, provided by dormant-BWP, for the UE for a corresponding activated SCell configured with dormant BWP or belonging to SCell dormant group.

Option 1.

if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 2.

if the previous DL BWP was not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 3.

a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell Another embodiment which is embodied from the third embodiment proposed in the disclosure is described below.

If a UE is provided search space sets to monitor PDCCH for detection of DCI format 1_1 scrambled by C-RNTI or MCS-C-RNTI, for PCell or SpCell and if resourceAllocation=resourceAllocationType0 and all bits of the frequency domain resource assignment field in DCI format 1_1 are equal to 0, or resourceAllocation=resourceAllocationType1 and all bits of the frequency domain resource assignment field in DCI format 1_1 are equal to 1 the UE considers the DCI format 1_1 as indicating an active DL BWP provided by dormant-BWP or by first-non-dormant-BWP-ID-for-DCI-inside-active-time for each activated SCell and interprets the sequence of fields of, for transport block 1 modulation and coding scheme new data indicator redundancy version and of

HARQ process number

Antenna port(s)

DMRS sequence initialization as providing a bitmap to each configured SCell from LSB or MSB, in an ascending order of the SCell index configured with dormant BWP or belonging to dormant SCell group for the cell group, where—a '0' value for a bit of the bitmap indicates an active DL BWP, provided by dormant-BWP, for the UE for a corresponding activated SCell Option 1.

if the previous DL BWP was a dormant DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 2.

if the previous DL BWP was not an active DL BWP, a '1' value for a bit of the bitmap indicates an active DL BWP, provided by first-non-dormant-BWP-ID-for-DCI-inside-active-time, for the UE for a corresponding activated SCell. Otherwise, it indicates to continue the current active DL BWP.

Option 3.

a '1' value for a bit of the bitmap indicates an active DL BWP switched from dormant DL BWP, provided by first-non-dormant-BWP-ID-for-DCI-inside-active-time or the current active DL BWP, for the UE for a corresponding activated SCell If an active DL BWP provided by dormant-BWP for a UE on an activated SCell is not a default DL BWP for the UE on the activated SCell, as described in Clause 12, the BWP inactivity timer is not used for transitioning from the active DL BWP provided by dormant-BWP to the default DL BWP on the activated SCell.

Figure 13:
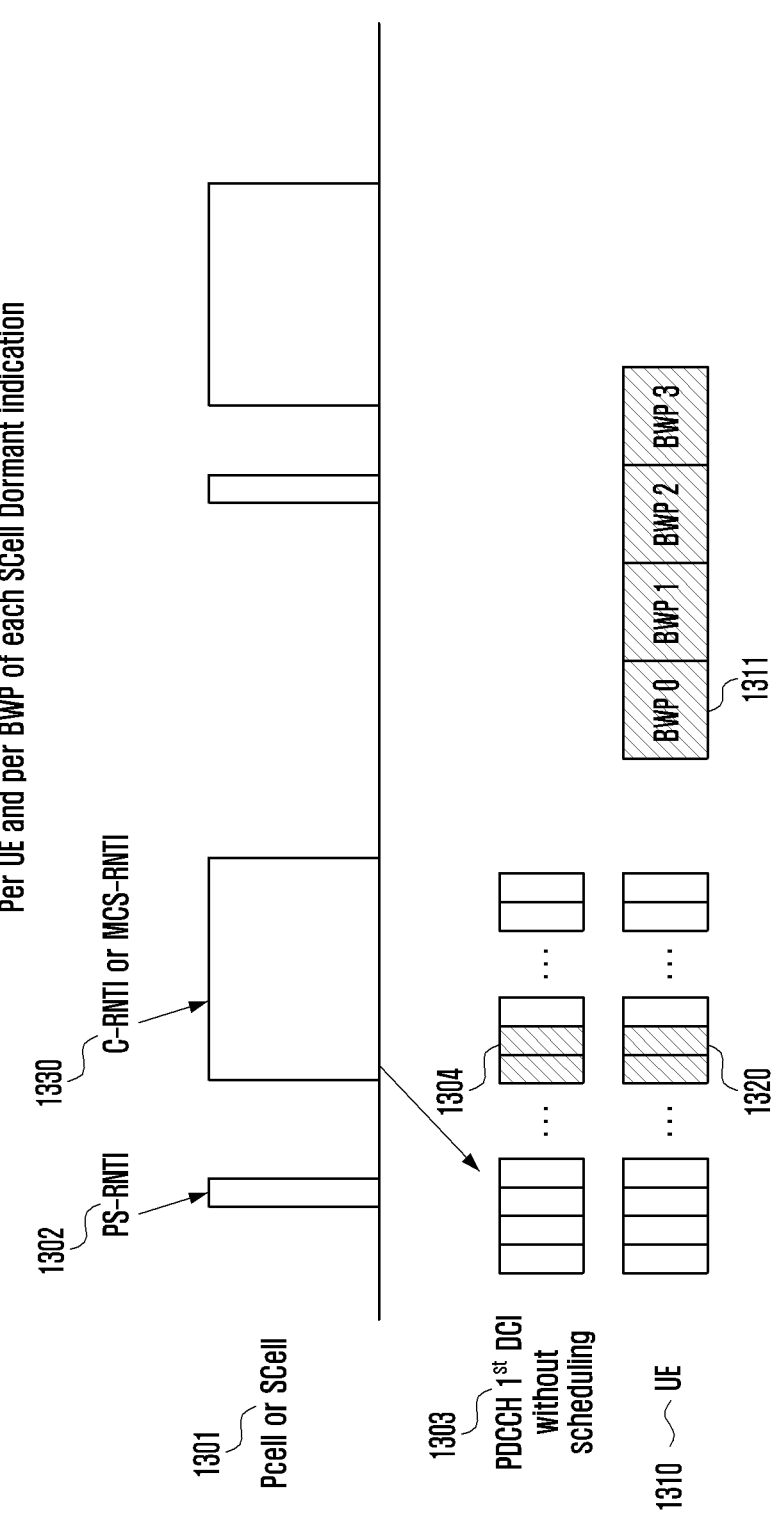
FIG. 13 is a diagram illustrating a fourth embodiment that embodies the concept of the method of operating the dormant BWP in the activated SCell described with reference to FIG. 9 of the disclosure.

FIG. 13 is a diagram illustrating a fourth embodiment that embodies the concept of the method of operating the dormant BWP in the activated SCell described with reference to FIG. 9 of the disclosure.

Referring to FIG. 13, in the fourth embodiment, the gNB may configure a plurality of SCells in the UE for carrier aggregation through the RRC message as described in FIG. 6, allocate each SCell identifier, configure a dormant BWP for each SCell, and may not configure a dormant BWP for some SCells. A plurality of BWPs may be configured to each SCell, and a BWP identifier may be allocated to each BWP. A value of 0, 1, 2, 3, or 4 may be allocated to each BWP identifier. A predetermined bit value (for example, 5 bits) may be allocated to the SCell identifier value, and the SCell identifier may have an integer value (or a natural number value). In order to realize or apply the fourth embodiment of the disclosure, SCell identifiers or BWP identifiers configured in the RRC message may be used. In the fourth embodiment of the disclosure, in order to monitor PDCCH DCI in a PCell or SCell within an active time and indicate switching or activation of a BWP by a 2-bit indicator of received DCI, the UE may indicate a BWP identifier value. The 2-bit indicator value may be 0, 1, 2, or 3, and refer to a specific BWP identifier value to indicate a BWP to which the current BWP switches or a BWP to be activated.

In FIG. 13, the gNB may configure a power saving function or a DRX function in the UE through the RRC message as illustrated in FIG. 6. Further, in the RRC message, the gNB may configure configuration information of a fourth DCI format (for example, DCI format 0 or DCI format 1) for which the UE should search within an active time 1330 of the DRX cycle for the PCell, SpCell, or SCell. When the UE detected the fourth DCI format in the PCell, SpCell, or SCell (for example, on the basis of a UE identifier (C-RNTI, MCS-RNTI, or SPS-C-RNTI), the UE may identify whether a 2-bit indicator indicating BWP switching of the activated SCell of the UE is included in the fourth DCI format. The 2-bit indicator may indicate a BWP identifier value and, for example, indicate a BWP identifier value configured through the RRC message, such as 00=0, 01=1, 10=2, or 11=3.

The PDCCH DCI proposed by the fourth embodiment (for example, the fourth DCI format) may be accompanied by downlink transmission resources (downlink assignment) or uplink transmission resources (uplink grant), and may be used to switch a BWP currently activated in the PCell, SpCell, or SCell to another BWP or to activate the BWP.

For example, in order to indicate switching of the current BWP activated in the PCell, SpCell, or SCell to a first BWP or activation of the current BWP through PDCCH DCI 1303 proposed by the fourth embodiment, the gNB may indicate an identifier value 1311 of the first BWP through a 2-bit indicator 1304 of the fourth DCI format and indicate downlink transmission resources or uplink transmission resources for the first BWP. The UE may read the received 2-bit indicator of the received fourth DCI format, switch the current BWP to the first BWP 1311 or activate the current BWP according to an indication, receive downlink data through the downlink transmission resources of the first BWP, or transmit uplink data through the uplink transmission resources. The UE may transmit HARQ ACK or NACK for the downlink transmission resources in the first BWP. Accordingly, upon receiving HARQ ACK or NACK for the downlink transmission in the first BWP or receiving uplink data through the uplink transmission resources, the gNB may know that the BWP indicated by the fourth DCI format of the PDCCH is successfully indicated. Further, the fourth embodiment may be applied to a procedure of switching the current BWP (for example, a first BWP) activated in the PCell, SpCell, or SCell to a second BWP (for example, a BWP first activated from a dormant state configured through RRC) or activating the current BWP through the PDCCH DCI 1303.

In the following of the disclosure, a method of not applying the fourth embodiment proposed in FIG. 13 to the dormant BWP is proposed. This is because the fourth embodiment proposed above always accompanies uplink transmission resources or downlink transmission resources when instructing the UE to perform BWP switching through the PDCCH DCI. As proposed in the disclosure, since data cannot be transmitted via the uplink transmission resource and cannot be received via the downlink transmission resource in the dormant BWP, the fourth embodiment may not be used by the gNB or the UE. That is, the gNB may not indicate the fourth embodiment to the UE, or the UE may not expect to receive an instruction of the fourth embodiment from the gNB. More specifically, the UE does not expect that a BWP indicator indicating the BWP (or BWP identifier) in the DCI format used in the fourth embodiment by the gNB indicates the BWP identifier configured as the dormant BWP of the SCell in the upper layer (device or RRC layer device). Alternatively, in case that a BWP indicator indicating the BWP (or BWP identifier) in the DCI format used in the fourth embodiment by the gNB indicates the BWP identifier configured as the dormant BWP of the SCell in the upper layer (device or RRC layer device), the UE may ignore it.

As another method, in order not to apply the fourth embodiment proposed in FIG. 13 to the dormant BWP of the SCell, a method for mapping or determining an indicator of a DCI format used in the fourth embodiment applicable to the gNB or the UE is proposed as follows.

In the fourth embodiment, a DCI format (e.g., DCI format 1_1) used in scheduling for a downlink data transmission resource (PDSCH) in one cell may be configured as follows. This DCI format may be scrambled with C-RNTI or CS-RNTI (or SPS-RNTI) or MCS-C-RNTI.

The bandwidth part (BWP) indicator may be determined to have a length of 0, 1, or 2 bits, and may be determined by the number of downlink BWP identifiers configured in a higher layer device (e.g., an RRC layer device). In the above, the bit length of the BWP indicator may be determined based on the number of downlink (DL) BWPs excluding the initial DL BWP or the dormant BWP or the BWP (or BWP identifier) configured as the dormant BWP among the DL BWP identifiers configured in the higher layer device (e.g., the RRC layer device). In the above, if the number of DL BWPs excluding the initial DL BWP or (if the dormant BWP is configured) the dormant BWP or the BWP (or BWP identifier) configured as the dormant BWP among the DL BWP identifiers configured in the higher layer device (e.g., the RRC layer device) is N, the length of the BWP indicator may be determined as a rounded value of log 2(K). For example, if it is log 2(1), the length of the BWP indicator may have 0 bit, if it is log 2(2), 1 bit, and if it is log 2(3) or log 2(4), 2 bits. If the dormant BWP is configured when calculating the number N of DL BWPs, the maximum value of N may be 3 because the number N is determined except for the dormant BWP identifier.

In the above, if the value of N is less than or equal to 3, K=N+1, and the indicator (or bit value) of the BWP may be mapped in ascending order of the BWP identifiers. Alternatively, the indicator (or bit value) of the BWP may be the same as the ascending order of the BWP identifiers. In the above, when the BWP indicator is mapped to the BWP identifier, mapping may be made in ascending order of the BWP identifier values for the BWP identifiers except for the identifier of the dormant BWP or the BWP configured as the dormant BWP. Alternatively, the indicator (or bit value) of the BWP may be the same as the ascending order of the BWP identifiers except for the identifier of the dormant BWP or the BWP configured as the dormant BWP.

Otherwise (if the value of N is greater than 3 in the above), K=N. Also, the 2-bit BWP indicator of 00 may indicate the BWP identifier value 1, 01 may indicate the BWP identifier value 2, 10 may indicate the BWP identifier value 3, and 11 may indicate the BWP identifier value 4.

In the fourth embodiment, a DCI format (e.g., DCI format 0_1) used in scheduling for an uplink data transmission resource (PUSCH) in one cell may be configured as follows. This DCI format may be scrambled with C-RNTI or CS-RNTI (or SPS-RNTI) or MCS-C-RNTI or SP-CSI-RNTI (identifier for indicating channel measurement configuration information).

(In case of frequency division duplex (FDD) or paired spectrum) The bandwidth part (BWP) indicator may be determined to have a length of 0, 1, or 2 bits, and may be determined by the number of uplink BWP identifiers configured in a higher layer device (e.g., an RRC layer device). In the above, the bit length of the BWP indicator may be determined based on the number of uplink (UL) BWPs excluding the BWP (or BWP identifier) configured as the initial DL BWP among the UL BWP identifiers configured in the higher layer device (e.g., the RRC layer device). In the above, if the number of UL BWPs excluding the BWP (or BWP identifier) configured as the initial DL BWP among the DL BWP identifiers configured in the higher layer device (e.g., the RRC layer device) is N, the length of the BWP indicator may be determined as a rounded value of log 2(K). For example, if it is log 2(1), the length of the BWP indicator may have 0 bit, if it is log 2(2), 1 bit, and if it is log 2(3) or log 2(4), 2 bits.

In the above, if the value of N is less than or equal to 3, K=N+1, and the indicator (or bit value) of the BWP may be mapped in ascending order of the BWP identifiers. Alternatively, the indicator (or bit value) of the BWP may be the same as the ascending order of the BWP identifiers.

Otherwise (if the value of N is greater than 3 in the above), K=N. Also, the 2-bit BWP indicator of 00 may indicate the BWP identifier value 1, 01 may indicate the BWP identifier value 2, 10 may indicate the BWP identifier value 3, and 11 may indicate the BWP identifier value 4.

(In case of time division duplex (TDD) or unpaired spectrum) The bandwidth part (BWP) indicator may be determined to have a length of 0, 1, or 2 bits, and may be determined by the number of uplink BWP identifiers configured in a higher layer device (e.g., an RRC layer device). In the above, the bit length of the BWP indicator may be determined based on the number of uplink (UL) BWPs excluding the initial DL BWP or (if the dormant BWP is configured) the dormant BWP or the BWP (or BWP identifier) configured as the dormant BWP among the UL BWP identifiers configured in the higher layer device (e.g., the RRC layer device). In the above, if the number of UL BWPs excluding the initial DL BWP or the dormant BWP or the BWP (or BWP identifier) configured as the dormant BWP among the UL BWP identifiers configured in the higher layer device (e.g., the RRC layer device) is N, the length of the BWP indicator may be determined as a rounded value of log 2(K). For example, if it is log 2(1), the length of the BWP indicator may have 0 bit, if it is log 2(2), 1 bit, and if it is log 2(3) or log 2(4), 2 bits. If the dormant BWP is configured when calculating the number N of DL BWPs, the maximum value of N may be 3 because the number N is determined except for the dormant BWP identifier.

In the above, if the value of N is less than or equal to 3, K=N+1, and the indicator (or bit value) of the BWP may be mapped in ascending order of the BWP identifiers. Alternatively, the indicator (or bit value) of the BWP may be the same as the ascending order of the BWP identifiers. In the above, when the BWP indicator is mapped to the BWP identifier, mapping may be made in ascending order of the BWP identifier values for the BWP identifiers except for the identifier of the dormant BWP or the BWP configured as the dormant BWP. Alternatively, the indicator (or bit value) of the BWP may be the same as the ascending order of the BWP identifiers except for the identifier of the dormant BWP or the BWP configured as the dormant BWP.

Otherwise (if the value of N is greater than 3 in the above), K=N. Also, the 2-bit BWP indicator of 00 may indicate the BWP identifier value 1, 01 may indicate the BWP identifier value 2, 10 may indicate the BWP identifier value 3, and 11 may indicate the BWP identifier value 4.

As another method, in order not to apply the fourth embodiment proposed in FIG. 13 to the dormant BWP of the SCell, a method for mapping or determining an indicator of a DCI format used in the fourth embodiment applicable to the gNB or the UE is proposed as follows.

In the fourth embodiment, a DCI format (e.g., DCI format 1_1) used in scheduling for a downlink data transmission resource (PDSCH) in one cell may be configured as follows. This DCI format may be scrambled with C-RNTI or CS-RNTI (or SPS-RNTI) or MCS-C-RNTI.

The bandwidth part (BWP) indicator may be determined to have a length of 0, 1, or 2 bits, and may be determined by the number of downlink BWP identifiers configured in a higher layer device (e.g., an RRC layer device). In the above, the bit length of the BWP indicator may be determined based on the number of downlink (DL) BWPs excluding the initial DL BWP or (if the dormant BWP is configured) the dormant BWP or the BWP (or BWP identifier) configured as the dormant BWP among the DL BWP identifiers configured in the higher layer device (e.g., the RRC layer device). In the above, if the number of DL BWPs excluding the initial DL BWP or the dormant BWP or the BWP (or BWP identifier) configured as the dormant BWP among the DL BWP identifiers configured in the higher layer device (e.g., the RRC layer device) is N, the length of the BWP indicator may be determined as a rounded value of log 2(K). For example, if it is log 2(1), the length of the BWP indicator may have 0 bit, if it is log 2(2), 1 bit, and if it is log 2(3) or log 2(4), 2 bits. If the dormant BWP is configured when calculating the number N of DL BWPs, the maximum value of N may be 3 because the number N is determined except for the dormant BWP identifier.

In the above, if the value of N is less than or equal to 3, K=N+1, and the indicator (or bit value) of the BWP may be mapped in ascending order of the BWP identifiers. Alternatively, the indicator (or bit value) of the BWP may be the same as the ascending order of the BWP identifiers. In the above, when the BWP indicator is mapped to the BWP identifier, mapping may be made in ascending order of the BWP identifier values for the BWP identifiers except for the identifier of the dormant BWP or the BWP configured as the dormant BWP. Alternatively, the indicator (or bit value) of the BWP may be the same as the ascending order of the BWP identifiers except for the identifier of the dormant BWP or the BWP configured as the dormant BWP.

Otherwise (if the value of N is greater than 3 in the above), K=N. Also, the 2-bit BWP indicator of 00 may indicate the BWP identifier value 1, 01 may indicate the BWP identifier value 2, 10 may indicate the BWP identifier value 3, and 11 may indicate the BWP identifier value 4.

In the fourth embodiment, a DCI format (e.g., DCI format 0_1) used in scheduling for an uplink data transmission resource (PUSCH) in one cell may be configured as follows. This DCI format may be scrambled with C-RNTI or CS-RNTI (or SPS-RNTI) or MCS-C-RNTI or SP-CSI-RNTI (identifier for indicating channel measurement configuration information).

The bandwidth part (BWP) indicator may be determined to have a length of 0, 1, or 2 bits, and may be determined by the number of uplink BWP identifiers configured in a higher layer device (e.g., an RRC layer device). In the above, the bit length of the BWP indicator may be determined based on the number of uplink (UL) BWPs excluding the BWP (or BWP identifier) configured as the initial DL BWP among the UL BWP identifiers configured in the higher layer device (e.g., the RRC layer device). In the above, if the number of UL BWPs excluding the BWP (or BWP identifier) configured as the initial DL BWP among the DL BWP identifiers configured in the higher layer device (e.g., the RRC layer device) is N, the length of the BWP indicator may be determined as a rounded value of log 2(K). For example, if it is log 2(1), the length of the BWP indicator may have 0 bit, if it is log 2(2), 1 bit, and if it is log 2(3) or log 2(4), 2 bits.

In the above, if the value of N is less than or equal to 3, K=N+1, and the indicator (or bit value) of the BWP may be mapped in ascending order of the BWP identifiers. Alternatively, the indicator (or bit value) of the BWP may be the same as the ascending order of the BWP identifiers.

Otherwise (if the value of N is greater than 3 in the above), K=N. Also, the 2-bit BWP indicator of 00 may indicate the BWP identifier value 1, 01 may indicate the BWP identifier value 2, 10 may indicate the BWP identifier value 3, and 11 may indicate the BWP identifier value 4.

As another method, in order not to apply the fourth embodiment proposed in FIG. 13 to the dormant BWP of the SCell, the higher layer device (e.g., the RRC layer device) may configure configuration information of the BWP configured as the dormant BWP as follows.

In the downlink BWP configured as the dormant BWP, PDCCH configuration information (pdcch-config or pdcch-configComon or sps-config (periodic transmission resource configuration information)), which is configuration information necessary for the UE to monitor the PDCCH, may not be configured. In addition, when PDSCH configuration information is configured in the downlink BWP configured as the dormant BWP, the configuration information for the downlink transmission resource may not be configured or, if configured, the UE may ignore it. In the PDSCH configuration information, beam-related configuration information (transmission configuration indicator (TCI) state) for beam management or beam recovery may be configured. The PDCCH configuration information or PDSCH configuration information may or may not be included in downlink BWP configuration information in a downlink BWP addition or modification list of the serving cell configuration information (ServingCellConfig) of the cell group configuration information (CellGroupConfig).

In case that the dormant BWP is configured, in the uplink BWP having the same or corresponding BWP identifier as or to the downlink BWP configured as the dormant BWP (for example, in case of TDD or in case of unpaired spectrum), PUCCH configuration information (pucch-config or sps-config (periodic transmission resource configuration information)) may not be configured. In addition, in the uplink BWP having the same or corresponding BWP identifier as or to the downlink BWP configured as the dormant BWP (for example, in case of TDD or in case of unpaired spectrum), PUSCH configuration information may not be configured, or even if the PUSCH configuration information is configured, configuration information for uplink transmission resources may be not configured, or even if configured, the UE may ignore it. For example, beam-related configuration information may be configured, and the UE may apply it. As another method, in the uplink BWP having the same or corresponding BWP identifier as or to the downlink BWP configured as the dormant BWP (for example, in case of TDD or in case of unpaired spectrum), BWP identifier information or BWP configuration information or uplink transmission resource configuration information may not be configured, or even if configured, the UE may ignore it. Using such a configuration method, the fourth embodiment may not be applicable to the uplink BWP. The PUCCH configuration information or PUSCH configuration information may or may not be included in uplink BWP configuration information in an uplink BWP addition or modification list of the serving cell configuration information (ServingCellConfig) of the cell group configuration information (CellGroupConfig).

Therefore, for a method of not applying the fourth embodiment of FIG. 13 proposed above to the dormant BWP, a BWP switching operation of the gNB or the UE can be proposed as follows.

When instructing or performing switching from a second BWP (a BWP that is not the dormant BWP, or a BWP that is not configured as the normal BWP or the dormant BWP) to another second BWP (a BWP that is not the dormant BWP, or a BWP that is not configured as the normal BWP or the dormant BWP), the gNB or the UE may apply the fourth embodiment proposed in the disclosure (e.g., a method using the BWP indicator (2-bit indicator) in DCI format 0_1 of PDCCH or DCI format 1_1 of PDCCH). In addition, the first embodiment (e.g., a method using a bitmap indicating each SCell group in DCI format 2_6 of PDCCH scrambled with PS-RNTI), the second embodiment (e.g., a method using a bitmap (e.g., XYZ field) indicating each SCell group in DCI format 0_1 of PDCCH or DCI format 1_1 of PDCCH), or the third embodiment (e.g., in DCI format 1_1 of PDCCH scrambled with C-RNTI or MCS-RNTI, a method of configuring all field values indicating frequency transmission resource allocation to 0 or 1 and interpreting the subsequent field values as a bitmap indicating each SCell identifier configured with the dormant BWP), as proposed in the disclosure, may not be applied. For example, upon receiving the BWP switching instruction according to the fourth embodiment, the UE may perform a switching procedure from the second BWP to another second BWP according to the instruction.

When instructing (or performing) switching from the second BWP (a BWP that is not the dormant BWP, or a BWP that is not configured as the normal BWP or the dormant BWP) to the first BWP (the dormant BWP, or a BWP configured as the dormant BWP), or when instructing (or performing) switching from the first BWP (the dormant BWP, or a BWP configured as the dormant BWP) to the second BWP (a BWP that is not the dormant BWP, or a BWP that is not configured as the normal BWP or the dormant BWP), the gNB or the UE may not apply the fourth embodiment proposed in the disclosure (e.g., a method using the BWP indicator (2-bit indicator) in DCI format 0_1 of PDCCH or DCI format 1_1 of PDCCH) and may apply the first embodiment (e.g., a method using a bitmap indicating each SCell group in DCI format 2_6 of PDCCH scrambled with PS-RNTI), the second embodiment (e.g., a method using a bitmap (e.g., XYZ field) indicating each SCell group in DCI format 0_1 of PDCCH or DCI format 1_1 of PDCCH), or the third embodiment (e.g., in DCI format 1_1 of PDCCH scrambled with C-RNTI or MCS-RNTI, a method of configuring all field values indicating frequency transmission resource allocation to 0 or 1 and interpreting the subsequent field values as a bitmap indicating each SCell identifier configured with the dormant BWP), as proposed in the disclosure. For example, upon receiving the BWP switching instruction in the first embodiment, the second embodiment, or the third embodiment, the UE may perform a switching procedure from the second BWP to the first BWP according to the instruction or perform a switching procedure from the first BWP to the second BWP. As another method, if cross-scheduling is configured in SCell when switching is instructed (or performed) from the first BWP (the dormant BWP, or a BWP configured as the dormant BWP) to the second BWP (a BWP that is not the dormant BWP, or a BWP that is not configured as the normal BWP or the dormant BWP), the fourth embodiment may be used.

In the following of the disclosure, a UE operation that allows the fourth embodiment proposed in FIG. 13 to be applied to the dormant BWP may be proposed as follows. Because the fourth embodiment proposed above always accompanies an uplink transmission resource or a downlink transmission resource when BWP switching is instructed to the UE via DCI of PDCCH, a corresponding UE operation is required.

Specifically, when the fourth embodiment is applied to each SCell for an indication of switching to dormant BWP or switching from dormant BWP to non-dormant BWP in the above, the gNB or the UE may operate as follows. (For example, the following may be applied in case of FDD, or may be extended and applied in case of TDD.).

If self-scheduling is configured in the UE for the serving cell, the gNB may apply the fourth embodiment to transmit the proposed PDCCH DCI to the UE in the serving cell.

The UE may receive the PDCCH DCI in the serving cell, perform the procedure proposed by the fourth embodiment, and perform switching or activation to a BWP indicated by a 2-bit indicator of the DCI.

If the BWP indicated by the BWP indicator (2-bit indicator) in the above is the second BWP (BWP that is not dormant BWP, or BWP that is not configured as normal BWP or dormant BWP) or BWP identifier, the UE may switch or activate a BWP to the BWP indicated above, and transmit uplink data in the uplink transmission resource indicated by the DCI in the BWP, or receive downlink data in the downlink transmission resource indicated by the DCI and transmit HARQ ACK or NACK in a transmission resource (e.g., PUCCH) corresponding thereto or configured in the DCI.

If the BWP indicated by the BWP indicator (2-bit indicator) in the above is the first BWP (dormant BWP, or BWP configured as dormant BWP) or BWP identifier, the UE may switch or activate a BWP to the BWP indicated above or make it dormant. Alternatively, the UE may not expect or may ignore the uplink transmission resource indicated by the DCI in the BWP. Alternatively, the UE may not expect or may ignore the downlink transmission resource indicated by the DCI. Alternatively, the UE may transmit HARQ ACK or NACK in the transmission resource (e.g., PUCCH) corresponding to the downlink transmission resource indicated by the DCI or configured in the DCI. As another method, in case that the DCI indicates the uplink transmission resource, the UE may transmit uplink data or asynchronous channel measurement information (aperiodic CSI report) using the uplink transmission resource. As another method, when the DCI indicates the uplink transmission resource in case of TDD (unpaired spectrum), the UE may transmit uplink data or asynchronous channel measurement information (aperiodic CSI report) using the uplink transmission resource.

If cross-scheduling is configured in the UE for the serving cell, the gNB may apply the fourth embodiment to transmit the indication for the serving cell to the UE in the PCell or SpCell through the PDCCH DCI.

The UE may receive the indication for the serving cell in the PCell or SpCell through the PDCCH DCI, perform the procedure proposed by the fourth embodiment, and perform switching or activation to a BWP indicated by a 2-bit indicator of the DCI.

If the BWP indicated by the BWP indicator (2-bit indicator) in the above is the second BWP (BWP that is not dormant BWP, or BWP that is not configured as normal BWP or dormant BWP) or BWP identifier, the UE may switch or activate a BWP to the BWP indicated above, and transmit uplink data in the uplink transmission resource indicated by the DCI in the BWP, or receive downlink data in the downlink transmission resource indicated by the DCI and transmit HARQ ACK or NACK in a transmission resource (e.g., PUCCH) corresponding thereto or configured in the DCI.

If the BWP indicated by the BWP indicator (2-bit indicator) in the above is the first BWP (dormant BWP, or BWP configured as dormant BWP) or BWP identifier, the UE may switch or activate a BWP to the BWP indicated above or make it dormant. Alternatively, the UE may not expect or may ignore the uplink transmission resource indicated by the DCI in the BWP. Alternatively, the UE may not expect or may ignore the downlink transmission resource indicated by the DCI. Alternatively, the UE may transmit HARQ ACK or NACK in the transmission resource (e.g., PUCCH) corresponding to the downlink transmission resource indicated by the DCI or configured in the DCI. As another method, in case that the DCI indicates the uplink transmission resource, the UE may transmit uplink data or asynchronous channel measurement information (aperiodic CSI report) using the uplink transmission resource. As another method, when the DCI indicates the uplink transmission resource in case of TDD (unpaired spectrum), the UE may transmit uplink data or asynchronous channel measurement information (aperiodic CSI report) using the uplink transmission resource.

If an indication indicating switching or activation to a second BWP (a normal BWP or a BWP which is not a dormant BWP) from a first BWP (dormant BWP) of a serving cell (for example, SCell), the PDCCH is not monitored in the serving cell when the first dormant BWP is activated in the serving cell, and thus the gNB or the UE cannot apply the fourth embodiment in the serving cell in case that the fourth embodiment is configured with cross-scheduling.

If cross-scheduling is configured in the UE for the serving cell or if the gNB realizes the first embodiment, the second embodiment, or the third embodiment proposed in the disclosure in the PCell or SpCell through cross-scheduling, the gNB may apply the first embodiment, the second embodiment, the third embodiment, or the fourth embodiment to transmit the indication for the serving cell to the UE in the PCell or SpCell through the PDCCH DCI.

The UE may receive the indication for the serving cell in the PCell or SpCell through the PDCCH DCI, perform the procedure proposed by the fourth embodiment, and perform switching or activation to a BWP indicated a 2-bit indicator of the DCI. In another method, the UE may receive the indication for the serving cell in the PCell or SpCell through the PDCCH DCI, perform the procedure proposed by the first embodiment, the second embodiment, or the third embodiment, and perform switching or activation to a BWP (for example, a BWP first activated from a dormant state) configured or indicated by RRC according to an indication of a DCI bitmap of the embodiments.

Proposed in the above of the disclosure is a method of applying the fourth embodiment proposed in the disclosure to perform a switching instruction for a dormant BWP in case that self-scheduling or cross scheduling is configured for a certain SCell.

As another method, by modifying or extending the above method, the fourth embodiment for the switching procedure for the dormant BWP may not be applied in case that self-scheduling is configured for a certain SCell, but the fourth embodiment for the switching procedure for the dormant BWP may be applied only in case that cross-scheduling is configured for a certain SCell. This is because, in case where the downlink BWP in the SCell is switched or activated to the dormant BWP, the UE cannot receive the DCI of the PDCCH through self-scheduling.

In order to apply the fourth embodiment proposed in FIG. 13 to the dormant BWP of the SCell, the higher layer device (e.g., the RRC layer device) may configure the configuration information of the BWP configured as the dormant BWP, as follows.

In the downlink BWP configured as the dormant BWP, PDCCH configuration information (pdcch-config or pdcch-configComon or sps-config (periodic transmission resource configuration information)), which is configuration information necessary for the UE to monitor the PDCCH, may not be configured. In addition, when PDSCH configuration information is configured in the downlink BWP configured as the dormant BWP, the configuration information for the downlink transmission resource may not be configured or, if configured, the UE may ignore it. In the PDSCH configuration information, beam-related configuration information (transmission configuration indicator (TCI) state) for beam management or beam recovery may be configured. The PDCCH configuration information or PDSCH configuration information may or may not be included in downlink BWP configuration information in a downlink BWP addition or modification list of the serving cell configuration information (ServingCellConfig) of the cell group configuration information (CellGroupConfig).

In case that the dormant BWP is configured, in the uplink BWP having the same or corresponding BWP identifier as or to the downlink BWP configured as the dormant BWP (for example, in case of TDD or in case of unpaired spectrum), PUCCH configuration information (pucch-config or sps-config (periodic transmission resource configuration information)) may not be configured. In addition, in the uplink BWP having the same or corresponding BWP identifier as or to the downlink BWP configured as the dormant BWP (for example, in case of TDD or in case of unpaired spectrum), PUSCH configuration information may be configured. As another method, the PUSCH configuration information may not be configured, or even if the PUSCH configuration information is configured, configuration information for uplink transmission resources may be not configured, or even if configured, the UE may ignore it. For example, beam-related configuration information may be configured, and the UE may apply it. As another method, in the uplink BWP having the same or corresponding BWP identifier as or to the downlink BWP configured as the dormant BWP (for example, in case of TDD or in case of unpaired spectrum), BWP identifier information or BWP configuration information or uplink transmission resource configuration information may not be configured, or even if configured, the UE may ignore it. The PUCCH configuration information or PUSCH configuration information may or may not be included in uplink BWP configuration information in an uplink BWP addition or modification list of the serving cell configuration information (ServingCell-Config) of the cell group configuration information (CellGroupConfig).

Therefore, for a method of applying the fourth embodiment of FIG. 13 proposed above to the dormant BWP, a BWP switching operation of the gNB or the UE can be proposed as follows.

When instructing or performing switching from a second BWP (a BWP that is not the dormant BWP, or a BWP that is not configured as the normal BWP or the dormant BWP) to another second BWP (a BWP that is not the dormant BWP, or a BWP that is not configured as the normal BWP or the dormant BWP), the gNB or the UE may apply the fourth embodiment proposed in the disclosure (e.g., a method using the BWP indicator (2-bit indicator) in DCI format 0_1 of PDCCH or DCI format 1_1 of PDCCH). In addition, the first embodiment (e.g., a method using a bitmap indicating each SCell group in DCI format 2_6 of PDCCH scrambled with PS-RNTI), the second embodiment (e.g., a method using a bitmap (e.g., XYZ field) indicating each SCell group in DCI format 0_1 of PDCCH or DCI format 1_1 of PDCCH), or the third embodiment (e.g., in DCI format 1_1 of PDCCH scrambled with C-RNTI or MCS-RNTI, a method of configuring all field values indicating frequency transmission resource allocation to 0 or 1 and interpreting the subsequent field values as a bitmap indicating each SCell identifier configured with the dormant BWP), as proposed in the disclosure, may not be applied. For example, upon receiving the BWP switching instruction according to the fourth embodiment, the UE may perform a switching procedure from the second BWP to another second BWP according to the instruction.

When instructing (or performing) switching from the second BWP (a BWP that is not the dormant BWP, or a BWP that is not configured as the normal BWP or the dormant BWP) to the first BWP (the dormant BWP, or a BWP configured as the dormant BWP), or when instructing (or performing) switching from the first BWP (the dormant BWP, or a BWP configured as the dormant BWP) to the second BWP (a BWP that is not the dormant BWP, or a BWP that is not configured as the normal BWP or the dormant BWP), the gNB or the UE may also apply the fourth embodiment proposed in the disclosure (e.g., a method using the BWP indicator (2-bit indicator) in DCI format 0_1 of PDCCH or DCI format 1_1 of PDCCH) and may apply the first embodiment (e.g., a method using a bitmap indicating each SCell group in DCI format 2_6 of PDCCH scrambled with PS-RNTI), the second embodiment (e.g., a method using a bitmap (e.g., XYZ field) indicating each SCell group in DCI format 0_1 of PDCCH or DCI format 1_1 of PDCCH), or the third embodiment (e.g., in DCI format 1_1 of PDCCH scrambled with C-RNTI or MCS-RNTI, a method of configuring all field values indicating frequency transmission resource allocation to 0 or 1 and interpreting the subsequent field values as a bitmap indicating each SCell identifier configured with the dormant BWP), as proposed in the disclosure. For example, upon receiving the BWP switching instruction in the first embodiment, the second embodiment, the third embodiment, or the fourth embodiment, the UE may perform a switching procedure from the second BWP to the first BWP according to the instruction or perform a switching procedure from the first BWP to the second BWP (for example, in case of the fourth embodiment, when cross scheduling is configured for the SCell). As another method, if cross-scheduling is configured in SCell when switching is instructed (or performed) from the first BWP (the dormant BWP, or a BWP configured as the dormant BWP) to the second BWP (a BWP that is not the dormant BWP, or a BWP that is not configured as the normal BWP or the dormant BWP), the fourth embodiment may be used.

When the first embodiment, the second embodiment, the third embodiment, or the fourth embodiment of the disclosure is applied, if the downlink dormant BWP configured in the SCell of the UE is not a downlink default BWP (default DL BWP), a BWP inactivity timer for switching or transitioning the dormant BWP to a default BWP may not be used. This is because, when the default BWP is configured as a normal BWP which is not a dormant BWP, the dormant BWP is automatically switched to the normal BWP when the timer expires, and thus battery consumption due to PDCCH monitoring may be generated.

Figure 14:
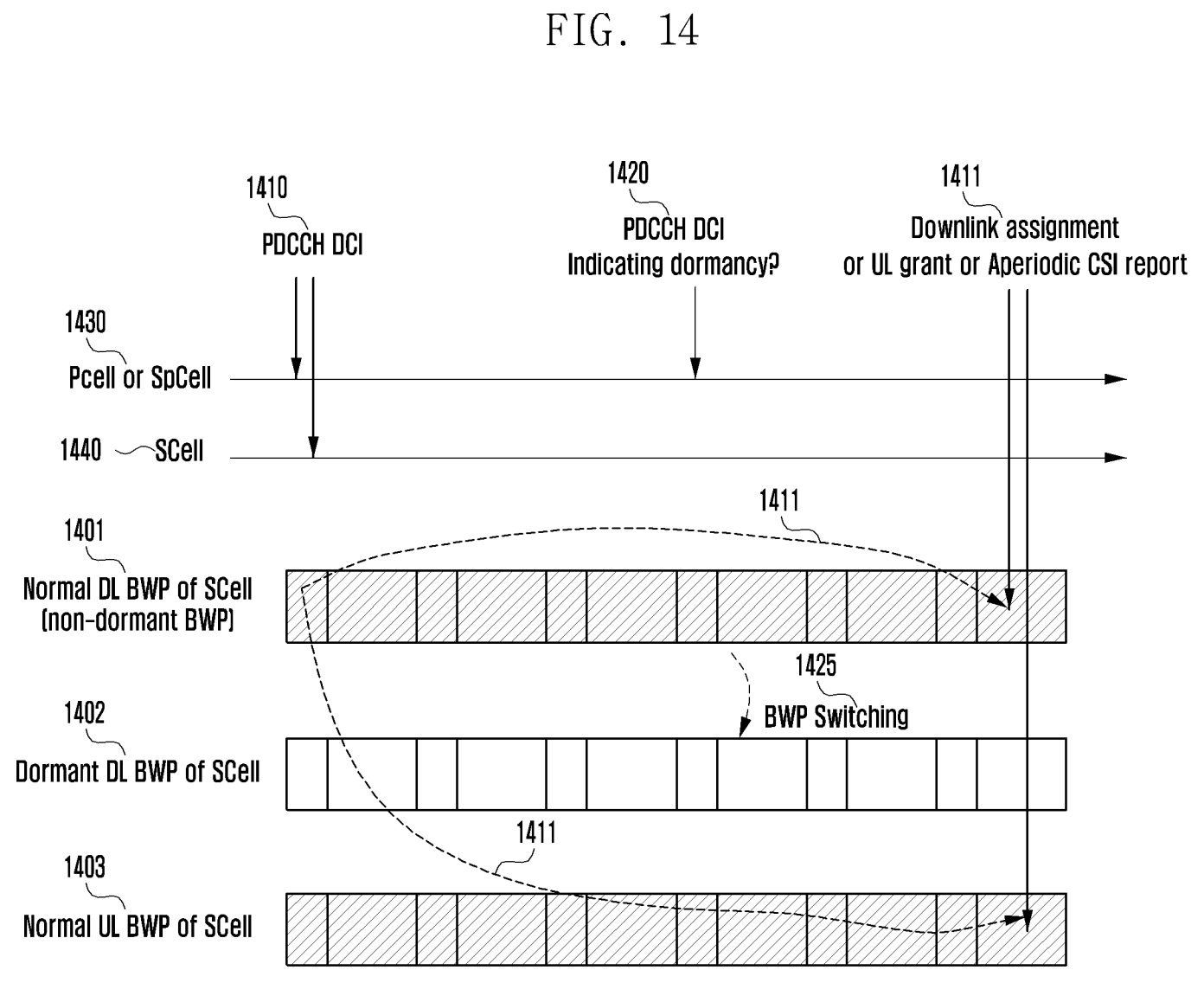

FIG. 14 is a diagram illustrating a problem occurring due to a temporal difference between instructions or indications of PDCCH DCI transmitted by a base station or received by a UE from the base station according to an embodiment of the disclosure.

Referring to FIG. 14, the UE may receive first PDCCH DCI 1410 in a Pcell or SpCell 1430 through cross-scheduling or in an SCell 1440 through self-scheduling for a second BWP (a downlink BWP 1401 which is not a dormant BWP or an uplink BWP 1403 which is not a dormant BWP) of the activated Scell 1440. The first PDCCH DCI may indicate (or allocate) uplink transmission resources 1411 (PUSCH) for the uplink BWP, indicate (or allocate) downlink transmission resources 1411 (PDSCH) for the downlink BWP, or indicate (or allocate) the uplink transmission resources 1411 (PUSCH) for an aperiodic channel measurement report (aperiodic CSI report) for the uplink BWP.

After receiving the first PDCCH DCI, the UE may receive second PDCCH DCI 1420 in the Pcell or SpCell 1430 or the SCell before receiving downlink data through the downlink transmission resources (PDSCH) of the downlink BWP indicated by the first PDCCH DCI or before transmitting uplink data (or aperiodic channel measurement result report) through the uplink transmission resources (PUSCH) of the uplink BWP indicated by the first PDCCH DCI.

The first embodiment, the second embodiment, the third embodiment, or the fourth embodiment proposed in the disclosure may be applied when the gNB transmits the first PDCCH DCI or the second PDCCH DCI, and the UE operation may be performed according to the first embodiment, the second embodiment, the third embodiment, or the fourth embodiment proposed in the disclosure when the UE receives the first PDCCH DCI or the second PDCCH DCI.

A first problem which may occur due to switching between downlink normal BWPs in the embodiment of FIG. 14 is described below.

If the second PDCCH DCI 1420 indicates switching of the current second downlink BWP to a third downlink BWP (a BWP which is not a dormant BWP), the UE performs switching to the third downlink BWP before receiving downlink data through the downlink transmission resources 1411 indicated by the first PDCCH DCI, and thus a problem that downlink data cannot be received through the downlink transmission resources 1411 indicated by the first PDCCH DCI may occur. Accordingly, in order to solve the first problem, one of the following methods may be applied or a plurality of methods among the following methods may be combined and applied.

First solution: When the second PDCCH DCI 1420 indicates switching of the current second downlink BWP of the SCell to the third downlink BWP (BWP which is not the dormant BWP), the UE may directly perform switching to the third downlink BWP indicated by the second PDCCH DCI 1420 before receiving downlink data through the downlink transmission resources 1411 indicated by the first PDCCH DCI. Accordingly, the UE may not receive downlink data through the downlink transmission resources 1411 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1420 to the UE.

Second solution: Transmission of the second PDCCH DCI 1420 indicating switching of the current second downlink BWP to the third downlink BWP (BWP which is not the dormant BWP) by the gNB may be limited before the UE successfully receive the downlink data through the downlink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data or before the gNB identifies that the UE successfully receives the downlink data (receives ACK).

Third solution: When the second PDCCH DCI 1420 indicates switching of the current second downlink BWP of the SCell to the third downlink BWP (BWP which is not the dormant BWP), the UE may perform switching to the third downlink BWP indicated by the second PDCCH DCI 1420 after receiving downlink data through the downlink transmission resources 1411 indicated by the first PDCCH DCI or after receiving the downlink data and then transmitting HARQ ACK or NACK. Accordingly, the UE receives downlink data through the downlink transmission resources 1411 indicated by the first PDCCH DCI and then performs switching.

In the embodiment of FIG. 14, a second problem which may occur due to switching between uplink normal BWPs is described below.

If the second PDCCH DCI 1420 indicates switching of the current second uplink BWP to a third uplink BWP (a BWP which is not a dormant BWP), the UE performs switching to the indicated third downlink BWP before transmitting uplink data through the uplink transmission resources 1411 indicated by the first PDCCH DCI, and thus a problem that uplink data cannot be transmitted through the uplink transmission resources 1411 indicated by the first PDCCH DCI may occur. Accordingly, in order to solve the second problem, one of the following methods may be applied or a plurality of methods among the following methods may be combined and applied.

First solution: When the second PDCCH DCI 1420 indicates switching of the current second uplink BWP of the SCell to the third uplink BWP (BWP which is not the dormant BWP), the UE may directly perform switching to the third downlink BWP indicated by the second PDCCH DCI 1420 before receiving uplink data through the uplink transmission resources 1411 indicated by the first PDCCH DCI. Accordingly, the UE may not transmit uplink data through the up transmission resources 1411 indicated by the first PDCCH DCI, the UE may consider that the uplink data is not transmitted, or the UE may not be required to transmit the uplink data. That is, the gNB may determine that the uplink data indicated by the first PDCCH DCI is not important and may transmit the second PDCCH DCI 1420 to the UE.

Second solution: Transmission of the second PDCCH DCI 1420 indicating switching of the current second uplink BWP to the third uplink BWP (BWP which is not the dormant BWP) by the gNB may be limited before the UE successfully transmits the uplink data through the uplink transmission resources 1411 indicated by the first PDCCH DCI. Accordingly, specifically, the gNB may transmit the second PDCCH DCI 1420 to the UE after the UE transmits the uplink data through the uplink transmission resources 1411 indicated by the first PDCCH DCI, receives HARQ ACK or NACK in response thereto, or successfully transmits the uplink data, or after the gNB identifies that the UE successfully transmits the uplink data (receives ACK). That is, the gNB cannot transmit the second PDCCH DCI 1420 to the UE before the UE transmits the uplink data through the uplink transmission resources 1411 indicated by the first PDCCH DCI, receives HARQ ACK or NACK in response thereto, successfully transmits the uplink data, or identifies that the gNB successfully receives the uplink data (receives ACK or identifies an NDI value).

Third solution: When the second PDCCH DCI 1420 indicates switching of the current second uplink BWP of the SCell to the third uplink BWP (BWP which is not the dormant BWP), the UE may perform switching to the third uplink BWP indicated by the second PDCCH DCI 1420 after transmitting uplink data through the uplink transmission resources 1411 indicated by the first PDCCH DCI or identifying that the gNB successfully receives the uplink data (for example, identifying an NDI value). Accordingly, the UE transmits uplink data through the uplink transmission resources 1411 indicated by the first PDCCH DCI and then performs switching.

In the embodiment of FIG. 14, a third problem which may occur due to switching of a downlink normal BWP to a downlink dormant BWP is described below.

If the second PDCCH DCI 1420 indicates switching 1425 of the current second downlink BWP to a first downlink BWP (dormant BWP), the UE performs switching to the indicated first downlink BWP before the UE transmits uplink data through the uplink transmission resources 1411 or the downlink transmission resources 1411 indicated by the first PDCCH DCI, and thus a problem that uplink data cannot be transmitted through the uplink transmission resources 1411 indicated by the first PDCCH DCI or a problem that downlink data cannot be received through the downlink transmission resources 1411 indicated by the first PDCCH DCI may occur. Accordingly, in order to solve the third problem, a method for a downlink BWP or a method for an uplink BWP is proposed, and one of the following methods may be applied or a plurality of methods among the following methods may be combined and applied.

The operation of the downlink BWP proposed to solve the third problem is described below, and one of the following methods may be applied or a plurality of methods among the following methods may be combined and applied.

First solution: When the second PDCCH DCI 1420 indicates switching of the current second downlink BWP of the SCell to the first downlink BWP (dormant BWP), the UE may directly perform switching to the first downlink BWP indicated by the second PDCCH DCI 1420 before receiving downlink data through the downlink transmission resources 1411 indicated by the first PDCCH DCI. Accordingly, the UE may not receive downlink data through the downlink transmission resources 1411 indicated by the first PDCCH DCI, the UE may consider that the downlink data is not transmitted, or the UE may not be required to receive the downlink data. That is, the gNB may determine that the downlink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully receive the downlink data through the downlink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data or after the gNB identifies that the UE successfully receives the downlink data (receives ACK). That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data or before the gNB identifies that the UE successfully receives the downlink data (receives ACK).

Third solution: When the second PDCCH DCI 1420 indicates switching of the current second downlink BWP of the SCell to the first downlink BWP (dormant BWP), the UE may perform switching to the first downlink BWP indicated by the second PDCCH DCI 1420 after receiving downlink data through the downlink transmission resources 1411 indicated by the first PDCCH DCI or after receiving the downlink data and then transmitting HARQ ACK or NACK. Accordingly, the UE receives downlink data through the downlink transmission resources 1411 indicated by the first PDCCH DCI and then performs switching.

The operation of the uplink BWP proposed to solve the third problem is described below, and one of the following methods may be applied or a plurality of methods among the following methods may be combined and applied.

First solution: When the second PDCCH DCI 1420 indicates switching of the current second downlink BWP of the SCell to the first downlink BWP (dormant BWP), the UE may directly perform switching to the first downlink BWP indicated by the second PDCCH DCI 1420 before transmitting uplink data through the uplink transmission resources 1411 indicated by the first PDCCH DCI. Further, when the second PDCCH DCI 1420 indicates switching of the current second downlink BWP of the SCell to the first downlink BWP (dormant BWP), the UE may directly hibernate or deactivate an uplink BWP corresponding to the SCell and may apply the operation proposed in the disclosure when the BWP is hibernated or deactivated. In another method, when the second PDCCH DCI 1420 indicates switching of the current second downlink BWP of the SCell to the first downlink BWP (dormant BWP), the UE may directly switch the uplink BWP corresponding to the SCell to a uplink dormant BWP configured through an RRC message or activate the uplink BWP. Accordingly, the UE may not transmit uplink data through the uplink transmission resources 1411 indicated by the first PDCCH DCI, the UE may consider that the uplink data is not transmitted, or the UE may not be required to transmit the uplink data. That is, the gNB may determine that the uplink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully transmits the uplink data through the uplink transmission resources 1411 indicated by the first PDCCH DCI. Accordingly, specifically, the gNB may transmit the second PDCCH DCI 1420 to the UE after the UE transmits the uplink data through the uplink transmission resources 1411 indicated by the first PDCCH DCI, receives HARQ ACK or NACK in response thereto, or successfully transmits the uplink data, or after the gNB identifies that the UE successfully transmit the uplink data (receives ACK). That is, the gNB cannot transmit the second PDCCH DCI 1420 to the UE before the UE transmits the uplink data through the uplink transmission resources 1411 indicated by the first PDCCH DCI, receives HARQ ACK or NACK in response thereto, successfully transmits the uplink data, or identifies that the gNB successfully receives the uplink data (receives ACK or identifies an NDI value).

Third solution: When the second PDCCH DCI 420 indicates switching of the current second downlink BWP of the SCell to the first downlink BWP (dormant BWP), the UE may hibernate or deactivate an uplink BWP corresponding to the SCell after transmitting uplink data through the uplink transmission resources 1411 indicated by the first PDCCH DCI or identifying that the gNB successfully receives the uplink data (for example, identifying an NDI value) and may apply the operation proposed in the disclosure when the BWP is hibernated or deactivated. In another method, when the second PDCCH DCI 420 indicates switching of the current second downlink BWP of the SCell to the first downlink BWP (dormant BWP), the UE may switch the uplink BWP corresponding to the SCell to an uplink BWP configured through an RRC message or activate the uplink BWP after transmitting uplink data through the uplink transmission resources 1411 indicated by the first PDCCH DCI or identifying that the gNB successfully receives the uplink data (for example, identifying an NDI value) and may apply the operation proposed in the disclosure when the BWP is hibernated or deactivated. When the second PDCCH DCI 1420 indicates switching of the current second downlink BWP of the SCell to the first downlink BWP (dormant BWP), the UE may directly perform switching to the first downlink BWP indicated by the second PDCCH DCI 1420 for the downlink BWP before transmitting uplink data through the downlink transmission resources 1411 indicated by the first PDCCH DCI. When the second PDCCH DCI 1420 indicates switching of the current second downlink BWP of the SCell to the first downlink BWP (dormant BWP), the UE may perform switching to the first downlink BWP indicated by the second PDCCH DCI 1420 for the downlink BWP after successfully transmitting uplink data through the uplink transmission resources 1411 indicated by the first PDCCH DCI. Accordingly, the UE may transmit uplink data through the uplink transmission resources 1411 indicated by the first PDCCH DCI.

In the disclosure, the first solution, the second solution, or the third solution for the downlink BWP and the first solution, the second solution, or the third solution for the uplink BWP to solve the third problem may be applied to the UE transmitting or receiving data to or from the gNB through a frequency division duplex (FDD) system or an FDD method. This is because the uplink and the downlink use different frequencies and different BWPs in the FDD communication. However, one of the following methods may be applied to the UE transmitting or receiving data to or from the gNB through a TDD system or a TDD method. In the TDD communication, since the uplink and the downlink do not share time for the same frequency and the same BWP, switching or activation timing for one BWP is determined as follows.

First solution: When the second PDCCH DCI 1420 indicates switching of the current second downlink BWP of the SCell to the first downlink BWP (dormant BWP), the UE may directly perform switching to the first downlink BWP (uplink or downlink) indicated by the second PDCCH DCI 1420 before receiving downlink data through the downlink transmission resources 1411 indicated by the first PDCCH DCI or transmitting uplink data through the uplink transmission resources 1411 indicated by the first PDCCH DCI. Accordingly, the UE may not receive uplink data through the downlink transmission resources 1411 indicated by the first PDCCH DCI or not transmit uplink data through the uplink transmission resources 1411 indicated by the first PDCCH DCI, the UE may consider that the downlink data is not transmitted, or the UE may not be required to receive the downlink data or transmit the uplink data through the uplink transmission resources 1411 indicated by the first PDCCH DCI. That is, the gNB may determine that the downlink data or the uplink data indicated by the first PDCCH DCI is not important and may transmit the second PDCCH DCI 1420 to the UE.

Second solution: Transmission of the second PDCCH DCI 1420 indicating switching of the current second downlink BWP to the first downlink BWP (dormant BWP) by the gNB may be limited before the UE successfully receive the downlink data through the downlink transmission resources 1411 indicated by the first PDCCH DCI or successfully transmits the uplink data through the uplink transmission resources 1411 indicated by the first PDCCH DCI. Accordingly, specifically, the gNB may transmit the second PDCCH DCI 1420 to the UE after the UE receives the downlink data through the downlink transmission resources 1411 indicated by the first PDCCH DCI and transmits HARQ ACK or NACK in response thereto or successfully receives the downlink data, after the gNB identifies that the UE successfully receives the downlink data (receives ACK), or after the gNB successfully receives uplink data through the uplink transmission resources 1411 indicated by the first PDCCH DCI. That is, the gNB cannot transmit the second PDCCH DCI 1420 to the UE before the UE receives the downlink data through the downlink transmission resources 1411 indicated by the first PDCCH DCI, transmits HARQ ACK or NACK in response thereto, or successfully receives the downlink data, before the gNB identifies that the UE successfully receives the downlink data (receives ACK), or the gNB receives uplink data through the uplink transmission resources 1411 indicated by the first PDCCH DCI.

Third solution: When the second PDCCH DCI 1420 indicates switching of the current second downlink BWP of the SCell to the first downlink BWP (dormant BWP), the UE may perform switching to the first BWP (uplink or downlink) indicated by the second PDCCH DCI 1420 or activate the second downlink BWP after receiving downlink data through the downlink transmission resources 1411 indicated by the first PDCCH DCI, receiving the downlink data and transmitting HARQ ACK or NACK, or successfully transmitting uplink data through the uplink transmission resources 1411 indicated by the first PDCCH DCI. Accordingly, the UE may perform switching or activation after receiving downlink data through the downlink transmission resources 1411 indicated by the first PDCCH DCI or transmitting uplink data through the uplink transmission resources 1411 indicated by the first PDCCH DCI.

When the UE receives an indication indicating to switch to or activate the second downlink BWP from the first downlink BWP (dormant BWP) of the activated SCell according to the first embodiment, the second embodiment, or the third embodiment proposed in the disclosure, the second downlink BWP may be a downlink BWP first activated from a dormant state configured through an RRC message. However, when the UE receives an indication indicating activation of the deactivated SCell through MAC control information proposed in the disclosure, the second downlink BWP or the second uplink BWP may be a first activated downlink BWP or a first activated uplink BWP configured through the RRC message when the UE activates the second downlink BWP or the second uplink BWP.

FIG. 15 is a diagram illustrating the structure of an RRC message for configuring configuration information according to an embodiment of the disclosure.

Referring to FIG. 15, the gNB may transmit configuration information for the application of the first embodiment, the second embodiment, the third embodiment, or the fourth embodiment proposed in the disclosure to the UE through the RRC message (for example, RRCSetup message, RRCResume message, or RRCReconfiguration message) as illustrated in FIG. 6.

The format of the RRC message (for example, RRCReconfiguration message) may be configured as illustrated in FIG. 15.

The RRC message may include bearer configuration information 1510 for configuring each bearer.

The RRC message may include cell group configuration information 1511 for configuring each RLC layer device, MAC layer device, PHY layer device, or cell. Accordingly, the cell group configuration information 1511 may include RLC layer device configuration information, MAC layer device configuration information 1521, PHY layer device configuration information 1525, or configuration information 1522, 1523, 1524, 1530, 1540, 1541, and 1542 for configuring the cell.

In order to configure the configuration information for the application of the first embodiment, the second embodiment, the third embodiment, or the fourth embodiment proposed in the disclosure, the gNB may configure a plurality of SCells in the UE for carrier aggregation and allocate each SCell identifier through the RRC message as illustrated in FIG. 15. Further, the gNB may configure a dormant BWP for each SCell, and does not configure a dormant BWP for some SCells. Further, the gNB may include the plurality of SCells in each SCell group (a first SCell group for the first embodiment or a second SCell group for the second embodiment), and one SCell group (the first SCell group for the first embodiment or the second SCell group for the second embodiment) may include a plurality of SCells. An SCell group identifier (a first SCell group identifier for the first embodiment or a second SCell group identifier for the second embodiment) may be allocated to each SCell group (a first SCell group for the first embodiment or a second SCell group for the second embodiment), and a plurality of SCells identifiers may be included in or mapped to the respective SCell group identifiers (the first SCell group identifier for the first embodiment or the second SCell group identifier for the second embodiment). An SCell identifier value or an SCell group identifier value may be allocated as a predetermined bit value and have an integer value (or a natural number value). The number of first SCell groups for the first embodiment may be plural, and the first SCell group may have the SCell group identifier or the SCell group identifier may be mapped to a first SCell group set identifier for the first embodiment. Further, the number of second SCell groups for the second embodiment may be plural, and the second SCell group may have the SCell group identifier or the SCell group identifier may be mapped to a second SCell group set identifier for the second embodiment.

A plurality of BWPs may be configured in each of the uplink and the downlink for each SCell, and a BWP identifier may be allocated to each BWP. A value of 0, 1, 2, 3, or 4 may be allocated to each BWP identifier. A predetermined bit value (for example, 5 bits) may be allocated to the SCell identifier value, and the SCell identifier may have an integer value (or a natural number value). For each SCell, a first active BWP, a default BWP, an initial BWP, a dormant BWP, or a BWP first activated from a dormant state for an uplink or downlink may be indicated and configured by a BWP identifier.

Specifically, a method of configuring configuration information for the application of the first embodiment, the second embodiment, the third embodiment, or the fourth embodiment proposed in the disclosure by the UE or the gNB is described below, and one or a plurality of following methods may be applied.

First method: When an SCell identifier 1540 is configured in cell configuration information 1523, 1530 included in cell group configuration information 1511 of the RRC message, dormant SCell group configuration information may be also included therein and thus a first SCell group (or group identifier) or a second SCell group (or group identifier) to which the SCell identifier is mapped or in which the SCell identifier is included may be indicated. The dormant SCell group configuration information may include the first SCell group set identifier for the first embodiment and include an identifier of the first SCell group belonging to the first SCell group set for the first embodiment, and thus the SCell identifier may be mapped to or included in the first SCell group (group corresponding to the group identifier) of the first SCell group set. Further, the dormant SCell group configuration information may include the second SCell group set identifier for the second embodiment and include an identifier of the second SCell group belonging to the second SCell group set for the second embodiment, and thus the SCell identifier may be mapped to or included in the second SCell group (group corresponding to the group identifier) of the second SCell group set. In another method, the dormant SCell group configuration information may include one of the first SCell group set identifier for the first embodiment and the second SCell group set identifier for the second embodiment and include an identifier of the first SCell group belonging to the first SCell group set for the first embodiment or a second SCell group set identifier for the second embodiment, and thus the SCell identifier may be mapped to or included in the SCell group of one SCell group set among the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Second method: When an SCell identifier 1540 is configured in cell configuration information 1523 and 1530 of cell group configuration information 1511 of the RRC message, dormant SCell group configuration information may be also included therein and thus a first SCell group (or group identifier) or a second SCell group (or group identifier) to which the SCell identifier is mapped or in which the SCell identifier is included may be indicated. The dormant SCell group configuration information may include an identifier of the first SCell group belonging to the first SCell group set (groups) and thus the SCell identifier may be mapped to or included in the first SCell group (group corresponding to the group identifier) of the first SCell group set. Further, the dormant SCell group configuration information may include an identifier of the second SCell group belonging to the second SCell group set (groups) and thus the SCell identifier may be mapped to or included in the second SCell group (group corresponding to the group identifier) of the second SCell group set. In another method, the dormant SCell group configuration information may include the identifier of the first SCell group belonging to the first SCell group set for the first embodiment or a second SCell group set identifier for the second embodiment and thus the SCell identifier may be mapped to or included in the SCell group of one of the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Third method: dormant SCell group configuration information may be configured along with cell configuration information 1523 and 1530 of cell group configuration information 1511 of the RRC message. The dormant SCell group configuration information may include a first SCell group set identifier for the first embodiment and include an identifier of a first SCell group belonging to a first SCell group set for the first embodiment, and may configure a first SCell identifier list included in the first SCell group. SCell identifiers included in the first SCell identifier list may be mapped to or included in the first SCell group (a group corresponding to a group identifier) of the first SCell group set. Furthermore, the dormant SCell group configuration information may include a second SCell group set identifier for the second embodiment and include an identifier of a second SCell group belonging to a second SCell group set for the second embodiment, and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include one of the first SCell group set identifier for the first embodiment and the second SCell group set identifier for the second embodiment and include a first SCell identifier list of the first SCell group belonging to the first SCell group set for the first embodiment or a second SCell identifier list of the second SCell group belonging to the second SCell group set for the second embodiment, and thus each SCell identifier may be mapped to or included in the SCell group of one of the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. The SCell identifier list may include lists to which SCell identifiers are added, in which SCell identifiers are modified, or from which SCell identifiers are released. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

Fourth method: dormant SCell group configuration information may be configured along with cell configuration information 1523 and 1530 of cell group configuration information 1511 of the RRC message. The dormant SCell group configuration information may include an identifier of a first SCell group belonging to a first SCell group set for the first embodiment and may configure a first SCell identifier list included in the first SCell group. SCell identifiers included in the first SCell identifier list may be mapped to or included in the first SCell group (a group corresponding to a group identifier) of the first SCell group set. Further, the dormant SCell group configuration information may include an identifier of a second SCell group belonging to a second SCell group for the second embodiment and may configure a second SCell identifier list included in the second SCell group. SCell identifiers included in the second SCell identifier list may be mapped to or included in the second SCell group (a group corresponding to a group identifier) of the second SCell group set. A plurality of first SCell groups and a first SCell identifier list corresponding to each first SCell group may be configured in the first SCell group set of the dormant SCell group configuration information or a plurality of second SCell groups and a second SCell identifier list corresponding to each second SCell group may be configured in the second SCell group set. In another method, the dormant SCell group configuration information may include a first SCell identifier list of first SCell groups belonging to a first SCell group set for the first embodiment or a second SCell identifier list of second SCell groups belonging to a second SCell group set for the second embodiment and may configure that each SCell identifier is mapped to or included in the SCell group of one SCell group set among the first SCell group of the first SCell group set and the second SCell group of the second SCell group set. That is, one SCell identifier may be mapped to or included in only one SCell group among the first SCell group for the first embodiment and the second SCell group for the second embodiment or may be included in only one SCell group. The SCell identifier list may include lists to which SCell identifiers are added, in which SCell identifiers are modified, or from which SCell identifiers are released. In order to configure a plurality of first SCell groups when dormant SCell group configuration information is configured in cell configuration information 1523 and 1530 of the cell group configuration information 1511 of the RRC message, a first SCell group list may be configured, and the first SCell group list may include first SCell group identifiers and, more specifically, may include lists to which SCell groups are added, in which SCell groups are modified, or from which SCell groups are released. Further, in order to configure a plurality of second SCell groups when dormant SCell group configuration information is configured in cell configuration information 1523 and 1530 of the cell group configuration information 1511 of the RRC message, a second SCell group list may be configured, and the second SCell group list may include second SCell group identifiers and, more specifically, may include lists to which SCell groups are added, in which SCell groups are modified, or from which SCell groups are released.

The proposed methods may be applied by including the configuration information proposed by the first method, the second method, the third method, or the fourth method in the MAC layer device configuration information 1521, the PHY layer device configuration information 1521, or the bearer configuration information 1510.

Figure 16:
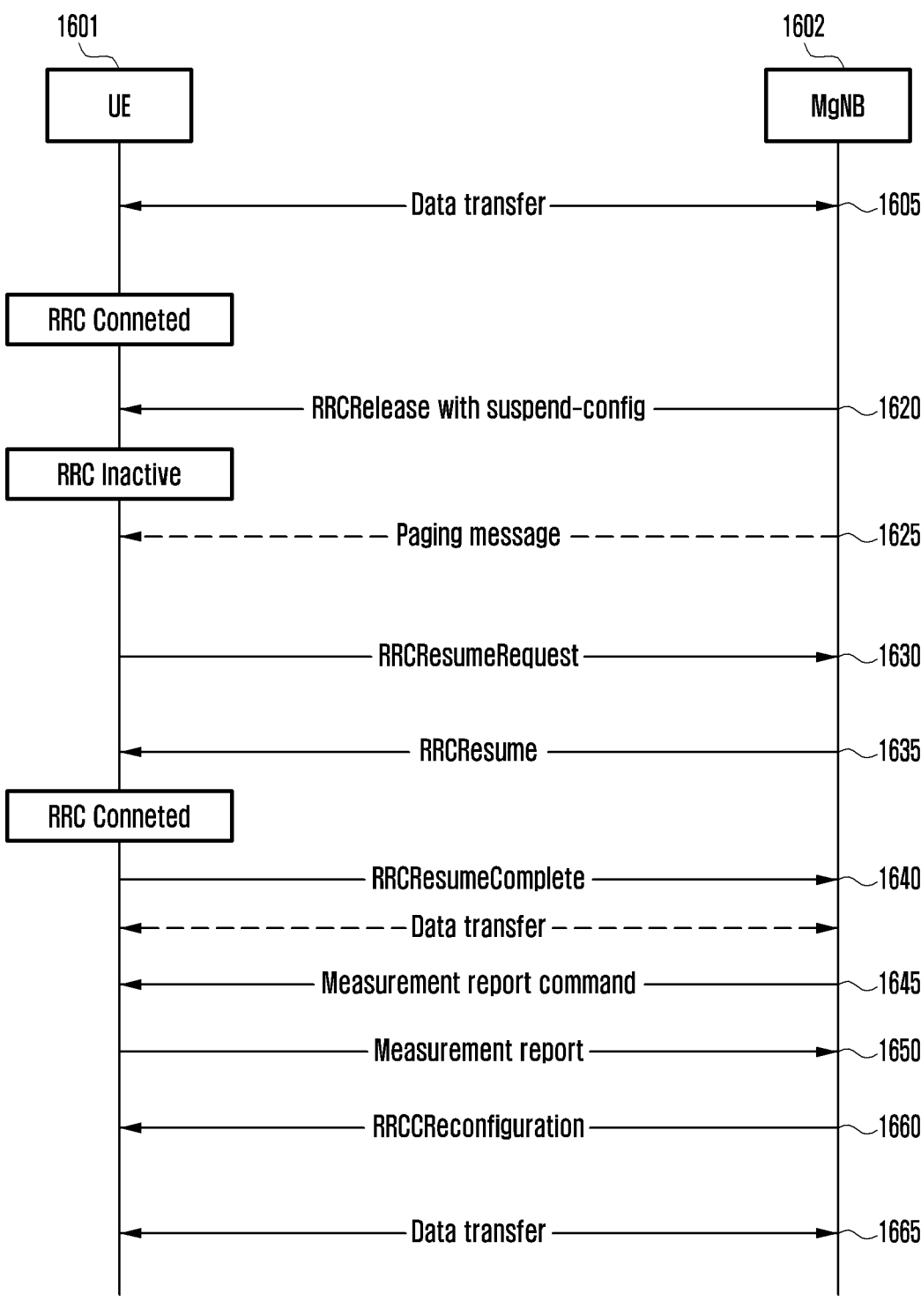
FIG. 16 is a diagram illustrating a fifth embodiment applied to an RRC-inactive mode UE according to an embodiment of the disclosure.

FIG. 16 is a diagram illustrating a fifth embodiment applied to an RRC-inactive mode UE according to an embodiment of the disclosure.

Referring to FIG. 16, the fifth embodiment proposes continuous storage of SCell configuration information (for example, configuration information described or proposed in FIG. 15) configured or stored for the first embodiment, the second embodiment, the third embodiment, or the fourth embodiment in the RRC-connected mode without releasing or discarding the Scell configuration information as illustrated in FIG. 6 even though the UE transitions to the RRC-inactive mode. Further, when performing an RRC connection resume procedure, the UE in the RRC-inactive mode proposes determining whether to discard, release, maintain and apply, or reconfigure the stored SCell configuration information (for example, configuration information described or proposed in FIG. 15) through an indicator of an RRCResume message or an RRCReconfiguration message transmitted by the gNB or through a reconfiguration procedure. When transmitting an RRCRelease message including a configuration or an indicator indicating transition to the RRC-inactive mode to the UE, the gNB may also transmit an indicator or configuration information indicating whether to discard, release, maintain and apply, or reconfigure the SCell configuration information (for example, configuration information described or proposed in FIG. 15) stored in the RRCRelease message to the UE. When updating an RAN notification area (RNA) while moving in the RRC-inactive mode, the UE may receive and apply an indicator or configuration information indicating whether to discard, release, maintain and apply, or reconfigure the SCell configuration information (for example, configuration information described or proposed in FIG. 15) stored in the RRCRelease message transmitted from the gNB to the UE.

In the fifth embodiment proposed in the disclosure, the gNB may allow configuration of the first active BWP of downlink or uplink BWP configuration information of each cell as the dormant BWP in the SCell configuration information (for example, configuration information described or proposed in FIG. 15) of the RRC message and thus the UE may operate the downlink BWP or the uplink BWP of each SCell as the dormant BWP when the UE activates each SCell, so that battery consumption of the UE can be reduced.

In another method, in the fifth embodiment proposed in the disclosure, the gNB may not allow configuration of the first active BWP of BWP configuration information of the downlink or uplink of each cell as the dormant BWP in SCell configuration information (for example, configuration information described or proposed in FIG. 15) of the RRC message to activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

Further, the fifth embodiment proposed above may be expansively applied to configuration information of each SCell of a master cell group (MCG) or a secondary cell group (SCG) of the UE in which the dual connectivity is configured. That is, SCell configuration information of the SCG may be stored when the UE transitions to the RRC-inactive mode, and an indicator or configuration information indicating whether to discard, release, maintain and apply, or reconfigure the stored SCell configuration information of the MCG or the SCG (for example, configuration information described or proposed in FIG. 15) may be transmitted to the UE through the RRC message (for example, RRCResume, RRCReconfiguration, or RRCRelease) when the RRC connection resume procedure is performed or when the UE transitions to the RRC-inactive mode.

In FIG. 16, a UE 1601 may make a network connection with a gNB 1602 and transmit and receive data in step 1605. If the gNB needs to transition the UE to the RRC-inactive mode for a predetermined reason, the gNB may transmit an RRCRelease message 1620 to transition the UE to the RRC-inactive mode. The indicator or configuration information indicating whether to discard, release, maintain and apply, or reconfigure the stored SCell configuration information of the MCG or the SCG (for example, configuration information described or proposed in FIG. 15) may be transmitted to the UE through the RRC message (for example, RRCRelease). In the case of the UE applying the dual connectivity, the gNB may determine whether to stop or resume master cell group bearer configuration, RRC configuration information, or SCell configuration information of the MCG or the SCG and ask the secondary cell gNB about whether to stop or resume the secondary cell group bearer configuration and the RRC configuration information and receive a response to determine the same in step 1615. Further, the gNB may configure a list of frequencies which the UE measures in the RRC-idle mode or the RRC-inactive mode, frequency measurement configuration information, or a period during which the frequency is measured in the RRCRelease message.

When the UE in the RRC-inactive mode receives a paging message during movement in step 1625, has a need to transmit uplink data, or has a need to update a RAN notification area, the UE may perform the RRC connection resume procedure.

When the UE needs to configure the connection, the UE performs a random access procedure, and when an RRCResumeRequest message is transmitted to the gNB, a proposed UE operation related to transmission of the message is described below in step 1630.

1. The UE identifies system information and, when the system information indicates transmission of a complete UE connection resume identifier (I-RNTI or a full resume ID), prepares transmission by inserting the stored complete UE connection resume identifier (I-RNTI) into the message. If the system information indicates transmission of a truncated UE connection resume identifier (truncated I-RNTI or a truncated resume ID), the UE configures the stored complete UE connection resume identifier (I-RNTI) as the truncated UE connection resume identifier (truncated resume ID) through a predetermined method and prepares transmission by inserting the configured truncated UE connection resume identifier into the message.

2. The UE restores RRC connection configuration information and security context information from stored UE context.

3. The UE updates a new KgNB security key corresponding to a master cell group on the basis of a current KgNB security key, a NextHop (NH) value, and an NCC value received and stored in the RRCRelease message.

4. Upon receiving an SCG-counter value (or sk-counter) in the RRCRelease message, the UE updates a new SKgNB security key corresponding to a secondary cell group on the basis of the KgNB security key and the SCG-counter value (or sk-counter).

5. The UE induces new security keys (K_RRCenc, K_RRC_int, K_UPint, and _) to be used in an integrity protection and verification procedure and an encryption and decryption procedure using the newly updated KgNB security key.

6. Upon receiving the SCG-counter value (or sk-counter) in the RRCRelease message, the UE induces new security keys (K_RRCenc, K_RRC_int, K_UPint, and K_UPenc) to be used in an integrity protection and verification procedure and an encryption and decryption procedure using the newly updated SKgNB security key corresponding to the secondary cell group.

7. The UE prepares transmission by calculating a MAC-I and inserting the same into the message.

8. The UE resumes SRB1 (The UE should resume in advance since the UE will receive an RRCResume message through SRB1 in response to an RRCResumeRequest message to be transmitted).

9. The UE configures the RRCResumeRequest message and transmits the same to a lower layer device.

10. The UE resumes the integrity protection and verification procedure by applying the updated security keys and a previously configured algorithm to all bearers (MCG terminated RBs) except for SRB0 and then apply integrity verification and protection to transmitted and received data (This is to increase reliability and security of data thereafter transmitted and received from SRB1 or DRBs).

11. The UE resumes the encryption and description procedure by applying the updated security keys and a previously configured algorithm to all bearers (MCG terminated RBs) except for SRB0 and then apply encryption and decryption to transmitted and received data (This is to increase reliability and security of data thereafter transmitted and received from SRB1 or DRBs).

12. Upon receiving the SCG-counter value (or sk-counter) in the RRCRelease message, the UE resumes the integrity protection and verification procedure by applying the updated security keys and a previously configured algorithm to all bearers (SCG terminated RBs) corresponding to the secondary cell group and then apply integrity verification and protection to transmitted and received data (This is to increase reliability and security of data thereafter transmitted and received from SRB1 or DRBs).

13. Upon receiving the SCG-counter value (or sk-counter) in the RRCRelease message, the UE resumes the encryption and decryption procedure by applying the updated security keys and a previously configured algorithm to all bearers (SCG terminated RBs) corresponding to the secondary cell group and then apply encryption and decryption to transmitted and received data (This is to increase reliability and security of data thereafter transmitted and received from SRB1 or DRBs).

The UE operation proposed when the UE has a need to configure the connection, performs a random access procedure, transmits an RRCResumeRequest message to the gNB, and receives an RRCResume message in response thereto is described below in step 1635. If the RRCResume message includes an indicator indicating a report on an effective frequency measurement result measured in the RRC-inactive mode to the UE, the UE may configure the frequency measurement result in an RRCResumeComplete message and report the same. Further, the gNB may insert an indicator or configuration information indicating whether to discard, release, maintain and apply, or reconfigure SCell configuration information of the MCG or SCG} (for example, configuration information described or proposed in FIG. 15) stored in the UE into the RRC message (for example, RRCResume) and transmit the same to the UE.

1. Upon receiving the message, the UE restores a PDCP state corresponding to the master cell group, resets a count value, and reestablishes PDCP layer devices of SRB2 corresponding to the master cell group and all DRBs (MCG terminated RBs).

2. Upon receiving the SCG-counter value (or sk-counter) in the message, the UE updates a new SKgNB security key corresponding to the secondary cell group on the basis of the KgNB security key and the SCG-counter value (or sk-counter). Further, the UE induces new security keys (K_RRCenc, K_RRC_int, K_UPint, and K_UPenc) to be used in an integrity protection and verification procedure and an encryption and decryption procedure using the newly updated KgNB security key corresponding to the second cell group.

3. If the message includes master cell group (masterCellGroup) configuration information,
   A. The master cell group configuration information included in the message is executed and applied. The master cell group information may contain configuration information of RLC layer devices belonging to the master cell group, a logical channel identifier, and a bearer identifier.

4. If the message includes bearer configuration information (radioBearerConfig),
   A. The bearer configuration information (radioBearerConfig) included in the message is executed and applied. The bearer configuration information (radioBearerConfig) may contain configuration information of PDCP layer devices for respective bearers, configuration information of SDAP layer devices, a logical channel identifier, and a bearer identifier.

5. If the message includes secondary cell group (secondaryCellGroup) configuration information, A. The secondary cell group configuration information included in the message is executed and applied. The secondary cell group information may contain configuration information of RLC layer devices belonging to the second cell group, a logical channel identifier, and a bearer identifier.

6. If the message includes secondary bearer configuration information (radioBearerConfig), A. The secondary bearer configuration information (radioBearerConfig) included in the message is executed and applied. The secondary bearer configuration information (radioBearerConfig) may contain configuration information of PDCP layer devices for respective secondary bearers, configuration information of SDAP layer devices, a logical channel identifier, and a bearer identifier.

7. The UE resumes SRB2 corresponding to the master cell group and all DRBs (MCG terminated RBs).

8. If the message includes frequency measurement configuration information (measConfig), A. The frequency measurement configuration information included in the message is executed and applied. That is, the frequency measurement may be performed according to the configuration.

9. The UE transitions to the RRC-connected mode.

10. The UE indicates resume of the RRC connection, which has been suspended, to a higher layer device.

11. The UE configures an RRCResumeComplete message and transmits the same to a lower layer device in step 1640.

When the UE has bearer configuration information and UE text information for the suspended secondary cell group, the UE may perform frequency measurement on the basis of frequency configuration information configured in system information, the RRCRelease message, or the RRCResume message and, when there is an effective result, insert an indicator indicating the result into the RRCResumeComplete message, and transmit the same. Upon receiving the indicator, the gNB instructs the UE to report the frequency measurement result in step 1645 when resume of the carrier aggregation or the dual connectivity is needed and may receive a report on the frequency measurement result or receive the report on the frequency measurement result through the RRCResumeComplete message in step 1650. Upon receiving the frequency measurement result, the gNB may ask the secondary cell gNB about whether to resume bearer information for the suspended secondary cell group, receive a response thereto, determine whether to resume, transmit an RRCReconfiguration message to the UE, and indicate whether to resume or release bearers for the second cell group. Further, the gNB may insert an indicator or configuration information indicating whether to discard, release, maintain and apply, or reconfigure SCell configuration information of the MCG or SCG (for example, configuration information described or proposed in FIG. 15) stored in the UE into the RRC message (for example, RRCReconfiguration) and transmit the same to the UE.

In the fifth embodiment proposed in FIG. 16 of the disclosure, the gNB may allow to configure the first active BWP in downlink BWP or uplink BWP configuration information of each cell as the dormant BWP in the SCell configuration information (for example, configuration information described or proposed in FIG. 15) of the RRC message (for example, RRCRelease, RRCResume, or RRCReconfiguration) and thus the UE may operate the downlink BWP or the uplink BWP of each SCell as the dormant BWP when the UE activates each SCell, so that battery consumption of the UE can be reduced. For example, when the SCell state is configured as an activated state in the SCell configuration information of the RRC message (for example, RRCRelease, RRCResume, or RRCReconfiguration) or an indication indicating activation of the SCell is received through the MAC control information proposed in the disclosure, the SCell may be activated and the downlink BWP or the uplink BWP of the SCell may be activated as the dormant BWP when the SCell is activated, thereby saving the battery of the UE. In another method, in the fifth embodiment proposed in the disclosure, the gNB may not allow configuration of the first active BWP of BWP configuration information of the downlink or uplink of each cell as the dormant BWP in SCell configuration information (for example, configuration information described or proposed in FIG. 15) of the RRC message to activate the downlink BWP or the uplink BWP of each SCell as the first active BWP when the UE activates each SCell and switch the same to the dormant BWP or activate the same by the first embodiment, the second embodiment, the third embodiment, or the fourth embodiment proposed in the disclosure, thereby reducing battery consumption of the UE.

When the UE in the RRC-inactive mode transitions to the RRC-connected mode and the SCell configuration information proposed in the disclosure is restored, applied, or reconfigured, BWPs may be switched, activated, or the dormant BWP may be activated or applied for each activated SCell according to the first embodiment, the second embodiment, the third embodiment, or the fourth embodiment proposed in the disclosure. Further, the firth embodiment may be expanded and applied when a handover is performed.

An embodiment of a detailed operation related to a BWP of a MAC layer device and a BWP inactivity timer according to the first embodiment, the second embodiment, or the third embodiment of the disclosure is described below, and the BWP inactivity timer starts or restarts only when a default BWP is configured and a BWP instructed to be BWP-switched is not a dormant BWP or not the default BWP or when the default BWP is not configured and a BWP instructed to be BWP-switched is not the dormant BWP or not an initial BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication, 2> If a downlink default BWP identifier (defaultDownlinkBWP-Id) is configured and the MAC layer device switches to a BWP which is not instructed by the downlink default BWP identifier or a downlink dormant BWP, 2> If a downlink default BWP identifier (defaultDownlinkBWP-Id) is not configured and the MAC layer device switches to a BWP which is not a downlink initial BWP or a downlink dormant BWP, 3> A BWP inactivity timer (bwp-InactivityTimer) for the downlink active BWP starts or restarts.

Another embodiment of a detailed operation related to a BWP of a MAC layer device and a BWP inactivity timer according to the first embodiment, the second embodiment, or the third embodiment of the disclosure is described below, and the BWP inactivity timer starts or restarts only when the switched and activated BWP is not the dormant BWP.

If the MAC layer device receives an indication of a PDCCH for BWP switching of a serving cell (PCell, PSCell, or SCell), the MAC layer device operates with respect to a serving cell in which a BWP inactivity timer is configured as follows.

1> If the PDCCH for the BWP switching indication is received and the MAC layer device switches the downlink active BWP according to the indication, 2> If a downlink default BWP identifier (defaultDownlinkBWP-Id) is configured and the MAC layer device switches to a BWP which is not instructed by the downlink default identifier, 2> If a downlink default BWP identifier (defaultDownlinkBWP-Id) is not configured and the MAC layer device switches to a BWP which is not a downlink initial BWP, 3> If the switched and activated downlink BWP is not the dormant BWP or not the BWP instructed by the dormant BWP identifier, 4> A BWP inactivity timer (bwp-InactivityTimer) for the downlink active BWP starts or restarts.

Another embodiment of a detailed operation related to a detailed operation related to an uplink BWP when a downlink BWP of a MAC layer device is switched to a dormant BWP according to the first embodiment, the second embodiment, or the third embodiment of the disclosure is described below, and an active uplink BWP is deactivated or hibernated when a downlink BWP is switched to a dormant BWP. This is because the PDCCH is not monitored and data transmission/reception is not performed in the dormant BWP and thus the uplink BWP is not used.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches to a BWP indicated by the PDCCH by switching the current BWP of the serving cell.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.

3> In another method, if a cell deactivation timer is being driven, the cell deactivation timer may be stopped. The operation is applied to prevent cell deactivation of the dormant BWP due to expiration of the cell timer and automatic deactivation of the dormant BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched to a first active BWP and activated when the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches to a BWP indicated by the PDCCH by switching the current BWP of the serving cell.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.

3> In another method, if a cell deactivation timer is being driven, the cell deactivation timer may be stopped. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, 2> If a BWP indicated by the PDCCH is a BWP having a BWP identifier which is not the same as the dormant BWP identifier or if the switched and activated downlink BWP according to the indication of the PDCCH is not the dormant BWP, 3> The uplink BWP of the current serving cell is activated to an uplink BWP indicated by a first active BWP identifier or a first active BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched to an uplink BWP having the same BWP identifier as a BWP identifier indicated by the PDCCH and activated when the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> The UE switches to a BWP indicated by the PDCCH by switching the current BWP of the serving cell.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.

3> In another method, if a cell deactivation timer is being driven, the cell deactivation timer may be stopped. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, 2> If a BWP indicated by the PDCCH is a BWP having a BWP identifier which is not the same as the dormant BWP identifier or if the switched and activated downlink BWP according to the indication of the PDCCH is not the dormant BWP, 3> The uplink BWP of the current serving cell is activated to an uplink BWP having the same BWP identifier as a BWP identifier indicated by the PDCCH or an uplink BWP having the same BWP identifier as a BWP identifier of the current downlink BWP.

Another embodiment of a detailed operation related to an uplink BWP when a downlink BWP of the MAC device is a dormant BWP but the downlink BWP is switched to a normal BWP instead of the dormant BWP according to the first embodiment, the second embodiment, or the third embodiment is described below, and the uplink BWP is switched and activated to an uplink BWP activated when a previous downlink BWP is switched to the dormant BWP or a last activated uplink BWP if the downlink BWP is switched from the dormant BWP to the normal BWP.

If the MAC layer device receives the indication of the PDCCH for BWP switching of the serving cell (PCell, PSCell, or SCell), 1> If there is no random access procedure which is being performed by the serving cell, 1> Alternatively, if a random access procedure which is being performed by the serving cell is successfully completed when the PDCCH indicated by the C-RNTI is received, 2> the UE switches to a BWP indicated by the PDCCH by switching the current BWP of the serving cell.

2> If the BWP indicated by the PDCCH is a downlink BWP having the same BWP identifier as a downlink dormant BWP identifier or if the switched and activated BWP is a downlink dormant BWP, 3> An active uplink BWP of the current serving cell is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

3> If a BWP activation timer related to the active downlink BWP is being driven in the current serving cell, the BWP activation timer is stopped. This is to prevent activation of the default BWP through automatic switching of the dormant BWP to the default BWP (battery consumption due to PDCCH monitoring). If the default BWP is configured as the dormant BWP, the above problem may be prevented.

3> In another method, if a cell deactivation timer is being driven, the cell deactivation timer may be stopped. The operation is applied to prevent cell deactivation of the dormant BWP due to expiration of the cell timer and automatic deactivation of the dormant BWP.

2> If the active downlink BWP (for example, previous downlink BWP) is a dormant BWP or is a BWP indicated by a dormant BWP identifier, 2> If a BWP indicated by the PDCCH is a BWP having a BWP identifier which is not the same as the dormant BWP identifier or if the switched and activated downlink BWP according to the indication of the PDCH is not the dormant BWP, 3> The uplink BWP of the current serving cell is activated to an uplink BWP activated when a previous downlink BWP is switched to the dormant BWP or a last activated uplink BWP.

Another embodiment of a detailed operation according to a cell state (activated state or deactivated state) of the MAC layer device according to the first embodiment, the second embodiment, or the third embodiment of the disclosure is described below.

If an indication indicating deactivation of a serving cell (PCell or SCell) is received through a MAC CE or an RRC message or if a cell deactivation timer has been configured and has expired, one or a plurality of following operations may be performed.

A downlink or uplink BWP is deactivated or hibernated.

A cell deactivation timer configured or driven for the cell or BWP is stopped.

If a BWP inactivity timer configured for the BWP of the cell is being driven, the BWP inactivity timer is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the activated state to the dormant state. This is because there is no information on periodic transmission resources activated or indicated through L1 signaling when the BWP transitions from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, namely, the operation of suspending the periodic uplink transmission resources (configured uplink grant Type 1), may be performed only when the BWP transitions from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

The UE does not transmit uplink data through a UL-SCH in the BWP of the cell.

The UE does not perform a random access procedure for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, the scheduled cell (for example, PCell) may receive an indication through monitoring of a PDCCH for the cell (for example, SCell).

No PUCCH or SPUCCH transmission is performed in the BWP of the cell.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of following operations may be performed.

If the current downlink BWP of the serving cell is not the dormant BWP or if the serving cell was previously in a deactivated state and is activated by the indication of the MAC CE, the uplink or downlink BWP is switched to a predetermined BWP (for example, an uplink or uplink first active BWP) and the BWP is activated.

If the current downlink BWP of the serving cell is not the dormant BWP or if the serving cell was previously in a deactivated state and is activated by the indication of the MAC CE, a sounding reference signal (SRS) is transmitted to enable the gNB to perform channel measurement for the uplink in the activated BWP. For example, the SRS may be periodically transmitted.

If the current downlink BWP of the serving cell is not the dormant BWP or if the serving cell was previously in a deactivated state and is activated by the indication of the MAC CE, a PUCCH is transmitted if the PUCCH is configured in the activated BWP.

If the current downlink BWP of the serving cell is not the dormant BWP or if the serving cell was previously in a deactivated state and is activated by the indication of the MAC CE, a BWP inactivity timer or cell deactivation timer starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If the current downlink BWP of the serving cell is not the dormant BWP or if the serving cell was previously in a deactivated state and is activated by the indication of the MAC CE, stored type 1 transmission resources may be initialized as original and used when there are type 1 configuration transmission resources of which the use is suspended. The type 1 configuration transmission resources are periodic (uplink or downlink) transmission resources pre-allocated through an RRC message, which can be used after being activated through the RRC message.

If the current downlink BWP of the serving cell is not the dormant BWP or if the serving cell was previously in a deactivated state and is activated by the indication of the MAC CE, a PHR for the BWP is triggered.

The UE may report a channel measurement result (CSI, CQI, PMI, RI, PTI, or CRI) for the downlink in the activated BWP according to a configuration of the gNB.

If the current downlink BWP of the serving cell is not the dormant BWP or if the serving cell was previously in a deactivated state and is activated by the indication of the MAC CE, a PDCCH is monitored to read an indication of the gNB in the activated BWP.

If the current downlink BWP of the serving cell is not the dormant BWP or if the serving cell was previously in a deactivated state and is activated by the indication of the MAC CE, a PDCCH is monitored to read cross-scheduling for the activated BWP.

If the current downlink BWP of the serving cell is not the dormant BWP or if the serving cell was previously in a deactivated state and is activated by the indication of the MAC CE, the BWP inactivity timer starts or restarts. In another method, the BWP inactivity timer may start or restart only when a BWP hibernation timer is not configured. If the BWP hibernation timer can be configured through the RRC message, the BWP may be hibernated or switched to a dormant BWP when the timer expires. For example, the BWP inactivity timer may start or restart only in the dormant BWP.

If the current downlink BWP of the serving cell is not the dormant BWP or if the serving cell was previously in a deactivated state and is activated by the indication of the MAC CE, and if a link BWP hibernation timer is configured for the BWP, The BWP hibernation timer starts or restarts for the BWP.

Further, in the embodiment of the disclosure, when the gNB triggers a random access procedure for the SCell, the gNB does not indicate BWP switching of the downlink BWP to the dormant BWP. This is because the uplink BWP is deactivated when switching to the downlink dormant BWP is performed and thus the random access procedure cannot be successfully performed.

The operation related to switching of the normal BWP (for example, a BWP other than the dormant BWP) or the dormant BWP is performed when the cell (for example, SCell) operating the BWP is in an activated state in the embodiment. Accordingly, when MAC control information (MAC control element (MAC CE)) including an indication indicating activation or deactivation of the cell is received, the indication may be ignored if the cell operates a downlink dormant BWP and receives the MAC CE including the indication indicating activation of the cell, and the downlink dormant BWP of the cell is deactivated if the cell operates the downlink dormant BWP and receives the MAC CE including the indication indicating deactivation of the cell. In another method, in the embodiment of the disclosure, a cell deactivation timer is being driven when a downlink BWP is switched to a dormant BWP, the cell deactivation timer is stopped. The operation is applied to prevent cell deactivation of the dormant BWP due to expiration of the cell timer and automatic deactivation of the dormant BWP.

In the disclosure, a fourth embodiment of performing the state transition in units of BWPs and the operation according thereto is described below.

In the fourth embodiment of the disclosure, a dormant BWP is configured by an indicator or a BWP identifier when a plurality of BWPs are configured in the UE for each cell through the RRC message as illustrated in FIG. 6. When the gNB transmits the MAC CE including the indication indicating deactivation of a specific cell to the UE and a dormant BWP is configured in the cell, the UE deactivates the specific cell and perform switching to the dormant BWP according to the indication of the MAC CE. The UE monitors no PDCCH and perform no data transmission/reception in the dormant BWP of the specific cell, but may reduce UE battery consumption and enable rapid BWP activation by reporting channel measurement. When there is a need to transmit and receive data for the inactive cell switched to the dormant BWP, the gNB may transmit the MAC CE including an indication indicating activation of a specific cell to the UE. When the UE receive the MAC CE, the UE may activate the specific cell, and switch the specific cell to a first active BWP and activate the same. The UE may monitor the PDCCH and start data transmission/reception again in the switched BWP. However, in the fourth embodiment of the disclosure, when deactivation of a specific cell is indicated through the RRC message, all BWPs are deactivated even though the dormant BWP is configured in the specific cell. When the UE receives the MAC including the indication indicating deactivation of the deactivated cell through the RRC message and the dormant BWP is configured in the cell, the UE may activate the dormant BWP, perform an operation in the dormant BWP, and start a channel measurement report.

In the fourth embodiment of the disclosure, the dormant BWP is operated or used by the cell in the deactivated state. Further, in the fourth embodiment of the disclosure, switching of the BWP to the dormant BWP indicates switching of the downlink BWP. This is because the operation of not monitoring the PDCCH and the operation of reporting the channel measurement are operations for the downlink BWP of the cell by the UE.

In the fourth embodiment of the disclosure, for the state of the cell (for example, SCell), the activated state or the deactivated state is maintained and operated and the state transition between states is supported. For the state of the BWP, the activated state, the dormant state, or the deactivated state is maintained and operated and the state transition between BWPs or switching between BWPs is performed according to the cell state.

An embodiment of the detailed operation according to the cell state (activated state or deactivated state) of the MAC layer device according to the fourth embodiment of the disclosure is described below.

If the UE receives an indication of the operation as the dormant BWP for the serving cell (PCell or SCell), if the UE receives an indication indicating deactivation of the cell through a MAC CE or an RRC message, if the UE receives an indication indicating switching of a BWP (for example, a downlink BWP) to a dormant BWP through DCI of a PDCCH (L1 control signal), a MAC CE, or an RRC message, or if a cell deactivation timer was configured and has expired, one or a plurality of following operations may be performed.

If the dormant BWP is configured in the serving cell, the downlink BWP is switched to a BWP indicated by a dormant BWP identifier. Alternatively, the BWP is hibernated.

An uplink BWP is deactivated or hibernated. In another method, the active uplink BWP of the current serving cell is hibernated or deactivated, and the hibernation or deactivation operation of the BWP or the operation of the dormant BWP proposed in the disclosure may be applied. In another method, the active uplink BWP of the current serving cell may be switched to an uplink BWP configured or designated by an RRC message or may be activated. In another method, if there are previously allocated uplink transmission resources, the active uplink BWP of the current serving cell may be hibernated or deactivated after uplink data for the uplink transmission resources is transmitted, and the hibernation or deactivation operation of the BWP or the operation of the dormant BWP proposed in the disclosure may be applied. In another method, if there are previously allocated uplink transmission resources, the active uplink BWP of the current serving cell may be switched to an uplink BWP configured or designated by an RRC message or may be activated.

A cell deactivation timer configured or driven for the cell or BWP is stopped.

If a BWP inactivity timer configured for the BWP of the cell is being driven, the BWP inactivity timer is stopped. This is to prevent an unnecessary BWP switching procedure in the cell.

Periodic downlink transmission resources (DL SPS or configured downlink assignment) or periodic uplink transmission resources (UL SPS or configured uplink grant Type 2) configured in the BPW of the cell may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the activated state to the dormant state. This is because there is no information on periodic transmission resources activated or indicated through L1 signaling when the BWP transitions from the deactivated state to the dormant state. In another method, the periodic transmission resources may be released only when the periodic downlink transmission resources or the periodic uplink transmission resources are configured or when the transmission resources are configured and used.

The periodic uplink transmission resources (configured uplink grant Type 1 configured through RRC) configured in the BWP of the cell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the activated state to the dormant state. This is because periodic transmission resources are not used when the BWP transitions from the deactivated state to the dormant state. In another method, the periodic transmission resources may be released only when the periodic downlink transmission resources or the periodic uplink transmission resources are configured or when the transmission resources are configured and used.

An HARQ buffer configured in the uplink or downlink BWP is all emptied.

The UE does not transmit an SRS to the uplink BWP of the cell.

If the dormant BWP is configured in the cell, the UE measures a channel (CSI, CQI, PMI, RI, PTI, or CRI) for the downlink in the BWP according to the configuration of the gNB and reports the measurement. For example, the UE may periodically report the channel or frequency measurement.

The UE does not transmit uplink data through a UL-SCH in the BWP of the cell.

The UE does not perform a random access procedure for the BWP of the cell.

The UE does not monitor a PDCCH in the BWP of the cell.

The UE does not monitor a PDCCH for the BWP of the cell. However, in the case of cross-scheduling, if the dormant BWP is configured in the cell, the scheduled cell (for example, PCell) may receive an indication through monitoring of a PDCCH for the cell (for example, SCell).

No PUCCH or SPUCCH transmission is performed in the BWP of the cell.

If the dormant BWP is configured in the cell, the downlink BWP may be hibernated, and a channel measurement may be performed and reported. Further, an uplink BWP of the cell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

The UE operation for the active BWP (active BWP or active Band Width Part) according to the disclosure is described below.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

The BWP is switched to the indicated uplink or downlink BWP or activated. Alternatively, the uplink or downlink BWP is switched to a predetermined BWP (for example, an uplink or uplink first active BWP), and the BWP is activated.

A sounding reference signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP inactivity timer or cell deactivation timer therefor starts or restarts. In another method, the BWP inactivity timer or cell deactivation timer may start or restart only when a BWP or cell hibernation timer is not configured. If the BWP or cell hibernation timer can be configured through the RRC message, the BWP or the cell may be hibernated when the timer expires. For example, the BWP inactivity timer or cell deactivation timer may start or restart only in the hibernated BWP or cell.

If there are type 1 configuration transmission resources of which the use is suspended, the stored type 1 transmission resources may be initialized and used. The type 1 configuration transmission resources are periodic (uplink or downlink) transmission resources pre-allocated through an RRC message, which can be used after being activated through the RRC message.

A PHR is triggered for the BWP.

The UE may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross-scheduling for the activated BWP.

The BWP inactivity timer starts or restarts. In another method, the BWP inactivity timer may start or restart only when a BWP hibernation timer is not configured. If the BWP hibernation timer can be configured through the RRC message, the BWP may be switched to a dormant state or a dormant BWP when the timer expires. For example, the BWP inactivity timer may start or restart only in the dormant BWP.

If a link BWP hibernation timer is configured for the BWP,

The BWP hibernation timer starts or restarts for the BWP.

Various embodiments may be configured and used by combining or expanding the first embodiment, the second embodiment, the third embodiment, or the fourth embodiment of performing the state transition in units of BWPs and the operation according thereto in the disclosure. For example, a fifth embodiment of performing the state transition in units of BWPs and the operation according thereto is described below.

In the fifth embodiment, a dormant BWP is configured by an indicator or a BWP identifier when a plurality of BWPs are configured in the UE for each cell through the RRC message as illustrated in FIG. 6. The gNB may indicate switching of the BWP for the cell in an activated state to the dormant BWP through DCI of the PDCCH which is L1 signaling and perform no PDCCH monitoring and no data transmission/reception in the dormant BWP but transmits a channel measurement report therein, thereby reducing UE battery consumption and enabling rapid BWP activation. The gNB may transmit DCI of the PDCCH which is L1 signaling in the cell (self-scheduling) or transmit the same in the PCell (cross-carrier scheduling) so as to indicate BWP switching.

When data transmission/reception for the activated cell switched to the dormant BWP is needed, the gNB may transmit a MAC CE including an indicator indicating activation of the cell to the UE, indicate switching of the dormant BWP for the cell in the activated state to a BWP (or an active BWP) which is not the dormant BWP among a plurality of BWPs configured through the RRC message, monitor a PDCCH again in the switched BWP, and start data transmission/reception.

If the gNB transmits a MAC CE including an indicator indicating deactivation of the cell to the UE, the UE may deactivate an uplink or downlink BWP of the specific cell and perform the deactivation operations proposed in the disclosure. In the fifth embodiment of the disclosure, the BWP is not operated or used by the cell in the deactivated state. Further, in the fifth embodiment of the disclosure, if switching the BWP to the dormant BWP is an indication of switching a downlink BWP, switching the dormant BWP to the active BWP may act as a cell activation indicator of the MAC CE. Detailed operations related to the cell state and BWP switching operation may be performed on the basis of the operation proposed by the first embodiment, the second embodiment, or the third embodiment of the disclosure.

As described above, various embodiments may be configured and used by combining or expanding the first embodiment, the second embodiment, the third embodiment, the fourth embodiment, or the fifth embodiment of the disclosure.

Figure 17:
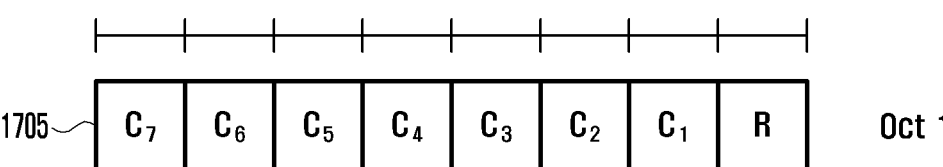
FIG. 17 is a diagram illustrating MAC control information indicating the state transition to an activated state, a dormant state, or a deactivated state proposed in an embodiment of the disclosure.
Figure 17:
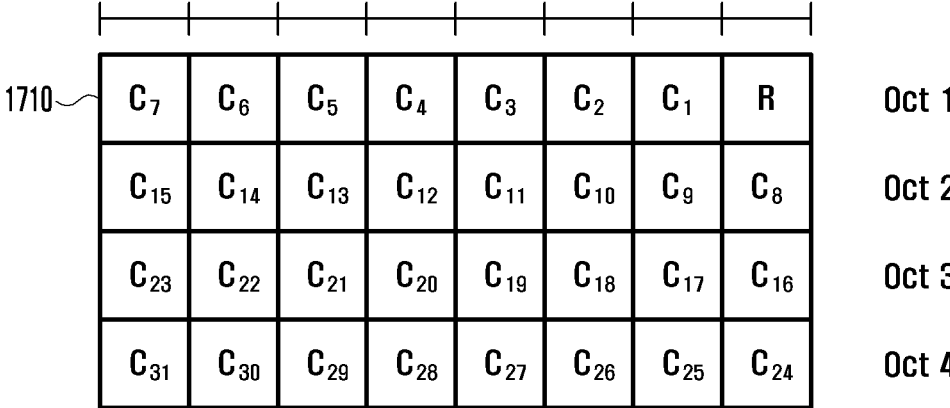

FIG. 17 is a diagram illustrating MAC control information indicating the state transition to an activated state, a dormant state, or a deactivated state proposed in an embodiment of the disclosure.

Active and inactive MAC CEs proposed in the disclosure are merely an embodiment, may have the format illustrated in FIG. 17, and may be divided into a MAC CE format 1705 having the size of 1 byte supporting 7 Scells and a MAC CE format 1710 having the size of 4 bytes supporting 31 Scells. Further, the MAC CEs may have the following characteristics.

In the case in which a dormant MAC CE is not received and only active and inactive MAC CEs are received, the UE operates as described below.

If each field of the active and inactive MAC CEs indicates each Scell identifier, a value corresponding to each field indicates whether the Scell is activated or deactivated. If a value of the indicator for the Scell indicated by the Scell identifier is 1, the Scell is activated only when the state of the Scell is the deactivated state. However, if the state of the Scell is a state other than the deactivated state, the indicator value may be ignored. If a value of an indicator for the Scell indicated by the Scell iden-
tifier is 0, the Scell may be deactivated. That is, if the
value of the indicator for the Scell is 0, the Scell is
deactivated regardless of the state of the Scell.

The dormant MAC CE proposed in the disclosure is
merely an embodiment and may have a format illustrated in
FIG. 17, and may be divided into a MAC CE format 1705
having the size of 1 byte supporting 7 Scells and a MAC CE
format 1710 having the size of 4 bytes supporting 31 Scells.
Further, the MAC CEs may have the following character-
istics.

In the case in which the active and inactive MAC CEs are
not received and only the dormant MAC CE is
received, the UE operates as described below.

If each field of the dormant MAC CE indicates each Scell
identifier, a value corresponding to each field may indicate
whether the Scell is activated or deactivated. If a value of an
indicator for the Scell indicated by the Scell identifier is 1,
the Scell may be made to hibernate. That is, the Scell may
be made to hibernate if the value of the indicator for the Scell
is 1 regardless of the state of the Scell. If a value of the
indicator for the Scell indicated by the Scell identifier is 0,
the Scell may be activated only when the state of the Scell
is the dormant state. However, if the state of the Scell is a
state other than the dormant state, the indicator value is
ignored.

In the case in which the active and inactive MAC CEs and
the dormant MAC CE are simultaneously received by
one MAC layer device, the UE operation is as
described below.

If each field of the active and inactive MAC CEs and the
dormant MAC CE indicates each Scell identifier, a
combination of values corresponding to the respective
fields may indicate state transition of the Scell to the
activated, dormant, or deactivated state. The active and
inactive MAC CEs and the dormant MAC CE may be
received by one MAC layer device along with MAC
CEs having the size of 1 byte or MAC CEs having the
size of 4 bytes. If two types of MAC CEs are received
together, the state transition of each Scell indicated by
the MAC CEs may be determined according to a
combination of indication values of the MAC CEs as
shown in the following table.

TABLE 1

| HibernationMAC control element $C_i$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

The active, inactive, and dormant states for each link may
be indicated using an R file included in the format of the
active and inactive MAC CEs of the cell or the dormant
MAC CE of the cell proposed above. For example, when the
R field is 0, it may indicate transition of the downlink of the
cell to the active, inactive, or dormant state. When the R field
is 1, it may indicate transmission of the uplink of the cell to
the active, inactive, or dormant state. In another method, the
R field may be defined and used to indicate only the state
transition of the downlink (or uplink). Further, the MAC CE
including each cell identifier and each link indicator or state
indicator may be defined as indicated by reference numeral
1715 and the state transition may be indicated for each link of each cell. A new MAC CE for supporting embodiments
of the disclosure and expanding them to various embodi-
ments may be designed or the conventional MAC CE
function may be expanded. For example, the MAC CEs
proposed and described in FIG. 17 of the disclosure may be
applied, or a reserved bit (R bit) may be expanded in
reference numerals 1705 or 1710 of FIG. 17 and the function
described in FIG. 17 of the disclosure may be expanded and
applied.

For example, when the reserved bit is configured as 0, a
1-bit indicator indicating an identifier of each cell
(SCell) may be defined and used as follows.

If the 1-bit indicator is configured as 0, the state transition
for the cell or the BWP may be performed as follows.

The cell or the BWP in the deactivated state is transitioned
to the deactivated state or is maintained.

The cell or the BWP in the activated state is transitioned
to the deactivated state The cell or the BWP in the dormant state is transitioned
to the deactivated state If the 1-bit indicator is configured as 1, the state transition
for the cell or the BWP may be performed as follows.

The cell or the BWP in the activated state is transitioned
to the activated state or is maintained.

The cell or the BWP in the deactivated state is transitioned
to the activated state The cell or the BWP in the dormant state is transitioned
to the dormant state or is maintained.

When the reserved bit is configured as 1, the 1-bit
indicator indicating the identifier of each cell (SCell)
may be defined and used as follows. In another method,
a logical identifier may be newly defined and a new
MAC CE may be defined and used as follows.

If the 1-bit indicator is configured as 0, the state transition
for the cell or the BWP may be performed as follows.

The cell or the BWP in the activated state is transitioned
to the activated state or is maintained.

The cell or the BWP in the dormant state is transitioned
to the activated state

The cell or the BWP in the deactivated state is transitioned
to the deactivated state or is maintained.

If the 1-bit indicator is configured as 1, the state transition
for the cell or the BWP may be performed as follows.

The cell or the BWP in the activated state is transitioned
to the dormant state

The cell or the BWP in the deactivated state is transitioned
to the dormant state The cell or the BWP in the dormant state is transitioned
to the dormant state or is maintained.

The function of the MAC CE described above by way of
example may be variously expanded and designed to indi-
cate state transition or switching of the cell or the BWP and
may be applied to the embodiments of the disclosure.

Figure 18:
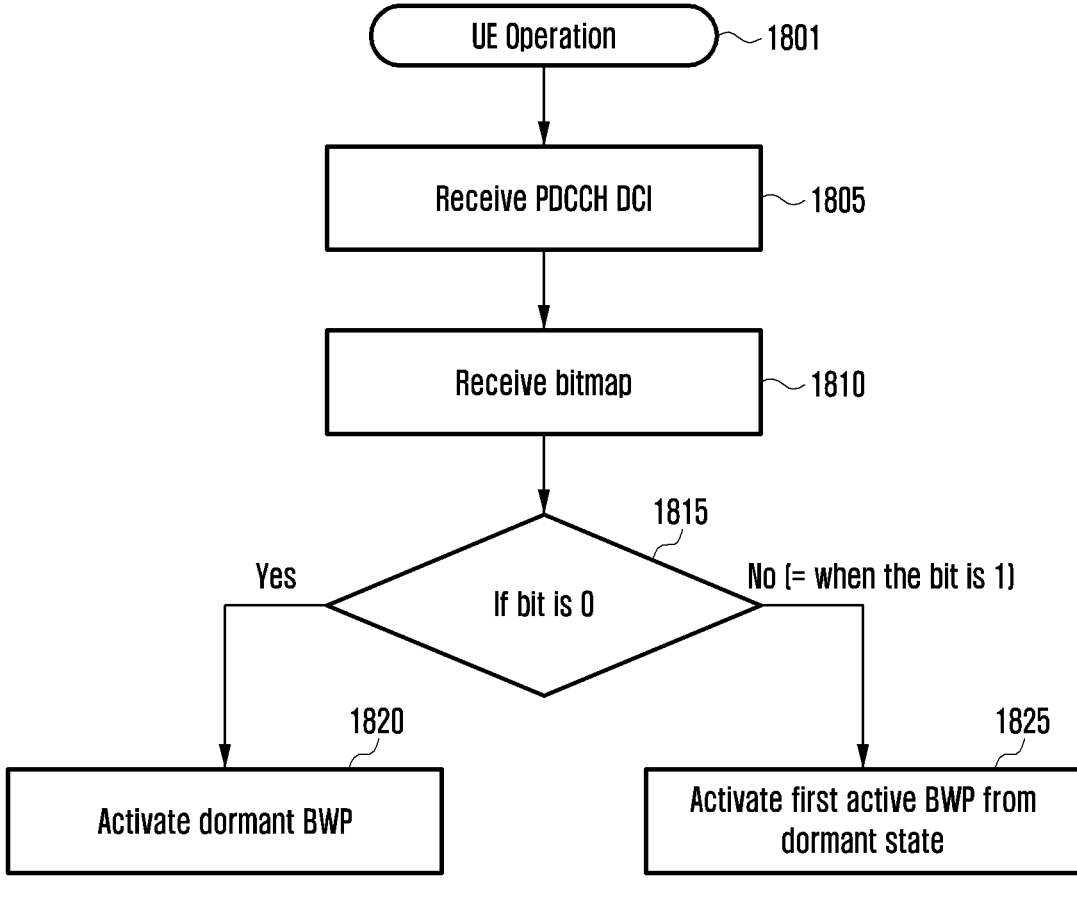
FIG. 18 is a diagram illustrating operations of a UE according to an embodiment of the disclosure.

FIG. 18 is a diagram illustrating operations of a UE
according to an embodiment of the disclosure.

Referring to FIG. 18, in the embodiments proposed in the
disclosure, the UE may search for DCI of a PDCCH in a
PCell or an SpCell in step 1805 and identify a bitmap
including an indication indicating switching or activation
from a dormant BWP or a dormant state to a first active
BWP proposed in the disclosure in the detected DCI format
in step 1810.

The UE may identify each bit value in the bitmap in step
1810. If the bit value of the bitmap is 0 in step 1820, the bit
value of 0 may indicate switching of each activated SCell,
an SCell identifier, an activated SCell included in a first
SCell group, or an activated SCell included in a second SCell group corresponding to the bit to a dormant BWP or activation of the dormant BWP (if the dormant BWP is configured or is included in the first SCell group or the second SCell group). In another method, when the bit value of the bitmap is 0, the bit value of 0 may indicate switching to the dormant BWP or activation of the dormant BWP if the dormant BWP is configured for each activated SCell, the activated SCell included in the first SCell group, or the activated SCell included in the second SCell group corresponding to the bit, if the dormant BWP is included in the first SCell group or the second SCell group, or if the activated BWP is not the dormant BWP (or if the activated BWP is a normal BWP). In another method, when the bit value of the bitmap is 0, the bit value of 0 may indicate switching of each activated SCell (having the dormant BWP configured therein or included in the first SCell group or the second SCell group), an SCell identifier, the activated SCell included in the first SCell group, or the activated SCell included in the second SCell group corresponding to the bit to the dormant BWP or activation of the dormant BWP. In another method, when the bit value of the bitmap is 0, the bit value of 0 may indicate switching of each activated SCell, the SCell identifier, the activated SCell included in the first SCell group, or the activated SCell included in the second SCell group corresponding to the bit to the dormant BWP or activation of the dormant BWP. If the bit of the bitmap indicates the SCell or the SCell identifier in which no dormant BWP is configured, the UE may ignore the bit, or not read or apply the bit.

The UE may identify each bit value in the bitmap in step 1810. If the bit value of the bitmap is 1 in step 1825, the bit value of 1 may indicate switching of each activated SCell, an activated SCell included in a first SCell group, or an activated SCell included in a second SCell group corresponding to the bit to a normal BWP (for example, a first active BWP activated from a dormant state) or activation of the normal BWP (for example, a first active BWP activated from a dormant state). In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell, the activated SCell included in the first SCell group, or the activated SCell included in the second SCell group corresponding to the bit is the dormant BWP (or is not the normal BWP). Otherwise (if the current or activated BWP for each activated SCell corresponding to the bit is not the dormant BWP (or is the normal BWP)), the current active BWP may be maintained, continuously used, applied, or activated. In another method, when the bit value of the bitmap is 1, the bit value of 1 may indicate, for each activated SCell, the activated SCell included in the first SCell group, or the activated SCell included in the second SCell group corresponding to the bit, switching from the dormant BWP to the normal BWP (for example, the first active BWP activated from the dormant state), activation to the normal BWP (for example, the first active BWP activated from the dormant state), or maintenance, continuous use, application, or activation of the current active BWP. In another method, when the bit value of the bitmap is 1, the bit value of 1 may indicate switching to the normal BWP (for example, the first active BWP activated from the dormant state) or activation of the normal BWP (for example, the first active BWP activated from the dormant state) if the current or activated BWP for each activated SCell, the activated SCell included in the first SCell group, or the activated SCell included in the second SCell group corresponding to the bit is the dormant BWP (or is not the normal BWP). Otherwise (if the current or activated BWP for each activated SCell corresponding to the bit is not the dormant BWP (or is the normal BWP)) or if the dormant BWP is not configured, the current active BWP may be maintained, continuously used, applied, or activated.

Figure 19:
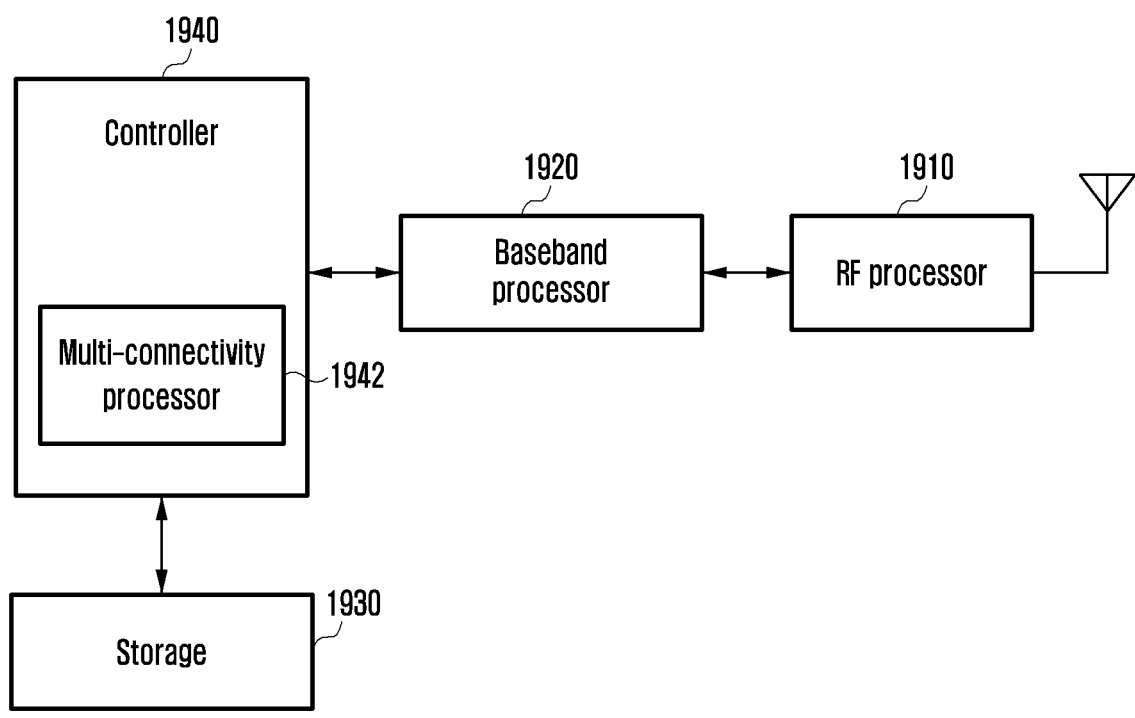
FIG. 19 is a diagram illustrating the structure of a UE according to an embodiment of the disclosure.

FIG. 19 is a diagram illustrating the structure of a UE according to an embodiment of the disclosure.

Referring to FIG. 19, the UE includes a radio frequency (RF) processor 1910, a baseband processor 1920, a storage 1930, and a controller 1940.

The RF processor 1910 performs a function for transmitting and receiving a signal through a wireless channel, such as band conversion and amplification of a signal. That is, the RF processor 1910 up-converts a baseband signal provided from the baseband processor 1920 into an RF band signal, transmits the RF band signal through an antenna, and then down-converts the RF band signal received through the antenna into a baseband signal. For example, the RF processor 1910 may include a transmission filter, a reception filter, an amplifier, a mixer, an oscillator, a digital-to-analog converter (DAC), an analog-to-digital converter (ADC), and the like. Although FIG. 19 illustrates only one antenna, the UE may include a plurality of antennas. In addition, the RF processor 1910 may include a plurality of RF chains. Moreover, the RF processor 1910 may perform beamforming. For the beamforming, the RF processor 1910 may control a phase and a size of each signal transmitted/received through a plurality of antennas or antenna elements. The RF processor may perform MIMO and receive a plurality of layers when performing the MIMO operation. The RF processor 1910 may appropriately configure a plurality of antennas or antenna elements according to the control of the controller to perform reception beam sweeping or control a direction of a reception beam and a beam width so that the reception beam corresponds to a transmission beam.

The baseband processor 1920 performs a function for a conversion between a baseband signal and a bitstream according to a physical layer standard of the system. For example, when data is transmitted, the baseband processor 1920 generates complex symbols by encoding and modulating a transmission bitstream. Further, when data is received, the baseband processor 1920 reconstructs a reception bitstream by demodulating and decoding a baseband signal provided from the RF processor 1910. For example, in an orthogonal frequency division multiplexing (OFDM) scheme, when data is transmitted, the baseband processor 1920 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processor 1920 divides the baseband signal provided from the RF processor 1910 in the unit of OFDM symbols, reconstructs the signals mapped to the subcarriers through a fast Fourier transform (FFT) operation, and then reconstructs a reception bitstream through demodulation and decoding.

The baseband processor 1920 and the RF processor 1910 transmit and receive signals as described above. Accordingly, the baseband processor 1920 and the RF processor 1910 may be referred to as a transmitter, a receiver, a transceiver, or a communication unit. Further, at least one of the baseband processor 1920 and the RF processor 1910 may include a plurality of communication modules to support a plurality of different radio access technologies. In addition, at least one of the baseband processor 1920 and the RF processor 1910 may include different communication modules to process signals of different frequency bands. For example, the different radio-access technologies may include an LTE network and an NR network. Further, the different frequency bands may include a super high frequency (SHF) (for example, 2.5 GHz and 5 GHz) band and a millimeter (mm) wave (for example, 60 GHz) band.

The storage 1930 stores data such as basic program, an application, and setting information for the operation of the UE. The storage 1930 provides the stored data according to a request from the controller 1940.

The controller 1940 controls the overall operation of the UE. For example, the controller 1940 transmits/receives a signal through the baseband processor 1920 and the RF processor 1910. In addition, the controller 1940 may record data in the storage 1930 and read the data. To this end, the controller 1940 may include at least one processor. For example, the controller 1940 may include a communication processor (CP) that performs a control for communication, and an application processor (AP) that controls a higher layer such as an application program.

Figure 20:
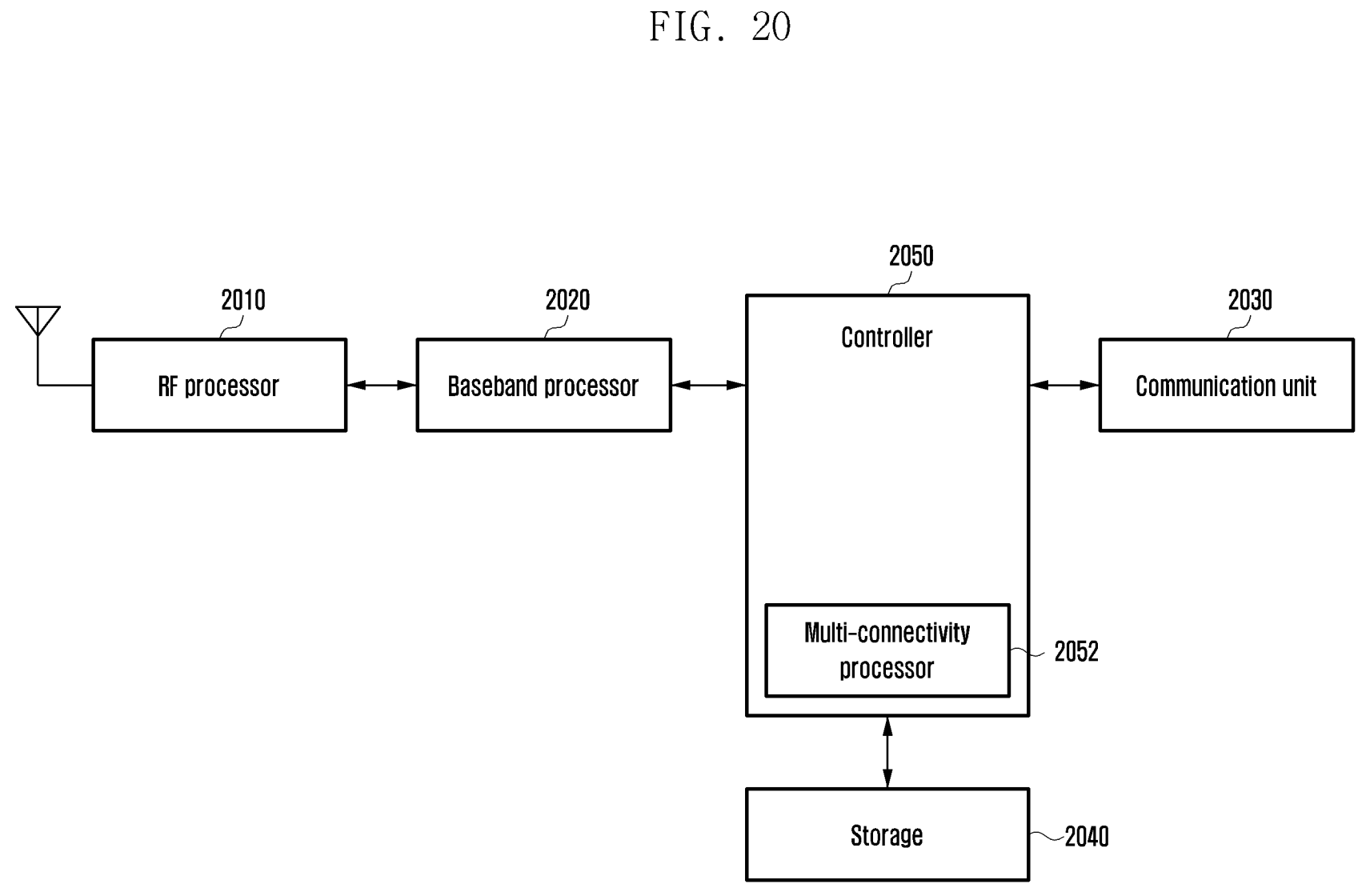

FIG. 20 is a diagram illustrating a block constitution of a TRP in a wireless communication system according to an embodiment of the disclosure.

Referring to FIG. 20, the base station includes an RF processor 2010, a baseband processor 2020, a backhaul communication unit 2030, a storage 2040, and a controller 2050.

The RF processor 2010 performs a function for transmitting and receiving a signal through a wireless channel, such as band conversion and amplification of a signal. That is, the RF processor 2010 up-converts a baseband signal provided from the baseband processing unit 2020 into an RF band signal and then transmits the converted signal through an antenna, and down-converts an RF band signal received through the antenna into a baseband signal. For example, the RF processor 2010 may include a transmission filter, a reception filter, an amplifier, a mixer, an oscillator, a DAC, and an ADC. Although FIG. 20 illustrates only one antenna, the first access node may include a plurality of antennas. In addition, the RF processor 2010 may include a plurality of RF chains. Moreover, the RF processor 2010 may perform beamforming. For the beamforming, the RF processor 2010 may control a phase and a size of each of the signals transmitted and received through a plurality of antennas or antenna elements. The RF processor may perform a downlink MIMO operation by transmitting one or more layers.

The baseband processor 2020 performs a function of performing conversion between a baseband signal and a bitstream according to a physical layer standard of the first radio access technology. For example, when data is transmitted, the baseband processor 2020 generates complex symbols by encoding and modulating a transmission bitstream. Further, when data is received, the baseband processor 2020 reconstructs a reception bitstream by demodulating and decoding a baseband signal provided from the RF processor 2010. For example, in an OFDM scheme, when data is transmitted, the baseband processor 2020 may generate complex symbols by encoding and modulating the transmission bitstream, map the complex symbols to subcarriers, and then configure OFDM symbols through an IFFT operation and CP insertion. In addition, when data is received, the baseband processor 2020 divides a baseband signal provided from the RF processor 2010 in units of OFDM symbols, recovers signals mapped with sub-carriers through an FFT operation, and then recovers a reception bitstream through demodulation and decoding. The baseband processor 2020 and the RF processor 2010 transmit and receive signals as described above. Accordingly, the baseband processor 2020 and the RF processor 2010 may be referred to as a transmitter, a receiver, a transceiver, or a communication unit.

The communication unit 2030 provides an interface for communicating with other nodes within the network.

The storage 2040 stores data such as a basic program, an application, and setting information for the operation of the MeNB. Particularly, the storage 2040 may store information on bearers allocated to the accessed UE and the measurement result reported from the accessed UE. Further, the storage 2040 may store information on a reference for determining whether to provide multiple connections to the UE or stop the multiple connections. In addition, the storage 2040 provides data stored therein according to a request from the controller 2050.

The controller 2050 controls the overall operation of the MeNB. For example, the controller 2050 transmits and receives a signal through the baseband processor 2020 and the RF processor 2010 or through the backhaul communication unit 2030. In addition, the controller 2050 may record data in the storage 2040 and read the data. To this end, the controller 2050 may include at least one processor.

According to an embodiment of the disclosure, proposed are seamless handover methods capable of minimizing a data interruption time due to handover or reducing the same to 0 ms in a next-generation mobile communication system.

Specifically, efficient handover methods of the disclosure may include one or more of a plurality of features as follows. In addition, with regard to the efficient handover methods of the disclosure, different handover methods may be applied to different bearers. In addition, the efficient handover methods of the disclosure may include features derived by combining some or all of the following features with each other.

When a UE, which performs data transmission or reception (uplink or downlink data transmission or reception) to or from a source base station through respective protocol layer devices (physical (PHY) layer devices, medium access control (MAC) layer devices, radio link control (RLC) layer devices, or PDCP layer devices) of a plurality of first bearers, may receive a handover command message (or an RRC Reconfiguration message) from the source base station. The UE having received the handover command message may configure new protocol layer devices of a plurality of second bearers corresponding to the protocol layer devices of the plurality of first bearers (for example, having the same bearer identifier as that of the protocol layer devices of the plurality of first bearers), and may maintain and perform the data transmission or reception (uplink or downlink data transmission or reception) to or from the source base station through the plurality of first bearers without interruption.

After receiving the handover command message as described above, the newly configured protocol layer devices of the plurality of second bearers (PHY layer devices, MAC layer devices, RLC layer devices, or PDCP layer devices) are configured for data transmission or reception to or from a target base station, based on bearer configuration information or protocol layer device information included in the handover command message.

In the above, the UE performs a procedure of random access to a target base station through the protocol layer devices of the plurality of second bearers (for example, MAC layer devices) while performing data transmission or reception (uplink or downlink data transmission or reception) to or from the source base station through the protocol layer devices of the plurality of first bearers. In this case, the random access procedure may include transmission of a preamble, reception of a random access response, transmission of message 3, or reception of message 4 (for example, contention resolution MAC control element (CE) or reception of uplink transmission resource).

In the above, the UE completes a procedure of random access to the target base station through the protocol layer devices of the plurality of second bearers (for example, the MAC layer devices) while performing data transmission or reception to or from the source base station through the protocol layer devices of the plurality of first bearers, and then transmits a handover complete message to the target base station through the protocol layer devices of the plurality of second bearers.

In the above, the UE completes the procedure of random access to the target base station through the protocol layer devices of the plurality of second bearers (for example, the MAC layer devices) while performing data transmission or reception to or from the source base station through the protocol layer devices of the plurality of first bearers, and then transmits a handover complete message to the target base station through the protocol layer devices of the plurality of second bearers and performs data transmission or reception (uplink or downlink).

In the above, when the UE successfully completes the procedure of random access to the target base station or when the UE receives an uplink transmission resource from the target base station for the first time, the UE stops transmission of the uplink data to the source base station through the protocol layer devices of the plurality of first bearers and switches the uplink transmission to thereby transmit the uplink data to the target base station through the plurality of second bearers.

In the above, when the handover command message is received, the UE may continue data transmission or reception (uplink or downlink data transmission or reception) to or from the source base station through the protocol layer devices of the plurality of first bearers, and may perform a procedure of random access to the target base station through the protocol layer devices of the plurality of second bearers. In addition, when the UE successfully completes the random access procedure or when the UE receives an uplink transmission resource from the target base station for the first time, the UE may stop transmission of the uplink data to the source base station through the protocol layer devices of the plurality of first bearers and transmit the uplink data to the target base station only through the protocol layer devices of the plurality of second bearers. In addition, the UE may continuously receive downlink data from the source base station only through the protocol layer devices of the plurality of first bearers and continuously receive downlink data from the target base station through the protocol layer devices of the plurality of second bearers.

In the above, the first bearer and the second bearer may be configured as the structure of a second PDCP layer device, and the second PDCP layer device structure may be configured such that both a first bearer (for example, RLC layer device, MAC layer device, or PHY layer device) for a source base station and a second bearer (for example, RLC layer device, MAC layer device, or PHY layer device) for the target base station are connected to one PDCP layer device. Here, the uplink data may be transmitted through one of the first bearer or the second bearer through the PDCP layer device. That is, the UE transmits uplink data through the first bearer before the procedure of random access to the target base station is completed and the random access procedure is successfully completed or before the uplink transmission resource is initially received from the target base station; if the procedure of random access to the target base station is performed, the random access procedure is successfully completed, and then the uplink transmission resource is received from the target base station for the first time, the UE may stop data transmission through the first bearer and performs switching to thereby transmit uplink data to the target through the second bearer. However, in the second PDCP layer device structure, the UE may receive downlink data from the source base station or the target base station through the first bearer or the second bearer.

In the following, the disclosure suggests efficient handover procedures in which a data interruption time does not occur, based on the above features.

Further, in the following, in a case where the UE performs the efficient handover method in which a data interruption time does not occur of the disclosure, if the UE fails to handover, a method for configuring a connection again by quickly falling back to the source base station by using the features of the efficient handover method of the disclosure is provided. As described above, the efficient handover method of the disclosure specifically refers to maintaining a connection to the source base station even when performing a handover procedure, and to performing fallback using a wireless connection connected to the existing source base station even if the handover fails.

Figure 21:
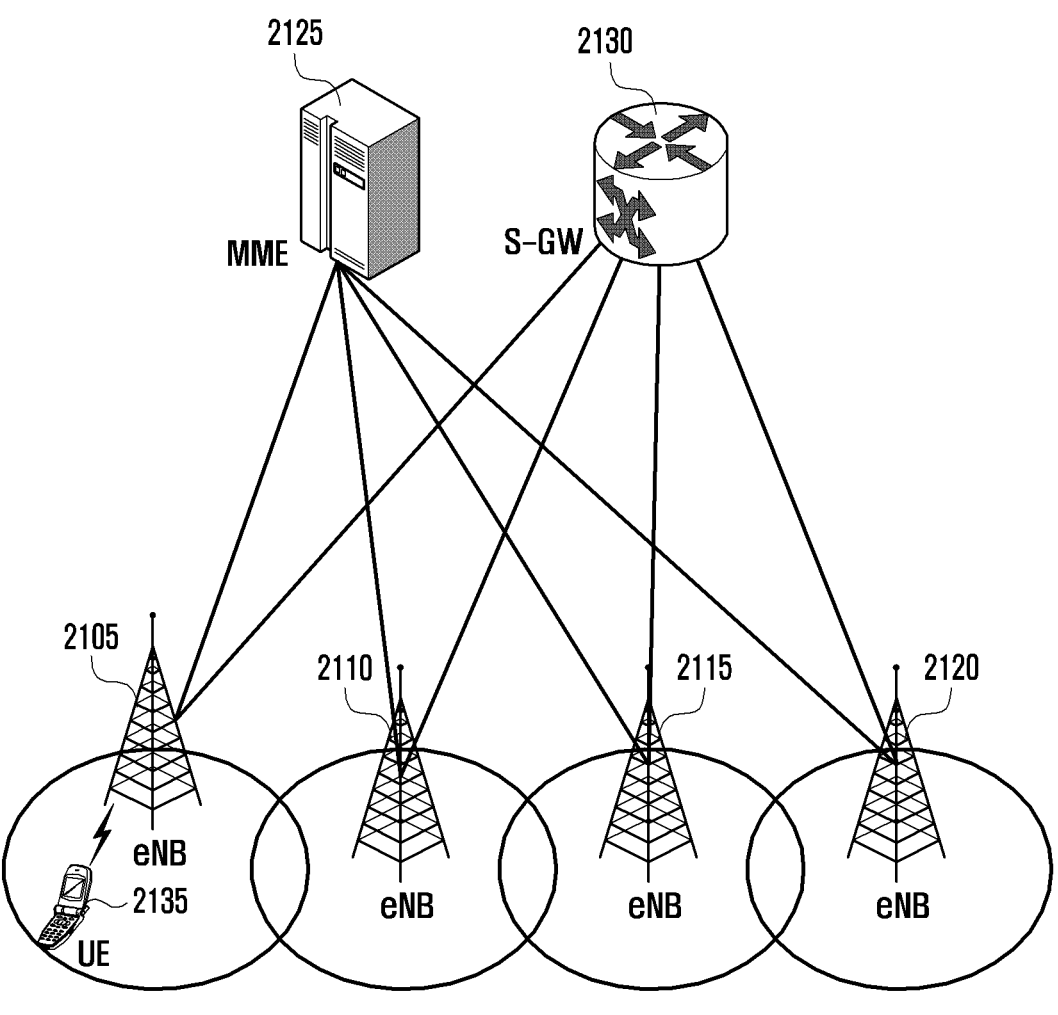
FIG. 21 is a diagram illustrating the structure of an LTE system according to an embodiment of the disclosure.

FIG. 21 is a diagram illustrating the structure of an LTE system according to an embodiment of the disclosure.

Referring to FIG. 21, a radio access network of an LTE system includes next-generation base stations (also referred to as evolved node Bs, hereinafter eNBs, node Bs, or base stations) 2015, 2010, 2115, and 2120, a mobility management entity (MME) 2125, and a serving gateway (S-GW) 2130. A user equipment (hereinafter UE or terminal) 2135 accesses an external network through the eNBs 2105 to 2120 and the S-GW 2130.

In FIG. 21, the eNBs 2105 to 2120 correspond to an existing node B of an UMTS system. The eNBs are connected to the UE 2135 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and the eNBs 2105 to 2120 are in charge of this function of the device. In general, one eNB controls a plurality of cells. For example, in order to implement a transmission rate of 100 Mbps, the LTE system uses orthogonal frequency division multiplexing (OFDM) as a radio access technology in the bandwidth of 20 MHz. In addition, the LTE system adopts an adaptive modulation & coding (hereinafter referred to as AMC) scheme for determining a modulation scheme and a channel coding rate based on the channel state of the UE. The S-GW 2130 is a device for providing a data bearer and generating or remov-
ing a data bearer under the control of the MME 2125. The
MME is in charge of various control functions in addition to
a mobility management function for the UE, and is con-
nected to a plurality of base stations.

Figure 22:
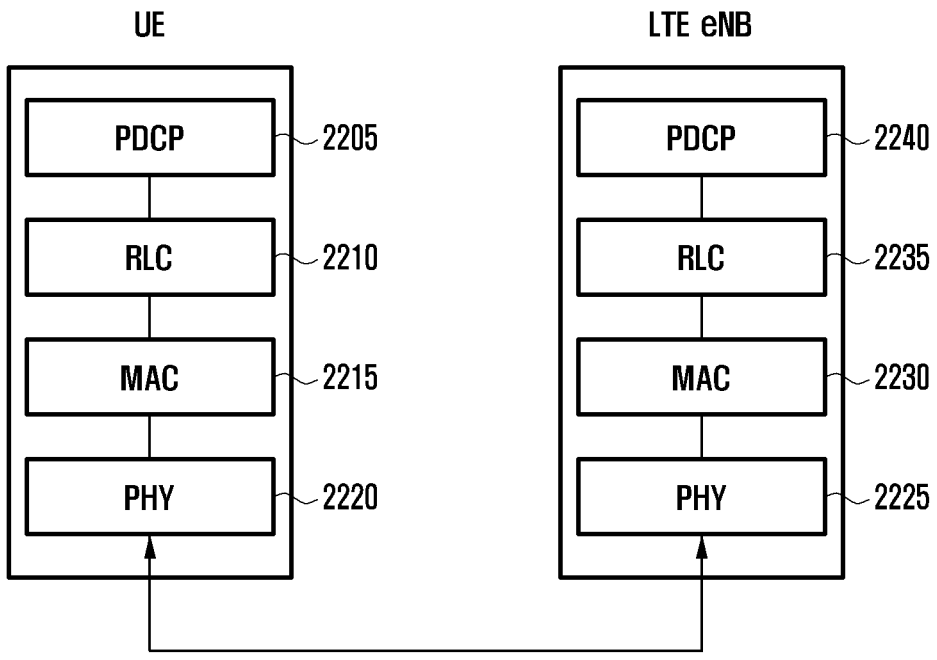
FIG. 22 is a diagram illustrating a radio protocol structure in an LTE system according to an embodiment of the disclosure.

FIG. 22 is a diagram illustrating a radio protocol structure
in an LTE system according to an embodiment of the
disclosure.

Referring to FIG. 22, the radio protocol of the LTE system
includes PDCPs 2205 and 2240, RLCs 2210 and 2235, and
MACs 2215 and 2230, in a UE and an eNB, respectively.
The PDCPs 2205 and 2240 are used to perform operations,
such as IP header compression/restoration. The main func-
tions of PDCPs are summarized as follows.

Header compression and decompression: ROHC only

Transfer of user data

In-sequence delivery of upper layer PDUs at PDCP
re-establishment procedure for RLC acknowledged
mode (AM)

Sequence reordering (for split bearers in DC (only support
for RLC AM): PDCP PDU routing for transmission and
PDCP PDU reordering for reception)

Duplicate detection of lower layer service data units
(SDUs) in a PDCP re-establishment procedure for RLC
AM Retransmission of PDCP SDUs at handover and, for split
bearers in DC, of PDCP PDUs at PDCP data-recovery
procedure, for RLC AM)

Ciphering and deciphering

Timer-based SDU discard in uplink

PLCs 2210 and 2235 may reconfigure a PDCP protocol
data unit (PDU) in a suitable size and perform an ARQ
operation. The main functions of RLCs are summarized
as follows.

Transfer of upper layer PDUs

ARQ (Error Correction through ARQ (only for AM data
transfer))

Concatenation, segmentation and reassembly of RLC
SDUs (only for unacknowledged mode (UM) and AM
data transfer)

Re-segmentation of RLC data PDUs (only for AM data
transfer)

Reordering of RLC data PDUs (only for UM and AM data
transfer)

Duplicate detection (only for UM and AM data transfer)

Protocol error detection (only for AM data transfer)

RLC SDU discard (only for UM and AM data transfer)

RLC re-establishment

The MACs 2215 and 2230 are connected to multiple RLC
layer devices configured in one UE, and may perform an
operation of multiplexing RLC PDUs with an MAC PDU
and de-multiplexing the RLC PDUs from the MAC PDU.
The main functions of the MAC are summarized as follows.

Mapping between logical channels and transport channels

Multiplexing/de-multiplexing of MAC SDUs belonging
to one or different logical channels into/from transport
blocks (TB) delivered to/from the physical layer on
transport channels Scheduling information reporting Error correction through hybrid automatic repeat request
(HARQ)

Priority handling between logical channels of one UE

Priority handling between UEs by means of dynamic
scheduling

Multimedia broadcast multicast services (MBMS) service
identification

Transport format selection

Padding

Physical layers 2220 and 2225 may perform operations of
channel coding and modulating higher layer data, forming
the higher layer data into an OFDM symbol, transmitting the
OFDM symbol through a radio channel, or of demodulating
an OFDM symbol received through a radio channel, chan-
nel-decoding the OFDM symbol, and transmitting the
OFDM symbol to a higher layer.

Figure 23:
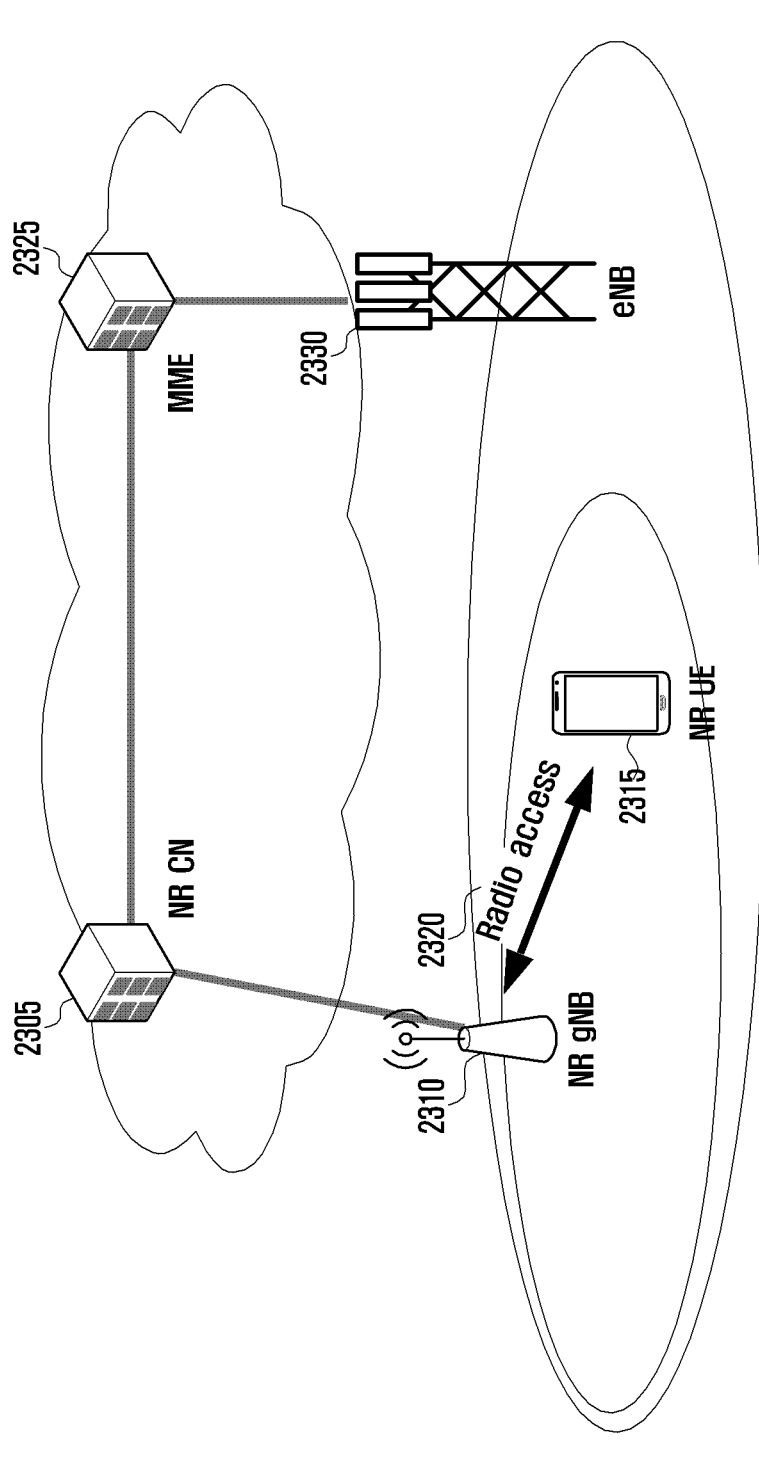
FIG. 23 is a diagram illustrating the structure of a next-generation mobile communication system according to an embodiment of the disclosure.

FIG. 23 is a diagram illustrating the structure of a next-
generation mobile communication system according to an
embodiment of the disclosure.

Referring to FIG. 23, a radio access network of a next-
generation mobile communication system (hereinafter
referred to as NR or 5G) includes a new radio node B
(hereinafter referred to as an NR, gNB, or NR base station)
2310 and a new radio core network (NR CN) 2305. A user
terminal (a new radio user equipment, hereinafter referred to
as NR UE or a terminal) 2315 accesses an external network
via an NR gNB 2310 and an NR CN 2305.

In FIG. 23, the NR gNB 2310 corresponds to an evolved
node B (eNB) of the existing LTE system. The NR gNB is
connected to the NR UE 2315 via a radio channel, and may
provide an excellent service as compared to the existing
node B. In the next-generation mobile communication sys-
tem, since all types of user traffics are serviced through a
shared channel, there is a need for a device for performing
scheduling by collecting state information, such as buffer
states, available transmission power states, and channel
states of UEs. Further, the NR NB 2310 is in charge of this
function of the device. In general, one NR gNB typically
controls a plurality of cells. In order to implement ultra-high
speed data transmission as compared to the existing LTE, the
NR gNB may have the existing maximum bandwidth or
more, and may additionally employ beamforming technol-
ogy using orthogonal frequency division multiplexing
(OFDM) as a radio access technology. In addition, the NR
gNB adopts an adaptive modulation & coding (AMC)
scheme that determines a modulation scheme and a channel
coding rate based on the channel state of a UE. The NR CN
2305 performs functions, such as mobility support, bearer
configuration, QoS configuration, and the like. The NR CN
is a device that is in charge of various control functions in
addition to a mobility management function for a UE, and is
connected to a plurality of base stations. In addition, the
next-generation mobile communication system may also
operate in conjunction with the existing LTE system, and the
NR CN may be connected to an MME 2325 via a network
interface. The MME is connected to an eNB 2330, that is, to
the existing base station.

Figure 24:
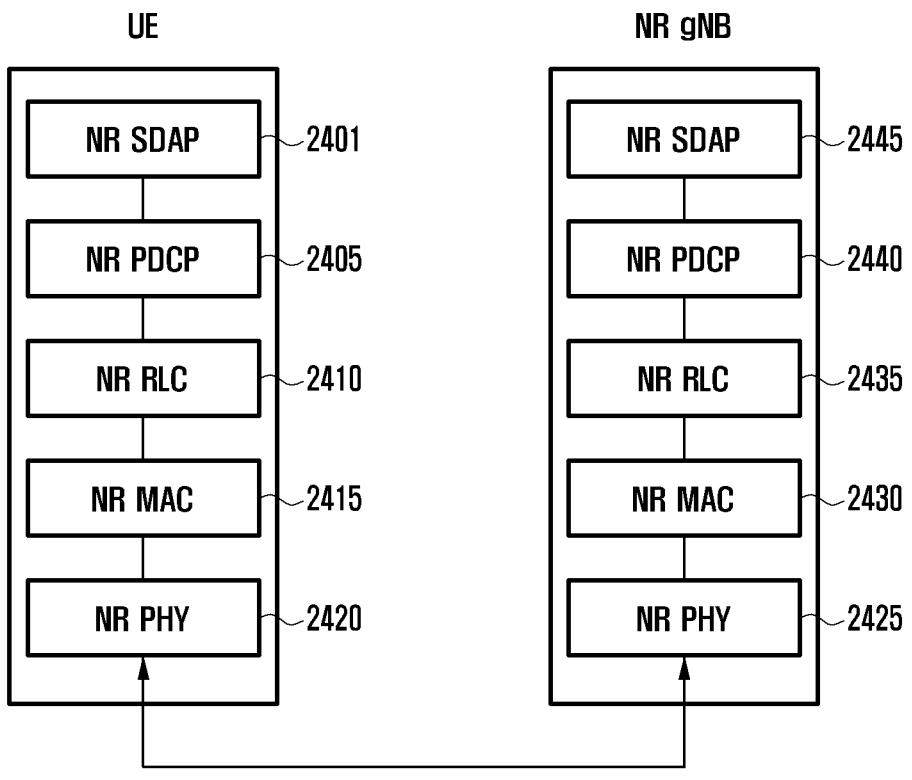
FIG. 24 is a diagram illustrating a radio protocol structure of a next-generation mobile communication system according to an embodiment of the disclosure.

FIG. 24 is a diagram illustrating a radio protocol structure
of a next-generation mobile communication system accord-
ing to an embodiment of the disclosure.

Referring to FIG. 24, the radio protocol of the next-
generation mobile communication system includes NR ser-
vice data adaptation protocols (SDAPs) 2401 and 2445, NR
PDCPs 2405 and 2440, NR RLCs 2410 and 2435, and NR
MACs 2415 and 2430, respectively, in a UE and an NR base
station.

The main functions of the NR SDAPs 2401 and 2445 may
include some of the following functions.

Transfer of user plane data

Mapping between a QoS flow and a DRB for both
downlink (DL) and uplink (UL)

Marking QoS flow ID in both DL and UL packets)

Mapping reflective QoS flow to DRB for the UL SDAP
PDUs

For the SDAP layer device, the UE may be configured as to whether or not use the header of the SDAP layer device or the function of the SDAP layer device for each PDCP layer device, for each bearer, and for each logical channel through an RRC message. When the SDAP header is configured, an NAS reflective QoS reflective configuration 1-bit indicator (NAS reflective QoS) and an AS QoS reflective configuration 1-bit indicator (AS reflective QoS) of the SDAP header are used to instruct the UE to enable updating or reconfiguring of the mapping information for the QoS flow of uplink and downlink and mapping information for data bearer. The SDAP header may include QoS flow ID information indicating QoS. The QoS information may be used as data processing priority, scheduling information, etc. to support a smooth service.

The main functions of the NR PDCPs 2405 and 2440 may include some of the following functions.

Header compression and decompression (ROHC only)

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP device refers to a function of sequentially reordering PDCP PDUs, received from a lower layer, based on a PDCP sequence number (SN), and may include a function of transmitting data to a higher layer in the reordered sequence, a function of directly transmitting data to a higher layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 2410 and 2435 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC device refers to a function of transmitting RLC SDUs, received from a lower layer, to a higher layer in the order of reception, and may include, if one RLC SDU is originally segmented into multiple RLC SDUs and received, a function of reassembling and transmitting the multiple RLC SDUs. The in-sequence delivery function may include a function of reordering the received RLC PDUs based on an RLC SN or PDCP SN, reordering the sequence and recording missing RLC PDUs, providing a state report on the missing RLC PDUs to a transmission side, and requesting retransmission of the missing RLC PDUs. Alternatively, the in-sequence delivery function of the NR RLC device may include a function of sequentially transmitting only RLC SDUs prior to the missing RLC SDU to a higher layer if an RLC SDU is missing, or sequentially transmitting all the RLC SDUs received before a timer starts to a higher layer if the timer expires even if there is a missing RLC SDU, or sequentially transmitting all RLC SDUs received so far to a higher layer if a predetermined timer expires even if there is a missing RLC SDU. In addition, the RLC PDUs may be processed in the sequence in which the RLC PDUS are received (in the sequence of arrival regardless of the serial number or sequence number), and may be transmitted to a PDCP device in out-of-sequence delivery. The in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to a higher layer regardless of the order thereof, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 2415 and 2430 may be connected to multiple NR RLC layer devices configured in one UE, and the main function of the NR MAC may include some of the following functions.

Mapping between logical channels and transport channels

Multiplexing/de-multiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers 2420 and 2425 may perform operations of channel-coding and modulating higher layer data, forming the higher layer data into an OFDM symbol, transmitting the OFDM symbols via a radio channel or demodulating and channel decoding of the OFDM symbols received via the radio channel, and transferring the OFDM symbol to a higher layer.

Figure 25:
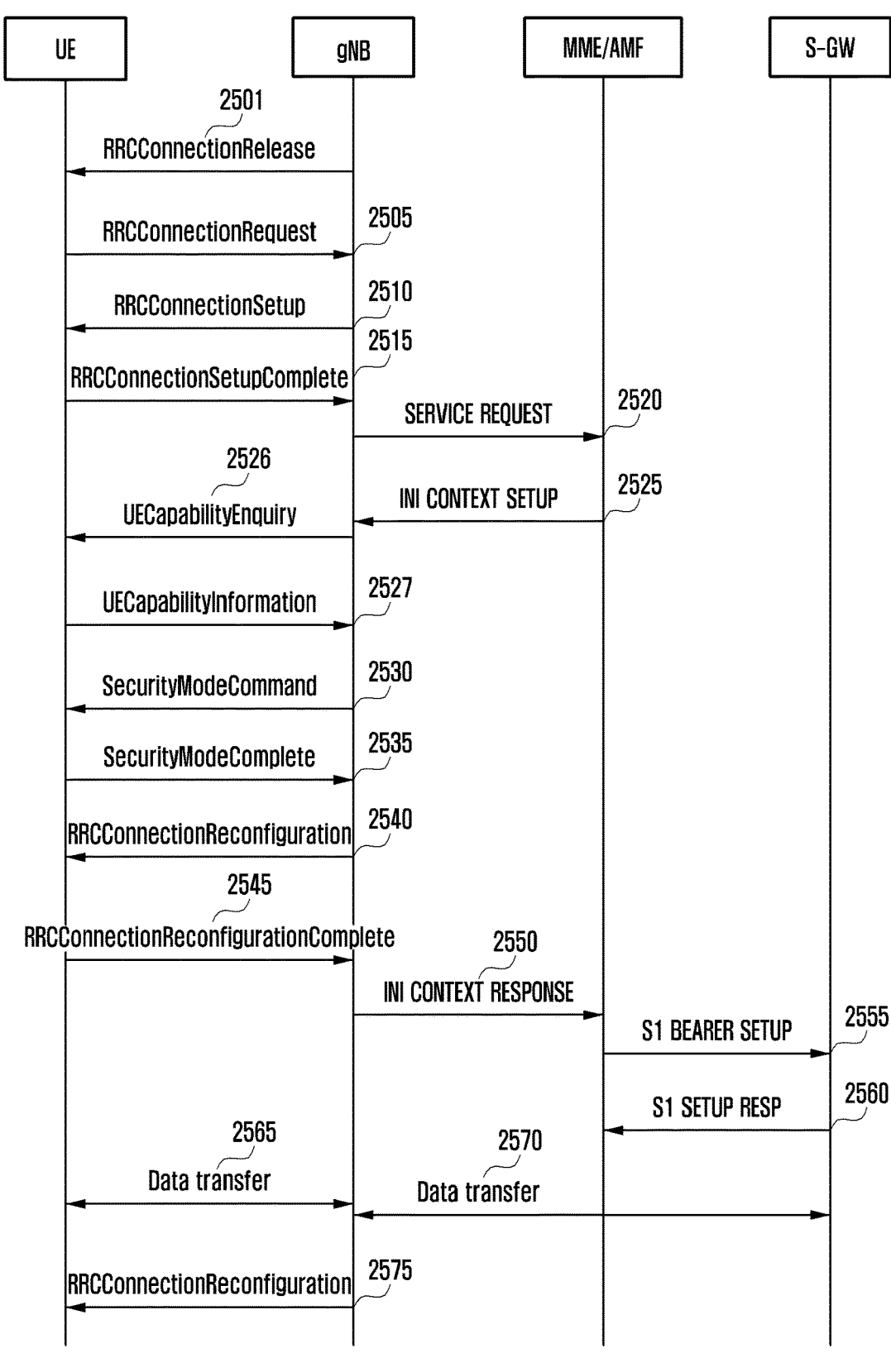
FIG. 25 is a diagram illustrating a procedure for establishing a connection with a network by switching a mode of a UE from an RRC idle mode to an RRC connected mode according to an embodiment of the disclosure.

FIG. 25 is a diagram illustrating a procedure for establishing a connection with a network by switching a mode of a UE from an RRC idle mode to an RRC connected mode according to an embodiment of the disclosure.

Referring to FIG. 25, the base station may transmit an RRCConnectionRelease message to the UE, when the UE transmitting and receiving data in the RRC connected mode does not transmit or receive data for a predetermined reason or for a predetermined period of time, to switch the UE to be in the RRC idle mode (indicated by reference numeral 2501). In the future, a UE for which a connection is not currently established (hereinafter, an idle mode UE) performs an RRC connection establishment process with the base station when data to be transmitted is generated. The UE establishes backward transmission synchronization with the base station through a random access process and transmits an RRCConnectionRequest message to the base station (indicated by reference numeral 2505). The message includes the reason (establishmentCause) for establishing a connection with the identifier of the UE. The base station transmits an RRCConnectionSetup message so that the UE establishes an RRC connection (indicated by reference numeral 2510).

The message includes configuration information for each service, bearer, RLC device, or logical channel, information indicating whether to use ROHC for each bearer or logical channel, ROHC configuration information (e.g., ROHC version, initial information, etc.), statusReportRequired information (information by which the base station instructs the UE to perform PDCP Status report), and drb-Continu-eROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

The UE that has established the RRC connection transmits an RRCConnetionSetupComplete message to the base station (indicated by reference numeral 2515). The message includes a control message called SERVICE REQUEST, through which the UE requests the MME to set up a bearer for a predetermined service. The base station transmits the SERVICE REQUEST message included in the RRCConnetionSetupComplete message to the MME or access management function (AMF) (indicated by reference numeral 2520), and the MME or AMF determines whether to provide the service requested by the UE. As a result of the determination, if the MME or AMF determines to provide the service requested by the UE, the MME or AMF transmits a message called INITIAL CONTEXT SETUP REQUEST (or INI CONTEXT SETUP) to the base station (indicated by reference numeral 2525). The message includes information such as QoS information to be applied when setting up a data radio bearer (DRB), and security-related information (for example, security key, security algorithm) to be applied to the DRB.

In addition, when the base station does not receive the capability information of the UE from the MME or AMF, the base station may transmit a UE capability information enquiry message to the UE in order to identify capability information of the UE (indicated by reference numeral 2526). Upon receiving the UE capability information enquiry message, the UE may configure and generate a UE capability information message and report the UE capability information message to the base station (indicated by reference numeral 2527). The UE capability information message may include types of handover methods the UE supports. For example, the UE capability can be reported to the base station through an indicator as to whether or not the UE supports the efficient handover method (dual active protocol stack, and DAPS) of the disclosure. When the base station identifies the UE capability information, the base station may instruct the UE to perform handover through the handover command message, by defining an indicator according to each handover method in the handover command message, and transmit the indicator to the UE. For example, the base station may instruct the UE to perform the efficient handover method (DAPS handover method) of the disclosure, and may configure the DAPS handover method for each bearer (DRB or SRB) of the UE by using another method. When the base station configures the DAPS handover method for the UE, together with other handover methods (e.g., a conditional handover method (a method in which the UE performs a procedure of handover to one target cell when multiple target cells and multiple conditions are configured for the UE and the UE satisfies the above conditions in the cell selection or reselection procedure) or a random access channel-less (RACH-less) handover method), data loss or transmission delay that may occur during handover can be prevented. The UE may perform a procedure of handover to the target base station according to the handover method indicated through the handover command message.

The base station exchanges a security mode command message 2530 and a security mode complete message 2535 in order to configure security with the UE. When the security configuration is completed, the base station transmits an RRCConnectionReconfiguration message to the UE (indicated by reference numeral 2540).

The message includes configuration information for each service, bearer, RLC device, or logical channel, information indicating whether to use ROHC for each bearer or logical channel, ROHC configuration information (e.g., ROHC version, initial information, etc.), statusReportRequired information (information by which the base station instructs the UE to perform PDCP Status report), and drb-Continu-eROHC information (configuration information which indicates maintaining and using ROHC configuration information as it is and the configuration information may be included in PDCP layer device configuration information (pdcp-config) and transmitted). In addition, the message includes RRC connection configuration information and the like. The bearer for RRC connection is also called signaling radio bearer (SRB), and is used for transmission or reception of an RRC message, which is a control message between the UE and the base station.

In addition, the message includes configuration information of the DRB in which user data is to be processed, and the UE configures the DRB by applying the information and transmits an RRCConnectionReconfigurationComplete message to the base station (indicated by reference numeral 2545). The base station, which has completed the DRB setup with the UE, transmits an INITIAL CONTEXT SETUP COMPLETE (INI CONTEXT RESPONSE) message to the MME or AMF (indicated by reference numeral 2550), and the MME or AMF, which has received the INITIAL CONTEXT SETUP COMPLETE message, exchanges the S1 bearer setup message with the S1 bearer setup response messages in order to set up S1 bearer for the S-GW. (Indicated by reference numerals 2555 and 2560). The S1 bearer is a data transmission connection established between the S-GW and the base station, and corresponds to DRB on a one to one basis. When all of the above processes are completed, the UE transmits or receives data through the base station through the S-GW (indicated by reference numerals 2565 and 2570). This general data transmission process is largely configured by three stages of RRC connection setup, security setup, and DRB setup. In addition, the base station may transmit an RRC connection reconfiguration message in order to newly perform, add, or change the configuration for the UE for a predetermined reason (indicated by reference numeral 2575).

In the disclosure, a bearer may include SRB and DRB, the SRB denotes a signaling radio bearer, and the DRB denotes a data radio bearer. The SRB is mainly used to transmit or receive RRC messages of the RRC layer device, and the DRB is mainly used to transmit or receive user layer data. In addition, a UM DRB denotes a DRB which uses an RLC layer device operating in a UM mode, and an AM DRB denotes a DRB which uses an RLC layer device operating in an AM mode.

In the disclosure, the bearer, for which the DAPS handover method is configured, may be configured such that the identifier of the bearer configured in the RRC message is included in the list of bearers for which the DAPS handover methods are configured or is not included in the list of bearers for which the DAPS handover methods are not configured. Alternatively, the bearer for which the DAPS handover method is configured may denote or indicate a bearer for which a DAPS handover method configuration indicator exists in the configuration information for each bearer, or bearer for which a DAPS handover method configuration indicator is configured in the PDCP layer device configuration information.

In the disclosure, the bearer, for which the DAPS handover method is not configured, may be configured such that the identifier of the bearer configured in the RRC message is not included in the list of bearers for which the DAPS handover methods are configured or is included in the list of bearers for which the DAPS handover methods are not configured. Alternatively, the bearer for which the DAPS handover method is not configured may denote or indicate a bearer for which a DAPS handover method configuration indicator does not exist in the configuration information for each bearer, or a bearer for which a DAPS handover method configuration indicator is not configured in the PDCP layer device configuration information.

In the disclosure, the source base station may be understood as a source cell (that may be a primary cell (Pcell), a special cell (Spcell), or a secondary cell (SCell)) or source cell group (that may be a source cell group or a master cell group). The target base station may be understood as a target cell (that may be a Pcell, Spcell, or SCell) or a target cell group (that may be a target cell group or a master cell group).

Figure 26:
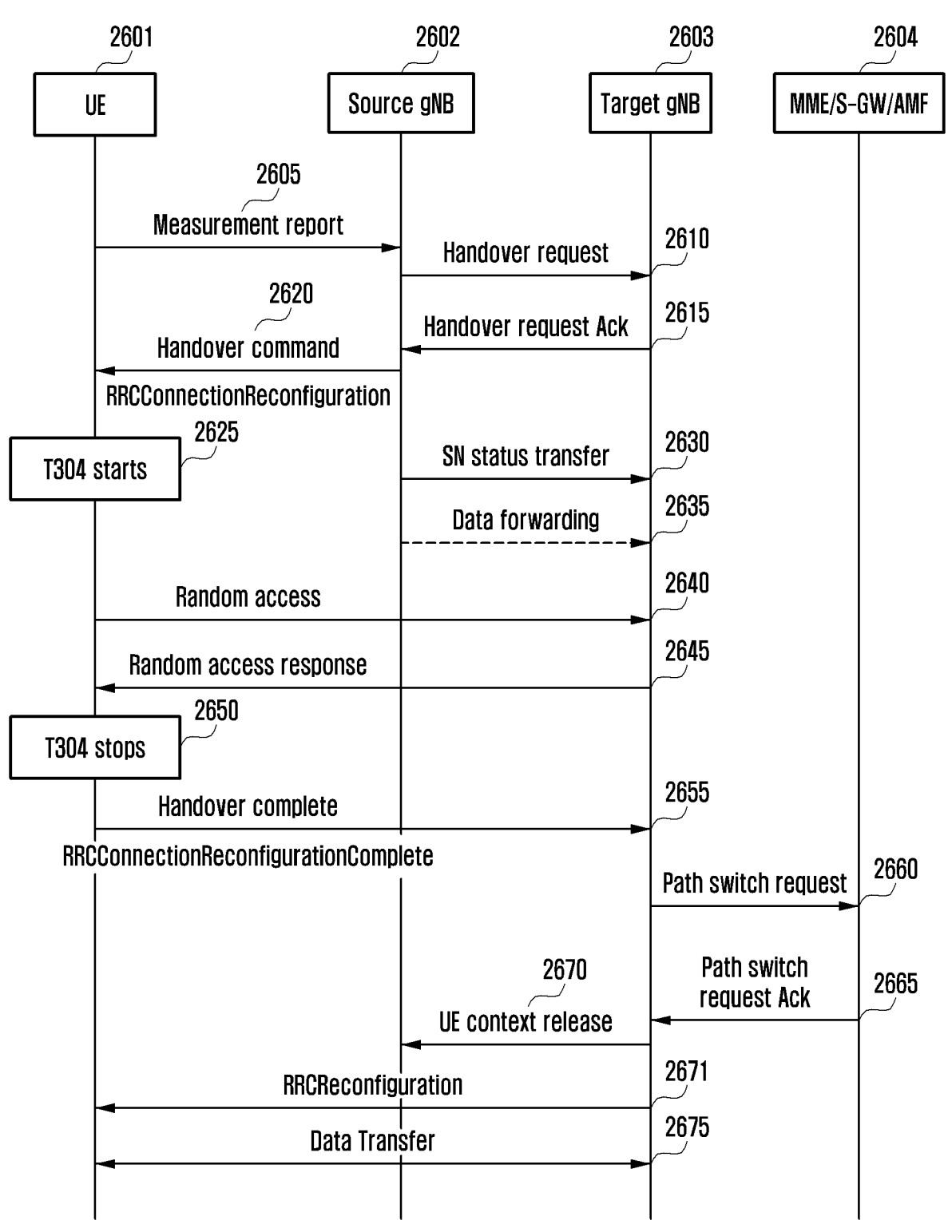
FIG. 26 is a diagram illustrating signaling procedures for performing handover proposed in the disclosure in a next-generation mobile communication system according to an embodiment of the disclosure.

FIG. 26 is a diagram illustrating signaling procedures for performing handover proposed in the disclosure in a next-generation mobile communication system according to an embodiment of the disclosure.

Referring to FIG. 26, the UE 2601, which is in an RRC connected mode state, reports cell measurement information (measurement report) to the current source base station (Source eNB) 2602 when a periodic or specific event is satisfied (indicated by reference numeral 2605). The source base station determines whether or not the UE 601 performs handover to an adjacent cell based on the measurement information. Handover is a technique for changing a source base station, which provides a service to a UE in a connected mode state, to another base station (or another cell of the same base station). If the source base station determines the handover, the source base station transmits an HO request message (for example, a handover preparation information message) to a new base station, which will provide a service to the UE 2601, that is, a target base station 2603 and thus requests handover (indicated by reference numeral 2610). If the target base station 2603 accepts the handover request, the target base station 2603 transmits an HO request acknowledgment (ACK) message (for example, a handover command message) to the source base station 2602 (indicated by reference numeral 2615). Upon receiving the message, the source base station 2602 transmits a handover command message (HO command message, or RRCReconfiguration message included in the DCCH of the HO request ACK message) to the UE 2601 (indicated by reference numeral 2620). The handover command (HO command) message is extracted by the source base station 2602 from the message received from the target base station 2603 and transmitted to the UE 2601 by using an RRCConnectionReconfiguration message (indicated by reference numeral 2625).

In the present disclosure, when the source base station 2602 transmits the handover preparation information message (indicated by reference numeral 2610) and the target base station 2603 transmits the handover command message (indicated by reference numeral 2615) to the source base station 2602 in response thereto, a method for determining the efficient DAPS handover method by using the two messages is provided.

A first embodiment of determining the efficient DAPS handover method of the disclosure is as follows.

In the first embodiment, the subject determining the DAPS handover method may be a source base station. Further, in the first embodiment, when the source base station requests the DAPS handover method, the target base station may always indicate or perform the DAPS handover method.

The source base station may indicate to the target base station that the source base station will perform the DAPS handover method of the disclosure by defining a new indicator in the handover preparation information message, and may request the DAPS handover method. The handover preparation information message may include current bearer configuration information, security key information, cell group configuration information, or UE capability information of the UE. In the above, the source base station may know in advance whether the target base station supports the DAPS handover method by sharing the capabilities of the target base station in advance. In addition, the source base station transmits, to the target base station, an indication that the source base station is to perform the DAPS handover method, and thus it is possible to inform the target base station that the source base station may perform fast or early data forwarding, and instruct the target base station to receive the data forwarding and prepare to process the data forwarding quickly. In the above, the source base station may perform a request for the DAPS handover method for each bearer (DRB or SRB).

In the above, the target base station receives the handover preparation information message and identifies that the indicator for requesting the DAPS handover method is included therein. Then, in a case of configuring an RRCReconfiguration message for indicating the UE to perform handover, the target base station may configure the RRCReconfiguration message by including an indicator indicating the DAPS handover method and configure the RRCReconfiguration message by including bearer configuration information, security key information, cell group configuration information, or system information, which are required when the UE performs the DAPS handover method. In addition, the target base station may include the configured RRCReconfiguration message in the DL-DCCH message of the handover command message to transmit the same to the source base station. In the above, the target base station may indicate a DAPS handover method for each bearer (DRB or SRB).

In the above, when the source base station receives the handover command message, the source base station may extract the RRCReconfiguration message included in the handover command message or transmit the RRCReconfiguration message to the UE to indicate to perform handover. In the above, the source base station may identify the indicated DAPS handover method for each bearer and perform the DAPS handover method for each bearer (DRB or SRB).

A second embodiment of determining an efficient DAPS handover method of the disclosure is as follows.

In the second embodiment, the subject determining the DAPS handover method may be a target base station. In addition, in the second embodiment, when the source base station requests the DAPS handover method from the target base station by using an indicator, the target base station may reject or accept the request, or may indicate the source base station through a handover command message indicating another handover method.

The source base station may indicate to the target base station that the source base station will perform the DAPS handover method of the disclosure by defining a new indicator in the handover preparation information message, and may request the DAPS handover method from the target base station. The handover preparation information message may include current bearer configuration information, security key information, cell group configuration information, or UE capability information of the UE. In the above, the source base station may know in advance whether the target base station supports the DAPS handover method by sharing the capabilities of the target base station in advance. In the above, the source base station transmits, to the target base station, an indication that the source base station is to perform the DAPS handover method, and thus it is possible to inform the target base station that the source base station may perform fast or early data forwarding, and instruct the target base station to receive the data forwarding and prepare to process the data forwarding quickly. In the above, the source base station may perform a request for the DAPS handover method for each bearer (DRB or SRB).

In the above, the target base station receives the handover preparation information message and identifies that the indicator for requesting the DAPS handover method is included therein. Then, the target base station may reject or accept the request for the DAPS handover according to whether the target base station is capable of supporting the DAPS handover method, the amount of current transmission resources, or scheduling, or may indicate another handover method. In the above, the target base station may include, in a handover command message, an indicator for rejecting the request for the DAPS handover request, an indicator for accepting thereof, or an indicator indicating another type of handover method, and transmit the handover command message. In the above, when the target base station configures an RRCReconfiguration message for instructing the UE to perform handover, the target base station may configure the RRCReconfiguration message to include an indicator indicating the DAPS handover method when the DAPS handover request is accepted and to include an indicator indicating another handover method when the DAPS handover request is rejected, and the target base station may configure the RRCReconfiguration message to include bearer configuration information, security key information, cell group configuration information, or system information, which are required when the UE performs the DAPS handover method or other handover method. In addition, the target base station may include the configured RRCReconfiguration message in a DL-DCCH message of the handover command message to transmit the DL-DCCH message to the source base station. In the above, the target base station may perform an indication of the DAPS handover method for each bearer (DRB or SRB).

In the above, when the source base station receives the handover command message, the source base station may identify whether the request for the DAPS handover method is accepted or rejected by identifying the indicator included in the handover command message. If the request is accepted, the source base station may also perform the DAPS handover method, and the source base station may extract the RRCReconfiguration message included in the handover command message or transmit the RRCReconfiguration message to the UE, so as to indicate to perform handover. However, if the request for the DAPS handover method is rejected when the indicator included in the handover command message is identified, or if another handover method is indicated, the source base station may also perform another handover method indicated by the target base station. In addition, the source base station may extract the RRCReconfiguration message included in the handover command message or transmit the RRCReconfiguration message to the UE, so as to indicate to perform handover. As another method, in the above, the source base station may read the RRCReconfiguration message included in the handover command message, even if there is no separate indicator in the handover command message, to identify a handover method indicated by the target base station and identify whether the request for the DAPS handover method is accepted or rejected; and the source base station may also perform the handover method (e.g., DAPS handover method or other handover method) indicated in the RRCReconfiguration message. In the above, the source base station may identify the indicated DAPS handover method for each bearer and perform the DAPS handover method for each bearer (DRB or SRB).

A third embodiment of determining an efficient DAPS handover method of the disclosure above is as follows.

In the third embodiment, the subject determining the DAPS handover method may be a target base station. In addition, in the third embodiment, the target base station identifies the capabilities of the UE and determines a handover method (e.g., DAPS handover method) according to whether the target base station is capable of supporting the DAPS handover method, or the amount of current transmission resources or scheduling.

The source base station may include, in a handover preparation information message, current bearer configuration information, security key information, cell group configuration information, or UE capability information of the UE, and may transmit the handover preparation information message to the target base station in order to request a handover. In the above, the source base station may know in advance whether the target base station supports the DAPS handover method by sharing the capabilities of the target base station in advance. If the target base station indicates to perform the DAPS handover method, the source base station may perform fast or early data forwarding.

In the above, the target base station receives the handover preparation information message, and the target base station may determine the handover method (for example, DAPS handover) according to the capability information of the UE or whether the target base station is capable of supporting the DAPS handover method, the amount of current transmission resources, or scheduling. As described above, when the DAPS handover method is determined based on the handover command message, the target base station may include an indicator indicating the DAPS handover method in the message and transmit the message. As described above, in a case where the DAPS handover method is determined, the target base station may include an indicator indicating the DAPS handover method in the RRCReconfiguration message at the time of configuring the RRCReconfiguration message instructing the UE to perform handover; in a case where another DAPS handover method rather than the DAPS handover method is determined, the target base station may include an indicator indicating the another DAPS handover method in the RRCReconfiguration message; and the target base station may configure the RRCReconfiguration message by including bearer configuration information, security key information, cell group configuration information, or system information, which are required when the UE performs the DAPS handover method or the another handover method. In addition, the target base station may include the configured RRCReconfiguration message in a DL-DCCH message of the handover command message to transmit the DL-DCCH message to the source base station. In the above, the target base station may perform an indication of the DAPS handover method for each bearer (DRB or SRB).

In the above, when the source base station receives the handover command message, the source base station may identify whether the DAPS handover is determined by identifying the indicator included in the handover command message. If the DAPS handover method is indicated, the source base station may also perform the DAPS handover method, and handover may be indicated by extracting the RRCReconfiguration message included in the handover command message or by transmitting the RRCReconfiguration message to the UE. However, if the DAPS handover method is not determined when the indicator included in the handover command message is identified, or if another handover method is indicated, the source base station may also perform another handover method indicated by the target base station. In addition, the source base station may extract the RRCReconfiguration message included in the handover command message or transmit the RRCReconfiguration message to the UE, to indicate to perform handover. As another method, the source base station may read the RRCReconfiguration message included in the handover command message, even if there is no separate indicator in the handover command message, to identify a handover method indicated by the target base station, and identify whether the determination of the DAPS handover method is established. If another handover method is indicated, the source base station may also perform the indicated handover method. The source base station may identify the indicated DAPS handover method for each bearer and perform the DAPS handover method for each bearer (DRB or SRB).

An extended new embodiment may be provided by combining the methods of the first embodiment, the second embodiment, or the third embodiment in which the efficient DAPS handover method of the disclosure is determined.

Through the RRCReconfiguration message, the base station may indicate, to the UE, an efficient handover method (DAPS handover method) of this disclosure, and may configure the DAPS handover method for each bearer (DRB or SRB) of the UE, by using another method. For example, the base station may define, in the RRC message, a new indicator indicating the efficient handover method (DAPS handover method) based on bearer configuration information, PDCP configuration information, or RLC configuration information for each bearer identifier or logical channel identifier. In addition, the base station may indicate, to the UE, the efficient handover method for each bearer or for each logical channel identifier, by using the indicator. As described above, when the base station configures the DAPS handover method for the UE, other handover methods (e.g., the conditional handover method (a method in which a plurality of target cells and a plurality of conditions are configured for the UE, and if the UE satisfies the above conditions in the procedure of cell selection or reselection procedure, the UE performs a procedure of handover to one target cell) or a handover method without a random access procedure) are indicated together with the configuration, and thus the UE can prevent data loss or transmission delay that may occur during handover. Upon receiving the message, the UE stops or continues transmission or reception of data to or from the source base station according to the configured handover method and starts a T304 timer. When the UE fails to perform handover to the target base station for a predetermined time (for example, when the T304 timer expires), the T304 timer causes the UE to return to its original configuration and switch to an RRC idle state. In addition, the UE may trigger an RRC connection re-establishment procedure, and if an efficient handover method is configured using another method and the connection with the source base station is valid, the UE may fall back to report a handover failure to the source base station. The source base station transmits the sequence number (SN) status for uplink or downlink data to each bearer (e.g., RLC UM bearer or RLC AM bearer), and if there is downlink or uplink data, the source base station transmits the downlink or uplink data to the target base station (indicated by reference numerals 2630 and 2635). The UE attempts random access to the target cell indicated by the source base station (indicated by reference numeral 2640). The random access is performed in order to notify the target cell that the UE is moving through handover and to match uplink synchronization with the target cell. For the random access, the UE transmits, to the target cell, a preamble ID provided from the source base station or a preamble corresponding to the preamble ID that is randomly selected. After transmission of the preamble, the UE monitors whether a random access response (RAR) message is transmitted from the target cell when a specific number of subframes elapses. The time period of the monitoring is called a random access response window (RAR window). If a random access response (RAR) is received during the specific period of time (indicated by reference numeral 2645), the UE transmits a handover (HO) complete message to the target base station by using an RRC reconfiguration complete message (indicated by reference numeral 2655). Upon successfully receiving the random access response from the target base station, the UE interrupts or terminates the T304 timer (indicated by reference numeral 2650). The target base station requests path modification from the source base station in order to modify configured paths of the bearers (indicated by reference numerals 2660 and 2665) and transmits a request for deleting UE context of the UE to the source base station (indicated by reference numeral 2670). In addition, the target base station may transmit an RRC message (e.g., RRCReconfiguration message) 2671 to the UE to instruct the UE to release the connection with the source base station by using an indicator. Alternatively, the target base station may transmit MAC control information, RLC control information, or PDCP control information to the UE to instruct the UE to release the connection with the source base station. Therefore, the UE attempts to receive data from the target base station from the start time of the RAR window, transmits an RRC reconfiguration complete message after the RAR is received, and receives a downlink transmission resource or an uplink transmission resource, thereby starting transmission or reception of data 2675 to or from the target base station.

Methods, which are applicable when the base station configures or indicates, for the UE, the second embodiment (DAPS handover method) of the disclosure by using the handover command message or RRC message (for example, RRCReconfiguration message), are as follows. In the disclosure, when the base station configures the DAPS handover method for the UE, or when the UE receives a handover command message for configuring the DAPS handover method from the base station, the base station may perform a method employed by applying one method or several methods among the methods as follows.

Method 1-1: When indicating or configuring a handover to a UE, the base station (source base station, target base station, LTE base station, or NR base station) may include mobility Control Info or ReconfigurationWithSync configuration information in the RRCReconfiguration message, and may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message to indicate the DAPS handover method for each bearer (SRB or DRB). As another method, the base station may define the indicator in pdcp-config in SRB-ToAddMod or DRB-ToAddMod to indicate the DAPS handover method for each bearer. As another method, when the LTE base station indicates or configures the handover to the UE through the LTE RRCRecofiguration message, in the case of LTE, pdcp-config is not defined in the SRB-ToAddMod and the default PDCP layer device configuration is used; and thus for SRB, an indicator is defined in the SRB-ToAddMod to configure the DAPS handover method for each bearer, and for DRBs, an indicator is defined in pdcp-config in DRB-ToAddMod to configure the DAPS handover method for each bearer. Upon receiving the handover command message (RRCReconfiguration message) configured in the above, the UE may perform the DAPS handover method for bearers for which the DAPS handover method is configured according to the configuration, and may perform a general handover method for bearers for which the DAPS handover method is not configured. In addition, if mobility Control Info or ReconfigurationWith-Sync configuration information of the handover command message includes an indicator indicating or configuring the type of handover method for the UE (e.g. MakeBeforeBreak handover, Rach-skip handover, RACH-less handover, or conditional handover (CHO)), and the DAPS handover method is configured for each bearer, the UE may apply the DAPS handover method prior to the type of the other handover methods when performing a handover procedure for each bearer as described above. For example, the UE may perform a DAPS handover method for bearers for which the DAPS handover method is configured according to the configuration, and may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured above, when the DAPS handover method is configured for at least one bearer or a predetermined bearer for each bearer, the UE may apply the RRC layer device, SDAP layer device, MAC layer device, PHY layer device, or SRB processing method, etc. for performing the DAPS handover method of the disclosure. In addition, for bearers for which the DAPS handover method is configured for each bearer, the UE may apply a method for processing the PDCP layer device, RLC layer device, etc. for performing the DAPS handover method of the disclosure.

Method 1-2: When indicating or configuring a handover to a UE, the base station (source base station, target base station, LTE base station, or NR base station) may include mobility Control Info or ReconfigurationWithSync configuration information in the RRCReconfiguration message, and may define an indicator in DRB-ToAddMod of DRB-ToAddModList in the bearer configuration information (Radio Resource Config Dedicated or Radio Bearer Config) of the RRCReconfiguration message to indicate the DAPS handover method for each bearer (DRB); and for SRBs, the base station may not introduce a separate indicator for configuring the DAPS handover method. That is, when the UE receives the handover command message (RRCReconfiguration message) configured as described above, when the DAPS handover method is configured for at least one bearer (DRB) or a predetermined bearer (DRB) for each bearer, the UE may apply the SRB processing method for performing the DAPS handover method of this disclosure. Alternatively, by defining an indicator in pdcp-config in the DRB-ToAddMod, the base station may indicate the DAPS handover method for each bearer. When the UE receives the configured handover command message (RRCReconfiguration message), the UE can perform the DAPS handover method for bearers for which the DAPS handover method is configured according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, and may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, when the UE receives the handover command message (RRCReconfiguration message) configured as described above, if the DAPS handover method is configured for at least one bearer or a predetermined bearer for each bearer, the RRC layer device, SDAP layer device, MAC layer device, PHY layer device, or SRB processing method, etc. for performing the DAPS handover method of the disclosure can be applied; and for bearers for which the DAPS handover method is configured for each bearer, the UE may apply a method for processing the PDCP layer device, RLC layer device, etc. for performing the DAPS handover method of the disclosure.

Method 2-1: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may define an indicator in SRB-ToAddMod or DRB-ToAddMod of SRB-ToAddModList or DRB-ToAddModList in the bearer configuration information (Radio Resource Config Dedicated or Radio Bearer Config) of the RRCReconfiguration message to indicate the DAPS handover method for each bearer (SRB or DRB). As another method, the base station may define the indicator in pdcp-config in SRB-ToAddMod or DRB-ToAddMod to indicate the DAPS handover method for each bearer. As another method, when the LTE base station indicates or configures the handover to the UE through the LTE RRCReconfiguration message, in the case of LTE, pdcp-config is not defined in the SRB-ToAddMod and the default PDCP layer device configuration is used; and thus for SRB, an indicator is defined in the SRB-ToAddMod to configure the DAPS handover method for each bearer, and for DRBs, an indicator is defined in pdcp-config in DRB-ToAddMod to configure the DAPS handover method for each bearer. The UE, having received the handover command message (RRCReconfiguration message) that is configured above, may perform the DAPS handover method for bearers for which the DAPS handover method is configured according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, a DAPS handover method may be performed for bearers for which a DAPS handover method is configured according to the configuration, and the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, may be performed for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply, to bearers for which the DAPS handover method is configured for each bearer, a method for processing the PDCP layer device, RLC layer device, etc. for performing the DAPS handover method of the disclosure.

Method 2-2: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may define an indicator in DRB-ToAddMod of DRB-ToAddModList in the bearer configuration information (Radio Resource Config Dedicated or Radio Bearer Config) of the RRCReconfiguration message to indicate the DAPS handover method for each bearer (DRB); and for SRBs, the base station may not introduce a separate indicator for configuring the DAPS handover method. That is, upon receiving the handover command message (RRCReconfiguration message) configured as described above, when the DAPS handover method is configured for at least one bearer (DRB) or a predetermined bearer (DRB) for each bearer, the UE may apply the SRB processing method for performing the DAPS handover method of this disclosure. As another method, by defining an indicator in pdcp-config in the DRB-ToAddMod, the base station may indicate the DAPS handover method for each bearer. The UE, having received the handover command message (RRCReconfiguration message) configured, may perform the DAPS handover method for a bearer for which the DAPS handover method is configured for each bearer according to the configuration, and may perform a general handover method for bearers for which the DAPS handover method is not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, a DAPS handover method may be performed for bearers for which a DAPS handover method is configured according to the configuration, and the UE may perform the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply, to bearers for which the DAPS handover method is configured for each bearer, a method for processing the PDCP layer device, RLC layer device, etc. for performing the DAPS handover method of the disclosure.

Method 3-1: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the base station may configure and include a list of bearers for which the DAPS handover methods are configured, and include the identifiers (SRB or DRB) of the bearer, for which the DAPS handover method is configured, in the list of bearers so as to indicate whether the DAPS handover method is configured for each bearer. As another method, the base station may configure and include a list of bearers for which the DAPS handover methods are not configured, and include the identifiers (SRB or DRB) of the bearer, for which the DAPS handover method is not configured, in the list of bearers so as to indicate whether the DAPS handover method is configured for each bearer. The UE, having received the handover command message (RRCReconfiguration message) that is configured above, may perform the DAPS handover method for bearers for which the DAPS handover method is configured according to the configuration, bearers, the identifiers of which are included in the list of bearers for which the DAPS handover methods are configured, or bearers, the identifiers of which are not included in the list of bearers for which the DAPS handover methods are not configured. In addition, the UE may perform a general handover method for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover CHO) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, bearers, the identifiers of which are included in the list of bearers for which the DAPS handover methods are configured; or bearers, the identifiers of which are not included in the list of bearers for which the DAPS handover methods are not configured. In addition, the UE may perform a handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message, for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply a method for processing the PDCP layer device, RLC layer device, etc. for performing the DAPS handover method of the disclosure, with respect to bearers for which the DAPS handover method is configured for each bearer, bearers, the identifiers of which are included in the list of bearers for which the DAPS handover methods are configured, or bearers, the identifiers of which are not included in the list of bearers for which the DAPS handover method are not configured.

Method 3-2: When indicating or configuring a handover to a UE, the base station (source base station, target base station, LTE base station, or NR base station) may include mobility Control Info or ReconfigurationWithSync configuration information in the RRCReconfiguration message and define and include an indicator for indicating or configuring the DAPS handover method in the mobility Control Info or ReconfigurationWithSync, thereby indicating that the DAPS handover method has been configured for at least one bearer or a predetermined bearer. In addition, the UE may configure and include a list of bearers for which the DAPS handover methods are configured, and include the identifiers (SRB or DRB) of the bearer, for which the DAPS handover method is configured, in the list of bearers so as to indicate whether the DAPS handover method is configured for each bearer. As another method, the base station may configure and include a list of bearers for which the DAPS handover methods are not configured, and include the identifiers (SRB or DRB) of the bearer, for which the DAPS handover method is not configured, in the list of bearers so as to indicate whether the DAPS handover method is configured for each bearer. In addition, for SRBs, the UE may not introduce a separate indicator for configuring the DAPS handover method. That is, upon receiving the handover command message (RRCReconfiguration message) configured above, when the DAPS handover method is configured for at least one bearer (DRB) or a predetermined bearer (DRB) for each bearer, the UE may apply the SRB processing method for performing the DAPS handover method of this disclosure. The UE, having received the handover command message (RRCReconfiguration message) configured, may perform the DAPS handover method for bearers for which a DAPS handover method is configured according to the configuration, bearers, the identifiers of which are included in the list of bearers for which the DAPS handover methods are configured; or bearers, the identifiers of which are not included in the list of bearers for which the DAPS handover methods are not configured. In addition, the UE may perform a general handover method for bearers for which the DAPS handover method is not configured, bearers, the identifiers of which are not included in the list of bearers for which the DAPS handover methods are configured, or bearers, the identifiers of which are included in the list of bearers for which the DAPS handover methods are not configured. In addition, if mobility Control Info or ReconfigurationWithSync configuration information of the handover command message includes an indicator indicating or configuring the type of handover method for the UE (e.g. MakeBeforeBreak handover, Rach-skip handover, RACH-less handover, or conditional handover (CHO)) and the DAPS handover method is configured for each bearer, the UE may apply the DAPS handover method prior to the type of the other handover methods when performing a handover procedure for each bearer as described above. For example, the UE may perform a DAPS handover method for bearers for which a DAPS handover method is configured according to the configuration, bearers, the identifiers of which are included in the list of bearers for which the DAPS handover methods are configured, or bearers, the identifiers of which are not included in the list of bearers for which the DAPS handover methods are not configured. In addition, the UE may perform, for bearers for which a DAPS handover method is not configured, bearers, the identifiers of which are not included in the list of bearers for which the DAPS handover methods are configured, or bearers, the identifiers of which are included in the list of bearers for which the DAPS handover methods are not configured, the handover method configured according to an indicator, which indicates or configures the type of handover method for the UE (for example, MakeBeforeBreak handover, Rach-skip handover, RACH-less handover, or conditional handover (CHO)) in mobility Control Info or ReconfigurationWithSync configuration information of the handover command message. As another method, when the DAPS handover method is configured for at least one bearer or a predetermined bearer in order to reduce the complexity of the UE implementation, the mobility Control Info or ReconfigurationWithSync configuration information of the handover command message may not indicate or configure the type of handover method for the UE (for example, MakeBeforeBreak handover, Rach-skip handover, RACH-less handover, or conditional handover (CHO)). In addition, upon receiving the handover command message (RRCReconfiguration message) configured as described above, if an indicator for indicating or configuring a DAPS handover method is included or configured in the mobility Control Info or ReconfigurationWithSync, the UE may apply the RRC layer device, SDAP layer device, MAC layer device, PHY layer device, or SRB processing method, etc. for performing the DAPS handover method of the disclosure. In addition, the UE may apply a method for processing the PDCP layer device, RLC layer device, etc. for performing the DAPS handover method of the disclosure, with respect to bearers for which the DAPS handover method is configured for each bearer, bearers, the identifiers of which are included in the list of bearers for which the DAPS handover methods are configured, or bearers, the identifiers of which are not included in the list of bearers for which the DAPS handover method are not configured.

The disclosure proposes seamless handover methods capable of minimizing a data interruption time due to handover or reducing the same to 0 ms in a next-generation mobile communication system.

The UE configures a plurality of first bearers, and transmits or receives data (uplink or downlink data transmission or reception) to or from a source base station through respective protocol layer devices (PHY layer devices, MAC layer devices, RLC layer devices, or PDCP layer devices) of bearers. However, for convenience of explanation, hereinafter, a description will be made as if the UE includes one bearer in the drawings and description. It goes without saying that the contents, which are described with reference to one bearer below, may be applied to multiple bearers.

Figure 27:
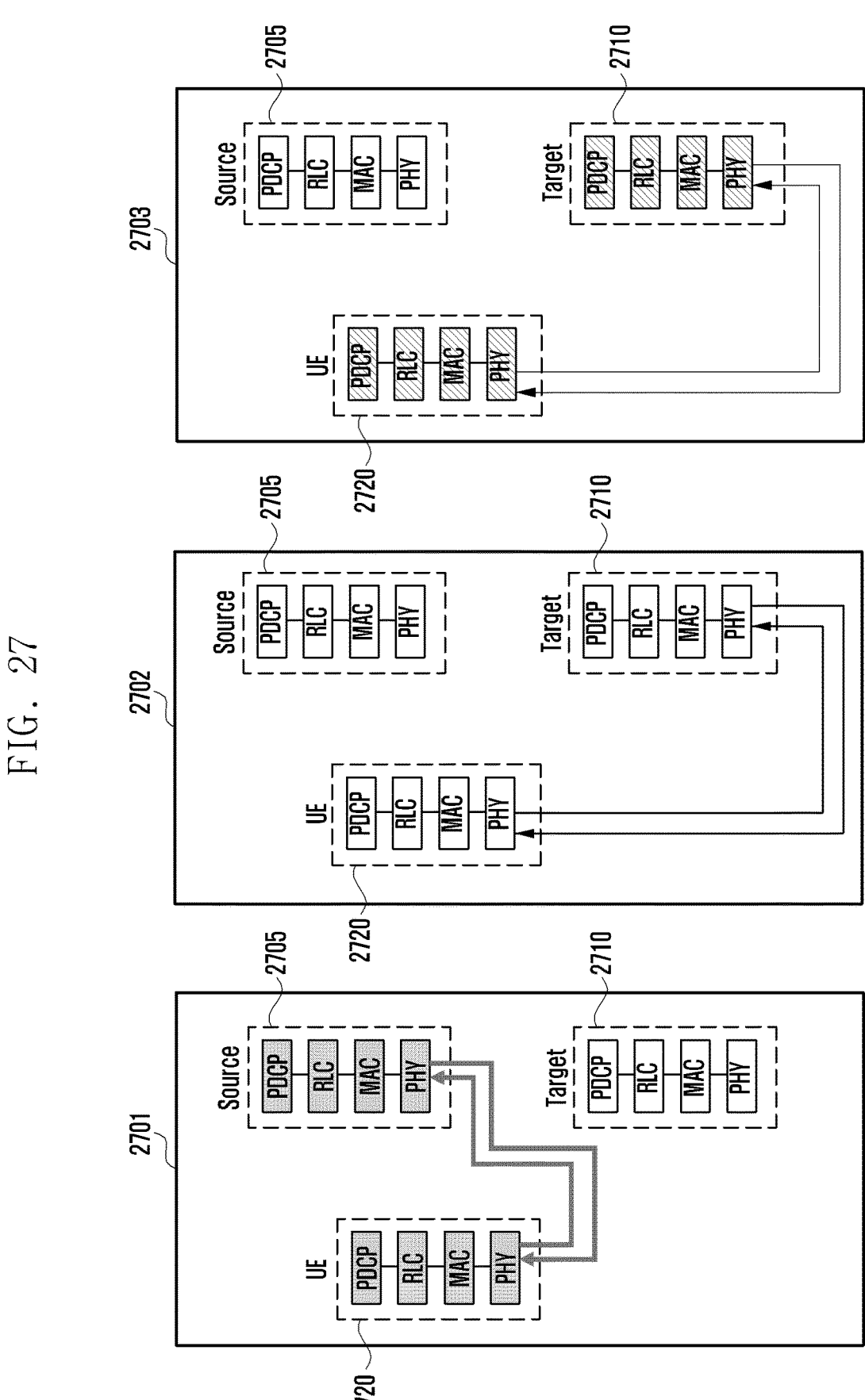
FIG. 27 is a diagram illustrating operations of a UE, a source base station, and a target base station regarding an efficient handover method for minimizing a data interruption time due to handover applied to a first embodiment of the disclosure.

FIG. 27 is a diagram illustrating operations of a UE, a source base station, and a target base station regarding an efficient handover method for minimizing a data interruption time due to handover applied to a first embodiment of the disclosure.

Referring to FIG. 27 according to the first embodiment of the efficient handover method, in a first stage 2701, if a UE 2720 receives a handover command message from a source base station 2705 while transmitting or receiving data to or from the source base station, the UE 2720 may release the connection with the source base station according to the handover method indicated through the handover command message (for example, RRCReconfiguration message), perform a procedure of random access to a target base station, and perform a handover procedure. As another method, the UE may continue to transmit or receive data to or from the source base station in order to minimize a data interruption time that occurs during handover according to the indicated handover method.

According to the first embodiment of the efficient handover method of FIG. 27, in a second stage 2702, when the UE 2720 performs a procedure of random access to a target base station 2710, transmits a preamble, or initially transmits data to an uplink transmission resource by using a physical uplink control channel (PUCCH) or physical uplink shared channel (PUSCH) transmission resource according to a handover method indicated by the handover command message, the UE 2720 may stop transmitting or receiving data to or from the source base station (uplink data transmission and downlink data reception).

According to the first embodiment of the efficient handover method of FIG. 27, in a third stage 2703, the UE 2720 may complete a procedure of random access to the target base station, may transmit a handover completion message, and may start transmitting or receiving data to or from the target base station (uplink data transmission and downlink data reception).

The first embodiment of the efficient handover method of the disclosure may describe a handover method performed when a DAPS handover method is not configured.

Figure 28:
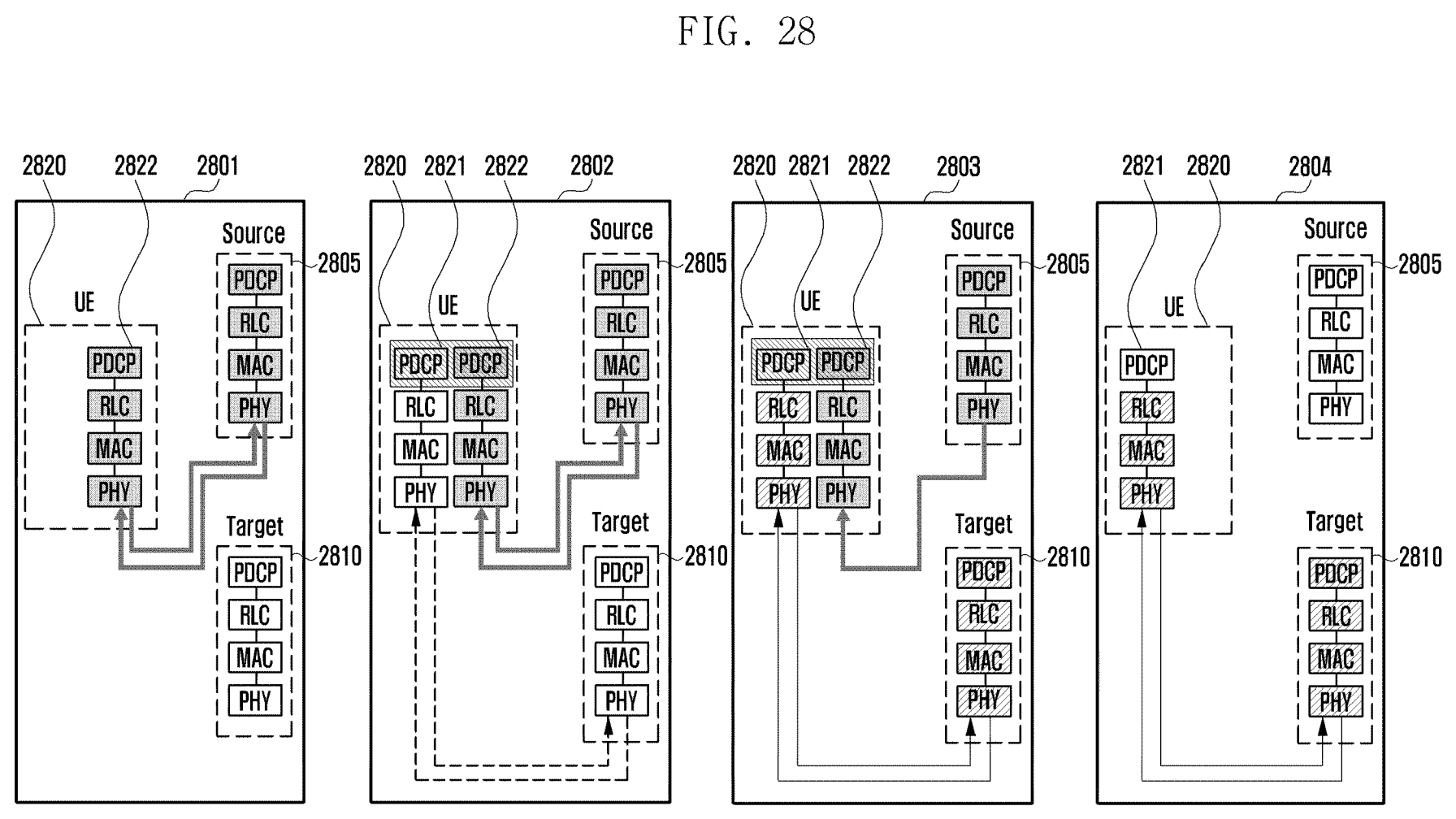

FIG. 28 is a diagram illustrating operations of a UE, a source base station, and a target base station regarding an efficient handover method for minimizing a data interruption time due to handover applied to a second embodiment of the disclosure.

Referring to FIG. 28, according to the second embodiment of the efficient handover method of FIG. 28, in a first stage 2801, a UE 2820 may receive a handover command message from a source base station 2805 while transmitting or receiving data to or from the source base station. If the UE receives the handover command message, in a case where the second embodiment (for example, the DAPS handover method) of the efficient handover method of the disclosure is indicated through the handover command message or indicated for each bearer, the UE may continue to transmit or receive data to or from the source base station through protocol layer devices 2822 of a first bearer, in order to minimize a data interruption time that occurs during handover, even if the UE has received the handover command message. In addition, when the RRC layer device of the UE identifies the indication for the second embodiment (for example, the DAPS handover method) of the efficient handover method of the disclosure through the handover command message, or identifies an indicator for the DAPS handover method for each bearer, the RRC layer device transmits an indicator to each bearer or a PDCP layer device corresponding to a bearer for which the DAPS handover method is indicated. Then, upon receiving the indicator, the PDCP layer device is switched to the structure of a second PDCP layer device (indicated by reference numeral 2920) from the structure of a first PDCP layer device (indicted by reference numeral 2911 or 2912). The first stage may describe a stage in which the UE receives a handover command message (RRCReconfiguration message) from the base station. In addition, when switching to the second PDCP layer device structure, the UE may configure or establish in advance the protocol layer devices (PHY layer devices, MAC layer devices, RLC layer devices, or PDCP layer devices) 2821 of the second bearer for the target base station according to the configuration included in the received handover command message above. In addition, the UE may derive and update the security key for the target base station, and may configure the header (or data) compression context for the target base station. In addition, when the handover command message, which is received by the UE, indicates the DAPS handover method of the disclosure or indicates the DAPS handover method for specific bearers, or the PDCP reordering timer value is newly configured, the UE may switch from the structure or function of the first PDCP layer device (indicated by reference numeral 2911 or 2912) to the structure or function of the second PDCP layer device (indicated by reference numeral 2920) of the disclosure, for each bearer or a bearer for which the DAPS handover method is indicated. When performing switching as above, the UE updates a variable for reordering with a PDCP serial number or count value expected to be received next, stops the reordering timer, and restarts the same. In addition, when receiving the handover command message (for example, RRC Reconfiguration message), the RRC layer device of the UE may start a first timer (for example, T304). In addition, the first timer may be interrupted when the procedure of random access to the target base station 9-03 is performed in order to perform handover and the random access procedure is successfully completed (for example, when the first condition described in the disclosure is satisfied). If the handover fails and the first timer expires, the UE performs fallback when the connection to the source base station is valid to report the handover failure to the source base station and attempts connection recovery; and when the connection to the source base station is not valid, the UE may perform an RRC connection re-establishment procedure.

Through the handover command message, the second bearer may be configured and established to have the same bearer identifier as that of the first bearer so that data interruption time does not occur for each bearer. In addition, in the second embodiment, the PDCP layer device of the first bearer and the PDCP layer device of the second bearer may logically operate like one PDCP layer device, and a more detailed operation method will be described in FIGS. 29A and 29B. In addition, in the second embodiment, when the UE enables transmission of the uplink data to both the source base station and the target base station, there is a need to prevent a coverage reduction problem due to insufficient transmission power of a UE or a problem (i.e., link selection) of requesting transmission resources from a base station and determining transmission of uplink data to a base station when transmitting the uplink data. Accordingly, the uplink data in the second embodiment may be transmitted to only one of the source base station and the target base station. Specifically, in the second embodiment, if the UE does not have the capability (that is, dual uplink transmission) of simultaneously transmitting uplink data to different base stations at different frequencies or at the same frequency, the uplink data may be transmitted to only one of the source base station and the target base station, by the UE, in one time unit. Therefore, the UE may request scheduling from only one of the source base station and the target base station, and may transmit a report of the size of data to be transmitted from the PDCP layer device (e.g., buffer status report (BSR)) to one base station among the source base station and the target base station and receive an uplink transmission resource, thereby transmitting the uplink data to only one of the base stations. In addition, even if the UE receives the handover command message from the source base station, the UE does not initialize the MAC layer device of the first bearer in order to prevent data loss by continuing data transmission or reception due to HARQ retransmission. In addition, the RLC layer device, which is in the AM mode, may continuously perform RLC retransmission. As another method, when the second embodiment (DAPS handover method) of the efficient handover method of the disclosure is indicated for each bearer through the handover command message, the UE may continuously transmit or receive data to or from the source base station only for the PDCP layer device, RLC layer device, or MAC layer device corresponding to a bearer or a logical channel identifier for which the second embodiment (DAPS handover method) is indicated through the handover command message, or only for data corresponding to the bearer or logical channel identifier. In addition, even when the first condition described in the disclosure is satisfied (for example, when uplink data transmission is switched to the target base station), the UE may continuously transmit or receive RLC control data (for example, RLC status report), PDCP control data (ROHC feedback or PDCP status report), or HARQ retransmission to or from the source base station only for the PDCP layer device, RLC layer device, or MAC layer device corresponding to a bearer or a logical channel identifier for which the second embodiment (DAPS handover method) is indicated through the handover command message. In addition, when the second embodiment (DAPS handover method) of the efficient handover method of the disclosure is indicated or has been indicated for each bearer through the handover command message, the UE stops data transmission or reception to or from the source base station for a PDCP layer device, an RLC layer device, or a MAC layer device corresponding to a bearer or logical channel identifier for which the second embodiment (DAPS handover method) is not indicated through the handover command message. In addition, when the UE receives the handover command message, the handover command message indicates the DAPS handover method of the disclosure or indicates the DAPS handover method for specific bearers, the DAPS handover method is configured for at least one bearer, the DAPS handover method is configured for a predetermined bearer, or the QoS flow and bearer mapping information are newly configured, the UE may switch, for each bearer or for a bearer for which the DAPS handover method is indicated, to the structure or function 3020 of the second SDAP layer device of the disclosure from the structure or function 3010 of the first SDAP layer device. In addition, according to the structure of the second SDAP layer device, the UE maintains the existing first QoS flow and bearer mapping information for the source base station to process uplink data to be transmitted to the source base station and downlink data to be received from the source base station. In addition, the UE configures the second QoS flow and bearer mapping information, newly configured in the handover command message, for the target base station, and uses the configuration in order to process uplink data to be transmitted to the target base station and downlink data to be received from the target base station. That is, in the structure of the second SDAP layer device of the disclosure, data for the source base station and the target base station are classified and processed by maintaining the first QoS flow and bearer mapping information or the second QoS flow and bearer mapping information for the source base station. In the structure of the second SDAP layer device, the SDAP layer device may identify whether data received from a lower layer is data received from the source base station or the target base station, through a 1-bit indicator of the SDAP header, a 1-bit indicator of the PDCP header, or information indicated by the PDCP layer device. In addition, if the base station instructs the UE to perform the DAPS handover method for each bearer through the handover command message, the UE allows the DAPS handover method to be indicated always for a default bearer (default DRB), and thus when data is generated in a new QoS flow that does not correspond to the bearer mapping information and QoS flow during the DAPS handover procedure, uplink data is always transmitted to the default bearer. If the DAPS handover method is not configured for the default bearer, data interruption time may occur because uplink data transmission in a new QoS flow occurring during handover is impossible. In another method, when the handover command message (for example, RRCReconfiguration message) is received, the second embodiment (DAPS handover method) is indicated, and the SDAP layer device configuration information for the target base station or the second QoS flow and bearer mapping information are configured through the RRC message, the UE may apply the SDAP layer device configuration information or the second QoS flow and bearer mapping information when the first condition described in the disclosure is satisfied. In addition, if the second embodiment (DAPS handover method) is indicated for each bearer through the handover command message, the UE may maintain and apply only the first QoS flow and bearer mapping information corresponding to a bearer for which the second embodiment is indicated when the first QoS flow and bearer mapping information for the source base station are maintained, and may release or not apply the first QoS flow and bearer mapping information corresponding to a bearer for which the second embodiment is not indicated. In addition, the SDAP layer device configuration information for the target base station or the second QoS flow and bearer mapping information are configured through the RRC message, the UE applies the SDAP layer device configuration information or the second QoS flow and bearer mapping information in order to transmit or receive data to or from the target base station when the first condition described in the disclosure is satisfied.

Referring to FIG. 28 according to the second embodiment of the efficient handover method, in a second stage 2802, even when the UE 2820 performs a procedure of random access to the target base station 2810, which is indicated through the handover command message, through the protocol layer devices of the second bearer, the UE 2820 may continue to transmit or receive data (uplink data transmission or downlink data reception) to or from the source base station through the protocol layer devices of the first bearer. In the second stage, the UE performs a cell selection or reselection procedure, and performs the procedure of random access to a target cell indicated through the handover command message (that is, RRCReconfiguration message) received from the source base station.

According to the second embodiment of the efficient handover method of FIG. 28, when the UE 2820 satisfies the first condition in a third stage 2803, the UE 2820 may stop transmitting uplink data to the source base station through the protocol layer devices 2822 of the first bearer, for a bearer for which the DAPS handover method is configured, and may transmit the uplink data to the target base station through the protocol layer devices 2821 of the second bearer. In addition, the UE may continuously receive downlink data from the source base station and the target base station through protocol layer devices of the first bearer and the second bearer. The third stage describes a stage in which the UE satisfies the first condition and switches uplink transmission from the source base station to the target base station. Specifically, the third stage describes a stage in which the UE transmits uplink data to the source base station through the first bearer until the first condition is satisfied, and when the first condition is satisfied, stops transmitting the uplink data to the source base station through the first bearer, and starts transmitting uplink data to the target base station through the second bearer. Specifically, when the PDCP layer device of the second PDCP layer device structure of the disclosure, for the bearers for which the DAPS handover method is configured, satisfies the first condition while transmitting uplink data through the first bearer and receives the indicator from a lower layer device (when the MAC layer device succeeds in a procedure of random access to the target base station) or a higher layer device (when the first timer expires in the RRC layer device), the PDCP layer device may stop and switch transmission of uplink data transmission through the first bearer to thereby start uplink data transmission through the second bearer. In addition, as shown in the structure of the PDCP layer device of FIGS. 29A and 29B, the receiving PDCP layer device 2821 of the second bearer and the receiving PDCP layer device 2822 of the first bearer are driven together, and may continuously perform data reception from the source base station or the target base station by using stored transmission or reception data, serial number information, or information such as header compression and decompression context. The first condition may be one of the following conditions. The first condition described in the following is an uplink data transmission switching time in which transmission resources are most efficiently used and data interruption time is minimized.

It may be determined that the first condition is satisfied when the UE successfully completes the procedure of random access to the target base station through the layer devices of the second bearer (for example, the MAC layer device), when the UE successfully completes the procedure of random access to the target base station through the layer devices of the second bearer (for example, the MAC layer device) and receives the first uplink transmission resource assigned from the target base station, or when the uplink transmission resource is first indicated to the UE.

For example, more specifically, when the UE receives a handover command message from the source base station and receives an indication to perform random access to the target base station, if the received random access is a contention free random access procedure (CFRA) (for example, if a pre-designated preamble or UE cell identifier (for example, cell radio network temporary identifier (C-RNTI) is assigned), Since the random access procedure may be considered as being successfully completed when the UE transmits a pre-designated preamble to the cell of the target base station and receives a random access response (RAR) message, it may be determined that the first condition is satisfied when the first uplink transmission resource, which is assigned, included, or indicated through the random access response message, is received. As another method, it may be determined that the first condition is satisfied when an uplink transmission resource is received for the first time after reception of the RAR.

If the UE receives a handover command message from the source base station and receives an indication to perform random access to the target base station, if the commanded random access is a contention-based random access procedure (CBRA) (for example, if a pre-designated preamble or UE cell identifier (e.g., C-RNTI) is not assigned), When the UE transmits a preamble (e.g., a random preamble) to the cell of the target base station, receives a random access response (RAR) message, and transmits message 3 (e.g., a handover complete message) by using the uplink transmission resource allocated, included or indicated through the random access response message, receives an MAC CE (e.g., contention resolution MAC CE) indicating that contention has been resolved through message 4 from the target base station, or receives the uplink transmission resource through the physical downlink control channel (PDCCH) corresponding to the CRNTI of the UE, the UE may identify that the procedure of random access to the target base station has been successfully completed, and thus the UE may monitor the PDCCH and determine that the first condition is satisfied when the uplink transmission resource is received for the first time or when an indication is received for the first time through the PDCCH corresponding to the C-RNTI of the UE. As another method, if the size of the uplink transmission resource allocated through the random access response message is sufficient to transmit message 3 and the UE can additionally transmit uplink data, it may be determined that the uplink transmission resource is received for the first time and that the first condition is satisfied. That is, upon receiving the RAR, it may be determined that the uplink transmission resource is received for the first time and that the first condition is satisfied.

If a handover method that does not require a random access procedure (RACH-less handover) is also indicated through the handover command message received by the UE, If the handover command message includes uplink transmission resources for the target base station, When the UE transmits message 3 (e.g., a handover complete message or an RRCReconfigurationComplete message) to an uplink transmission resource of the target base station, receives a UE identity confirmation MAC CE through message 4 from the base station, or receives the uplink transmission resource through the PDCCH corresponding to the C-RNTI of the UE, it may be determined that the random access procedure has been successfully completed and that the first condition may be satisfied. As another method, it may be determined that the first condition is satisfied when the first uplink transmission resource is received through the PDCCH corresponding to the C-RNTI of the UE by monitoring the PDCCH after the random access procedure is successfully completed.

If the handover command message does not contain uplink transmission resources for the target base station, When the UE receives the uplink transmission resource through the PDCCH corresponding to the C-RNTI of the UE by monitoring the PDCCH for the target base station (or cell), transmits message 3 (e.g., handover completion message or RRCReconfigurationComplete message) to the uplink transmission resource, receives UE identity confirmation MAC CE from the base station, or receives the uplink transmission resource through the PDCCH corresponding to the C-RNTI of the UE, it may be determined that the random access procedure is successfully completed and that the first condition is satisfied. As another method, it may be determined that the first condition is satisfied when the first uplink transmission resource is received through the PDCCH corresponding to the C-RNTI of the UE by monitoring the PDCCH after the random access procedure is successfully completed.

1> When the DAPS handover method is indicated to the UE through a handover command message, and a 2-step random access procedure is configured or indicated through the handover command message (e.g., RRCReconfiguration message), 1> Alternatively, in a case where the 2-step random access procedure is not configured or indicated through the handover command message (for example, RRCReconfiguration message), the UE supports the 2-step random access procedure through the UE capability, supports a 2-step random access procedure through the system information of the target cell, and broadcasts information for the 2-step random access procedure (for example, a random access resource or a threshold value for determining whether or not to perform 2-step random access, etc.) through the system information; or where the UE receives the system information and performs the 2-step random access procedure for the target cell because the signal strength is higher or greater than the threshold value broadcast through the system information, 2> When the 2-step random access procedure is successfully completed, the UE may determine that the first condition is satisfied.

2> The 2-step random access procedure may be specifically performed by using one of a CBRA method and a CFRA method.

3> If the UE performs the CBRA-based 2-step random access procedure in the above, 4> The UE transmits a preamble via transmission resources for 2-step random access (e.g., a transmission resource configured through an RRC message by a PRACH occasion or the base station or a transmission resource broadcast through system information), and data (e.g., MsgA MAC PDU) may be transmitted via transmission resources for data transmission (e.g., a PUSCH occasion). The data may include MAC control information (C-RNTI MAC CE) including a UE identifier (C-RNTI) or an RRC message (RRCReconfigurationComplete message or handover complete message).

4> The UE may monitor the PDCCH scrambled by the UE identifier (C-RNTI) or the first identifier (MsgB-RNTI) derived by the time or frequency at which the preamble has been transmitted.

4> If the UE receives the PDCCH scrambled by the UE identifier, if the PDCCH allocates downlink transmission resources, or if the downlink transmission resource receives MAC control information for time timing adjustment (timing advance command MAC CE), 5> The UE may determine that the 2-step random access procedure has been successfully completed and that the first condition is satisfied.

4> If the UE receives the PDCCH scrambled by the first identifier (MsgB-RNTI), the PDCCH allocates a downlink transmission resource, or the downlink transmission resource receives a fallback random access response to the preamble transmitted by the UE (i.e., when the base station receives the preamble but the base station does not receive MsgA, a fallback RAR for transmitting MsgA to another transmission resource), 5> The UE may transmit data (MsgA MAC PDU) to a transmission resource indicated by the fallback random access response.

5> The UE may monitor the PDCCH scrambled by the UE identifier (C-RNTI).

5> If the UE receives the PDCCH scrambled by the UE identifier or if the PDCCH allocates uplink transmission resources, the UE determines that the 2-step random access procedure has been successfully completed, and may determine that the first condition is satisfied.

3> If the UE performs the CFRA-based 2-step random access procedure in the above, 4> The UE transmits a preamble via a transmission resource for 2-step random access (for example, a transmission resource designated through an RRC message by a PRACH occasion or the base station), and may transmit data (e.g., MsgA MAC PDU) via transmission resources for data transmission (for example, a PUSCH occasion). The data may include MAC control information (C-RNTI MAC CE) including a UE identifier (C-RNTI) or an RRC message (RRCReconfigurationComplete message or handover complete message).

4> The UE may monitor the PDCCH scrambled by the UE identifier (C-RNTI) or the first identifier (MsgB-RNTI) derived by the time or frequency at which the preamble has been transmitted.

4> If the UE receives the PDCCH scrambled by the UE identifier, or the PDCCH allocates downlink transmission resources, or the downlink transmission resource receives MAC control information for time timing adjustment (Timing Advance command MAC CE), 5> The UE may determine that the 2-step random access procedure has been successfully completed and determine that the first condition is satisfied.

4> If the UE receives the PDCCH scrambled by the first identifier (MsgB-RNTI), the PDCCH allocates a downlink transmission resource, or the downlink transmission resource receives a fallback random access response to the preamble transmitted by the UE (i.e., when the base station receives the preamble but the base station does not receive MsgA, a fallback RAR for transmitting MsgA to another transmission resource), 5> The UE may determine that the 2-step random access procedure has been successfully completed and that the first condition is satisfied.

5> The UE may transmit data (MsgA MAC PDU) to a transmission resource indicated through the fallback random access response.

1> As another method, if the DAPS handover method is indicated to the UE through the handover command message, a 2-step random access procedure is configured or indicated through the handover command message (e.g., RRCReconfiguration message), the UE may determine that the first condition is satisfied. For example, in the above case, the UE may determine that the first condition is satisfied before starting the 2-step random access procedure.

1> As another method, if the DAPS handover method is indicated to the UE through the handover command message, a 2-step random access procedure is configured or indicated through the handover command message (e.g., RRCReconfiguration message), if a transmission resource (for example, PUSCH), which is configured for data transmission in the 2-step random access procedure, has a value greater than the first threshold value, or if the timing advance value for time timing adjustment is included in the RRC message, the UE may determine that the first condition is satisfied. The first threshold value may be configured by the base station through the RRC message (for example, RRCReconfiguration), may be broadcast through system information, or may be configured as the size of data to be transmitted from the UE. For example, in the above case, the UE may determine that the first condition is satisfied before starting the 2-step random access procedure. As another method, if a timing advance value for time timing adjustment is included in the RRC message or if a 2-step random access procedure is configured, the UE may directly transmit data via configured transmission resources (e.g., transmission resources configured through the RRC message or transmission resources in which the UE monitors a PDCCH of the target base station and indicated via the PDCCH) without transmitting a preamble. Accordingly, in the above case, the UE may determine that the first condition has been satisfied before starting the 2-step random access procedure or when transmitting or before transmitting the data. As another method, if a timing advance value for time timing adjustment is included in the RRC message, or if a 2-step random access procedure is configured in the RRC message, the UE may directly transmit data via configured transmission resources (e.g., transmission resources configured through the RRC message or transmission resources for which the UE monitors the PDCCH of the target base station and indicated via the PDCCH) without transmitting the preamble. In the above case, if the configured transmission resource (PUSCH) (e.g., transmission resources configured through the RRC message or transmission resources for which the UE monitors the PDCCH of the target base station and indicated via the PDCCH) has a value greater than the first threshold value, or if the timing advance value for time timing adjustment is included in the RRC message, the UE may determine that the first condition is satisfied before starting the 2-step random access procedure or when transmitting or before transmitting the data.

Hereinafter, an efficient method for switching uplink data from a source base station to a target base station in the DAPS handover method of this disclosure is provided. As described above, whether the first condition is satisfied can be identified or detected using one of the following methods in the MAC layer device or the RRC layer device for the target base station corresponding to the second bearer, and the following method can be combined and expanded to a new method.

First method: For example, in the case of indicating DAPS handover through the RRCReconfiguration message received by the UE, the UE configures a MAC layer device for the target base station corresponding to the second bearer, and the MAC layer device may perform a random access procedure and identify whether the first condition is satisfied. In addition, if the first condition is satisfied, the MAC layer device may transmit, to a higher layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

Second method: As another method, for example, in the case of indicating DAPS handover through the RRCReconfiguration message received by the UE, the UE configures the MAC layer device for the target base station corresponding to the second bearer, and the MAC layer device may perform a random access procedure and identify whether the first condition is satisfied. In addition, if the first condition is satisfied, the MAC layer device may transmit, to a higher layer device (e.g., RRC layer device), an indication that the first condition has been satisfied. In addition, the higher layer device (e.g., RRC layer device) may transmit, to a lower layer device (e.g., PDCP layer device) of a bearer for which the DAPS handover method is configured, an indicator indicating switching of uplink data transmission to the target base station through the second bearer from the source base station through the first bearer in the DAPS handover method of the disclosure. Since the higher layer device (e.g., the RRC layer device) stops the first timer when the first condition described in the disclosure is satisfied or when the procedure of random access to the target base station is successfully performed, the RRC layer device may indicate the PDCP layer device of the bearer for which the DAPS handover method is configured to switch by using the indicator when the first timer is interrupted.

Third method: For example, in the case of indicating DAPS handover through the RRCReconfiguration message received by the UE, the UE configures a MAC layer device for the target base station corresponding to the second bearer, and if the RRC layer device of the UE transmits an indicator indicating that the RRC layer device performs DAPS handover to a lower layer device (e.g., MAC layer device), the MAC layer device may perform a random access procedure and identify whether the first condition is satisfied. In addition, if the first condition is satisfied, the MAC layer device may transmit, to a higher layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

Fourth method: In another method, when DAPS handover is indicated in the RRCReconfiguration message received by the UE, the UE configures a MAC layer device for the target base station corresponding to the second bearer, and if the RRC layer device of the UE transmits an indicator indicating that the RRC layer device performs DAPS handover to a lower layer device (e.g., MAC layer device), the MAC layer device may perform a random access procedure and identify whether the first condition is satisfied. In addition, if the first condition is satisfied, the MAC layer device may transmit, to a higher layer device (e.g., an RRC layer device), an indication that the first condition is satisfied. When identifying the indicator, the higher layer device (e.g., the RRC layer device) stops the first timer when the first condition described in the disclosure is satisfied or when the procedure of random access to the target base station is successfully performed, so that the first timer may be interrupted. In addition, the higher layer device (e.g., the RRC layer device) may transmit, to a lower layer device (e.g., a PDCP layer device) of a bearer for which the DAPS handover method is configured, an indicator indicating switching of uplink data transmission to the target base station through the second bearer from the source base station through the first bearer in the DAPS handover method of the disclosure.

According to the first method, the second method, the third method, or the fourth method, if the PDCP layer device receives, from a higher layer device (e.g., an RRC layer device) or a lower layer device (e.g., a MAC layer device), an indicator indicating that the first condition is satisfied or an indicator to switch uplink data transmission to the target base station from the source base station (for example, when a DAPS handover method is indicated), the PDCP layer device may perform operations of the protocol layer device, described below, in order to effectively perform switching of uplink data transmission, and perform one or more of the following operations so as to prevent data loss due to uplink data transmission. The following operations may be applied to a PDCP layer device connected to an AM DRB or UM DRB (RLC layer device operating in AM mode or RLC layer device operating in UM mode). In the above, if there is data to be transmitted in the buffer before the first condition is satisfied or before an indicator indicating that the first condition is satisfied is received, the PDCP layer device indicates, to the MAC layer device of the first bearer for the source base station, the size or quantity of data to be transmitted (e.g., PDCP data volume) to inform that there is data to be transmitted, and performs uplink data transmission to the source base station. Then, the MAC layer device of the first bearer for the source base station may perform a procedure of scheduling request or buffer status report to the source base station in order to receive allocation of uplink transmission resources. However, when the first condition is satisfied or an indicator indicating that the first condition is satisfied is received, uplink data transmission switching to the target base station for the bearer for which the DAPS handover method is configured is performed as follows.

The uplink or downlink ROHC context for the source base station is not initialized and used as it is, and the uplink or downlink ROHC context for the target base station is initialized and can be started in an initial state (for example, an IR state in U mode).

The PDCP layer device may transmit, to the MAC layer device of the first bearer for the source base station, an indication indicating that the size and the quantity of data to be transmitted is zero (or none) in order to switch the uplink data transmission to the second bearer for the target base station from the first bearer for the source base station. That is, the PDCP layer device may transmit an indication indicating that the data volume of the PDCP layer device is zero to the MAC layer device of the first bearer for the source base station, thereby indicating that there is no more data to be transmitted (even if the data to be transmitted exists actually in the buffer, the indication indicating that there is no data to be transmitted may be transmitted to the MAC layer device of the first bearer for the source base station in order to switch uplink data transmission).

However, as described in the disclosure, when the handover method (DAPS handover method) of the second embodiment of the disclosure is indicated, in the case of a bearer for which the handover method (DAPS handover method) of the second embodiment of the disclosure is indicated, if the first condition is satisfied, or if RLC control data (RLC status report) or PDCP control data (PDCP status report or ROHC feedback) for the source base station is generated, the PDCP layer device of the bearer may indicate, to a MAC layer device for a source base station, a data volume corresponding to RLC control data or PDCP control data, and may perform data transmission to the source base station or an RLC layer device for the source base station. However, as described in the disclosure, when the handover method (DAPS handover method) of the second embodiment of the disclosure is indicated or when the first condition is satisfied for a bearer for which the handover method (DAPS handover method) of the second embodiment of the disclosure is indicated, if RLC control data (RLC status report) or PDCP control data (PDCP status report or ROHC feedback) for the target base station is generated, the PDCP layer device of the bearer may indicate, to a MAC layer device for a target base station, a data volume corresponding to RLC control data or PDCP control data, and may perform data transmission to the target base station or an RLC layer device for the target base station. If the first condition is not satisfied, the PDCP layer device may indicate, to the MAC layer device for the source base station, the generated data (PDCP data PDU or PDCP control PDU) and a data volume corresponding to the data, and may perform data transmission to the source base station or the RLC layer device for the source base station. Therefore, upon receiving an indicator indicating that the first condition has been satisfied in the structure of the second PDCP layer device described for the bearer for which the DAPS handover method is configured, when indicating the data volume to the MAC layer device for the target base station, the second PDCP layer device may indicate, to the MAC layer device for the target base station, PDCP control data, RLC control data, or the data volume excluding the size of the data, which are to be transmitted to the bearer for the source base station or the MAC layer device for the source base station.

The PDCP layer device, which is connected to the AM DRB (RLC layer device operating in the AM mode) (all the previously stored PDCP PDUs are discarded (e.g., the PDCP SDUs are not discarded in order to prevent loss of original data)), may perform a new header compression procedure based on the header context for the target base station for data (PDCP SDUs in the buffer) in ascending order of the count value (or PDCP serial number) allocated before satisfying the first condition from the first data (e.g., PDCP SDU) for which successful transmission from lower layers (e.g., RLC layer device corresponding to the first bearer for the source base station) is not identified or before receiving the indicator indicating that the first condition is satisfied. In addition, the PDCP layer device, which is connected to the AM DRB, may perform the integrity procedure or ciphering procedure again by applying security keys for the target base station, configures the PDCP header, and transmit the PDCP header to the lower layer device (the RLC layer device of the second bearer for the target base station) to perform retransmission or transmission. That is, the PDCP layer device performs cumulative retransmission from the first data that has not been successfully transmitted. As another method, when performing the retransmission above, the PDCP layer device may perform retransmission only for data for which successful transmission from lower layers (e.g., RLC layer devices of the first bearer for the source base station) has not been identified. More specifically, the PDCP layer device, which is connected to the AM DRB (RLC layer device operating in the AM mode) (all the stored PDCP PDUs are discarded in order to transmit the same to the source base station through the first protocol layer device connected to the PDCP layer device (e.g., the PDCP SDUs are not discarded in order to prevent loss of original data)), newly performs a header or data compression procedure for only data (e.g. PDCP SDU) for which successful transmission is not identified from lower layers (e.g., RLC layer devices), which is the first protocol layer device for the source base station, by applying header compression (or data compression) protocol context or security key corresponding to the target base station based on the count value (or PDCP serial number) allocated before the first condition is satisfied or before receiving the indicator indicating that the first condition is satisfied, performs the integrity procedure or ciphering procedure again, configures the PDCP header, and transmits the PDCP header to the lower layer device (the RLC layer device of the second bearer for the target base station) to perform retransmission or transmission. That is, in order to prevent a waste of transmission resources, the PDCP layer device may perform selective retransmission only for data for which successful transmission has not been identified. As another method, the transmission or retransmission operation may be performed by releasing lower layers (e.g., a transmitting or receiving RLC layer device or a MAC layer device), which are first protocol layer devices for transmitting data to a source base station. If the transmission or retransmission procedure is extended to UM DRB, the PDCP layer device, which is connected to the RLC layer device operating in the UM mode, may: regard, as data received from higher layer devices or newly received data, data that has not yet been transmitted to the lower layer device, data for which the PDCP discard timer has not expired, or pieces of data that have already been assigned a PDCP serial number (or count value) to perform header (or data) compression for the pieces of data by using a header (or data) compression context or security key for the target base station without restarting the PDCP discard timer for each data; perform ciphering or integrity protection procedure therefor; generate and conjugate the PDCP header and performs transmission or retransmission thereof; process the data in ascending order of the count values allocated before the procedure is triggered; and perform transmission or retransmission thereof. In addition, the window state variable of the PDCP layer device connected to the UM DRB or AM DRB is not initialized, but is maintained and used as it is.

In the above, if there is data to be transmitted in the buffer, the PDCP layer device indicates, to the MAC layer device of the second bearer for the target base station, the size or quantity of data to be transmitted (e.g., PDCP data volume) to inform that there is data to be transmitted, and performs uplink data transmission switching to the target base station. Then, the MAC layer device of the second bearer for the target base station may perform a procedure of scheduling request or buffer status report to the target base station in order to receive allocation of uplink transmission resources.

For a bearer for which the second embodiment (or DAPS handover method) is indicated (or configured), when the first condition is satisfied, the UE may release configuration information or context for the data compression protocol for the source base station (for example, uplink data compression protocol). Alternatively, when the first condition is satisfied, the higher layer device (e.g., RRC layer device) of the UE may instruct the PDCP layer device to release configuration information or context for the data compression protocol (e.g., uplink data compression protocol) or reconfigure the same. However, for a bearer for which the second embodiment (or DAPS handover method) is not indicated (or configured), when the handover command message is received, the UE may release configuration information or context for a data compression protocol (e.g., uplink data compression (UDC) protocol). Alternatively, when a handover command message is received, the higher layer device (e.g., RRC layer device) of the UE may instruct the PDCP layer device to release configuration information or context for the data compression protocol (e.g., uplink data compression protocol) (for the source base station) or reconfigure the same. This is because, for a bearer for which the DAPS handover method is configured, data needs to be compressed by using the context or configuration information for the data compression protocol for the source base station until the first condition is satisfied and transmitted to the source base station.

When a DAPS handover method is configured for at least one bearer among bearers configured for the UE, or a DAPS handover method is configured for a predetermined bearer, if the first condition is satisfied or if an indicator indicating that the first condition is satisfied is received, the UE may perform one of the following methods for a bearer for which the DAPS handover method is not configured.

First method: If the first condition is satisfied, the higher layer device (for example, RRC layer device) of the UE may trigger or request a PDCP re-establishment procedure for a bearer or bearers for which the DAPS handover method is not configured (even if the target base station configures the PDCP re-establishment procedure for the bearer in the handover command message, the procedure may be performed when the first condition is satisfied). The PDCP layer device, which has received the request for the PDCP re-establishment procedure, may perform different PDCP re-establishment procedures for respective bearers. For example, for UM DRB, the PDCP layer device may initialize the window state variables, and may perform compression, ciphering, or integrity protection of data that has not yet been transmitted to the lower layer device or data for which the PDCP discard timer has not expired, based on the header (or data) compression context or security key of the target base station in ascending order of the count value, to perform transmission or retransmission thereof. In addition, the PDCP layer device may interrupt and initialize a reordering timer if the reordering timer is running, and may sequentially process received data (PDCP SDU or PDCP PDU) and transmit the same to the higher layer device. For AM DRB, the PDCP layer device may not initialize the window state variables, and may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, to perform transmission or retransmission thereof. The reason for performing the PDCP re-establishment procedure when the first condition is satisfied rather than performing the PDCP re-establishment procedure when the handover command message is received, for the bearer(s) for which the DAPS handover method is not configured, is that if the handover procedure to the target base station fails, the UE may perform fallback to the source base station, wherein, during fallback, in the PDCP re-establishment procedure, pieces of data, which are subjected to compressed based on the header (or data) compression context of the target base station and ciphered or integrity-protected based on the security key of the target base station, become useless and need to be discarded. In addition, when fallback is required, pieces of data, for which PDCP re-establishment procedure is performed again and to be transmitted to the bearers, need to be compressed based on the header (or data) compression context of the source base station, and ciphered or integrity-protected again based on the security key of the source base station. Thus, unnecessary processing occurs. Therefore, when the UE performs the DAPS handover method, for a bearer for which the DAPS handover method is not configured, the PDCP re-establishment procedure is not triggered or performed when the handover command message is received. The target base station may not configure the PDCP re-establishment procedure for the bearers through the handover command message, and when the first condition is satisfied, the target base station may trigger or perform the PDCP re-establishment procedure. In addition, the PDCP re-establishment procedure is not performed for the bearer for which the DAPS handover method is configured.

Second method: When a handover command message is received, the higher layer device (for example, RRC layer device) of the UE may trigger or request a PDCP re-establishment procedure for bearer(s) for which the DAPS handover method is not configured. The PDCP layer device, which has received the request for the PDCP re-establishment procedure, may perform different PDCP re-establishment procedures for respective bearers. For example, for UM DRB, the PDCP layer device may initialize the window state variables, and perform compression, ciphering, or integrity protection of data not yet transmitted to the lower layer device or data for which the PDCP discard timer has not expired, based on the header (or data) compression context or security key of the target base station in ascending order of the count value, to perform transmission or retransmission thereof. In addition, the PDCP layer device may interrupt and initialize a reordering timer if the reordering timer is running, and may sequentially process received data (PDCP SDU or PDCP PDU) and transmit the same to the higher layer device. For AM DRB, the PDCP layer device may not initialize the window state variables, and may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, to perform transmission or retransmission thereof. When a handover command message is received for the bearer(s) for which the DAPS handover method is not configured, the data is compressed based on the header (or data) compression context of the target base station and is ciphered and integrity-protected based on the security key of the target base station through the PDCP re-establishment procedure. Accordingly, if the UE fails to handover to the target base station (for example, if the first timer expires or wireless connection to the target base station fails), and fallback to the source base station is possible and thus fallback is performed, the base station needs to support the UE to discard pieces of data (e.g., PDCP PDUs), which are generated or processed for transmission to the target base station in the bearers, and to process again the pieces of data (for example, PDCP SDUs) based on the header (or data) compression context or security key for the source base station. Accordingly, the base station may request or indicate such that the higher layer device (e.g., RRC layer device) of the UE reconfigures, for the bearers for which the DAPS handover method is not indicated, an indication of discarding pieces of data (e.g., PDCP PDUs), which are processed based on configuration information (security key or header (or data) compression context) for the target base station, a PDCP re-establishment procedure, or configuration information (security key or header (or data) compression context) for the source base station; and generate or process again the data based on the source base station configuration information.

According to the second embodiment (for example, the DAPS handover method) of the efficient handover method of the disclosure, a UE can continuously receive downlink data from the source base station or the target base station through protocol layer devices of the first bearer for the source base station or the second bearer for the target base station, even after the UE receives a handover command message (for example, an RRCReconfiguration message). In addition, in order to smoothly receive downlink data from the source base station (or target base station) or to smoothly transmit the downlink data by the source base station (or target base station), the UE may allow, with respect to AM bearers, the RLC status report other than data to be continuously transmitted via uplink transmission to the source base station (or target base station) via uplink transmission through protocol layer devices of the first bearer (or second bearer). That is, even if the UE switches uplink data transmission to the target base station by satisfying the first condition as described above, when transmission of RLC status report, HARQ ACK, NACK, or PDCP control data (PDCP ROHC feedback or PDCP status report) to the source base station is required, data transmission may be allowed to be transmitted through a first bearer for the source base station. This is because, in the case of AM bearers, after transmitting data to the transmitting terminal, if successful transmission of the RLC status report is not indicated (i.e., if the RLC status report is not received), data cannot be continuously transmitted thereafter. Specifically, in the second embodiment of the efficient handover method of FIG. 28, even if the UE 2820 stops transmission of uplink data to the source base station through the protocol layer devices 2822 of the first bearer and switches to start transmission of uplink data to the target base station through the protocol layer devices 2821 of the second bearer because the first condition is satisfied in a third stage 2803, the UE may enable continuous transmission of HARQ ACK or HARQ NACK information, RLC status report (ACK or NACK information), or PDCP control data (for example, PDCP status report or ROHC feedback information) through the protocol layer devices of the first bearer (or the second bearer) so as to smoothly receive downlink data from the source base station (or target base station) or to enable the source base station (or target base station) to smoothly transmit downlink data. In addition, in the second embodiment of the efficient handover method of FIG. 28, even if the UE 2820 stops transmission of uplink data to the source base station through the protocol layer devices 2822 of the first bearer and switches to start transmission of uplink data to the target base station through the protocol layer devices 2821 of the second bearer because the first condition is satisfied in the third stage 2803, the UE may continuously perform data transmission due to HARQ retransmission of the MAC layer device or data transmission due to retransmission of RLC layer device in the AM mode in order to prevent data loss to the source base station. In the above, in the second embodiment of the efficient handover method of FIG. 28, if the UE 2820 stops transmission of uplink data to the source base station through the protocol layer devices 2822 of the first bearer and switches to start transmission of uplink data to the target base station through the protocol layer devices 2821 of the second bearer because the first condition is satisfied in the third stage 2803, the source base station or the target base station may divide time and accordingly allocate transmission resources to the UE so that the uplink transmission resource for the target base station and the uplink transmission resource for the source base station do not collide. If the uplink transmission resource for the target base station and the uplink transmission resource for the source base station collide and overlap, the UE may prioritize the uplink transmission resource for the source base station and perform data transmission to the source base station in order to maintain the downlink data transmission from the source base station or continuously receive the uplink transmission resource from the source base station without problems. As another method, if the uplink transmission resource for the target base station and the uplink transmission resource for the source base station collide and overlap, the UE may prioritize the uplink transmission resource for the target base station and perform data transmission to the target base station in order to maintain the downlink data transmission from the target base station.

Specifically, when a handover (for example, a DAPS handover) corresponding to the second embodiment of the disclosure is indicated when the UE receives a handover command message, or when the handover is indicated for each bearer, the UE or the bearer for which the DAPS handover is indicated may perform a scheduling request through the first protocol layer device and transmit a buffer status report to the source base station, before the first condition is satisfied, to receive uplink transmission resources and transmit uplink data, and receive downlink data from the source base station. However, if the first condition is satisfied, the UE no longer transmits data to the source base station and switches the uplink to perform a scheduling request through the second protocol layer device, and may transmit a buffer status report to the target base station, receive uplink transmission resources, and transmit uplink data to the target base station. However, the UE may continuously receive downlink data from the source base station, and even after uplink transmission switching, may continuously transmit HARQ ACK, HARQ NACK, RLC status report, or PDCP control data (e.g., PDCP status report or ROHC feedback information) corresponding to the downlink data. In addition, even if the first condition is satisfied, the UE may continue to receive downlink data from the source base station or the target base station.

In the second embodiment of the efficient handover method of FIG. 28, in fourth state 2804, if the UE 2820 satisfies the second condition, the UE may stop reception of downlink data from the source base station 2805 through the protocol layer devices 2822 of the first bearer or release a connection to the source base station. The second condition may be one of the following conditions. In addition, the PDCP layer device 2821 of the second bearer may continuously perform data transmission or reception to or from the target base station by using transmission or reception data, serial number information, or information such as header compression and decompression context, stored in the PDCP layer device 2822 of the first bearer.

When the UE performs a procedure of random access to the target base station through the layer devices 2821 of the second bearer and receives a random access response, it may be determined that the second condition is satisfied.

When the UE performs a procedure of random access to the target base station through the layer devices of the second bearer, receives a random access response, configures and transmits a handover completion message to the target base station, it may be determined that the second condition is satisfied.

When the UE completes a procedure of random access to the target base station through the layer devices of the second bearer and transmits data for the first time to the PUCCH or PUSCH uplink transmission resource, or when the PUCCH or PUSCH uplink transmission resource is initially received, it may be determined that the second condition is satisfied.

The base station may set a separate timer for the UE through an RRC message, and when the timer expires, it may be determined that the second condition is satisfied.

The timer may be started when the UE has received a handover command message from the source base station, starts random access to the target base station (when the UE transmits a preamble), receives a random access response from the target base station, transmits a handover completion message to the target base station, or initially transmits data to a PUCCH or PUSCH uplink transmission resource.

When the UE performs a procedure of random access to the target base station through the layer devices of the second bearer, receives a random access response, and configures and transmits a handover completion message to the target base station, and then successful transmission of the handover completion message is identified by the MAC layer device (HARQ ACK) or the RLC layer device (RLC ACK), it may be determined that the second condition has been satisfied.

When the UE performs a procedure of random access to the target base station through the layer devices of the second bearer, receives a random access response, and configures and transmits a handover completion message to the target base station, and then initially receives an allocation of the uplink transmission resource from the target base station or initially receives an indication of the uplink transmission resource, it may be determined that the second condition has been satisfied.

When the source base station performs the efficient handover of the disclosure, there may be determined a time when downlink data transmission to the UE is stopped or a time when the connection with the UE is released. For example, the time may be determined by using a predetermined method (e.g., when a predetermined timer expires (the timer may be started after performing a handover indication) or when an indication indicating that the UE has successfully performed a handover to the target base station is received, from the target base station, by the source base station). In addition, if the downlink data is not received from the source base station for a predetermined period of time, the UE may determine that the second condition is satisfied, and may determine that the connection with the source base station is released and release the connection.

When the UE receives an indicator (for example, an RRC message (for example, RRCReconfiguration message) indicating to release the connection with the source base station from the target base station, a MAC CE, RLC control PDU, or PDCP control PDU, it may be determined that the second condition is satisfied.

If the UE does not receive downlink data from the source base station for a predetermined time, it may be determined that the second condition is satisfied.

When the UE successfully completes the procedure of random access to the target base station through the layer devices (for example, the MAC layer device) of the second bearer or the UE successfully completes the procedure of random access to the target base station through the layer devices of the second bearer and receives an allocation of the first uplink transmission resource from the target base station or when the uplink transmission resource is first indicated to the UE, it may be determined that the second condition is satisfied.

For example, more specifically, when the UE receives a handover command message from the source base station and receives an indication to perform random access to the target base station, if the received random access is a CFRA (for example, if a pre-designated preamble or UE cell identifier (for example, C-RNTI) is assigned), Since the random access procedure may be determined as being successfully completed when the UE transmits a pre-designated preamble to the cell of the target base station and receives a random access response (RAR) message, when the first uplink transmission resource, which is assigned, included, or indicated through the random access response message, is received, it may be determined that the second condition is satisfied. As another method, it may be determined that the second condition is satisfied when an uplink transmission resource is received for the first time after reception of the RAR.

If the UE receives a handover command message from the source base station and receives an indication to perform random access to the target base station, if the commanded random access is a CBRA (for example, if a pre-designated preamble or UE cell identifier (e.g., C-RNTI) is not assigned), when the UE transmits a preamble (e.g., a random preamble) to the cell of the target base station, receives a random access response (RAR) message, transmits message 3 (e.g., a handover complete message) by using the uplink transmission resource allocated, included or indicated through the random access response message, receives a contention resolution MAC CE indicating that contention has been resolved through message 4 from the target base station, or receives the uplink transmission resource through the PDCCH corresponding to the RNTI, the UE may identify that the procedure of random access to the target base station has been successfully completed. Accordingly, it is determined that the second condition is satisfied when the UE monitors the PDCCH and thus receives the uplink transmission resource for the first time through the PDCCH corresponding to the C-RNTI of the UE or receives an indication thereof. As another method, if the size of the uplink transmission resource allocated through the random access response message is sufficient to transmit message 3 and the UE can additionally transmit uplink data, it may be determined that the uplink transmission resource is received for the first time and that the second condition is satisfied. That is, when RAR is received, it may be determined that the uplink transmission resource is received for the first time and that the second condition is satisfied.

If a handover method that does not require a random access procedure (RACH-less handover) is also indicated through the handover command message received by the UE, If the handover command message includes uplink transmission resources for the target base station, When the UE transmits message 3 (e.g., a handover complete message or an RRCReconfigurationComplete message) to an uplink transmission resource of the target base station, receives a UE identity confirmation MAC CE through message 4 from the base station, or receives the uplink transmission resource through the PDCCH corresponding to the C-RNTI of the UE, it may be determined that the random access procedure has been successfully completed and that the second condition may be satisfied. As another method, it may be determined that the second condition is satisfied when the first uplink transmission resource is received through the PDCCH corresponding to the C-RNTI of the UE by monitoring the PDCCH after the random access procedure is successfully completed.

If the handover command message does not contain uplink transmission resources for the target base station, It may be determined that the random access procedure is successfully completed and that the second condition is satisfied when the UE receives the uplink transmission resource through the PDCCH corresponding to the C-RNTI of the UE by monitoring the PDCCH for the target base station (or cell), transmits message 3 (e. g., handover completion message or RRCReconfigurationComplete message) to the uplink transmission resource, receives UE identity confirmation MAC CE from the base station, or receives the uplink transmission resource through the PDCCH corresponding to the C-RNTI of the UE. As another method, it may be determined that the second condition is satisfied when the first uplink transmission resource is received through the PDCCH corresponding to the C-RNTI of the UE by monitoring the PDCCH after the random access procedure is successfully completed.

In the above, when the UE performs the second embodiment (for example, the DAPS handover method) of the efficient handover method of the disclosure, if it is identified that the RRC layer device, the MAC layer device, or the RLC layer device of the first bearer for the source base station of the UE, or the RRC layer device, the MAC layer device, or the RLC layer device of the second bearer for the target base station satisfy a second condition described in the disclosure, the higher layer or lower layer device may transmit an indicator indicating that the second condition is satisfied to the PDCP layer device of the UE or bearer for performing the DAPS handover method. If the PDCP layer device of the UE receives an indicator indicating that the second condition is satisfied from a lower layer device or a higher layer device, or if the second condition is satisfied, one or more of the procedures, which will be described in the following, may be performed for the bearer or the UE for which the DAPS handover method is configured, to successfully complete the second embodiment of the efficient handover method of the disclosure.

The UE may release the first bearer for the source base station and release the connection with the source base station. In addition, before releasing the first bearer for the source base station, the UE may perform an RLC re-establishment procedure for an RLC layer device corresponding to the first bearer for the source base station (for example, if the reordering timer is running, the timer is paused or initialized, and if the received data is stored in the buffer, the stored data may be processed and transmitted to the higher layer device, and if the data to be transmitted is in the buffer, data may be discarded) or the MAC layer device may be initialized.

When the UE disconnects from the source base station, the UE may trigger a PDCP status reporting procedure and configure a PDCP status report to transmit the PDCP status report to the target base station, in order to report the reception status of downlink data, received from the source base station, to the target base station.

If the second condition is satisfied, the UE may switch the structure or function 2920 of the second PDCP layer device to the structure or function 2911 or 2912 of the first PDCP layer device of the disclosure for each bearer or for a bearer for which the DAPS handover method is indicated, may initialize variables for realignment, and may interrupt and initialize a reordering timer. In addition, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the UE may transmit the processed data to the higher layer in ascending order. That is, in the above case, when the second condition is satisfied, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In another method, if the second condition is satisfied, the UE may switch the structure or function 2920 of the second PDCP layer device to the structure or function 2930 of the third PDCP layer device of the disclosure for each bearer or for a bearer for which the DAPS handover method is indicated, and may use variables for realignment and a reordering timer as they are without stopping and initializing. However, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In addition, the UE may transmit the processed data to the higher layer in ascending order. That is, in the above case, when the second condition is satisfied, the UE may perform a deciphering procedure or header (or data) decompression for pieces of data stored in a buffer for realignment (e.g., for pieces of data received from the source base station), by applying a security key or header decompression context for the source base station, and then may discard the security key or header decompression context for the source base station. In the above, the UE may release QoS mapping information of the SDAP layer device for the source base station, the security key information for the source base station of the PDCP layer device, the header (or data) compression context information for the source base station, or the RLC layer device or MAC layer device for the source base station. In the above, switching the structure or function 2920 of the second PDCP layer device to the structure or function of the first PDCP layer device of the disclosure for each bearer or for a bearer for which the DAPS handover method is indicated may denote that the PDCP layer device is reconfigured, and may be performed when a reconfiguration indicator of the PDCP layer device is received from a higher layer device (e.g., an RRC layer device). For example, the UE receives the handover command message and the higher layer device (for example, the RRC layer device) transmits the PDCP layer device reconfiguration indicator to the PDCP layer device of the bearer for the bearer for which the DAPS handover method is configured, and thus the structure or function of the first PDCP layer device may be reconfigured to the structure or function of the second PDCP layer device. In addition, if the second condition is satisfied, the higher layer device (e.g., RRC layer device) may transmit the PDCP layer device reconfiguration indicator to the PDCP layer device of the bearer to reconfigure the structure or function of the second PDCP layer device to be the structure or function of the first PDCP layer device. For example, whenever the PDCP layer device reconfiguration indicator is received from a higher layer device (for example, an RRC layer device) by using a toggle scheme, the PDCP layer device of the bearer may reconfigure the structure or function of the first PDCP layer device to be the structure or function of the second PDCP layer device, or may reconfigure the structure or function of the second PDCP layer device to be the structure or function of the first PDCP layer device.

When the second condition described in this disclosure is satisfied while performing the DAPS handover method of the disclosure, the UE may release the first bearers for the source base station and switch the structure and function 3020 of the second SDAP layer device, which is being applied to each bearer or a bearer for which the DAPS handover method is indicated, to the structure and function 3010 of the first SDAP layer device and apply the same. In addition, if the second condition is satisfied, the UE may switch the structure or function 3020 of the second PDCP layer device to the structure or function 3010 of the first PDCP layer device of the disclosure for each bearer or for a bearer for which the DAPS handover method is indicated, and may maintain mapping information between second a QoS flow and a bearer and a second bearer for the target base station. In addition, the UE may release mapping information of a first QoS flow and a bearer or a first bearer for the source base station after completing data processing by applying the mapping information of the first QoS flow and a bearer to pieces of data received from the source base station (for example, all pieces of data received from the source base station) before releasing the mapping information of the first QoS flow and a bearer or the first bearer for the source base station. In addition, the UE may transmit the processed data to a higher layer in ascending order. That is, in the above, when the second condition is satisfied, the UE may process pieces of data stored in the buffer (for example, all pieces of data received from the source base station) by applying the mapping information of the first QoS flow and a bearer for the source base station (e.g., a procedure of reading SDAP header information and updating mapping information, configuring SDAP header, or routing or transmitting to a suitable higher layer device or lower layer device based on the mapping information of the first QoS flow and a bearer), and then may discard the mapping information of the first QoS flow and bearer for the source base station. In the above, the SDAP layer device may define and apply a 1-bit indicator of a new SDAP header, a 1-bit indicator of a PDCP header, SDAP control data (for example, a downlink end marker), or information indicated by a PDCP layer device, and may identify last data received from the source base station based on the defined information. Therefore, after performing data processing by applying the mapping information of the first QoS flow and the bearer for the source base station to the last data received from the source base station, the UE may discard the mapping information between the first QoS flow and the bearer for the source base station. In addition, in the above, the SDAP layer device may continuously maintain the mapping information between the second QoS flow and the bearer and process uplink data or downlink data transmission to the target base station based on the mapping information.

The UE may initialize the MAC layer device for the source base station, and may perform an RLC layer device re-establishment procedure or a release procedure for the RLC layer device for the source base station in the second PDCP layer device structure when converting the second PDCP layer device structure of the bearer for which the DAPS handover method is configured to the first PDCP layer device structure.

In the disclosure, when the second condition is satisfied or an indicator indicating that the second condition is satisfied has been received from a higher layer device (e.g., an RRC layer device) or a lower layer device (e.g., a MAC layer device), the procedure for re-establishing or releasing the RLC layer device of the first bearer for the source base station by the UE may follow one of the following methods in detail.

First method: If an RLC layer device of a first bearer for the source base station is an LTE RLC layer device for a bearer for which the DAPS handover method is configured in the above, a higher layer device (for example, an RRC layer device) may instruct the LTE RLC layer device to perform a re-establishment procedure. Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the RLC layer device may initialize variables and discard pieces of data for transmission. Then, the higher layer device (e.g., the RRC layer device) may indicate to release the LTE RLC layer device. However, if the RLC layer device of the first bearer for the source base station is an NR RLC layer device, the higher layer device (e.g., the RRC layer device) may indicate to release the NR RLC layer device directly without re-establishing the same. This is because the NR RLC layer device always performs out-of-sequence transmission and thus there is no stored data, and even if there is stored data, the data is divided data and thus there is no problem even if it is discarded as it is. Different procedures may be applied according to an RLC layer device configured for each bearer as described above.

Second method: If an RLC layer device of a first bearer for the source base station is an LTE RLC layer device for a bearer for which the DAPS handover method is configured in the above, a higher layer device (for example, an RRC layer device) may instruct the LTE RLC layer device to perform a re-establishment procedure. Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. Alternatively, the higher layer device (e.g., the RRC layer device) may release the LTE RLC layer device. However, if the RLC layer device of the first bearer for the source base station is an NR RLC layer device, the higher layer device (e.g., the RRC layer device) may indicate to release the NR RLC layer device directly without re-establishing the same. This is because the NR RLC layer device always performs out-of-sequence transmission and thus there is no stored data, and even if there is stored data, the data is divided data and thus there is no problem even if it is discarded as it is. Different procedures may be applied according to an RLC layer device configured for each bearer as described above.

Third method: If an RLC layer device of a first bearer for the source base station is an LTE RLC layer device for a bearer for which the DAPS handover method is configured in the above, a target base station may, when transmitting an RRC message (e.g., RRCReconfiguration) including an indicator to release the connection with the source base station or the first bearer for the base station to the UE, include an indicator (e.g., reestablishRLC) indicating re-establishment of the LTE RLC layer device in configuration information (e.g., RLC-config) of the LTE RLC layer device for the bearer in the RRC message and transmit the same (or may include an indicator to release the LTE RLC layer device). Therefore, upon receiving an indication to release the connection with the source base station or satisfying the second condition, the higher layer device (for example, the RRC layer device) may read the RRC message, and may indicate to perform a re-establishment procedure for the LTE RLC layer device according to the indication of the LTE RLC re-establishment procedure (or release). Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the LTE RLC layer device may initialize variables and discard pieces of data for transmission. Then, the higher layer device (for example, the RRC layer device) may release the LTE RLC layer device. If an RLC layer device of a first bearer for the source base station is an LTE RLC layer device for a bearer for which the DAPS handover method is configured in the above, the target base station may, when transmitting an RRC message (e.g., RRCReconfiguration) including an indicator to release the connection with the source base station or the first bearer for the source base station to the UE, include an indicator indicating release of the NR RLC layer device in configuration information (e.g., RLC-config) of the NR RLC layer device for the bearer in the RRC message and transmit the same. As described above, the target base station may indicate different procedures according to an RLC layer device configured for each bearer through the RRC message, and accordingly, the UE may apply a procedure to each bearer.

Fourth method: If an RLC layer device of a first bearer for the source base station is an LTE RLC layer device for a bearer for which the DAPS handover method is configured in the above, a target base station may, when transmitting an RRC message (e.g., RRCReconfiguration) including an indicator to release the connection with the source base station or the first bearer for the base station to the UE, include an indicator (e.g., reestablishRLC) indicating re-establishment of the LTE RLC layer device in configuration information (e.g., RLC-config) of the LTE RLC layer device for the bearer in the RRC message and transmit the same (or may include an indicator to release the LTE RLC layer device). Therefore, upon receiving an indication to release the connection with the source base station or satisfying the second condition, the higher layer device (for example, the RRC layer device) may read the RRC message, and may indicate to perform a re-establishment procedure for the LTE RLC layer device according to the indication of the LTE RLC re-establishment procedure (or release). Specifically, if the reordering timer is running, the LTE RLC layer device may stop or initialize the timer, and if there is stored data, the LTE RLC layer device may process the stored data and transmit the processed data to a higher layer device, to reduce transmission delay due to the reordering timer. In addition, the RLC layer device may initialize variables and discard pieces of data for transmission. Alternatively, the higher layer device (e.g., the RRC layer device) may release the LTE RLC layer device. If an RLC layer device of a first bearer for the source base station is an NR RLC layer device for a bearer for which the DAPS handover method is configured in the above, the target base station may, when transmitting an RRC message (e.g., RRCReconfiguration) including an indicator to release the connection with the source base station or the first bearer for the source base station to the UE, include an indicator indicating release of the NR RLC layer device for the bearer or re-establishment of the NR RLC layer device in the RRC message and transmit the same. As described above, the target base station may indicate different procedures according to an RLC layer device configured for each bearer through the RRC message, and accordingly, the UE may apply a procedure to each bearer.

The receiving PDCP layer device may process or store the data received due to the re-establishment procedure of the lower layer device (e.g., RLC layer device), and for UM DRBs, a header decompression procedure may be performed on the stored data (received from the source base station) or all stored data, based on header compression context (ROHC or Ethernet header compression (EHC)) (for the source base station).

The receiving PDCP layer device may process or store the data received due to the re-establishment procedure of the lower layer device (e.g., RLC layer device), and for AM DRBs, a header decompression procedure may be performed on the stored data (received from the source base station) or all stored data, based on header compression context (ROHC or Ethernet header compression (EHC)) (for the source base station).

As another method, the receiving PDCP layer device may process or store the data received due to the re-establishment procedure of the lower layer device (e.g., the RLC layer device), and for UM DRBs or AM DRBs, if an indicator (drb-Continue ROHC or drb-Continue Ethernet header compression (EHC)) indicating that continued use of the header compression context is not configured, a header decompression procedure may be performed on the stored data (received from the source base station) or all stored data, based on header compression context (ROHC or Ethernet header compression (EHC)).

After performing the above procedure, the transmitting or receiving PDCP layer device may discard or release the security key or header compression contexts for the source base station.

In FIG. 26 of the disclosure, when transmitting a handover command message 2620 to the UE, the base station may define indicators for the embodiments of the disclosure in the handover command message (e.g., RRCReconfiguration message), and may indicate, to the UE, whether to trigger a handover procedure corresponding to an embodiment. In addition, the UE may perform a handover procedure according to a handover method indicated through the handover command message, and, for example, the UE may perform the second embodiment of the efficient handover method (DAPS handover method) of the disclosure, so as to perform a handover to a target base station while minimizing a data interruption time. As another method, the base station may define an indicator, for the embodiments of the disclosure, for each bearer, through the handover command message, and may more specifically indicate a bearer to which an embodiment is applied during a handover. For example, the base station may indicate to apply the second embodiment of the disclosure to an AM bearer only in which an RLC layer device operating in the AM mode operates, or an indication may be extended and applied to a UM bearer in which an RLC layer device operating in the UM mode operates. In addition, it is assumed that the embodiments of the disclosure are applied to DRB. However, if necessary (for example, in a case where the UE maintains the SRB for the source base station and fails to handover to the target base station, and thus may report or restore the handover failure message to the SRB for the source base station), the embodiments of the disclosure may be extended and applied to the SRB.

In the embodiments of the disclosure, when a UE performs data transmission or reception to or from a source base station through protocol layer devices of a first bearer, and performs data transmission or reception to or from a target base station through protocol layer devices of a second bearer, the MAC layer device of the first bearer and the MAC layer device of the second bearer operate a separate discontinuous reception (DRX) cycle to reduce battery consumption of the UE. That is, the UE may continuously apply the DRX cycle of the MAC layer device, applied when transmitting or receiving data through the protocol layer devices of the first bearer, even after receiving the handover command message, and may stop the DRX cycle according to the first condition or the second condition of the disclosure. In addition, the UE may separately apply the DRX cycle to the MAC layer device of the second bearer according to the instruction of the target base station.

In addition, in the disclosure, the UE stops uplink transmission to the source base station through the protocol layer devices of the first bearer and stops receiving downlink data from the source base station, and denotes that the UE reestablishes, initializes, or releases protocol layer devices of the first bearer (PHY layer device, MAC layer device, RLC layer device, or PDCP layer device).

In the embodiments of the disclosure, for convenience of description, it has been described that the UE is configured with a first bearer for the source base station or a second bearer for the target base station, and it may be easily extended and applied equally to a case in which the UE is configured with a plurality of first bearers for the source base station or a plurality of second bearers for the target base station. As another method, it may be easily extended and applied equally to a case in which a plurality of bearers for a plurality of target base stations are configured. For example, the UE may perform a procedure of handover to a first target base station and configure the second bearers. If handover fails, the UE may perform a procedure of handover to a second target base station and configure the second bearers, and thus the UE may search for and determine a cell satisfying a predetermined condition (e.g., having a value equal to or greater than a predetermined signal strength) among a plurality of target base stations by itself, and may determine one cell to perform a handover procedure.

Figure 29A:
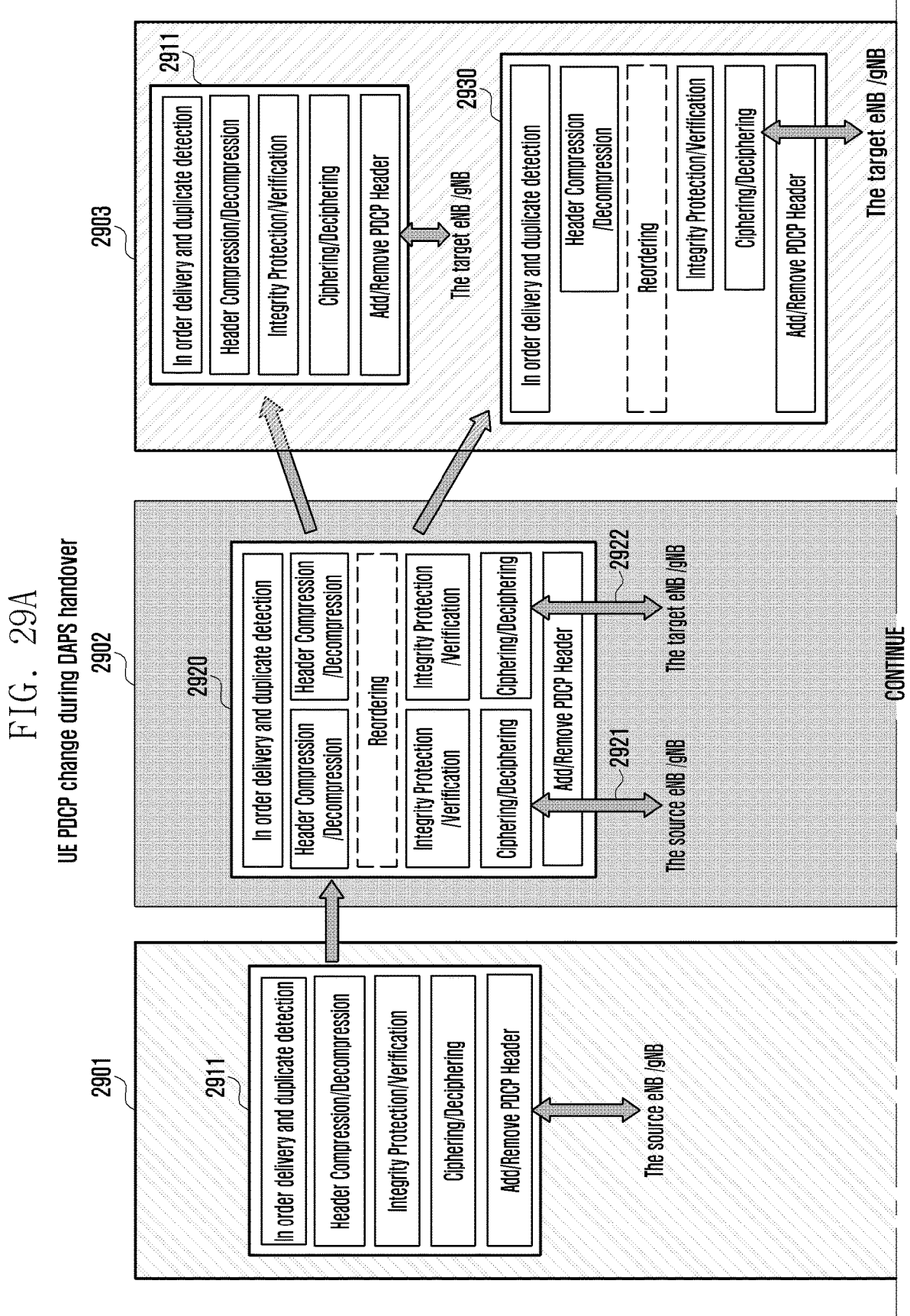
Figure 29B:
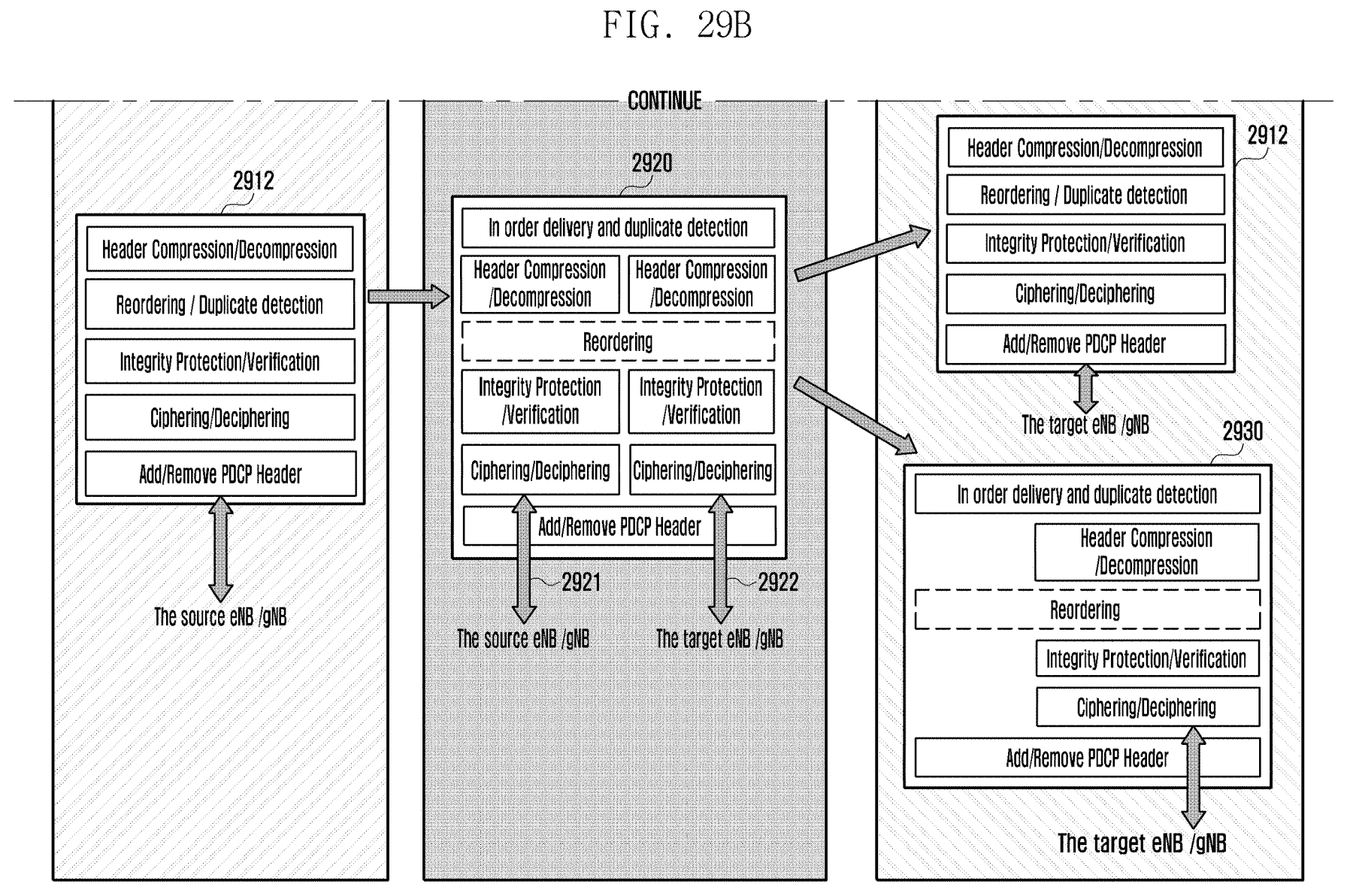

FIGS. 29A and 29B are diagrams illustrating the structures of an efficient PDCP layer device applied in a DAPS handover method of an efficient handover method applied to a second embodiment of the disclosure, and a method for applying the structures.

Referring to FIGS. 29A and 29B, they propose detailed the structures and functions of an efficient PDCP layer device applied in a DAPS handover method, which is a second embodiment of an efficient handover method of the disclosure, and may apply different structures of the PDCP layer device of the following to each bearer at different time points while performing the DAPS handover procedure.

For example, before receiving the handover command message from the base station, the UE may process data by applying the structure and functions 2911 or 2912 of the first PDCP layer device of this disclosure for each bearer and transmit or receive the same (indicated by reference numeral 2901).

However, if the UE receives the handover command message from the base station, indicates the DAPS handover method of this disclosure through the handover command message, or indicates the DAPS handover method for specific bearers, the UE may process data by applying the structure and functions 2920 of the second PDCP layer device of the disclosure, for each bearer or for bearers for which the DAPS handover method is indicated above, and transmit or receive the same (indicated by reference numeral 2902). That is, when the handover command message is received and the handover command message indicates the DAPS handover method of this disclosure, or the DAPS handover method is indicated for specific bearers, the UE may switch, for each bearer or for bearers for which the DAPS handover method is indicated, from the structure or functions 2911 or 2912 of the first PDCP layer device used for each bearer to the structure or functions 2920 of the second PDCP layer device of the disclosure. In another method, when the first condition described in the disclosure is satisfied, the UE may switch, for each bearer or for bearers for which the DAPS handover method is indicated, from the structure or functions 2911 or 2912 of the first PDCP layer device used for each bearer to the structure or functions 2920 of the second PDCP layer device of the disclosure (indicated by reference numeral 2902). In addition, when the UE receives the handover command message, indicates the DAPS handover method of this disclosure through the handover command message, or indicates the DAPS handover method for specific bearers, or when the PDCP reordering timer value is newly configured, the UE updates parameters of reordering to a PDCP serial number or count value expected to be received next, and stops and restarts the reordering timer in a case where the UE may switch, for each bearer or for bearers for which the DAPS handover method is indicated, from the structure or functions 2911 or 2912 of the first PDCP layer device to the structure or functions 2920 of the second PDCP layer device of the disclosure.

In addition, the UE performs the DAPS handover method of the disclosure, and if the second condition described in the disclosure is satisfied, the UE may switch again and apply to the structure or functions 2911 or 2912 of the first PDCP layer device by releasing the first bearers for the source base station from the structure or functions 2920 of the second PDCP layer device, which are applied for each bearer or for bearers for which the DAPS handover method is indicated. In addition, when the second condition described in the disclosure is satisfied, and the UE switches, for each bearer or for bearers for which the DAPS handover method is indicated, from the structure or functions 2920 of the second PDCP layer device to the structure or functions 2911 or 2912 of the first PDCP layer device of the disclosure, the UE may initialize variables for reordering, interrupt and initialize the reordering timer. In addition, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station. In addition, the UE may transmit the processed data to the higher layer in ascending order. That is, in the above case, when the second condition is satisfied, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station.

As another method, the UE performs the DAPS handover method of the disclosure, and if the second condition described in the disclosure is satisfied, the UE may switch again and apply to the structure or function 2930 of the third PDCP layer device by releasing bearers for the source base station from the structure or functions 2920 of the second PDCP layer device, which are applied for each bearer or for bearers for which the DAPS handover method is indicated. In addition, when the second condition described in the disclosure is satisfied, and the UE switches, for each bearer or for bearers for which the DAPS handover method is indicated, from the structure or functions 2920 of the second PDCP layer device to the structure or functions 2930 of the third PDCP layer device of the disclosure, the UE may use variables for reordering and the reordering timer as they are without stopping or initializing the same. However, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station. In addition, the processed data may be transmitted to the higher layer in ascending order. That is, in the above case, when the second condition is satisfied, the UE may perform a deciphering procedure or header (or data) decompression by applying a security key or header decompression context for the source base station to pieces of data stored in the buffer for reordering (e.g., for data received from the source base station) and then discard the security key or header decompression context for the source base station.

As suggested in FIGS. 29A and 29B of the disclosure above, when the UE performs handover by applying the structure and function 2911 or 2912 of the first PDCP layer device, the structure and function 2920 of the second PDCP layer device, or the structure and function 2930 of the third PDCP layer device which are different for each bearer at different time points, there is no data loss and a data interruption time can be minimized.

The structure 2911 or 2912 of the first PDCP layer device of FIGS. 29A and 29B may have a (1-1)th PDCP layer device structure, a (1-2)th PDCP layer device structure, a (1-3)th PDCP layer device structure, or a (1-4)th PDCP layer device structure, which will be described later, and may have the following characteristics.

1> (In the case of the (1-1)th PDCP layer device structure) for example, if a UE applies the structure and function 2911 of the first PDCP layer device to a PDCP layer device (e.g., E-UTRA PDCP layer device or an LTE PDCP layer device) connected to an AM RLC layer device (e.g., E-UTRA AM RLC layer device), the structure may have the following characteristics.

2> The receiving PDCP layer device may first detect data outside the window or detect duplicate data of the received data. (Since there is retransmission for the RLC AM, and the size of the LTE RLC SN and the PDCP SN may be different, duplicated data or data outside the window may be received. The window indicates a range of PDCP serial numbers or a count value in which valid data is received.)

3> The UE performs a deciphering procedure and a header decompression procedure for the data outside the window or duplicate data before discarding the same, and then discards the data. (Because the data may include useful information for the header decompression procedure (for example, IR packet or header compression information), the UE may identify and discard the data.)

2> Data received without being discarded are deciphered directly without sequencing data and a header decompression procedure thereon is performed. This is because the E-UTRA AM RLC layer device arranges data in sequence and transmits the same to the PDCP layer device.

2> In addition, when transmitting the data to the higher layer, the UE transmits the data in ascending order of the count value.

1> (In the case of the structure of the (1-2)th PDCP layer device) For example, if a UE applies the structure and function 2911 of the first PDCP layer device to a PDCP layer device (e.g., E-UTRA PDCP layer device or an LTE PDCP layer device) connected to a UM RLC layer device (e.g., E-UTRA UM RLC layer device), the structure may have the following characteristics.

2> A procedure of detecting data outside the window or detecting duplicate data is not performed. This is because the UM E-UTRA RLC layer device does not perform a retransmission procedure.

2> In addition, a deciphering procedure is directly performed for the received data and a header decompression procedure thereof is performed.

2> Then, the data can be transmitted directly to the higher layer (for example, in ascending order) after the reordering procedure.

1> (In the case of the structure of the (1-3)th PDCP layer device) For example, if a UE applies the structure and function 2911 of the first PDCP layer device to a PDCP layer device (e.g., E-UTRA PDCP layer device or an LTE PDCP layer device) in which a split bearer, a packet duplication bearer, or an LTE-wireless local area network (WLAN) aggregation (LWA) bearer are configured, a reordering procedure and a reordering timer are always applied thereto, and the structure may have the following characteristics:

2> It may be characterized by first detecting data outside the window or duplicate data with respect to the received data. (This is because data may be received at different times from different RLC layer devices or RLC AM retransmission, and data outside the window or duplicate data may be received because the sizes of the LTE RLC SN and the PDCP SN may be different.)

3> A deciphering procedure is performed. However, a header compression decompression procedure is not performed. (Because it is impossible for E-UTRA PDCP to set a header compression protocol for a split bearer or LWQ bearer)

3> If integrity protection or a verification procedure has been performed, the data subject to the procedure is discarded. If the integrity verification procedure fails, the data may be discarded and reported to a higher layer device.

3> Data outside the window or duplicate data is discarded.

2> If the data is not discarded, it may be characterized in that the deciphering procedure is directly performed without sequencing of the received data. In addition, when integrity protection or a verification procedure is configured, integrity verification is performed. If the integrity protection or verification procedure for the data has been performed, the data is discarded. If the integrity verification procedure fails, the data may be discarded and reported to a higher layer device.

2> In addition, if the received data is arranged in sequence, and if the data is sequentially arranged in ascending order without gaps in the PDCP serial number or count value, and the header compression procedure is performed (in a case where the header compression procedure or the decompression procedure is configured), it may be characterized in that data is transmitted to the higher layer in ascending order.

2> If the reordering timer is running

3> If data corresponding to the count value, which is the same value as the value obtained by subtracting 1 from a value maintained by a variable for reordering, is transmitted to the higher layer device, or if all the data is transmitted to the higher layer without a gap in the PDCP serial number (or count value)

4> The reordering timer is interrupted and initialized.

2> If the reordering timer is not running

3> If there is data stored in the buffer without being transmitted to the higher layer device, or if there is a gap in the PDCP serial number (or count value)

4> The reordering timer is started.

4> In addition, the variable for reordering is updated with the PDCP serial number or count value that is expected to be received next.

2> If the reordering timer has expired

3> If the header decompression procedure is configured for stored data in ascending order of the PDCP serial number or count value for a value smaller than the reordering variable value, the header decompression procedure is performed for the stored data and the data is transmitted to the higher layer device.

3> If the header decompression procedure is successively configured for the stored data in ascending order of the PDCP serial number or count value for values equal to or greater than reordering variable values, the header decompression procedure is performed for the stored data and the data is transmitted to the higher layer device.

3> Then, the variable value of the data last transmitted to the higher layer is updated with the PDCP serial number or count value of the last transmitted data.

3> If there is data stored in the buffer without being transmitted to the higher layer device, or if there is a gap in the PDCP serial number (or count value)

4> The reordering timer is started.

4> In addition, the variable for reordering is updated with the PDCP serial number or count value that is expected to be received next.

1> (In the case of the structure of the (1-4)th PDCP layer device) For example, if the UE applies the structure and function 2912 of the first PDCP layer device to the NR PDCP layer device, the reordering procedure and reordering timer are always applied and may have the following characteristics.

2> It may be characterized by first performing a deciphering procedure for the received data.

2> When an integrity protection or verification procedure is configured, an integrity protection or verification procedure is performed on the received data, and if the integrity verification procedure fails, the data may be discarded and reported to a higher layer device.

2> Data outside the window or duplicate data with respect to the received data may be detected. (It may be characterized in that data outside the window or redundant detection is performed after performing the deciphering procedure above. According to another method, detection of data outside the window or detection of duplicate data is performed after performing a deciphering procedure only when the integrity protection or verification procedure is configured. In addition, if the integrity protection or verification procedure is not configured, a deciphering procedure can be performed only for data that is not discarded after performing detection of data outside the window or detection of duplicate data.)

3> Data outside the window or duplicated data is discarded.

2> If the data is not discarded above, sequencing for the received data is performed, and if the data is sequentially arranged in ascending order without gaps in the PDCP serial number or count value, the header compression procedure is performed (in a case where the header compression procedure or header decompression procedure is configured) and data may be transmitted to a higher layer in ascending order.

2> In addition, when transmitting data to the higher layer, the count value is transmitted in ascending order.

2> If the reordering timer is running

3> If data corresponding to the count value, which is the same value as the value obtained by subtracting 1 from a value maintained by a variable for reordering, is transmitted to the higher layer device, if all the data is transmitted to the higher layer without a gap in the PDCP serial number (or count value), or if the value of the variable storing the PDCP serial number or count value of the data to be transmitted to the higher layer is greater than or equal to the value of the variable for reordering 4> The reordering timer is interrupted and initialized.

2> If the reordering timer is not running

3> If there is data stored in the buffer without being transmitted to the higher layer device, if there is a gap in the PDCP serial number (or count value), or if the value of the variable storing the count value of first, which is not transmitted to the higher layer, is smaller than the value of the variable for reordering 4> In addition, the variable for reordering is updated with the PDCP serial number or count value that is expected to be received next.

4> The reordering timer is started.

2> If the reordering timer has expired

3> If the header compression decompression procedure is configured for stored data in ascending order of the PDCP serial number or count value for a value smaller than the reordering variable value, the header decompression procedure for the stored data is performed and the data is transmitted to the higher layer device.

3> If the header decompression procedure is successively configured for the stored data in ascending order of the PDCP serial number or count value for values equal to or greater than the reordering variable value, the header decompression procedure for the stored data is performed and the data is transmitted to the higher layer device.

3> Then, the variable value of the first data not transmitted to the higher layer is updated with the PDCP serial number or count value of the first data not transmitted to the higher layer.

3> If there is data stored in the buffer without being transmitted to the higher layer device, if there is a gap in the PDCP serial number (or count value), or if the value of variable that stores the count value of the first data that has not been transmitted to the higher layer is smaller than the value of variable for reordering 4> In addition, the variable for reordering is updated with the PDCP serial number or count value that is expected to be received next.

4> The reordering timer is started.

The structure 2920 of the second PDCP layer device of FIGS. 29A and 29B may have the following (2-1)th PDCP layer device structure or the (2-2)th PDCP layer device structure 2-2 of the disclosure, and may have the following characteristics.

The disclosure proposes the structure of a second PDCP layer device that is efficient in handover, as shown in reference numeral 2920. The structure of the second PDCP layer device may be applied to the second embodiment of an efficient handover method for minimizing a data interruption time, of the disclosure.

In the second PDCP layer device structure, the UE may perform data transmission or reception to or from the source base station 2921 through protocol layer devices of the first bearer (for example, SDAP layer device, PDCP layer device, RLC layer device, or MAC layer device), and may perform data transmission or reception to or from the target base station 2922 through protocol layer devices (for example, SDAP layer device, PDCP layer device, RLC layer device, or MAC layer device) of the second bearer.

The PDCP layer device of the first bearer and the PDCP layer device of the second bearer may be configured in the UE, respectively, but logically operate as a single PDCP layer device, such as reference numeral 2920. Specifically, the one PDCP layer device may be implemented with functions, wherein the functions of the PDCP layer device are divided into functions of a higher PDCP layer device (for example, a serial number assignment function, a reordering function, a sequence transfer function, or a duplicate detection function), and functions of two lower PDCP layer devices for the source base station and the target base station (e.g., a deciphering or ciphering function, a header (or data) compression or header (or data) decompression function, an integrity protection or verification function, or a duplicate detection function). In addition, in the DAPS handover method as described above, the UE transmits uplink data transmission to the source base station and switches to the target base station when the first condition is satisfied, and downlink data may be successfully received from the source base station and the target base station. Therefore, with respect to the header (or data) compression protocol context, only one context is maintained and applied to the source base station or target base station for the uplink, and two contexts are maintained and applied to the source base station or target base station for the downlink.

Based on the second PDCP layer structure described above, the (2-1)th PDCP layer structure (for example, an E-UTRA PDCP layer device for a DAPS handover method) of the disclosure may have the following characteristics.

The function of a higher transmission PDCP layer device may perform a role of allocating a PDCP serial number to data received from a higher layer device. In addition, according to the functions 2921 and 2922 of lower transmission PDCP layer devices for each source base station and each target base station, a header (or data) compression procedure is applied by using a separate security key configured with each source base station and each target base station such that a header (or data) compression context or security key configured with the source base station is applied to data to be transmitted to the source base station, and a header (or data) compression context or security key configured with the target base station is applied to data to be transmitted to the target base station. In addition, two lower transmission PDCP layer device functions 2921 and 2922 may, if integrity protection is configured, apply the integrity protection procedure to the PDCP header and data (PDCP SDU) and apply the ciphering procedure thereto, and may perform transmission such that data to be transmitted to the source base station is transmitted to the transmission RLC layer device of the first bearer and data to be transmitted to the target base station is transmitted to the transmission RLC layer device of the second bearer. The functions 2921 and 2922 of two lower transmission PDCP layer devices may perform parallel data processing in which header compression, integrity protection, or ciphering procedures are processed in parallel in order to accelerate data processing speed. The integrity protection or ciphering procedure is performed using different security keys in the functions of two lower transmission PDCP layer devices. In addition, it may be characterized in that procedures of compression, integrity protection, or ciphering different pieces of data are logically performed by applying different compression contexts, security keys, or security algorithms in one transmission PDCP layer device.

The function of the receiving PDCP layer device may perform, for pieces of data received from respective lower layer devices, specifically for data received from two RLC layer devices for each source base station and each target base station. That is, the functions 2921 and 2922 of lower receiving PDCP layer devices for the source base station and the target base station may independently perform a procedure of detecting data outside the window or duplicate data based on the PDCP serial number or count value, for data received from respective RLC layer devices. As another method, for convenience of implementation, the lower receiving PDCP layer devices may perform the procedure of detecting data outside the window or duplicate data based on the PDCP serial number or count value, for all received data without distinguishing respective RLC layer devices. As another method, for more accurate duplication detection, the lower receiving PDCP layer devices may perform the procedure of detecting data outside the window based on the PDCP serial number or count value, for all received data without distinguishing respective RLC layer devices, and may independently perform the duplicate data detection procedure for pieces of data received from respective RLC layer devices. As another method, when data received from different base stations overlap each other, in order to prevent data loss for the header compression protocol, the lower receiving PDCP layer devices may perform the procedure of detecting data outside the window based on the PDCP serial number or count value, for all received data without distinguishing respective RLC layer devices, and may perform the duplicate data detection procedure for all the pieces of data after performing a deciphering procedure, an integrity protection procedure, or a header (or data) decompression procedure for respective pieces of data received from RLC layer devices.

The functions of the lower receiving PDCP layer devices may directly apply a deciphering procedure to pieces of received data, by using a separate header (or data) compression context or security key configured with each source base station and each target base station, and when integrity protection is configured, the functions may apply the integrity verification procedure to the PDCP header and data (PDCP SDU).

In the (2-1)th PDCP layer device structure, a header (or data) decompression procedure is directly performed without sequencing pieces of data, received from RLC layer devices of the first bearer for each source base station, and a header (or data) decompression procedure is directly performed without sequencing pieces of data received from RLC layer devices of the second bearer for each target base station. In addition, in order to distinguish data received from RLC layer devices of the first bearer for each source base station and data received from RLC layer devices of the second bearer for each target base station, the (2-1)th PDCP layer device structure may define an indicator for each data to distinguish whether data is received from the source base station or the target base station. As another method, the (2-1)th PDCP layer device structure may define a 1-bit indicator of a PDCP header, SDAP header, or RLC header to distinguish whether data is received from the source base station or the target base station. In addition, in the (2-1)th PDCP layer device structure, for all the pieces of data received from the RLC layer devices of the first bearer for the source base station and pieces of data received from the RLC layer devices of the second bearer for the target base station, in which the header (or data) compression procedure for the pieces of data is completed, the duplicate detection procedure based on the PDCP serial number or count value is performed (a procedure in which only one data (including previously received data or data transmitted to a higher layer) is left (for each PDCP serial number or count value) and the remaining pieces of data are discarded). In addition, in the (2-1)th PDCP layer device structure, a reordering procedure is performed for all the pieces of data received from the RLC layer devices of the first bearer for the source base station and pieces of data received from the RLC layer devices of the second bearer for the target base station, based on the PDCP serial number or count value in an ascending order, and the data may be transmitted to a higher layer device in sequence. As described above, since one PDCP layer device can receive data from different base stations, that is, from the first bearer or the second bearer in any order, it may be characterized in that the reordering procedure must always be performed.

Each of the functions of the two lower receiving PDCP layer devices may perform parallel data processing of performing header compression, integrity protection, or ciphering procedures in parallel in order to accelerate the data processing speed based on the PDCP serial number or count value, and may perform the integrity protection, ciphering procedure, or decompression procedure by using different header (or data) compression contexts or security keys. In addition, the functions may perform the integrity protection, ciphering procedure, or decompression procedure of different pieces of data by applying different header (or data) compression contexts, security keys, or security algorithms logically in one transmitting PDCP layer device. In addition, according to the functions of lower receiving PDCP layer devices, it is possible to perform out-of-sequence deciphering or an integrity verification procedure for each data received regardless of the sequence of the PDCP serial number or count value.

When distinguishing between the layer devices of the first bearer and the layer devices of the second bearer, the one PDCP layer device may distinguish the layer devices of the first bearer (or first RLC layer devices) and the layer devices of the second bearer (or second RLC layer devices) by considering that the layer devices of the first bearer and the layer devices of the second bearer are connected to different MAC layer devices or have different logical channel identifiers, or the layer devices of the first bearer and the layer devices of the second bearer are different RLC layer devices connected to different MAC layer devices or use different ciphering keys. In addition, the PDCP layer device performs ciphering or deciphering procedures of uplink data and downlink data by using different security keys, and performs compression or decompression therefor using different compression protocol contexts.

Based on the second PDCP layer structure described above, the (2-2)th PDCP layer structure (for example, an NR PDCP layer device for a DAPS handover method) of the disclosure may have the following characteristics.

The function of a higher transmission PDCP layer device may perform a role of allocating PDCP serial numbers to pieces of data received from a higher layer device. In addition, according to the functions 2921 and 2922 of two lower transmission PDCP layer devices for a source base station and a target base station, a header (or data) compression procedure is applied by using a separate security key configured with each source base station and each target base station such that a header (or data) compression context or security key configured with the source base station is applied to data to be transmitted to the source base station, and a header (or data) compression context or security key configured with the target base station is applied to data to be transmitted to the target base station. In addition, according to the functions 2921 and 2922 of two lower transmission PDCP layer devices, if integrity protection is configured, the integrity protection procedure is applied to the PDCP header and data (PDCP SDU), the ciphering procedure is applied thereto, and transmission may be performed such that the data to be transmitted to the source base station is transmitted to the transmission RLC layer device of the first bearer and data to be transmitted to the target base station is transmitted to the transmission RLC layer device of the second bearer. The functions 2921 and 2922 of two lower transmission PDCP layer devices may perform parallel data processing in which header compression, integrity protection, or ciphering procedures are processed in parallel in order to accelerate data processing speed. The integrity protection or ciphering procedure is performed using different security keys in the functions of two lower transmission PDCP layer devices. In addition, it may be characterized in that procedures of compression, integrity protection, or ciphering different pieces of data are logically performed by applying different compression contexts, security keys, or security algorithms in one transmission PDCP layer device.

The function of the receiving PDCP layer device, specifically, the functions 2921 and 2922 of lower receiving PDCP layer devices for the source base station and the target base station, may independently perform a procedure of detecting data outside the window or duplicate data based on the PDCP serial number or count value, for data received from each lower layer device, specifically for data received from two RLC layer devices for each source base station and each target base station. As another method, for convenience of implementation, the lower receiving PDCP layer devices may perform the procedure of detecting data outside the window or duplicate data based on the PDCP serial number or count value for all received data without distinguishing respective RLC layer devices. As another method, for more accurate duplication detection, the lower receiving PDCP layer devices may perform the procedure of detecting data outside the window based on the PDCP serial number or count value for all received data without distinguishing respective RLC layer devices, and the duplicate data detection procedure may be independently performed for pieces of data received from respective RLC layer devices. As another method, when data received from different base stations overlap each other, the lower receiving PDCP layer devices may perform the procedure of detecting data outside the window based on the PDCP serial number or count value for all received data without distinguishing respective RLC layer devices, in order to prevent data loss for the header compression protocol, and the duplicate data detection procedure may be performed for all the pieces of data after performing a deciphering procedure, an integrity protection procedure, or a header (or data) decompression procedure for respective pieces of data received from RLC layer devices.

The functions of the lower receiving PDCP layer devices may directly apply a deciphering procedure to pieces of received data, by using a separate header (or data) compression context or security key configured with each source base station and each target base station, and when the integrity protection is configured, the functions may apply the integrity verification procedure to the PDCP header and data (PDCP SDU).

In the (2-2)th PDCP layer device structure, pieces of data received from RLC layer devices of the first bearer for each source base station and pieces of data received from RLC layer devices of the second bearer for each target base station are re-sequenced and then a header (or data) decompression procedure is performed by applying the header (or data) compression context of each base station (source base station or target base station) for each data received from each base station (source base station or target base station) in ascending order of PDCP serial number or count value. In addition, in order to distinguish data received from RLC layer devices of the first bearer for each source base station and data received from RLC layer devices of the second bearer for each target base station, the (2-2)th PDCP layer device structure may define an indicator for each piece of data to distinguish whether data is received from the source base station or the target base station. As another method, the (2-2)th PDCP layer device structure may define a 1-bit indicator of a PDCP header, SDAP header, or RLC header to distinguish whether data is received from the source base station or the target base station. In addition, the (2-2)th PDCP layer device structure may perform the duplicate detection procedure for all the pieces of data received from the RLC layer devices of the first bearer for the source base station and pieces of data received from the RLC layer devices of the second bearer for the target base station, in which the header (or data) compression procedure for the pieces of data has been completed, based on the PDCP serial number or count value (a procedure in which only one piece of data (including previously received data or data transmitted to a higher layer) is left for each PDCP serial number or count value and the remaining pieces of data are discarded). In addition, all the pieces of data received from the RLC layer devices of the first bearer for the source base station and pieces of data received from the RLC layer devices of the second bearer for the target base station are transmitted to a higher layer device in sequence, based on the PDCP serial number or count value in an ascending order. As described above, since one PDCP layer device can receive data from different base stations, that is, from the first bearer or the second bearer regardless of the sequence, the reordering procedure needs to be always performed.

Each of the functions of the two lower receiving PDCP layer devices may perform parallel data processing of performing header compression, integrity protection, or ciphering procedures in parallel in order to accelerate the data processing speed based on the PDCP serial number or count value, and may perform the integrity protection, ciphering procedure, or decompression procedure by using different header (or data) compression contexts or security keys. In addition, the functions of the two lower receiving PDCP layer devices may perform the integrity protection, ciphering procedure, or decompression procedure of different pieces of data by applying different header (or data) compression contexts, security keys, or security algorithms logically in one transmitting PDCP layer device. In addition, according to the functions of lower receiving PDCP layer devices, it is possible to perform out-of-sequence deciphering or an integrity verification procedure for each data received regardless of the sequence of the PDCP serial number or count value.

When distinguishing between the layer devices of the first bearer and the layer devices of the second bearer, the one PDCP layer device may distinguish the layer devices of the first bearer (or first RLC layer devices) and the layer devices of the second bearer (or second RLC layer devices) by considering that the layer devices of the first bearer and the layer devices of the second bearer are connected to different MAC layer devices or have different logical channel identifiers, or the layer devices of the first bearer and the layer devices of the second bearer are different RLC layer devices connected to different MAC layer devices or use different ciphering keys. In addition, the one PDCP layer device may perform ciphering or deciphering procedures for uplink data and downlink data by using different security keys, and perform compression or decompression thereof using different compression protocol contexts.

The disclosure proposes the structure of a third PDCP layer device that is efficient in handover, as shown in reference numeral 2930. The structure of the third PDCP layer device may be applied to the second embodiment of an efficient handover method for minimizing a data interruption time, of the disclosure. In addition, in the structure of the third PDCP layer device of the disclosure, the function of the PDCP layer device may be the same as the function of the structure of the second PDCP layer device of the disclosure. However, the third PDCP layer device structure may be obtained by releasing the first bearer for the source base station from the structure of the second PDCP layer device. Specifically, the structure of the third PDCP layer device of this disclosure has the same function as the function of the structure of the second PDCP layer device described above, but has the structure obtained by releasing the first bearer for the source base station (e.g., SDAP layer device, PDCP layer device, RLC layer device, or MAC layer device). Accordingly, the structure of the third PDCP layer device is obtained by releasing QoS mapping information of the SDAP layer device for the source base station, security key information for the source base station of the PDCP layer device, or header (or data) compression context information for the source base station, the RLC layer device for the source base station, or the MAC layer device.

Hereinafter, the disclosure proposes, in FIG. 26, when the UE receives a handover command message and applies bearer configuration information included in the handover command message, the features of applying bearer configuration information based on different methods according to a handover type indicated through the handover command message.

In a case where the UE receives the handover command message, if a first handover method (for example, the first embodiment of the disclosure or a general handover method) is indicated through the handover command message, ReconfigWithSync information, or MobilityControlInfo information, if the second embodiment (DAPS handover method) of the disclosure is not configured in the above, or if the second embodiment (DAPS handover method) of this disclosure is not configured for any bearer through the bearer configuration information, When a default bearer is configured in SDAP layer device configuration information configured through the handover command message, a default bearer for a source base station may be configured as a default bearer for a target base station, indicated in the configuration information.

When the second QoS flow and bearer mapping information are configured in the SDAP layer device configuration information configured through the handover command message, the first QoS flow and bearer mapping information applied for the source base station are released, and the second QoS flow and bearer mapping information can be applied. As another method, the first QoS flow and bearer mapping information applied for the source base station may be replaced by the second QoS flow and bearer mapping information.

When a data discard timer value is configured in the PDCP layer device configuration information configured through the handover command message, the discard timer value may be directly applied to the PDCP layer device corresponding to the bearer identifier of the configuration information.

If a drb-ContinueROHC indicator is configured as false in the PDCP layer device configuration information configured through the handover command message, the PDCP layer device corresponding to the bearer identifier of the configuration information may initialize the context of the header compression or decompression protocol. If the drb-ContinueROHC indicator is configured as true, the PDCP layer device corresponding to the bearer identifier of the configuration information does not initialize the context of the header compression or decompression protocol.

When the reordering timer value is configured in the PDCP layer device configuration information configured through the handover command message, the reordering timer value may be applied directly to the PDCP layer device corresponding to the bearer identifier of the configuration information.

Upon receiving the handover command message, the PDCP layer device may be re-established. For example, for SRB, window state variables may be initialized and stored data (PDCP SDU or PDCP PDU) may be discarded; and for UM DRB, window state variables may be initialized, and data which has not yet been transmitted to lower layer devices or data for which the PDCP revocation timer has not expired may be compressed or ciphered based on the header (or data) compression context or security key of the target base station in ascending order of the count value, or may be subject to integrity protection thereof to perform transmission or retransmission. In addition, if the reordering timer is running, the timer may be interrupted and initialized, and received data (PDCP SDU or PDCP PDU) may be processed in sequence and transmitted to the higher layer device. For AM DRB, window state variables are not initialized, and compression or ciphering is performed starting from first data (PDCP SDU or PDCP PDU), which is not successfully transmitted from the lower layer device, based on the header (or data) compression context or security key of the target base station in ascending order of the PDCP serial number or count value, or integrity protection thereof is performed to be transmitted or retransmitted.

When security key-related configuration information or security algorithm is configured in the security configuration information configured through the handover command message, a new security key or security configuration information is derived using the configuration information, the existing security key or security configuration information is released, or the existing security key or security configuration information may be replaced by the new security key or security configuration information.

When a new logical channel identifier is configured in the RLC layer device configuration information configured through the handover command message, the new logical channel identifier is released from the existing logical channel identifier corresponding to a bearer identifier indicated in the RLC layer device configuration information, or the existing logical channel identifier may be replaced and configured to be the new logical channel identifier.

When an RLC re-establishment procedure is configured in the RLC layer device configuration information configured through the handover command message, the RLC re-establishment procedure may be performed for an RLC layer device corresponding to a bearer identifier indicated in the RLC layer device configuration information. That is, specifically, the transmitting RLC layer device may perform a procedure of discarding all stored data by performing the RLC re-establishment procedure. In addition, when the reordering timer is running, the receiving RLC layer device may interrupt and initialize the reordering timer, process all stored data, and transmit the processed data to a higher layer device. In addition, the receiving RLC layer device may initiate the MAC layer device. In addition, the receiving RLC layer device may initiate the MAC layer device for the source base station and use the MAC layer device for the target base station.

The MAC layer device may be initialized, and data transmission or reception may be stopped for the source base station and each bearer. In addition, the MAC layer device may stop monitoring the PDCCH for the first UE identifier (C-RNTI) allocated from the source base station. In addition, the MAC layer device may stop a procedure of requesting scheduling from a source base station or may release transmission resources for scheduling. In addition, the PHY or MAC layer device may perform a procedure of random access to the target base station. The PHY or MAC layer device may resume data transmission or reception to or from the target base station if the procedure of handover to the target base station is successfully completed, and may start monitoring the PDCCH for the second UE identifier (C-RNTI) allocated from the target base station. In addition, the PHY or MAC layer device may receive a system frame number from the target base station and perform synchronization. In addition, the PHY or MAC layer device may initiate or perform a procedure of requesting scheduling from the target base station.

The PHY layer device may perform channel measurement for the source base station, perform a channel measurement report, or stop a procedure of transmitting HARQ ACK or NACK. Then, the PHY layer device may perform a downlink synchronization procedure for the target base station. In addition, the PHY layer device may configure configuration information for the target base station (or Spcell or Pcell), received through the handover command message, in a lower layer device or a PHY layer device. The PHY layer device may start transmission of or may transmit HARQ ACK or NACK information to the target base station if the procedure of handover to the target base station is successfully completed. In addition, the PHY or MAC layer device may receive a system frame number from the target base station and perform synchronization. In addition, the PHY or MAC layer device may initiate or perform a procedure of requesting scheduling from the target base station.

When the RLC layer device configuration information configured through the handover command message is newly configured, an RLC re-establishment procedure may be performed for an RLC layer device corresponding to a bearer identifier indicated in the RLC layer device configuration information.

When the second priority for the logical channel is newly configured in the MAC layer device configuration information configured through the handover command message, the first priority corresponding to the logical channel identifier indicated in the configuration information is released, or the first priority corresponding to the logical channel identifier may be replaced and configured to be the newly configured second priority.

When the second prioritized bit rate (PBR) for a logical channel is newly configured in the MAC layer device configuration information configured through the handover command message, the first PBR corresponding to the logical channel identifier indicated in the configuration information may be released, or the first PBR corresponding to the logical channel identifier may be replaced and configured to be the newly configured second PBR. The prioritized bit rate is a value that increases for each logical channel for a predetermined time (for example, every TTI), when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

When a second bucket size (bucketSizeDuration) for a logical channel is newly configured in the MAC layer device configuration information configured through the handover command message, a first bucket size (bucketSizeDuration) corresponding to the logical channel identifier indicated in the configuration information may be released, or the first bucket size (bucketSizeDuration) corresponding to the logical channel identifier may be replaced and configured to be the newly configured second bucket size (bucketSizeDuration). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer device configuration information configured through the handover command message, the previously configured first allowed SCell information, allowed subcarrier spacing information, a maximum PUSCH period, or logical channel group configuration information are released, or the previously configured first allowed SCell information, allowed subcarrier spacing information, maximum PUSCH period, or logical channel group configuration information may be replaced and configured to be the newly configured second allowed SCell information, allowed subcarrier spacing information, maximum PUSCH period, or logical channel group configuration information.

When the UE receives the handover command message, if the handover command message or ReconfigWithSync information and mobility Control Info information indicate or configure the second handover method (for example, the second embodiment or the DAPS handover method of the disclosure), if the DAPS handover method is indicated or configured for each bearer identifier, or if the second embodiment (DAPS handover method) of the disclosure is configured for a predetermined bearer through the bearer configuration information or the second embodiment (DAPS handover method) of the disclosure is configured for at least one bearer through the bearer configuration information, When a default bearer is configured in the SDAP layer device configuration information configured through the handover command message, the DAPS handover method of the disclosure is performed, and by applying the second SDAP layer device structure, a default bearer for the existing source base station may be maintained and default bearer information indicated in the configuration information may be configured as a default bearer for the target base station. As another method, when the first condition described in the disclosure is satisfied, the default bearer for the existing source base station may be switched to the default bearer for the target base station indicated in the configuration information.

When a second QoS flow and bearer mapping information are configured in the SDAP layer device configuration information configured through the handover command message, the DAPS handover method of the disclosure is performed, and by applying the second SDAP layer device structure, the first QoS flow and bearer mapping information that have been applied for the source base station may be maintained and the second QoS flow and bearer mapping information may be applied to data for the target base station. As another method, when the first condition described in the disclosure is satisfied, the second QoS flow and bearer mapping information for the target base station may be applied.

When a data discard timer value is configured in the PDCP layer device configuration information configured through the handover command message, the DAPS handover method described above of the disclosure is performed, and by applying a second PDCP layer device structure, the discard timer value may be applied directly to the PDCP layer device corresponding to the bearer identifier of the configuration information.

The PDCP layer device in which the DAPS handover method is indicated or configured through the handover command message may not be re-established, and the following procedures may be performed. For example, for SRB, window state variables may be initialized (initialization of variables may be omitted in order to perform fall back when DAPS handover fails). Specifically, when the count value or the window state variable value is initialized, in order to solve the security issue (the risk of exposure of security keys caused by transmitting different pieces of data by using the same security key and same count value when the DAPS handover fallback procedure is performed), which occurs from reusing the same count value from the beginning when the DAPS handover fallback procedure is performed, the count value, a transmission window state variable (TX_NEXT), or a reception window state variable (RX_NEXT and RX_DELIV) may not be initialized and the values of the existing variables may be continuously used or maintained; or stored data (PDCP SDU) may be discarded. In addition, for UM DRB, window state variables may not be initialized and data that has not yet been transmitted to the lower layer device or data for which the PDCP discard timer has not expired may continue to transmit or receive data to or from the source base station. Alternatively, for AM DRB, window state variables may not be initialized and continue to transmit or receive data to or from the source base station. In addition, with regard to the procedure for the SRBs, the SRBs for the source base station are suspended, or in the case of the SRBs for the target base station, in order to solve the security issue that occurs from reusing the same count value from the beginning when the DAPS handover fallback procedure is performed, the existing count value of the SRBs for the source base station or the values of transmission or reception window variables are applied to the SRBs established for the target base station and maintained to be used (or by configuring the count value of the SRBs of the source base station or the values of transmission or reception window variables as the count value of SRBs of the target base station or values of transmission or reception window variables). In addition, for the SRBs for the target base station, the security key for the target base station may be derived or the derived security key may be applied, and the PDCP layer device of the SRBs may perform ciphering, deciphering, integrity protection, or verification procedures by applying the security key for the target base station. In addition, for SRBs for the source base station, old data (e.g., RRC message for the source base station) may be discarded. The procedure for the SRB for the target base station may be defined as a new procedure (e.g., a DAPS SRB establishment or PDCP layer device re-establishment procedure) and indicated, triggered, or performed, and the procedure for the SRB may be extended and applied to UM DRB or AM DRB for which the DAPS handover method is not configured.

A PDCP layer device for which a DAPS handover method is not indicated or not configured through the handover command message may be re-established. For example, for SRB, window state variables may be initialized, and stored data (PDCP SDU or PDCP PDU) may be discarded. For UM DRB, window state variables are initialized, and data that have not yet been transmitted to lower layer devices or data for which the PDCP revocation timer has not expired may be compressed or ciphered based on the header (or data) compression context or security key of the target base station in ascending order of the count value, or integrity protection thereof is performed to be transmitted or retransmitted. In addition, if the reordering timer is running, the reordering timer is stopped and initialized, and received data (PDCP SDU or PDCP PDU) may be processed in sequence and transmitted to the higher layer device. For AM DRB, window state variables are not initialized, and compression or ciphering is performed starting from first data (PDCP SDU or PDCP PDU) that has not been successfully transmitted from the lower layer device based on the header (or data) compression context or security key of the target base station in ascending order of the PDCP serial number or count value, or integrity protection thereof is performed to be transmitted or retransmitted. In addition, the RLC layer device may perform a re-establishment procedure.

When the drb-ContinueROHC indicator is configured as "false" in the configuration information of the PDCP layer device in which the DAPS handover method is indicated or configured through the handover command message, the DAPS handover method of the disclosure is performed. Here, by applying the second PDCP layer device structure, the PDCP layer device corresponding to the bearer identifier of the configuration information may use the context of the header compression or decompression protocol for the source base station as it is, and may initialize the context of the header compression or decompression protocol for the target base station and start from an initial state (e.g., IR state). If the drb-ContinueROHC indicator is configured as "true", the DAPS handover method of the disclosure is performed, and by applying the second PDCP layer device structure, the PDCP layer device corresponding to the bearer identifier of the configuration information may use the context of the header compression or decompression protocol for the source base station as it is, and may apply the context of the header compression or decompression protocol for the target base station to be the same form as the context of the header compression or decompression protocol for the source base station. For example, the context of the header compression or decompression protocol for the source base station may be copied to the context of the header compression or decompression protocol for the target base station and applied as is. As another method, the same header compression or decompression protocol context may be applied to the target base station or the source base station.

When a reordering timer value is configured through the configuration information of the PDCP layer device in which the DAPS handover method is indicated or configured through the handover command message, the DAPS handover method of the disclosure is performed, and by applying the second PDCP layer device structure, the reordering timer value may be directly applied to the PDCP layer device corresponding to the bearer identifier of the configuration information.

When security key-related configuration information or a security algorithm is configured through the security configuration information in which the DAPS handover method is indicated or configured through the handover command message, or when there is an indicator indicating a new procedure in the PDCP layer device configuration information, a new security key or security configuration information is derived using the configuration information, the DAPS handover method as described above in the disclosure may be performed. In addition, by applying the second PDCP layer device structure, the existing security key or security configuration information for the source base station is maintained and a security key or security configuration information for the target base station may be configured as the new security key or security configuration information.

When a new logical channel identifier is configured in the RLC layer device configuration information of a bearer for which the DAPS handover method is indicated or configured through the handover command message, the DAPS handover method of the disclosure may be performed. In addition, by applying the second PDCP layer device structure, for the RLC layer device or MAC layer device of a first bearer for a source base station corresponding to a bearer identifier indicated in the RLC layer device configuration information, the existing logical channel identifier is maintained, and the RLC layer device or the MAC layer device of a second bearer for the target base station may be configured as a new logical channel identifier indicated in the configuration information.

The RLC re-establishment procedure may not be performed for the RLC layer device for the source base station in the RLC layer device configuration information of a bearer for which the DAPS handover method is indicated or configured through the handover command message. Specifically, without performing the RLC re-establishment procedure, the transmitting RLC layer device continues to transmit the stored data, and the receiving RLC layer device continues to process the stored data together with the received data to avoid occurrence of a data interruption. However, when the first condition described in the disclosure is satisfied, with respect to the AM bearer or UM bearer, the PDCP layer device in which the DAPS handover method is configured may transmit a data discard indicator for PDCP user data (PDCP Data PDU) in order to indicate discarding of data (PDCP Data PDU) to the RLC layer device for the source base station according to the method of this disclosure. Accordingly, the RLC layer device for the source base station discards the PDCP data PDU, but may perform transmission without discarding the PDCP control PDU.

The RLC re-establishment procedure may be performed for the RLC layer device of a bearer for which the DAPS handover method configured in the handover command message is not indicated or not configured, or may perform the RLC re-establishment procedure when the RLC re-establishment procedure is configured. That is, specifically, by performing the RLC re-establishment procedure, the transmitting RLC layer device may perform a procedure of discarding all stored data (PDCP data PDU or PDCP control PDU). In addition, when the reordering timer is running, the receiving RLC layer device may interrupt and initialize the reordering timer, process all stored data, and transmit the processed data to a higher layer device.

When RLC layer device configuration information of a bearer for which the DAPS handover method is indicated or configured through the handover command message is newly configured, the DAPS handover method of the disclosure is performed, and by applying the second PDCP layer device structure, the existing RLC configuration information is maintained for an RLC layer device of a first bearer for the source base station corresponding to a bearer identifier indicated in the RLC layer device configuration information, and an RLC layer device of a second bearer for the target base station may be configured via new RLC layer device configuration information indicated in the configuration information.

Figure 30:
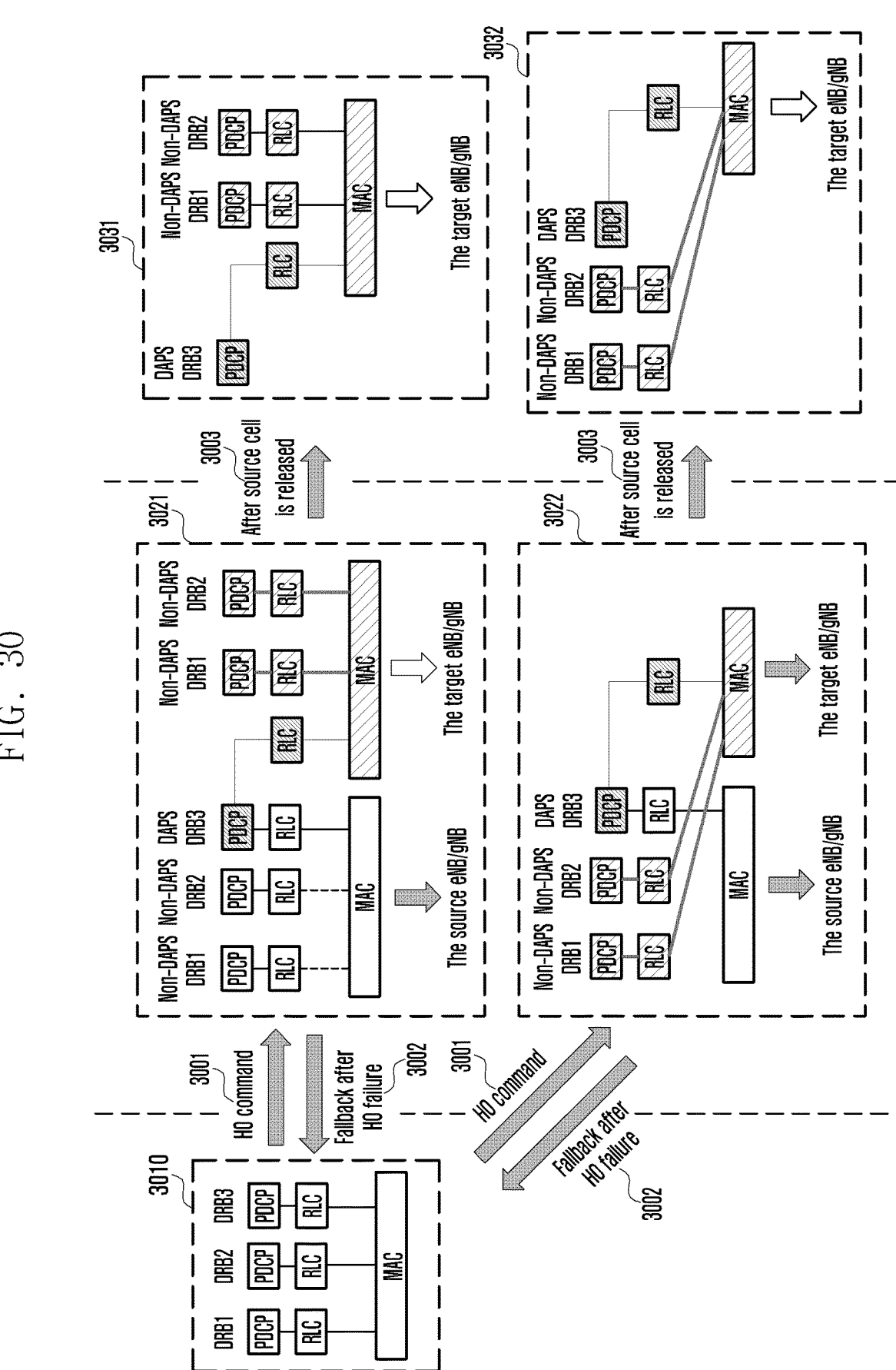
FIG. 30 is a diagram illustrating a method for applying configuration information for each bearer when a DAPS handover method is configured according to an embodiment of the disclosure.
Figure 31B:
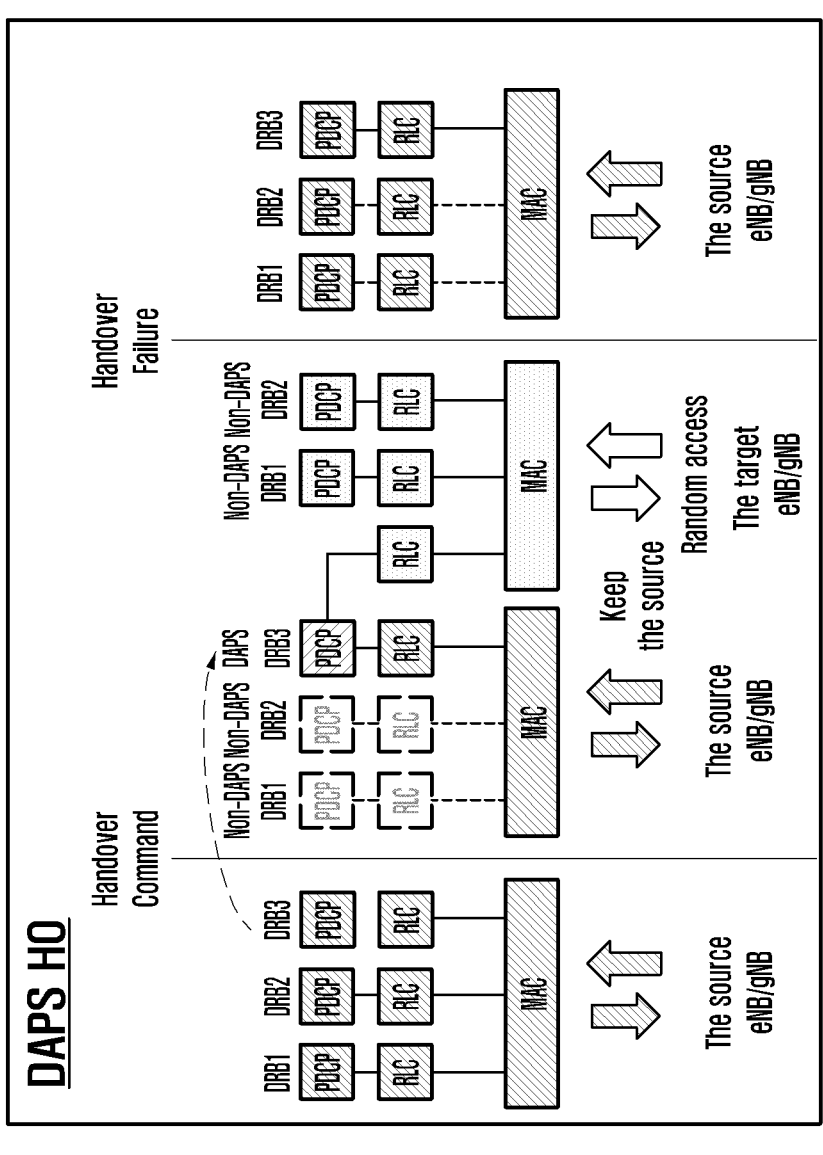
Figure 32A:
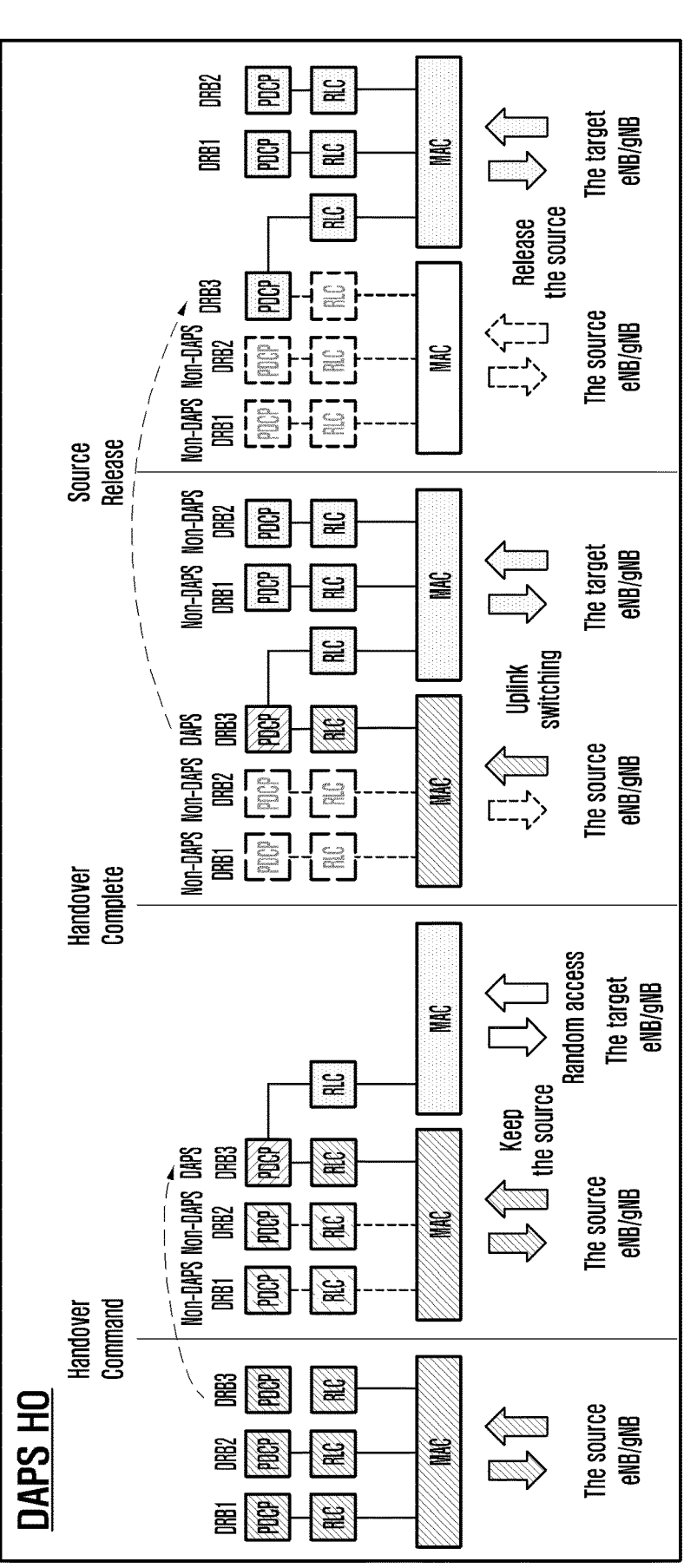
Figure 32B:
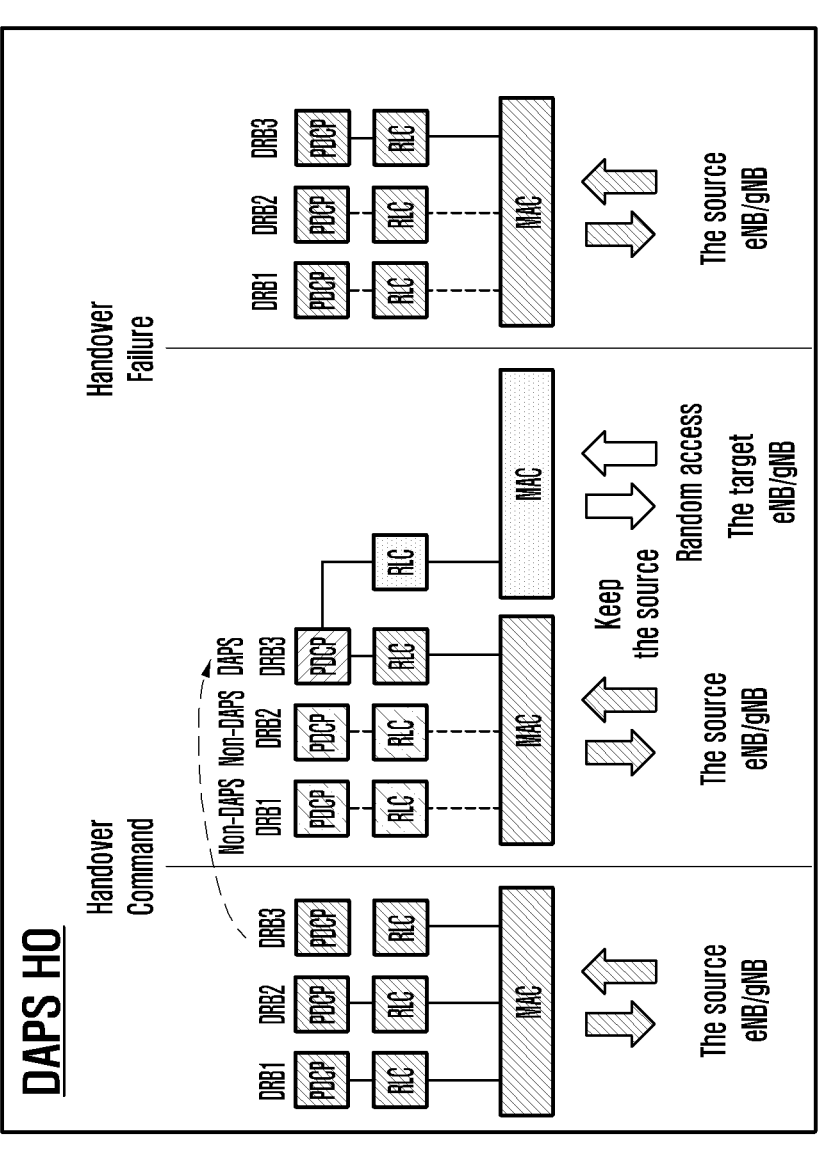
Figure 33A:
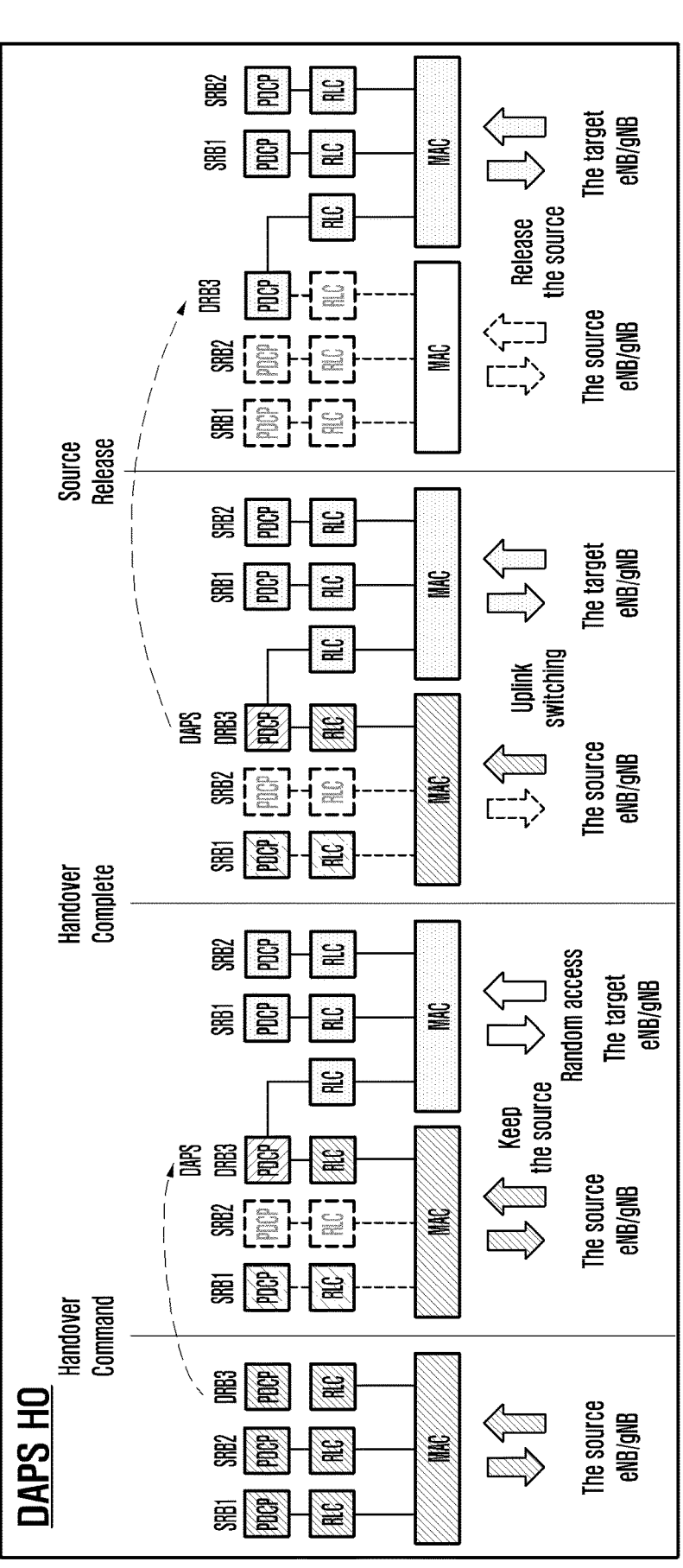
Figure 33B:
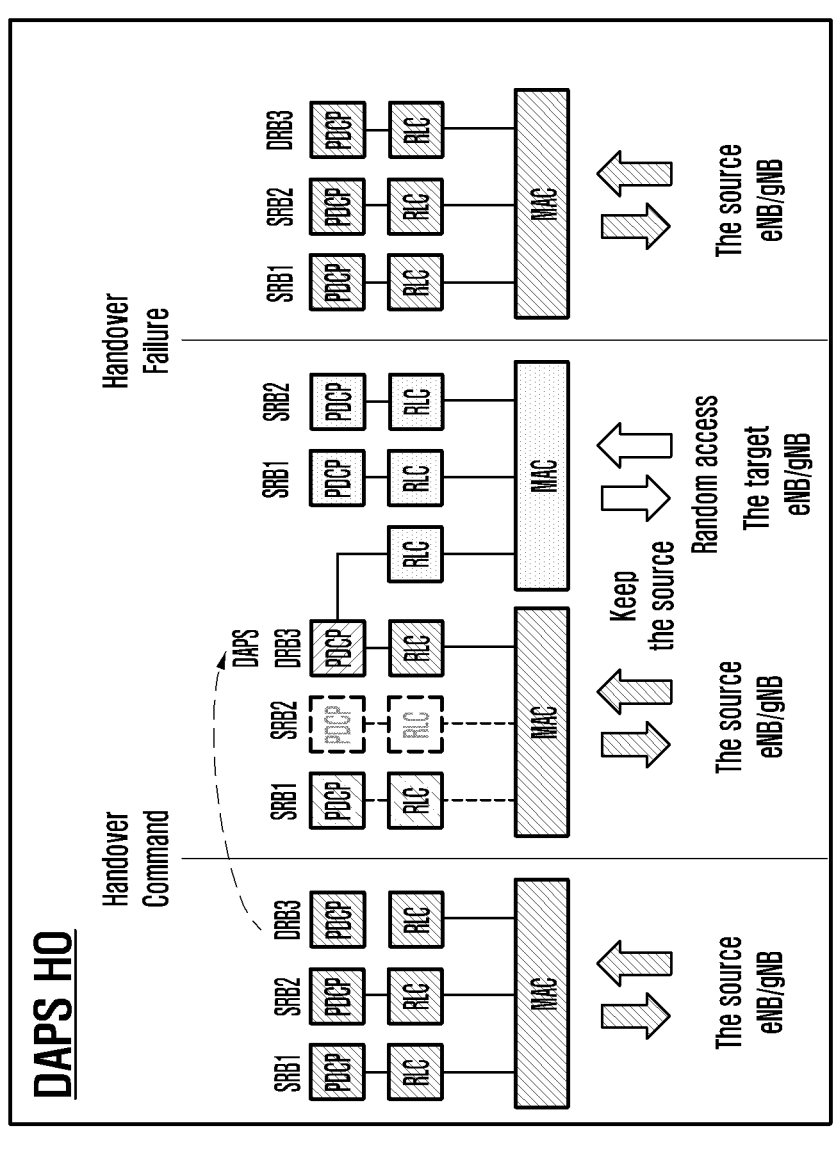
Figure 34A:
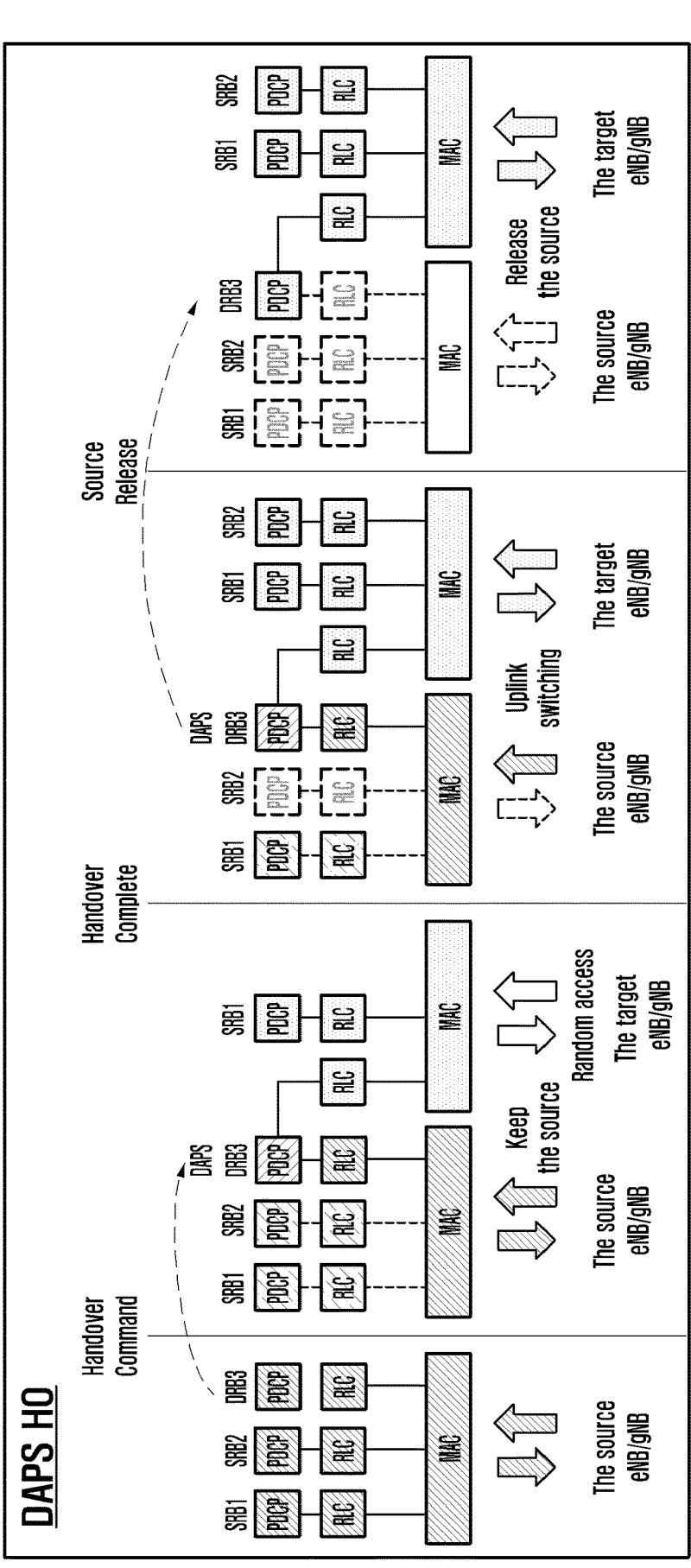
Figure 34B:
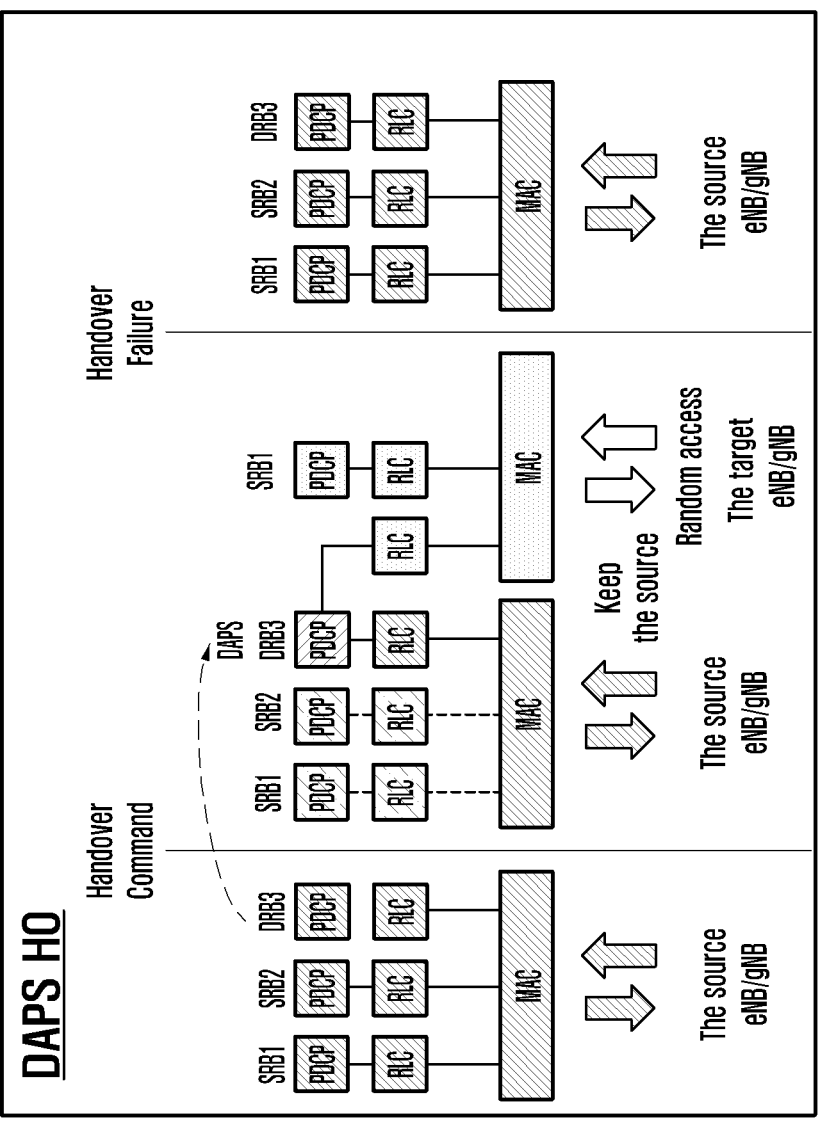

Method 1, method 2, or method 3 for configuring the MAC layer device of FIG. 30 of the disclosure may be performed.

Method 1 method 2, or method 3 for configuring the MAC layer device of FIG. 10 may be performed, and data transmission or reception may be continuously performed for bearers for which the DAPS handover method is indicated or configured in the MAC layer device, the MAC layer device is not initialized, and data transmission or reception may be stopped for bearers for which the DAPS handover method is not indicated or not configured.

In the above, the MAC layer device for the source base station is not initialized, and monitoring the PDCCH for the first UE identifier (C-RNTI) allocated from the source base station may be continuously performed. In addition, the MAC layer device for the source base station may continue to perform a procedure of requesting scheduling from the source base station. In addition, the PHY or MAC layer device for the target base station may apply configuration by using configuration information to be received through the handover command message and perform a procedure of random access to the target base station. The PHY or MAC layer device for the target base station may start data transmission or reception to or from the target base station if the procedure of handover to the target base station is successfully completed, and may start monitoring the PDCCH for the second UE identifier (C-RNTI) allocated from the target base station. In addition, the PHY or MAC layer device may receive a system frame number from the target base station and perform synchronization. In addition, the PHY or MAC layer device for the target base station may initiate or perform a procedure of requesting scheduling from the target base station. The UE may monitor the PDCCH for the first UE identifier allocated from the source base station in the PHY or MAC layer device for the source base station until the connection with the source base station is released or the second condition described in this disclosure is satisfied, and may monitor the PDCCH for the second UE identifier allocated from the target base station in the PHY or MAC layer device for the target base station. As described above, if the connection with the source base station is released or the second condition described in this disclosure is satisfied, the UE may stop monitoring the PDCCH for the first UE identifier allocated from the source base station in the PHY or MAC layer device for the source base station, or may release a transmission resource for a scheduling request.

The PHY layer device for the source base station may maintain configuration information, perform a channel measurement for the source base station, perform a channel measurement report, or continue to perform a procedure of transmitting HARQ ACK or NACK. In addition, the PHY or MAC layer device for the target base station performs a downlink synchronization procedure for the target base station. In addition, configuration information for the target base station (or Spcell or Pcell), received through the handover command message, may be configured in a lower layer device or a PHY layer device for the target base station. The PHY or MAC layer device for the target base station may start transmission of HARQ ACK or NACK information to the target base station or may perform transmission thereof, if the procedure of handover to the target base station is successfully completed. In addition, the PHY or MAC layer device for the target base station may receive a system frame number from the target base station and perform synchronization. In addition, the PHY or MAC layer device for the target base station may initiate or perform a procedure of requesting scheduling from the target base station, a procedure of performing channel measurement, or a procedure of reporting a result of channel measurement. The UE may monitor the PDCCH for the first UE identifier allocated from the source base station in the PHY or MAC layer device for the source base station until the connection with the source base station is released or the second condition described in this disclosure is satisfied, and may monitor the PDCCH for the second UE identifier allocated from the target base station in the PHY or MAC layer device for the target base station. In the above, if the connection with the source base station is released or the second condition described in this disclosure is satisfied, the UE stops monitoring the PDCCH for the first UE identifier allocated from the source base station in the PHY or MAC layer device for the source base station, or may release a transmission resource for a scheduling request.

Method 1, method 2, or method 3 for configuring or processing the SRB of FIG. 30 of the disclosure may be performed.

When a second priority for a logical channel is newly configured in the MAC layer device configuration information configured through the handover command message, the DAPS handover method of the disclosure may be performed. In addition, the second PDCP layer device structure is applied, the existing configuration information is maintained for the MAC layer device of the first bearer for the source base station corresponding to the bearer identifier indicated above, and a new logical channel identifier, which is indicated in the configuration information, may be configured for the MAC layer device of the second bearer for the target base station and a newly configured second prioritized bit rate corresponding to the logical channel identifier indicated in the configuration information may be applied thereto. As another method, when the first condition described in the disclosure is satisfied, the priority may be applied to the MAC layer device of the second bearer for the target base station for each logical channel identifier.

When the second PBR for a logical channel is newly configured in the MAC layer device configuration information configured through the handover command message, the DAPS handover method of the disclosure may be performed. In addition, the second PDCP layer device structure is applied, the existing configuration information is maintained for the MAC layer device of the first bearer for the source base station corresponding to the bearer identifier indicated above, and a new logical channel identifier, which is indicated in the configuration information, may be configured for the MAC layer device of the second bearer for the target base station and a newly configured second prioritized bit rate corresponding to the logical channel identifier indicated in the configuration information may be applied thereto. As another method, the second prioritized bit rate may be started to be applied to the logical channel identifier in the MAC layer device of the second bearer for the target base station from the time when the first condition described in the disclosure is satisfied (Accordingly, when different handover methods are indicated for each bearer, uplink transmission resources can be fairly distributed). The prioritized bit rate is a value that increases for each logical channel for a predetermined time (for example, every TTI) when starting to be applied to each logical channel identifier, and when an uplink transmission resource is received, a logical channel prioritization (LCP) procedure is performed, data for the logical channel may be transmitted by considering the priority and the prioritized bit rate, and the higher the priority or the greater the value of the prioritized bit rate, the more data may be transmitted.

In addition, when applying the DAPS handover method above, if the UE needs to transmit uplink data through the first bearer for the source base station because the first condition described in the disclosure is not yet satisfied, the MAC layer device of the first bearer selects, as a target of the LCP procedure, only bearers or logical channel identifiers for which the DAPS handover method (or a handover method for continuing data transmission to the source base station even after receiving the handover command message) is indicated during the LCP procedure, and performs the LCP procedure thereof. Bearers or logical channel identifiers for which the DAPS handover method is not applied should not be selected as a target of the LCP procedure because uplink data cannot be transmitted to the source base station upon receiving the handover command message.

When a second bucket size (bucketSizeDuration) for a logical channel is newly configured in the MAC layer device configuration information configured through the handover command message, the DAPS handover method of the disclosure is performed, the second PDCP layer device structure is applied, the existing configuration information is maintained for the MAC layer device of the first bearer for the source base station corresponding to the bearer identifier indicated above, a new logical channel identifier indicated by the configuration information may be configured for the MAC layer device of the second bearer for the target base station, and the newly configured second bucket size corresponding to the logical channel identifier indicated by the configuration information may be configured. As another method, the second bucket size can be started to be applied to the logical channel identifier in the MAC layer device of the second bearer for the target base station from the time when the first condition described in the disclosure is satisfied (Accordingly, when different handover methods are indicated for each bearer, uplink transmission resources can be fairly distributed). The bucket size indicates a maximum value that the prioritized bit rate may have when the prioritized bit rate is accumulated.

If second allowed SCell information, allowed subcarrier spacing information, a maximum PUSCH period, or logical channel group configuration information are configured in the MAC layer device configuration information configured through the handover command message, the DAPS handover method described above in this disclosure is performed. In addition, the second PDCP layer device structure is applied, the existing configuration information is maintained for the MAC layer device of the first bearer for the source base station corresponding to the bearer identifier indicated above, and the second allowed SCell information, allowed subcarrier spacing information, maximum PUSCH period, or logical channel group configuration information, which are indicated in the configuration information, may be configured for the MAC layer device of the second bearer for the target base station.

FIG. 30 is a diagram illustrating a method for applying configuration information for each bearer when a DAPS handover method is configured according to an embodiment of the disclosure.

Referring to FIG. 30, when the UE receives a handover command message (indicated by reference numeral 3001), if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may generate or establish a MAC layer device for the target base station (or a target cell) at a time when the handover command message is received, and the UE may continue to transmit or receive data to or from a source base station with respect to only bearers (AM bearer or UM bearer) for which the DAPS handover method is indicated, through an MAC layer device for the source base station (or source cell), until the first condition described in this disclosure is satisfied from the time when the handover command message is received. In addition, the UE may, when the first condition is satisfied, switch uplink data to a target base station, and may receive downlink data from the source base station until the connection with the source base station is released. However, for bearers for which the DAPS handover method is not indicated above, the UE may not transmit or receive data to or from the source base station until the first condition described in the disclosure is satisfied from the time when the handover command message is received or may no longer continue to transmit or receive data to or from the source base station. Accordingly, the following method may be applied to the UE to perform the operation of the disclosure, and may be modeled as shown in reference numeral 3021 or 3022. In addition, if the second condition described in the disclosure is satisfied and thus the source base station is released, the method may be modeled as shown in reference numeral 3031 or 3032.

As suggested in the disclosure, when the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may suspend SRBs configured for the MAC layer device for the source base station. In addition, a higher layer device (for example, an RRC layer device) of the UE may instruct the MAC layer device for the source base station to perform reconfiguration (MAC reconfiguration) by using configuration information, which is obtained by excluding configuration information related to the bearer for which the DAPS handover method is not indicated through the handover command message from the configuration information of the current MAC layer device. As another method, the higher layer device (for example, the RRC layer device) of the UE may instruct the MAC layer device for the source base station to perform reconfiguration (MAC reconfiguration) by using configuration information, which is obtained by including only configuration information related to the bearer for which the DAPS handover method is indicated through the handover command message in the configuration information of the current MAC layer device. In the above, if the UE reconfigures the MAC layer device for the source base station, the MAC layer device for the source base station of the UE may maintain logical channel identifiers for which the DAPS handover method is indicated or a priority bit rate or bucket size corresponding to the logical channel identifiers, and may release, or no longer use or apply logical channel identifiers corresponding to bearers for which the DAPS handover method is not indicated or a priority bit rate or bucket size corresponding to the logical channel identifiers. In addition, the higher layer device (for example, the RRC layer device) of the UE may perform, for a bearer for which the DAPS handover method is not indicated above, a PDCP re-establishment procedure or an RLC re-establishment procedure; may apply PDCP configuration information or RLC configuration information configured through the handover message or suspend the bearer; may suspend the bearer in the MAC layer device for the source base station; may configure the PDCP configuration information or RLC configuration information in the MAC layer device for the target base station (when the first condition is satisfied, the PDCP configuration information or RLC configuration information may be configured in the MAC layer device for the target base station); may indicate the MAC layer device for the target base station to configure or apply bearer configuration information, such as a logical channel identifier or priority bit rate or bucket size configured for the target base station, to the MAC layer device for the target base station with respect to a bearer for which the DAPS handover method is not indicated through the handover command message; and may switch the connection of the PDCP layer device or the RLC layer device with the MAC layer device for the source base station, the PDCP layer device or the RLC layer device corresponding to a bearer for which the DAPS handover method is not indicated, to the connection of the PDCP layer device or the RLC layer with the MAC layer device for the target base station. Then, for example, from that time point, when a logical channel prioritization (LCP) procedure for data transmission is performed, the MAC layer device for the source base station of the UE may select, as a candidate group, only logical channel identifiers corresponding to the bearer for which the DAPS handover method is indicated and perform the LCP procedure thereof. In the above, a procedure of reconfiguring the MAC layer device for the source base station by the higher layer device (for example, the RRC layer device) enables partial initialization of the MAC layer device (partial MAC reset) for the source base station to perform the same procedure. For example, the configuration information of the MAC layer device for a bearer for which the DAPS handover method is not indicated above may be initialized, released, or application thereof may be suspended. In addition, data transmission or reception to or from the source base station may be performed until the first condition described in the disclosure is satisfied. For the logical channel identifier corresponding to the bearer for which the DAPS handover method is not indicated above, the MAC layer device for the source base station may initialize the priority bit rate and release or suspend the bearer without further applying a procedure of calculating the priority bit rate accumulation. In addition, for a logical channel identifier corresponding to a bearer for which the DAPS handover method is indicated, the MAC layer device for the source base station may continue to maintain the priority bit rate and perform the accumulation calculation procedure. If the first condition is satisfied, data transmission is switched to the target base station, and the MAC layer device for the target base station may initialize the priority bit rate for newly configured logical channel identifiers (logical channel identifies corresponding to a bearer in which a DAPS handover method is indicated or a bearer in which the DAPS handover method is not indicated), or may start accumulation calculation (in another way, when a handover command message is received for the MAC layer device for the target base station, the priority bit rate is initialized and accumulation calculation may start). If bearers for which the DAPS handover method is not indicated in the above are configured or suspended, the MAC layer device for the target base station may configure or resume the bearers to perform data transmission or reception to or from the target base station, and may initialize the prioritized bit rate or start accumulation calculations. In addition, until the second condition described in the disclosure is satisfied, data reception from the source base station or the target base station is performed, and when the second condition is satisfied (indicated by reference numeral 3003), the MAC layer device for the source base station is initialized, the RLC layer device, PDCP layer device, or bearer configuration information corresponding to a bearer for which the DAPS handover method is not indicated may be released from the MAC layer device for the source base station, and the RLC layer device or bearer configuration information corresponding to the bearer for which the DAPS handover method is indicated may be released from the structure of the second PDCP layer device or the MAC layer device for the source base station (indicated by reference numeral 3031 or 3032). If the handover procedure fails and the connection with the source base station is valid, as described herein below in the disclosure, the UE may perform a procedure of fallback to the source base station (indicated by reference numeral 3002), may resume the SRB configured in the MAC layer device of the source base station and report the handover failure, may apply the existing bearer configuration information of the source base station before receiving the handover command message again and apply the configuration information of the original MAC layer device (for example, the RRC layer device may reconfigure MAC layer device configuration information used before receiving the handover command message), and may resume data transmission or reception to or from the source base station for each bearer (indicated by reference numeral 3030). As another method, the higher layer device (for example, the RRC layer device) of the UE may indicate the RLC re-establishment procedure for the bearer for which the DAPS handover method is indicated or the bearer in which the DAPS handover method is not indicated. As another method, in the above, configuration information of the MAC layer device for the source base station, to be applied when the source base station performs the DAPS handover method, may be configured through an RRC message.

In the methods of the disclosure, when the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, the UE may apply SRBs, which are configured in the MAC layer device for the source base station, by using one method or a plurality of methods among the following methods.

When the UE receives a handover command message, if a second handover method (for example, the second embodiment or DAPS handover method of the disclosure) is indicated through ReconfigWithSync information, if the DAPS handover method is indicated for each bearer identifier or logical channel identifier, if the DAPS handover method is configured for at least one bearer, or if the DAPS handover method is configured for a predetermined bearer, Method 1: SRB may be suspended in the MAC layer device for the source base station. Alternatively, window state variables may be initialized by performing the re-establishment procedure of the RLC layer device of the SRBs or the re-establishment procedure of the PDCP layer device, and stored data (PDCP SDU, PDCP PDU, RLC SDU, or RLC PDU) may be discarded. Alternatively, SRBs may be configured in the MAC layer device for the target base station according to the configuration received through the handover message. Alternatively, the SRBs of the MAC layer device for the source base station may be configured according to the configuration received through the handover message, and may be switched and connected to the MAC layer device for the target base station. If the UE fails the handover procedure and performs the fallback procedure, the SRBs, which are suspended in the MAC layer device for the source base station, may be resumed or the SRBs configured for the target base station may be reconfigured by the existing configuration for the source base station and switched and connected to the MAC layer device for the source base station to be resumed.

Method 2: The SRB may be suspended in the MAC layer device for the source base station. Alternatively, the re-establishment procedure of the RLC layer device of the SRBs or the re-establishment procedure of the PDCP layer device may be suspended without performing thereof. Alternatively, SRBs may be configured in the MAC layer device for the target base station according to the configuration received through the handover message. As another method, the SRBs of the MAC layer device for the source base station may be configured according to the configuration received through the handover message, and may be switched and connected to the MAC layer device for the target base station. If the UE fails a handover procedure and performs a fallback procedure, SRBs suspended in the MAC layer device for the source base station may be resumed or SRBs configured for the target base station may be reconfigured using the existing configuration for the source base station, and switched and connected to the MAC layer device for the source base station to be resumed.

Method 3: The SRB may be suspended in the MAC layer device for the source base station. Alternatively, the re-establishment procedure of the RLC layer device of the SRBs or the re-establishment procedure of the PDCP layer device may not be performed, and window state variables are not initialized but stored data (PDCP SDU, PDCP PDU, RLC SDU, or RLC PDU) may be discarded (in order to prevent RRC messages, which are not transmitted, from being transmitted unnecessarily later). Alternatively, SRBs may be configured in the MAC layer device for the target base station according to the configuration received through the handover message. As another method, the SRBs of the MAC layer device for the source base station may be configured according to the configuration received through the handover message, and may be switched and connected to the MAC layer device for the target base station. If the UE fails a handover procedure and performs a fallback procedure, the SRBs suspended in the MAC layer device for the source base station may be resumed or the SRBs configured for the target base station may be reconfigured using the existing configuration for the source base station, and may be switched and connected to the MAC layer device for the source base station to be resumed. In addition, according to the procedure for the SRBs, specifically, SRBs for the source base station are allowed to be suspended or SRBs configured for the target base station are enabled such that, in order to solve the security issue occurring by reusing the same count value from the beginning when performing the DAPS handover fallback procedure as described above, the existing count value of the SRBs for the source base station or transmission or reception window variable values thereof are applied or maintained for the SRBs established for the target base station (or the count value of the SRBs of the source base station or transmission or reception window variable values thereof may be configured as a count value of SRBs of the target base station or a transmission or reception window variable values thereof). In addition, for the SRBs for the target base station, the security key for the target base station may be derived or the derived security key may be applied, and the PDCP layer device of the SRBs may apply the security key for the target base station to perform ciphering or deciphering, or an integrity protection or verification procedure. In addition, for SRBs for the source base station, old data (e.g., RRC messages for the source base station) may be discarded. The procedure for the SRB for the target base station may be defined as a new procedure (e.g., DAPS SRB establishment or PDCP layer device re-establishment procedure) and indicated, triggered, or performed, and the procedure for the SRB may be extended and applied in the same manner as that of a UM DRB or AM DRB in which the DAPS handover method is not configured. More specifically, if the UE fails a handover procedure and performs a fallback procedure, and SRBs for the source base station may be resumed or SRBs for the target base station may be released. As another method, the target base station is enabled such that, in order to solve the security issue occurring by using the same count value from the beginning, the existing count value of SRBs for the target base station or the transmission or reception window variable values thereof are applied or maintained for SRBs for the source base station (alternatively, the count value of the SRBs of the target base station or the transmission or reception window variable values thereof may be configured as the count value of the SRBs of the source base station or the transmission or reception window variable values thereof), and the SRBs for the target base station may be released. In addition, the security key for the source base station may be applied to the SRBs for the source base station, and the PDCP layer device of the SRBs applies the security key for the source base station to perform ciphering or deciphering, or an integrity protection or verification procedure. Also, for SRBs for the source base station, old data (e.g., RRC message for the source base station) may be discarded. The procedure for the SRB may be extended and applied in the same manner as that of a UM DRB or AM DRB in which the DAPS handover method is not configured.

Herein below in the disclosure, when the UE performs the second embodiment (DAPS handover method) of the efficient handover method of the disclosure, if the UE fails in handover, a method is provided for quickly falling back to the source base station and re-establishing a connection by using the characteristics of the DAPS handover method of the above. In the above, the characteristics of the DAPS handover method of the disclosure specifically refers to performing data transmission or reception by maintaining a connection with the source base station even when performing a handover procedure. In addition, in the following of the disclosure, a handover method is provided for performing fallback by using a wireless connection established with the existing source base station even if the handover fails.

In the second embodiment (DAPS handover method) of the efficient handover method as described in FIG. 28 of the disclosure, even if the handover command message is received from the source base station, a procedure of handover to the target base station is performed while maintaining data transmission or reception to or from the source base station of reference numeral 2802. In addition, the disclosure proposes, when the procedure of handover to the target base station fails in the above, a procedure for falling back to the source base station.

If the UE fails the procedure of handover to the target base station as suggested above, in order to fall back to the source base station, a method for identifying whether a wireless connection between the UE and the source base station is valid is needed. This is because if the UE fails to handover and performs a fallback to the source base station when the wireless connection between the UE and the source base station is not valid, the fallback procedure to the source base station also fails, resulting in a very-long data interruption time, leading to a significant data loss. In addition, when the wireless connection between the UE and the source base station is valid, the SRB configured in the UE and the source base station needs to be maintained.

First, the disclosure proposes new timers applicable to the handover method, and proposes specific operations of each timer. In addition, specific operations of the timer may include performing different operations according to the type of handover method indicated through the handover command message by the base station. In addition, a method of releasing or maintaining connection with the source base station or SRB configuration according to the handover method is provided.

The disclosure introduces, in order to efficiently perform a handover procedure, a first timer (for example, T304), a second timer (for example, T310), a third timer (for example, T312), or a fourth timer (for example, a timer for fallback), and runs and applies the timers in the handover procedure. The first timer (for example, T304), the second timer (for example, T310), the third timer (for example, T312), or the fourth timer (for example, a timer for fallback) of the disclosure perform different operations as follows according to the type of handover method indicated through the handover command message. In the above, the first timer (for example, T304) is a timer for determining whether the handover has been successfully performed, the second timer (for example, T310) is a timer for determining whether the wireless connection is valid, and the third timer (for example, T312) is an auxiliary timer for determining whether the wireless connection is valid and is a timer for triggering a frequency measurement procedure and reporting a frequency measurement result. In addition, the fourth timer (for example, a timer for fallback) is a timer for, when handover fails while performing the second embodiment (DAPS handover method) of the efficient handover method of the disclosure, transmitting a message indicating that the handover has failed to the source base station by performing a procedure of fallback to the source base station and then determining whether the fallback procedure has been successfully performed or has failed.

Specific operations of the first timer (for example, T304), the second timer (for example, T310), the third timer (for example, T312), or the fourth timer (for example, a timer for fallback) of order to support an efficient handover method in the disclosure are described as follows according to the indicated handover method.

1> If the UE receives, from a lower layer device (e.g., a MAC layer device or a PHY layer device), an indicator (out-of-sync indication) indicating that wireless connection signals are not synchronized a predetermined number of times (for example, the base station configures the same), and thus detects that a problem exists in the physical layer device, the UE may start the second timer (for example, T310) when the first timer is not running. In addition, when the UE receives an indicator (in-sync indication) indicating that wireless connection signals are synchronizing well from the lower layer device a predetermined number of times (for example, the base station configures the same), when the handover procedure is triggered (started), or when an RRC connection re-establishment procedure is started, the second timer is interrupted. If the second timer expires, the UE triggers or starts an RRC connection re-establishment procedure. Alternatively, the UE transitions to an RRC idle mode, and triggers or starts the RRC connection re-establishment procedure.

1> When the second timer is running, the UE starts the third timer when a frequency measurement procedure is triggered for a frequency measurement identifier for which the third timer is configured. In addition, when the UE receives an indicator (in-sync indication) that the wireless connection signals are synchronizing well from the lower layer device a predetermined number of times (for example, the base station may configure the same), when the handover procedure is triggered (when the handover procedure is started), or when the RRC connection re-establishment procedure is started, the UE may interrupt the third timer. If the third timer expires, the UE triggers or starts an RRC connection re-establishment procedure. Alternatively, the UE transitions to the RRC idle mode and triggers or starts an RRC connection re-establishment procedure.

1> If the UE indicates a first handover method (for example, the first embodiment of the disclosure or general handover method) through a handover command message (a message obtained by including a mobility indication (MobilityControl info or Recon-figurationWithSync) or a handover indication in the RRCReconfiguration message), which is received from a base station, when the UE receives the handover command message, the first handover method (for example, the first embodiment of the disclosure or general handover method) is indicated through the handover command message, ReconfigWithSync information, or MobilityControlInfo information, if the second embodiment (DAPS handover method) of this disclosure is not configured, or the second embodiment (DAPS handover method) of this disclosure is not configured for a predetermined bearer through the bearer configuration information, 2> In the disclosure, upon receiving a handover command message (a message obtained by including mobility indication (mobility control info or Reconfiguration-WithSync) or handover indication in the RRCRecon-figuration message), the UE triggers a handover procedure and starts a first timer.

2> When triggering the handover procedure in the above, the UE releases an SRB (for example, SRB1) config-ured for the source base station, and configures an SRB for the target base station (for example, SRB1) based on the configuration information configured in the handover command message).

2> When triggering the handover procedure in the above, the UE may interrupt the second timer if the second timer is running. In addition, when the first timer is running, a second timer is not started even when the condition of starting the second timer (when an asyn-chronous indicator of a wireless connection signal is received from a lower layer a predetermined number of times) is satisfied. That is, when the first timer is running, the second timer is not used.

2> When triggering the handover procedure in the above, the UE may interrupt a third timer if the third timer is running. In addition, the third timer is started when the condition of starting the third timer only when the second timer is running (when a frequency measure-ment procedure is triggered for a frequency measure-ment identifier for which the third timer is configured) is satisfied. That is, since the second timer is not used when the first timer is running, the third timer is also not used.

2> In the above, if the procedure of handover to the target base station or the random access procedure is success-fully completed, the UE interrupts the first timer.

2> If the first timer expires in the above (for example, if the procedure of handover to the target base station fails), the UE performs an RRC connection re-estab-lishment procedure (may release the connection with the base station, and perform the RRC connection procedure from the beginning again, that is, perform a cell selection or reselection procedure, perform a ran-dom access procedure, and transmit an RRC connec-tion re-establishment request message).

1> In a case where the UE indicates a second handover method (for example, the second embodiment or the DAPS handover method) through a handover com-mand message (a message obtained by including a mobility indication (MobilityControl info or Recon-figurationWithSync) or a handover indication in the RRCReconfiguration message), which is received from a base station, (or may be extended and applied to a case where the UE indicates a conditional handover method together); if the UE receives the handover command message, the second embodiment (the DAPS handover method) of the disclosure is configured through the handover command message, Recon-figWithSync information, or MobilityControlInfo information; if the second embodiment (DAPS han-dover method) of this disclosure is configured for a predetermined bearer through bearer configuration information; or if the second embodiment (DAPS han-dover method) of this disclosure is configured for at least one bearer through the bearer configuration infor-mation.

2> In the disclosure, the UE triggers a handover procedure and starts a first timer upon receiving a handover command message (a message including a mobility indication (MobilityControl info or Reconfiguration-WithSync) or a handover indication in the RRCRecon-figuration message). If the conditional handover method is indicated together, the UE may start the first timer when selecting one cell among a plurality of target cells and starting a handover procedure or per-forming a random access procedure.

2> If the DAPS handover method is started when trig-gering the handover procedure in the above, the UE maintains or suspends the SRB (e.g., SRB1) configured for the source base station, and configures the SRB (for example, SRB1) for the target base station based on the configuration information configured in the handover command message. As another method, if the DAPS handover method is started when triggering the handover procedure in the above, the UE: may maintain or suspend an SRB (e.g., SRB1) configured for the source base station, and for the SRB for the source base station, re-establish a PDCP layer device or re-establish an RLC layer device to initialize a window state variable or interrupt a timer; may indicate to discard stored data (PDCP SDU or PDCP PDU) (that may be performed when the fallback procedure of this disclosure is triggered); and may configure an SRB (for example, SRB1) for the target base station based on the configuration information configured through the handover command message. As another method, the UE may configure a first bearer for a source base station and a second bearer for a target base station by applying the second PDCP layer device structure of the disclosure to the SRB. As another method, when the second PDCP layer device structure is applied to the SRB, the UE may re-establish the PDCP layer device for the first bearer or re-establish the RLC layer device to initialize the window state variable, interrupt the timer, and indicate to discard stored data (PDCP SDU or PDCP PDU) (that may be performed when the fallback procedure of the disclosure is triggered). That is, as another method, when the fallback procedure of the disclosure is triggered, the UE may perform a procedure of discarding data (e.g., old RRC messages) remaining in the SRB for the source base station or stored in a buffer, or may trigger or instruct the higher layer device (e.g., RRC layer device) of the UE to discard data (e.g., old RRC messages) remaining in the PDCP layer device for the SRB or stored in a buffer. This is because old RRC messages should be prevented from being transmitted to the source base station.

2> If the DAPS handover method is triggered when triggering the handover procedure in the above, the UE may not interrupt the second timer for the source base station even if the second timer for the source base station is running. In addition, when the condition of starting the second timer even when the first timer is running (or when the first timer is not running) is satisfied (when an asynchronous indicator of a wireless connection signal is received from a lower layer a predetermined number of times), the UE starts the second timer. The second timer may operate for wireless connection between the UE and the source base station. As another method, two second timers are operated, one second timer is operated for the wireless connection between the UE and the source base station, and another second timer is operated for the wireless connection between the UE and the target base station. That is, even when the first timer is running, the second timer may be used for wireless connection with the source base station or the target base station. However, even when the second timer expires, if the first timer does not expire and is running, the UE may not trigger an RRC connection re-establishment procedure. That is, specifically, even if the second timer for the source base station expires or a radio connection failure (RLF) occurs in the above, if the first timer is not expired and is running, a procedure of random access to the target base station is being performed, or a procedure of handover to the target base station is being performed, the UE may release the radio connection with the source base station without triggering the RRC connection re-establishment procedure. In addition, the UE may not release RRC configuration information (e.g., bearer configuration information etc.) configured by the source base station and may reuse the same if the RRC connection re-establishment procedure is triggered later. In addition, even if the second timer expires, if the first timer does not expire and is running, the UE does not trigger the RRC connection re-establishment procedure, and may transmit a report indicating that the wireless connection with the source base station has failed to the source base station or target base station, or the UE may release the connection with the source base station (e.g., first bearers for the source base station may be released) or suspends the first bearers for the source base station. However, when the second timer expires, if the first timer expires or has been interrupted, or if the first timer is not driven because it is not started, the UE may trigger the RRC connection re-establishment procedure. The reason for operating the second timer even when the handover procedure is performed is to enable the fallback procedure to be performed in a case where the wireless connection with the source base station or the target base station is valid when a handover failure occurs as a result of monitoring the wireless connection between the UE and the source base station. In addition, when the second timer for the target base station in the above expires or when the wireless connection with the target base station fails, if the first timer has expired, has been interrupted, or has not started and thus is not running, or a procedure of random access to the target base station has been successfully performed, the UE may trigger an RRC connection re-establishment procedure.

2> If the DAPS handover method is triggered when triggering the handover procedure in the above, the UE does not interrupt the third timer for the source base station even if the third timer is running. In addition, when the condition of starting the third timer only when the second timer is running is satisfied (when the frequency measurement procedure is triggered for the frequency measurement identifier for which the third timer is configured), the third timer is started. That is, since the second timer is used even when the first timer is running, the third timer may also be used. The third timer may operate for wireless connection between the UE and the source base station. In another method, two third timers are operated, one third timer may operate for the wireless connection between the UE and the source base station, and another third timer may operate for the wireless connection between the UE and the target base station. That is, even when the first timer is running, the third timer may be used for wireless connection with the source base station or the target base station. However, if the first timer does not expire and is running even if the third timer expires, the UE may not trigger an RRC connection re-establishment procedure. In addition, if the first timer does not expire and is running even if the third timer expires, the UE does not trigger the RRC connection re-establishment procedure, and may transmit, to the source base station or target base station, a report indicating that the connection with the source base station has failed, and release the connection with the source base station (for example, first bearers for the source base station may be released) or suspend the first bearers for the source base station. However, if the first timer expires or is interrupted when the third timer expires, or if the first timer is not driven because it is not started, the UE may trigger the RRC connection re-establishment procedure. The reason for operating the third timer even when performing the handover procedure in the above is to enable the fallback procedure to be performed in a case where the wireless connection with the source base station is valid when a handover failure occurs as a result of monitoring the wireless connection between the UE and the source base station, and is to enable a result of frequency measurement to be reported in the fallback procedure.

2> In the above, if the procedure of handover to the target base station is successfully completed, the UE interrupts the first timer.

2> In the above, if the first timer expires (for example, if the procedure of handover to the target base station has failed); if the number of retransmissions to the target base station in the RLC layer device exceeds the maximum number of retransmissions; when a handover command message is received in the above, if the UE fails the handover because the configuration information of the handover command message has a value exceeding the UE capability or an error occurs in the application of the configuration information; if a problem in performing random access to the target base station occurs, and the handover procedure fails because the first timer expires although the UE continues to attempt the random access procedure; or if the second timer or the third timer is driven for the target base station above, the second timer or the third timer expires before the handover procedure is completed, the T304 timer is interrupted or expired, and if it is determined that the handover procedure has failed, 3> If the second timer or the third timer for the wireless connection between the UE and the source base station in the above has not expired (or the second timer or the third timer for the wireless connection between the UE and the source base station is not started or is running), or if the wireless connection between the UE and the source base station is valid, 4> The UE may determine that the wireless connection between the UE and the source base station is valid and perform the fallback procedure of this disclosure.

4> In the above, if the SRB (e.g., SRB1, or MAC, RLC, or PDCP layer device of SRB1), which is configured for the source base station, is suspended when starting the fallback procedure, the UE resumes or newly configures the SRB and perform a procedure of fallback to the SRB (for example, SRB1). As another method, if the second PDCP layer device structure of the disclosure is applied to the SRB, the UE may perform a fallback procedure through the first bearer for the source base station, and may release the second bearer for the target base station. For example, the UE may switch uplink data transmission to the first bearer for the source base station, indicate that there is data to be transmitted to the RLC layer device or the MAC layer device of the first bearer, and transmit a message for reporting failure of a handover for the fallback procedure through the first bearer. In addition, when the fallback procedure is triggered in the above, the UE performs a procedure of discarding data (e.g., old RRC messages) remaining in the SRB for the source base station or stored in the buffer, or may trigger or instruct the higher layer device (e.g., RRC layer device) of the UE to discard data (e.g., old RRC messages) remaining in the PDCP layer device for the SRB or stored in a buffer. This is because old RRC messages should be prevented from being transmitted to the source base station.

4> In the above, the fallback procedure is to report the handover failure to the source base station by configuring a report message indicating that the handover has failed through the SRB (for example, SRB1) configured with the source base station. In the above, when the UE transmits, to the source base station, the report message indicating that the handover has failed, a result of frequency measurement measured by the UE is also reported, thereby helping to quickly recover the connection with the source base station. As another method, the UE may define and transmit MAC control information (for example, the UE may indicate that the handover has failed by indicating that there is new MAC control information or data to be transmitted for buffer status report or by defining and indicating a special value), RLC control information, or PDCP control information so as to transmit an indication that the handover has failed to the source base station. As another method, the UE may transmit the RRC connection re-establishment request message to the SRB (e.g., SRB0 or SRB1) for the source base station in the above. As another method, the fallback procedure in the above may be a procedure of releasing the second bearer for the target base station for each bearer or in the second PDCP layer device structure of a bearer in which the DAPS handover method is configured when the handover fails, or resuming data transmission or reception through the first bearer for the source base station by the UE after switching to the first PDCP layer device structure. The UE may transmit an indication indicating that there is data to be transmitted to the MAC layer device of the first bearer, request scheduling from the source base station or report, to the source base station, that there is data to be transmitted (e.g., buffer status report), or transmit new MAC CE, RLC control data, or PDCP control data to fall back to the source base station and thus transmit an indication indicating that data transmission is to be started again to the source base station. In addition, the UE may newly configure or resume the SRB for the source base station. In addition, the fallback procedure in the above has been previously configured for each bearer when the handover fails or bearers for which the DAPS handover method is not configured because the bearers do not have a second PDCP layer device structure, and the UE may release the PDCP layer device, RLC layer device, bearer configuration information, or logical channel identifier information, reconfigured through the configuration information of the handover command message, from the MAC layer device for the target base station, and may switch and connect to the MAC layer device for the source base station to resume data transmission or reception for each bearer to or from the source base station. This is because, for a bearer in which the DAPS handover method is not indicated when receiving the handover command message, the UE may apply the bearer configuration information configured in the handover command message to the MAC layer device for the target base station, and may switch the connection of the MAC layer device for the source base station with the PDCP layer device or the RLC layer device corresponding to the bearer in which the DAPS handover method is not indicated to the connection of the MAC layer device for the target base station with the PDCP layer device or the RLC layer device. For example, when receiving the handover command message, the higher layer device (for example, the RRC layer device) of the UE may instruct the MAC layer device for the source base station to perform reconfiguration (MAC reconfiguration) by using configuration information, which is obtained by excluding configuration information related to the bearer for which the DAPS handover method is not indicated through the handover command message from the configuration information of the current MAC layer device. Alternatively, the higher layer device (for example, the RRC layer device) of the UE may instruct the MAC layer device for the source base station to perform reconfiguration (MAC reconfiguration) by using configuration information, which is obtained by including only configuration information related to the bearer for which the DAPS handover method is indicated through the handover command message in the configuration information of the current MAC layer device. That is, when the handover command message is received, since the configuration information of the PDCP layer device, RLC layer device, or MAC layer device of a bearer for which the DAPS handover method is not indicated may be released from the MAC layer device for the source base station, and the configuration information may be applied or connected to the MAC layer device for the target base station according to the bearer configuration for the target base station, if the fallback procedure is performed, the bearer for which the DAPS handover method is not configured is reconfigured in the MAC layer device for the source base station. For example, when performing a fallback procedure, the higher layer device (e.g., RRC layer device) of the UE may instruct the MAC layer device for the source base station to perform reconfiguration (MAC reconfiguration) by using the configuration information of the current MAC layer device, the configuration information related to the bearer for which the DAPS handover method is not indicated through the handover command message, and the bearer configuration information in which the DAPS handover method is indicated. Alternatively, when the fallback procedure is performed, the UE may reconfigure or reconstruct bearer configuration (for example, PDCP layer device configuration information, RLC layer device configuration information, MAC layer device configuration information, or PHY layer device configuration information) prior to reception of the handover command message and apply the reconfigured or reconstructed bearer configuration to the bearer for the source base station (PHY layer devices, PDCP layer device configuration information, RLC layer device configuration information, or MAC layer device configuration information of SRB, AM DRB, or UM DRB).

4> In the fallback procedure, when the UE transmits a report message indicating that the handover has failed to the source base station (for example, the RRC message, MAC CE, RLC control data, or PDCP control data described above), the UE may start the fourth timer. When receiving an instruction or message from the source base station in response to a report message indicating that the handover has failed, the UE may interrupt a fourth timer. However, if the fourth timer expires or if the response message is not received until the expiration, the UE performs an RRC connection re-establishment procedure (may release the connection with the base station and perform the RRC connection procedure again from the beginning, that is, perform a cell selection or reselection procedure, perform a random access procedure, and transmit an RRC connection re-establishment request message). In addition, if the RRC connection re-establishment procedure is triggered due to the expiration of the fourth timer, the second timer or the third timer may be interrupted if it is running 3> If the second timer or the third timer for wireless connection between the UE and the source base station or the target base station in the above has expired, or if the wireless connection between the UE and the source base station or target base station is not valid 4> The UE performs the RRC connection re-establishment procedure (may release the connection with the base station and perform the RRC connection procedure again from the beginning, that is, perform a cell selection or reselection procedure, perform a random access procedure, and transmit an RRC connection re-establishment request message).

2> If the UE satisfies the second condition described in the disclosure when performing the DAPS handover procedure in the above, the UE may release the connection with the source base station or release the SRB for the source base station, and may interrupt and initialize the second timer or the third timer for the source base station if it is running. In the above, it is possible to prevent unnecessary RRC connection re-establishment procedures due to expiration of the second timer or the third timer only when the second timer or the third timer is interrupted. Since satisfaction of the second condition may denote that the handover procedure has been successfully performed, and the first timer is thus interrupted and expiration of the second timer or the third timer may trigger an unnecessary RRC connection re-establishment procedure. As another method, when the first condition described in the disclosure is satisfied or the handover procedure is successfully completed, the SRB for the source base station is released, or the second timer or the third timer for the source base station may be interrupted and initialized if it is running. In the above, it is possible to prevent unnecessary RRC connection re-establishment procedures due to expiration of the second timer or the third timer only when the second timer or the third timer is interrupted. Since satisfaction of the first condition may denote that the handover procedure has been successfully performed, the first timer is thus interrupted and expiration of the second timer or the third timer may trigger an unnecessary RRC connection re-establishment procedure.

When the UE determines that a handover failure has occurred according to the method of the disclosure and performs a fallback procedure by satisfying the condition described above, the UE may include, in an RRC message (for example, a ULInformationTransferMRDC message or a FailureInformation message), information indicating that a handover failure has occurred, and transmit the RRC message to SRB1 or SRB1 to which the second PDCP layer device structure is applied, to enable the source base station to identify the handover failure of the UE. In the above, when the source base station detects the handover failure of the UE, the source base station may configure an RRC message (for example, an RRCReconfiguration message or an RRCRelease message) in response thereto and transmit the RRC message to the UE. In the above, when receiving an RRCReconfiguration message (SRB1 to which the second PDCP layer device structure is applied, or an RRC message received through SRB1) through a response RRC message with respect to the handover failure report, the UE may complete the application of the configuration information thereof and in response thereto, transmit an RRCReconfigurationComplete message again to the source base station through SRB1 or SRB1 to which the second PDCP layer device structure is applied; and if the handover or access to another cell is indicated through the RRCReconfiguration, complete a procedure of random access to the cell and transmit the RRCReconfigurationComplete message through SRB1. However, if the UE receives the RRCRelease message as a response RRC message with respect to the handover failure report in the above, the UE may transition to the RRC idle mode or to the RRC deactivation mode according to the configuration information indicated through the RRCRelease message, and may no longer transmit an additional response RRC message with respect to the RRC message to the base station.

Figure 35:
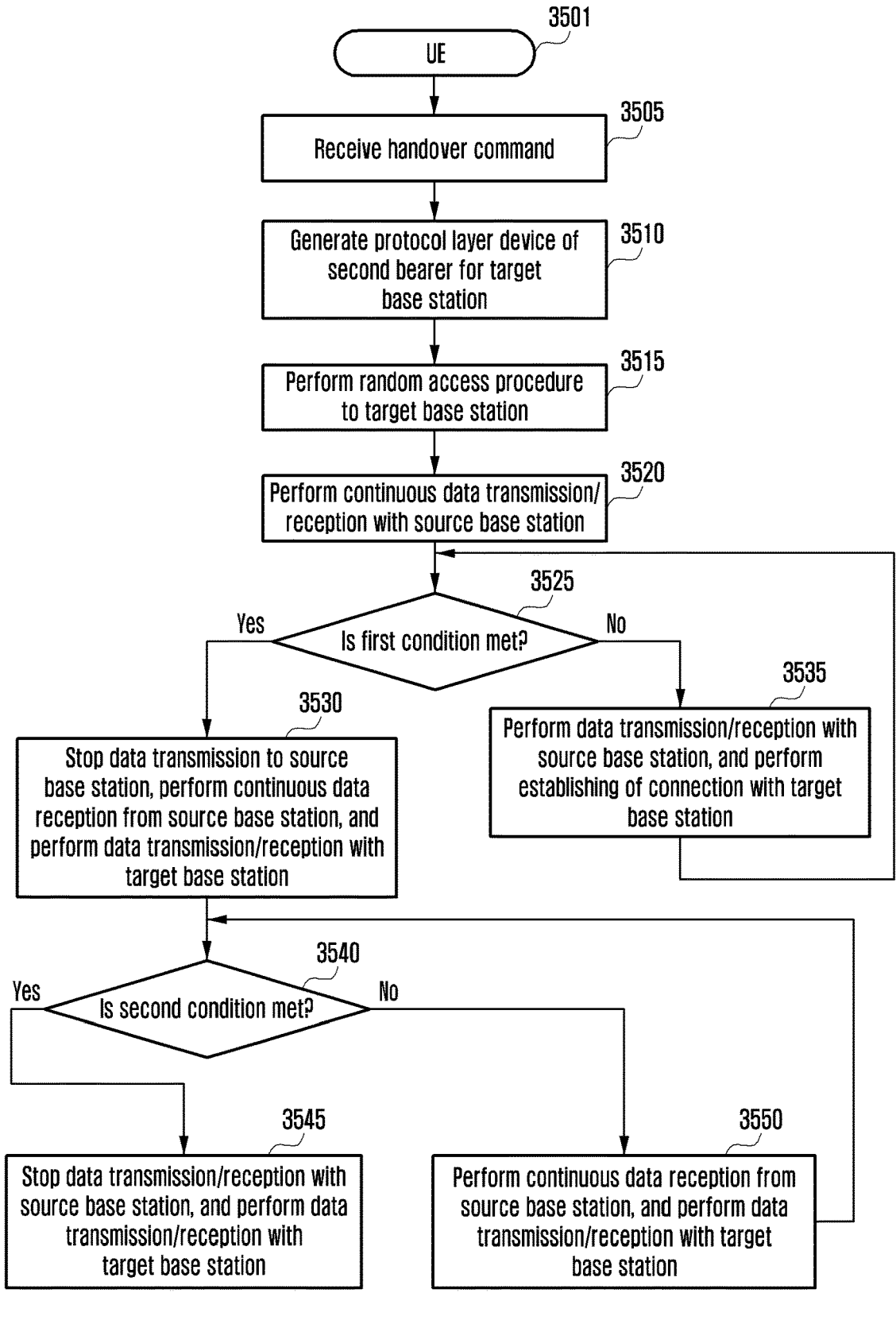
FIG. 35 is a diagram illustrating operations of a UE according to an embodiment of the disclosure.

FIG. 35 is a diagram illustrating operations of a UE according to an embodiment of the disclosure.

Referring to FIG. 35, a UE 3505 may transmit or receive data to or from the source base station through the first PDCP layer device structure for each bearer. However, in case that a handover command message is received and the DAPS handover method of the second embodiment of the disclosure is indicated through the handover command message, or in case that the DAPS handover method is indicated for each bearer, the UE may switch the target base station indicated through the message to the structure of the second PDCP layer device for each bearer or the bearers for which the DAPS handover method is indicated, and even when the protocol layer devices of the second bearer are configured and established and a procedure of random access to the target base station is performed through the established protocol layer devices (indicated by reference numerals 3510 and 3515), the UE continue to transmit or receive data (uplink data transmission and downlink data reception) to or from the source base station through protocol layer devices of the first bearer (indicated by reference numeral 3520).

If the first condition is satisfied (indicated by reference numeral 3525), the UE interrupts transmission of uplink data to the source base station through the protocol layer devices of the first bearer, and switches the uplink data transmission to transmit the uplink data to the target base station through the protocol layer devices of the second bearer, wherein the UE may continuously receive downlink data from the source base station and the target base station through the protocol layer devices of the first bearer and the second bearer (indicated by reference numeral 3530). In addition, the PDCP layer device of the second bearer may continue to perform seamless data transmission or reception to or from the target base station by using transmission or reception data, serial number information, or information such as header compression and decompression context, which are stored in the PDCP layer device of the first bearer. In the above, if the first condition is not satisfied, the UE may continue to identify the first condition while continuing the procedure previously performed (indicated by reference numeral 3535).

In addition, if the second condition is satisfied in the above, the UE may stop receiving downlink data from the source base station through the protocol layer devices of the first bearer (indicated by reference numeral 3545). In addition, the PDCP layer device of the second bearer may continue to perform seamless data transmission or reception to or from the target base station by using transmission or reception data, serial number information, or information such as header compression and decompression context stored in the PDCP layer device of the first bearer.

If the second condition is not satisfied in the above, the UE may continue to identify the second condition while continuing to perform the existing procedure (indicated by reference numeral 3550).

A specific embodiment of the PDCP layer device of the disclosure may perform different procedures according to the type of handover indicated through the handover command message received by the UE as follows.

If the handover type indicated through the handover command message, received from the source base station by the UE, indicates the handover of the first embodiment (for example, a general handover procedure), if the handover command message, ReconfigWithSync information, or MobilityControlInfo information indicates a first handover method (for example, the first embodiment of the disclosure or a general handover method) when the UE has received the handover command message, if the second embodiment (DAPS handover method) of the disclosure is not configured, or if the second embodiment (DAPS handover method) of the disclosure is not configured for a predetermined bearer through the bearer configuration information, for a bearer in which the second embodiment of the disclosure (DAPS handover method) is not configured through the bearer configuration information, The UE may perform a PDCP layer device re-establishment procedure (PDCP re-establishment) of the PDCP layer device for each bearer. For example, for SRB, the UE may initialize window state variables and discard stored data (PDCP SDU or PDCP PDU). For UM DRB, the UE may initialize window state variables, and may perform compression, ciphering, or integrity protection of data, which has not yet been transmitted to lower layer devices or data for which the PDCP revocation timer has not expired, based on the header (or data) compression context or security key of the target base station in ascending order of the COUNT value, thereby performing transmission or retransmission thereof. If the reordering timer is running, the UE may interrupt the timer and initialize, and may process received data (PDCP SDU or PDCP PDU) in sequence and transmit the same to the higher layer device. For AM DRB, the UE may not initialize window state variables, and may perform compression or ciphering starting from first data (PDCP SDU or PDCP PDU), which is not successfully transmitted from the lower layer device, based on the header (or data) compression context or security key of the target base station in ascending order of the PDCP serial number or count value, or integrity protection thereof is performed to be transmitted or retransmitted. In addition, the receiving PDCP layer device may process or store the data received due to the re-establishment procedure of the lower layer device (e.g., the RLC layer device), and for AM DRBs, if an indicator (drb-Continue ROHC) indicating continuous use of the header compression context is not configured, a header decompression procedure may be performed on the stored data based on header compression context (ROHC). In addition, the receiving PDCP layer device may process or store the data received due to the re-establishment procedure of the lower layer device (e.g., the RLC layer device), and for AM DRBs, a header decompression procedure may be performed on the stored data based on Ethernet header compression context (EHC). In another method, the receiving PDCP layer device may process or store the data received due to the re-establishment procedure of the lower layer device (e.g., the RLC layer device), and for AM DRBs, if an indicator (drb-Continue Ethernet header compression context (EHC)) indicating continuous use of the header compression context is not configured, a header decompression procedure may be performed on the stored data based on the EHC.

If the handover type indicated through the handover command message received from the source base station indicates the handover of the second embodiment (or the handover is indicated for each bearer), if the second embodiment (DAPS handover method) of the disclosure is configured based on the handover command message, ReconfigWithSync information, or MobilityControlInfo information when the UE has received the handover command message, if the second embodiment (DAPS handover method) of the disclosure is configured for a predetermined bearer through the bearer configuration information, or if the second embodiment (DAPS handover method) of the disclosure is configured for at least one bearer through the bearer configuration information, for a bearer in which the second embodiment of the disclosure (DAPS handover method) is configured through the bearer configuration information, The PDCP layer device in which the handover command message is received and the DAPS handover method is indicated may perform the following procedures without performing a PDCP re-establishment procedure. For example, for SRB, the UE may initialize window state variables (variable initialization may be skipped in order to perform fallback at the time of DAPS handover failure), or may discard stored data (PDCP SDU or PDCP PDU). For UM DRB, the UE may initialize window state variables, and may continue to transmit or receive pieces of data, which has not yet been transmitted to lower layer devices or pieces of data, for which the PDCP revocation timer has not expired, to or from the source base station. For AM DRB, the UE may not initialize window state variables, and may continue to transmit or receive data to or from the source base station. In addition, the UE may not initialize the uplink or downlink ROHC context for the source base station and use the same as it is, and may initialize the uplink or downlink ROHC context for the target base station and start in an initial state (for example, an IR state of U mode). As another method, the UE may initialize the uplink or downlink ROHC context for the source base station and start in an initial state (for example, an IR state in U mode), and may initialize an uplink or downlink ROHC context for the target base station and start in an initial state (for example, an IR state in U mode).

The UE may perform procedures, which are described in the disclosure when the first condition is satisfied, for each bearer (or for a bearer for which the second embodiment is indicated).

The UE may perform procedures, which are described in the disclosure when the second condition is satisfied, for each bearer (or for a bearer for which the second embodiment is indicated).

For bearers for which the second embodiment (or DAPS handover method) is not indicated (or not configured), when the handover command message is received, the UE may release configuration information or context for a data compression protocol (e.g., uplink data compression protocol). Alternatively, when the handover command message is received, the higher layer device (e.g., RRC layer device) of the UE may instruct the PDCP layer device to release configuration information or context for the data compression protocol (e.g., uplink data compression protocol) or reconfigure the same. However, for bearers for which the second embodiment (or DAPS handover method) is indicated (or configured), the UE may release context or configuration information for a data compression protocol (e.g., uplink data compression protocol) (for the source base station) when the first condition described in the disclosure is satisfied. Alternatively, when the first condition is satisfied, the higher layer device (e.g., RRC layer device) of the UE may instruct or reconfigure the PDCP layer device to release configuration information or context for the data compression protocol (e.g., uplink data compression protocol) (for the source base station). This is because, for a bearer for which the DAPS handover method is configured, data needs to be compressed by using the context or configuration information for the data compression protocol for the source base station until the first condition is satisfied and transmitted to the source base station.

One of the following methods may be applied to a bearer or PDCP layer device for which a DAPS handover method is not indicated after receiving the handover command message.

First method: For bearers or PDCP layer devices for which the DAPS handover method is not configured above, when a handover command message is received, the UE does not trigger or perform the PDCP re-establishment procedure, or the target base station does not establish a PDCP re-establishment procedure for the bearers through the handover command message. If the first condition described in the disclosure is satisfied, the PDCP re-establishment procedure may be triggered or performed (even if the target base station configures the PDCP re-establishment procedure for the bearer through the handover command message, the procedure may be performed when the first condition is satisfied). Specifically, if the first condition is satisfied, the higher layer device (for example, RRC layer device) of the UE may trigger or request a PDCP re-establishment procedure for a bearer or bearers for which the DAPS handover method is not configured. The PDCP layer device, which has received the request for the PDCP re-establishment procedure, may perform different PDCP re-establishment procedures for respective bearers. For example, for UM DRB, the UE may initialize the window state variables, may perform compression, ciphering, or integrity protection of pieces of data, which has not yet been transmitted to the lower layer device, or pieces of data, for which the PDCP discard timer has not expired, based on the header (or data) compression context or security key of the target base station in ascending order of the count value, and then may perform transmission or retransmission thereof. If the reordering timer is running, the UE may interrupt and initialize the reordering timer, and may process received data (PDCP SDU or PDCP PDU) in a sequential manner and transmit the same to the higher layer device. For AM DRB, the UE may not initialize the window state variables, may perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, and then may perform transmission or retransmission thereof. The reason for performing the PDCP re-establishment procedure when the first condition is satisfied rather than performing the PDCP re-establishment procedure when the handover command message is received, for the bearer(s) for which the DAPS handover method is not configured, is that if the handover procedure to the target base station fails, fallback to the source base station may be performed, wherein in the PDCP re-establishment procedure for the bearers, data is compressed based on the header (or data) compression context of the target base station and is ciphered or integrity protected based on the security key of the target base station, and in this case, the data becomes useless and needs to be discarded if data fallback is required. In addition, when fallback is required, pieces of data, for which PDCP re-establishment procedure is performed again and to be transmitted, need to be compressed based on the header (or data) compression context of the source base station, and ciphered or integrity protected again based on the security key of the source base station. Thus, unnecessary processing occurs. Therefore, when the UE performs the DAPS handover method, for a bearer for which the DAPS handover method is not configured, the PDCP re-establishment procedure is not triggered or performed when the handover command message is received, and when the first condition is satisfied, the PDCP re-establishment procedure may be triggered or performed. In addition, the PDCP re-establishment procedure is not performed for the bearer for which the DAPS handover method is configured.

Second method: When a handover command message is received for bearer(s) for which the DAPS handover method is not configured, the higher layer device (for example, RRC layer device) of the UE may trigger or request a PDCP re-establishment procedure. The PDCP layer device, which has received the request for the PDCP re-establishment procedure, may perform different PDCP re-establishment procedures for respective bearers. For example, for UM DRB, the UE may initialize the window state variables, and perform compression, ciphering, or integrity protection of data that has not yet been transmitted to the lower layer device or data for which the PDCP discard timer has not expired, based on the header (or data) compression context or security key of the target base station in ascending order of the count value, and then may perform transmission or retransmission thereof. If the reordering timer is running, the UE may interrupt and initialize the reordering timer, and may process received data (PDCP SDU or PDCP PDU) in a sequential manner and transmit the same to the higher layer device. For AM DRB, the UE may not initialize the window state variables, and perform compression, ciphering, or integrity protection of first data (PDCP SDU or PDCP PDU) that has not been successfully transmitted from the lower layer device, based on the header (or data) compression context or security key of the target base station in ascending order of the count value or the PDCP serial number, and then may perform transmission or retransmission thereof. When a handover command message is received for the bearer (s) for which the DAPS handover method is not configured, the data is compressed based on the header (or data) compression context of the target base station and is ciphered and integrity protected based on the security key of the target base station through the PDCP re-establishment procedure. Accordingly, if the UE fails in the procedure of handover to the target base station (for example, if the first timer expires or wireless connection to the target base station fails), and fallback to the source base station is possible and thus the UE performs fallback, the higher layer device (e.g., RRC layer device) of the UE may: reconfigure, for the bearers for which the DAPS handover method is not indicated, an indication of discarding pieces of data (PDCP PDUs) processed based on configuration information (security key or header (or data) compression context) for the target base station so that pieces of data (e.g., PDCP PDUs), generated or processed for transmission to the target base station, are discarded in the bearers and the data can be processed again based on the header (or data) compression context or security key for the source base station, a PDCP re-establishment procedure, or configuration information (security key or header (or data) compression context) for the source base station; and may request or indicate generation or processing of data again based on the source base station configuration information.

In addition, when the source base station instructs the UE to perform a handover applying the embodiments of the disclosure, the source base station may start data forwarding to the target base station if the following third condition is satisfied. The third condition may denote that one or more of the following conditions are satisfied.

When an indication that the UE has successfully completed handover is received from the target base station When a handover command message is transmitted to the UE When a handover command message is transmitted to the UE and successful transmission (HARQ ACK, NACK, RLC ACK, or NACK) for the handover command message is identified When the source base station receives, from the UE, an indicator (for example, an RRC message (for example, RRCReconfiguration message), MAC CE, or RLC control PDU, or PDCP control PDU) indicating releasing the connection with the source base station When a handover command message is transmitted to the UE, a predetermined timer is driven, and the timer is expired When information indicating identification (HARQ ACK, NACK, RLC ACK, or NACK) about successful transmission of downlink data is not received from the UE for a predetermined time FIGS. 31A, 31B, 32A, 32B, 33A, 33B, 34A, and 34B are diagrams illustrating, when a DAPS handover method which is a second embodiment of an efficient handover method proposed in an embodiment of the disclosure is indicated for each bearer through an RRCReconfiguration message or an RRCConnectionReconfiguration message, a method for a UE having received the message to drive different bearer-specific protocol layer devices for a bearer in which SRB or the DAPS handover method is configured or for bearers in which the DAPS handover method is not configured.

Herein below in the disclosure, a UE operation for specifically performing the techniques described above is provided. Specifically, the disclosure proposes, when the DAPS handover method, which is the second embodiment of the efficient handover method of the disclosure, is indicated to each bearer through an RRCReconfiguration message or an RRCConnectionReconfiguration message, a method for driving, by the UE having received the message, different bearer-specific protocol layer devices with respect to a signaling radio bearer (SRB), bearers for which the DAPS handover method is configured, or bearers for which the DAPS handover method is not configured.

FIGS. 31A, 31B, 33A, and 33B illustrate a detailed first embodiment of the method in which, when the DAPS handover method is indicated to each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed first embodiment is as follows.

1> If the UE receives a handover command message (e.g., RRCReconfiguration message) or receives ReconfigWithSync information (in case of NR base station) or MobilityControlInfo information (in case of LTE base station) through the RRCReconfiguration message, if the UE can follow the configuration information of the RRC message, the UE can perform one or more of the following operations.

2> The UE starts the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> the UE may interrupt the second timer if the second timer for the source base station of the disclosure is running 3> the UE may interrupt the third timer if the third timer for the source base station of the disclosure is running 2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> Even if the second timer for the source base station of this disclosure is running, the UE does not interrupt the second timer.

3> The UE may generate or establish a MAC layer device for the target base station. For example, the UE may apply the configuration of the target Pcell with the same configuration of the source PCell.

3> The UE may apply a new UE identifier (e.g., C-RNTI) in the MAC or PHY layer device with respect to the target base station or for the target base station.

3> The UE may reconfigure the MAC layer device for the source Pcell.

Specifically, the UE may reconfigure the MAC layer device for the source Pcell by using MAC layer device configuration information, obtained by excluding configuration information about a logical channel or a bearer for which a DAPS handover method is not configured. Alternatively, the UE may reconfigure the MAC layer device for the source Pcell by using MAC layer device configuration information including configuration information about a logical channel or a bearer for which the DAPS handover method is configured. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, or may be a list of DRBs for DAPS handover. With regard to a DRB having an identifier included in the list of DRBs for which the DAPS handover method is configured, or with regard to all DRBs (there is no list of DRBs for a DAPS handover), 4> An RLC layer device and a dedicated control channel (DCCH) logical channel for a target Pcell may be configured or established. For example, the target Pcell may be applied with the same configuration as that of the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB, the identifier of which is not included in a list of DRBs for which the DAPS handover method is configured 4> The PDCP layer device may be re-established. As described in the disclosure, a security key or ROHC context for a target Pcell may be applied, or data (e.g., PDCP PDU) is generated based on the applied security key or ROHC context for the target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

4> The RLC layer device may be re-established and the RLC layer device or the connected dedicated traffic channel (DTCH) may be connected to the target Pcell (or the MAC layer device of the target Pcell).

3> With regard to each SRB,

4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the configuration of the target Pcell may be applied with the same configuration as the configuration for the source PCell.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

2> Otherwise, or if the second handover method (for example, the second embodiment of the disclosure or the DAPS handover method) is not indicated (or is not configured), if the DAPS handover method is not configured (or is not indicated) for each bearer identifier or logical channel identifier, if the DAPS handover method is not configured for at least one bearer, or if the DAPS handover method is not configured for a predetermined bearer, one or more of the following operations may be performed.

3> If the DAPS handover method is configured, the MCG MAC layer device or SCG MAC layer device is initialized.

3> If the DAPS handover method is configured, the configuration or context for the uplink compressed data method is released.

3> The PDCP layer device may be re-established for all bearers (e.g., DRBs or SRBs) for which the PDCP layer device is established or configured.

3> MCG RLC or SCG RLC layer device may be re-established for all bearers (e.g., DRBs or SRBs) for which the RLC layer device is established or configured.

1> If the MAC layer device successfully completes the random access procedure (or the first condition described in this disclosure is satisfied)

1> Alternatively, if an indicator (for example, rach-Skip) indicating skipping of the random access procedure is configured, and the MAC layer device indicates successful reception of the PDCCH transmission corresponding to the UE identifier (C-RNTI), 2> The first timer (for example, T304) is interrupted.

2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer 3> The second timer (for example, T310) is interrupted if the second timer is running 3> The third timer (for example, T312) is interrupted if the third timer is running 3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

3> MCG configuration information may be released. The MCG configuration information may include configuration information of each bearer or SDAP, PDCP, RLC, MAC, or PHY layer device information, UE identifier information, or security information.

3> If there is SCG configuration information, the SCG configuration information may be released. The SCG configuration information may include configuration information of each bearer or SDAP, PDCP, RLC, MAC, or PHY layer device information, UE identifier information, or security information.

2> System information may be read from the target PCell.

1> If the first timer of this disclosure has expired (for example, if the handover procedure has failed)

2> If the first timer for handover (for example, T304) has expired or if handover has failed 3> If random access-related configuration information is configured, designated preamble information is released.

3> If the second handover method (e.g., the second embodiment of the disclosure or the DAPS handover method) is not configured (or not indicated), the DAPS handover method is not configured (or not indicated) for each bearer identifier or logical channel identifier, if the DAPS handover method is not configured for at least one bearer, or if DAPS handover method is not configured for a predetermined bearer, 3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer, and if the wireless connection between the source base station and the UE fails (or radio link failure (RLF) is detected), or if the wireless connection between the source Pcell and the UE has failed (or if the second timer or the third timer has expired), if there is a problem in random access, if the number of retransmissions has reached the maximum number of retransmissions, or if an indication indicating out-of-synchronization is received more than a predetermined number of times), 4> It is possible to perform fall back, return, or recovery by using configuration information used in the source Pcell, excluding physical layer device configuration information, MAC layer device configuration information, or transmission resource information 4> The measured frequency or cell information is configured and prepared to be reported, and the same is reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer, and if the radio connection between the source base station and the UE has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times), or if the wireless connection between the source Pcell and the UE has not failed (or if the second timer or the third timer has not expired), 4> the MAC layer device for the target PCell may be initialized or released.

4> There may be a DRB for which a DAPS handover method is configured, or may be a list of DRBs for which the DAPS handover method is configured. With regard to DRBs included in the list, or with regard to all DRBs (if there is no list of DRBs for which the DAPS handover method is configured), 5> The RLC layer device for the target Pcell may be re-established and released, or an associated DTCH logical channel may be released.

5> The PDCP layer device (e.g., DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> With regard to a DRB for which the DAPS handover method is not configured, or with regard to DRBs not included in the list (if there is a list for which the DAPS handover method is configured), 5> The PDCP layer device may be re-established. Alternatively, a higher layer device (e.g., an RRC layer device) may indicate a PDCP layer device re-establishment procedure for the bearer. Alternatively, the UE may transmit a message indicating that the DAPS handover has failed through the SRB for the source base station to the source base station, and then may receive an RRC message (e.g., RRCReconfiguration message) from the base station as a response message thereto. In addition, the UE may perform a PDCP re-establishment procedure for each bearer including an indicator indicating re-establishment of the PDCP layer device according to the indication of the message. Alternatively, the UE may receive the RRC message from a higher layer device (e.g., an RRC layer device), identify the indicator, and indicate a PDCP layer device re-establishment procedure for the bearer. As described in the disclosure, a security key or ROHC context for the source Pcell may be applied, or data (for example, PDCP PDU) may be generated based on the applied security key or ROHC context (or data compression context) for the source Pcell to perform transmission or retransmission. In the disclosure, when the UE receives a handover command message or an RRC message indicating a DAPS handover method, the UE performs PDCP layer device re-establishment procedure based on a security key or an ROHC context for a target Pcell, with respect to a bearer for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the PDCP layer device may be performed in order to update the security configuration information, ROHC context, or data compression configuration information for the target PCell with the security configuration information, ROHC context, or data compression configuration information for the source PCell. In addition, when the PDCP layer device is re-established in the above, the PDCP status report is triggered for the AM DRB or UM DRB, to enable the PDCP status report to be transmitted to the source base station, and enable the source base station to receive the PDCP status report from the UE. As a result, data transmission or reception may be continuously performed without interruption.

5> The RLC layer device may be re-established and the RLC layer device or the connected DTCH channel may be connected to the source Pcell (or the MAC layer device of the source Pcell).

4> Suspended SRBs, which are configured in the MAC layer device for the source base station or with respect to the source base station (or source PCell), are resumed.

4> The MAC layer device for the source Pcell may be reconfigured. Specifically, the MAC layer device for the source Pcell may be reconfigured using original MAC layer device configuration information (for example, configuration information before receiving the handover command message) including information on the bearer for which the DAPS handover method is not configured or the logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the UE detects a wireless connection problem in the physical layer device

2> If the second handover method (for example, the second embodiment of the disclosure or the DAPS handover method) is configured as above, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received, from a lower layer device (for example, a MAC layer device or a PHY layer device), a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and a problem in the physical layer device is detected, 3> A second timer (e.g., T310) may be started.

2> If an indicator (out-of-sync indication) indicating that radio connection signals are out of synchronization is received, from a lower layer device (for example, a MAC layer device or a PHY layer device), a predetermined number of times (for example, the base station may configure the number of times) and a problem in the physical layer device is detected, and the first timer or another timer T300, T301, T304, T311, or T319 is not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) as above, if the DAPS handover method is configured (or indicated) for each bearer identifier or logical channel identifier, if the DAPS handover method is configured for at least one bearer, or if the DAPS handover method is configured for a predetermined bearer, and the first timer is running (or the handover procedure is in progress), 2> If the wireless connection between the source base station and the UE fails (or if a radio link failure (RLF) is detected (for example, or if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> The MAC layer device for the source PCell may be initialized or the MAC layer device configuration information may be released.

3> There may be a DRB for which each DAPS handover method is configured, or may be a list of DRBs for which the DAPS handover method is configured. With regard to the DRBs included in the list or with regard to all DRBs if there is no list for which the DAPS handover method is configured, 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> the RRC layer device of the UE interrupts the second timer if the second timer for the source base station is running. This is because when the second timer expires, an unnecessary RRC connection re-establishment procedure may be triggered.

2> the RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure 3> The MAC layer device for the source base station (or cell or PCell) is initialized, and the configuration of the MAC layer device for the source PCell is released.

3> For a bearer for which the DAPS handover method is configured or for each DRB having the second PDCP layer device structure (DAPS PDCP layer device structure)

4> The RLC layer device for the source PCell is re-established.

4> RLC layer device and dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> the RLC layer device and dedicated traffic channel (DTCH) logical channel for the source PCell are released.

3> Configuration information for the physical channel (or physical layer device) configured for the source PCell is released.

FIGS. 31A, 31B, 33A, and 33B illustrate a detailed second embodiment of the method in which, when the DAPS handover method is configured for each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed second embodiment is as follows.

1> If the UE receives a handover command message (e.g., RRCReconfiguration message) or receives ReconfigWithSync information (in case of NR base station) or MobilityControlInfo information (in case of LTE base station) through the RRCReconfiguration message, if the UE can follow the configuration information of the RRC message, the UE can perform one or more of the following operations.

2> The UE may start the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> The UE may interrupt the second timer if the second timer for the source base station of the disclosure is running 3> The UE may interrupt the third timer if the third timer for the source base station of the disclosure is running 2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> The UE does not interrupt the second timer even if the second timer for the source base station of this disclosure is running 3> The UE may generate or establish a MAC layer device for the target base station. For example, the target Pcell may be applied with the same configuration as that of the source PCell.

3> The UE may apply a new UE identifier (e.g., C-RNTI) in the MAC or PHY layer device with respect to the target base station or for the target base station.

3> The UE may reconfigure the MAC layer device for the source Pcell. Specifically, the MAC layer device for the source Pcell may be reconfigured using MAC layer device configuration information, obtained by excluding configuration information about a logical channel or a bearer for which a DAPS handover method is not configured. Alternatively, the MAC layer device for the source Pcell may be reconfigured using MAC layer device configuration information including configuration information about a logical channel or a bearer for which the DAPS handover method is configured. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, may be a list of DRBs for DAPS handover, or may be no list of DRBs for a DAPS handover. With regard to a DRB having an identifier included in the list of DRBs for which the DAPS handover method is configured, or with regard to all DRBs, 4> An RLC layer device and a dedicated control channel (DCCH) logical channel for a target Pcell may be configured or established. For example, the configuration of the target Pcell may be applied with the same configuration as the configuration for the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB that does not include an identifier in the list of DRBs for which the DAPS handover method is configured, 4> the PDCP layer device may be re-established. As described in the disclosure, a security key or ROHC context for a target Pcell may be applied, or data (e.g., PDCP PDU) is generated based on the applied security key or ROHC context for the target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

4> The RLC layer device may be re-established and the RLC layer device or the connected DTCH channel may be connected to the target Pcell (or the MAC layer device of the target Pcell).

3> With regard to each SRB,

4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the configuration of the target Pcell may be applied with the same configuration as the configuration for the source PCell. In another method, a new SRB1 for the target PCell may be configured or established, other SRBs (for example, SRB2, SBR3, or SRB4) may re-establish a PDCP layer device or RLC layer device (used for the source PCell) and the PDCP layer device or RLC layer device may be configured or established for the target PCell.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted. As another method, SRB1 for the source PCell may be suspended and other SRBs (e.g., SRB2, SBR3, or SRB4) may be released.

2> Otherwise, or if the second handover method (for example, the second embodiment of the disclosure or the DAPS handover method) is not indicated (or is not configured), if the DAPS handover method is not configured (or is not indicated) for each bearer identifier or logical channel identifier, if the DAPS handover method is not configured for at least one bearer, or if the DAPS handover method is not configured for a predetermined bearer, one or more of the following operations may be performed.

3> If the DAPS handover method is configured, the MCG MAC layer device or SCG MAC layer device is initialized.

3> If the DAPS handover method is configured, the configuration or context for the uplink compressed data method is released.

3> The PDCP layer device may be re-established for all bearers (e.g., DRBs or SRBs) for which the PDCP layer device is established or configured.

3> The MCG RLC or SCG RLC layer device may be re-established for all bearers (e.g., DRBs or SRBs) for which the RLC layer device is established or configured.

1> If the MAC layer device successfully completes the random access procedure (or the first condition described in this disclosure is satisfied)

1> Alternatively, if an indicator (for example, rach-Skip) indicating skipping of the random access procedure is configured, and the MAC layer device indicates successful reception of the PDCCH transmission corresponding to the UE identifier (C-RNTI), 2> the first timer (for example, T304) is interrupted.

2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer 3> the second timer is interrupted if the second timer (for example, T310) is running 3> the third timer is interrupted if the third timer (for example, T312) is running 3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

3> MCG configuration information may be released. The MCG configuration information may include configuration information of each bearer or SDAP, PDCP, RLC, MAC, or PHY layer device information, UE identifier information, or security information.

3> If there is SCG configuration information, the SCG configuration information may be released. The SCG configuration information may include configuration information of each bearer or SDAP, PDCP, RLC, MAC, or PHY layer device information, UE identifier information, or security information.

2> System information may be read from the target PCell.

1> If the first timer of this disclosure has expired (for example, if the handover procedure has failed)

2> If the first timer for handover (for example, T304) has expired or if handover has failed 3> If random access-related configuration information is configured, designated preamble information is released.

3> If the second handover method (e.g., the second embodiment of the disclosure or the DAPS handover method) is not configured (or is not indicated), the DAPS handover method is not configured for each bearer identifier or logical channel identifier (or not indicated), if DAPS handover method is not configured for at least one bearer, or if DAPS handover method is not configured for a predetermined bearer, 3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer, and if the wireless connection between the source base station and the UE fails (or radio link failure (RLF) is detected or if the wireless connection between the source Pcell and the UE has failed (or if the second timer or the third timer has expired, if there is a problem in random access, if the number of retransmissions has reached the maximum number of retransmissions, or if an indication indicating out-of-synchronization is received more than a predetermined number of times), 4> It is possible to perform fall back, return, or recovery by using configuration information used in the source Pcell, excluding physical layer device configuration information, MAC layer device configuration information, or transmission resource information 4> the measured frequency or cell information is configured and prepared to be reported, and the same is reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer, and the radio connection between the source base station and the UE has not failed (or if radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the UE has not failed (or if the second timer or the third timer has not expired), 4> the MAC layer device for the target PCell may be initialized or released.

4> With regard to a DRB for which each DAPS handover method is configured, or if there is a list in which the DAPS handover method is configured, with regard to all DRBs included in the list, or with regard to all DRBs if there is no list in which the DAPS handover method is configured, 5> the RLC layer device for the target Pcell may be re-established and released, or an associated DTCH logical channel may be released.

5> The PDCP layer device (e.g., DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> For each DRB for which the DAPS handover method is not configured, or if there is a list for which the DAPS handover method is configured, for DRBs not included in the list 5> The PDCP layer device may be re-established. Alternatively, a higher layer device (e.g., an RRC layer device) may indicate a PDCP layer device re-establishment procedure for the bearer. Alternatively, the UE may transmit a message indicating that the DAPS handover has failed through the SRB for the source base station to the source base station, and then may receive an RRC message (e.g., RRCReconfiguration message) from the base station as a response message thereto. In addition, the UE may perform a PDCP re-establishment procedure for each bearer including an indicator indicating re-establishment of the PDCP layer device according to the indication of the message. Alternatively, the UE may receive the RRC message from a higher layer device (e.g., an RRC layer device), identify the indicator, and indicate a PDCP layer device re-establishment procedure for the bearer. As described in the disclosure, a security key or ROHC context for the source Pcell may be applied, or data (for example, PDCP PDU) may be generated based on the applied security key or ROHC context (or data compression context) for the source Pcell to perform transmission or retransmission. In the disclosure, when the UE receives a handover command message or an RRC message indicating a DAPS handover method, the UE performs PDCP layer device re-establishment procedure based on a security key or an ROHC context for a target Pcell, with respect to a bearer for which the DAPS handover method is not configured, so that data for the target base station may be generated for the AM DRB or UM DRB and thus the data generated for the target base station should be discarded. This is because an error occurs when data for the target base station is transmitted when falling back to the source base station. Therefore, when falling back to the source base station, the re-establishment procedure of the PDCP layer device may be performed in order to update the security configuration information, ROHC context, or data compression configuration information for the target PCell with the security configuration information, ROHC context, or data compression configuration information for the source PCell. In addition, when the PDCP layer device is re-established in the above, the PDCP status report is triggered for the AM DRB or UM DRB, to enable the PDCP status report to be transmitted to the source base station, and enable the source base station to receive the PDCP status report from the UE. As a result, data transmission or reception may be continuously performed without interruption.

5> The RLC layer device may be re-established and the RLC layer device or the connected DTCH channel may be connected to the source Pcell (or the MAC layer device of the source Pcell).

5> As another method above, for each DRB in which the DAPS handover method is not configured or if there is a list in which the DAPS handover method is configured, the PDCP layer device or the RLC layer devices are released for the DRBs that are not included in the list. This is because it is possible to simply release the PDCP re-establishment procedure without performing the same, and allow the base station to reconfigure the bearers by using the RRC message (for example, RRCReconfiguration message).

4> Suspended SRBs, which are configured in the MAC layer device for the source base station or with respect to the source base station (or source PCell), are resumed.

4> The MAC layer device for the source Pcell may be reconfigured.

Specifically, the MAC layer device for the source Pcell may be reconfigured using original MAC layer device configuration information (for example, configuration information before receiving the handover command message) including information on the bearer for which the DAPS handover method is not configured or the logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted. As another method, the suspended SRB1 for the source PCell may be resumed and other SRBs (e.g., SRB2, SBR3, SRB4) may re-establish the PDCP layer device or RLC layer device (which has been re-established or configured for the target PCell) and the PDCP layer device or RLC layer device may be configured or established for the source PCell. Alternatively, because the handover procedure has failed, SRB1 that has been configured or established for the target Pcell may be released.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed.

1> If the UE detects a wireless connection problem in the physical layer device

2> If the second handover method (for example, the second embodiment of the disclosure or the DAPS handover method) is configured, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received, from a lower layer device (for example, a MAC layer device or a PHY layer device), a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and a problem in the physical layer device is detected, 3> a second timer (e.g., T310) may be started.

2> If an indicator (out-of-sync indication) indicating that radio connection signals are out of synchronization is received, from a lower layer device (for example, a MAC layer device or a PHY layer device), a predetermined number of times (for example, the base station may configure the number of times) and a problem in the physical layer device is detected, and the first timer or another timer T300, T301, T304, T311, or T319 is not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer identifier or logical channel identifier, if the DAPS handover method is configured for at least one bearer, or if the DAPS handover method is configured for a predetermined bearer, and the first timer is running (or the handover procedure is in progress), 2> If the wireless connection between the source base station and the UE fails (or the radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> the MAC layer device for the source PCell may be initialized or the MAC layer device configuration information may be released.

3> There may be a DRB for which each DAPS handover method is configured, or may be a list for which the DAPS handover method is configured. With regard to DRBs included in the list, or with regard to all DRBs if there is no list for which the DAPS handover method is configured, 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> When receiving a handover command message (e.g., RRCReconfiguration message) or receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> the RRC layer device of the UE interrupts the second timer if the second timer for the source base station is running. This is because when the second timer expires, an unnecessary RRC connection re-establishment procedure may be triggered.

2> The RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure 3> The MAC layer device for the source base station (or cell or PCell) is initialized, and the configuration of the MAC layer device for the source PCell is released.

3> For a bearer for which the DAPS handover method is configured or for each DRB having the second PDCP layer device structure (DAPS PDCP layer device structure)

4> The RLC layer device for the source PCell is re-established.

4> The RLC layer device and the dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> RLC layer device and dedicated traffic channel (DTCH) logical channel for the source PCell are released.

3> Configuration information for the physical channel (or physical layer device) configured for the source PCell is released.

FIGS. 32A, 32B, 34A, and 34B illustrate a detailed third embodiment of the method in which, when the DAPS handover method is indicated to each bearer through an RRC message (e.g., RRCReconfiguration message or an RRCConnectionReconfiguration message), which is received by the UE, the UE drives different bearer-specific protocol layer devices with respect to an SRB, bearers for which the DAPS handover method is configured, or bearers for which the DAPS handover method is not configured, and the detailed third embodiment is as follows.

1> If the UE receives a handover command message (e.g., RRCReconfiguration message) or receives ReconfigWithSync information (in case of NR base station) or MobilityControlInfo information (in case of LTE base station) through the RRCReconfiguration message, if the UE can follow the configuration information of the RRC message, the UE can perform one or more of the following operations.

2> The UE may start the first timer of the disclosure.

2> If the second handover method (for example, the second embodiment of the disclosure or the DAPS handover method) is not indicated above, if the DAPS handover method is not indicated for each bearer identifier or logical channel identifier, if the DAPS handover method is not configured for at least one bearer, or if the DAPS handover method is not configured for a predetermined bearer, 3> the UE may interrupt the second timer if the second timer for the source base station of the disclosure is running 3> the UE may interrupt the third timer if the third timer for the source base station of the disclosure is running 2> In the above, if the second handover method (for example, the second embodiment of the disclosure or the DAPS handover method) is indicated (or configured), or the DAPS handover method is indicated for each bearer identifier or logical channel identifier, if the DAPS handover method is configured for at least one bearer, or if the DAPS handover method is configured for a predetermined bearer, one or more of the following operations may be performed for a bearer for which the DAPS handover method is configured.

3> Even if the second timer for the source base station of this disclosure is running, the UE does not interrupt the second timer.

3> The UE may generate or establish a MAC layer device for the target base station. For example, the UE may apply the target Pcell with the same configuration as that of the source PCell.

3> The UE may apply a new UE identifier (e.g., C-RNTI) in the MAC or PHY layer device with respect to the target base station or for the target base station.

3> The UE may reconfigure a MAC layer device for the source Pcell. Specifically, the UE may reconfigure the MAC layer device for the source Pcell by using MAC layer device configuration information, obtained by excluding configuration information about a bearer for which a DAPS handover method is not configured or configuration information about a logical channel. Alternatively, the UE may reconfigure the MAC layer device for the source Pcell by using MAC layer device configuration information including configuration information about a bearer for which the DAPS handover method is configured or configuration information about a logical channel. In addition, the configuration information may include mapping information between a logical channel and a SCell.

3> The UE may deactivate all SCells configured in the MAC layer device for the source base station. However, the source PCell is maintained as it is and data transmission or reception may be continuously performed.

3> There may be a DRB for which each DAPS handover method is configured, may be a list of DRBs for DAPS handover, or may be no list of DRBs for a DAPS handover. With regard to a DRB having an identifier included in the list of DRBs for which the DAPS handover method is configured, or with regard to all DRBs, 4> an RLC layer device and a dedicated control channel (DCCH) logical channel for a target Pcell may be configured or established. For example, the configuration of the target Pcell may be applied with the same configuration as the configuration for the source PCell.

4> The first PDCP layer device structure (or a normal PDCP layer device) may be reconfigured to be or switched to the second PDCP layer device structure (or a DAPS PDCP layer device). Alternatively, the received PDCP layer device configuration information may be applied to the second PDCP layer device structure.

3> There is a DRB for which each DAPS handover method is not configured or a list of DRBs for DAPS handover, and for a DRB that does not include an identifier in the list of DRBs for which the DAPS handover method is configured, 4> The DRBs may be suspended. That is, UM DRBs or AM DRBs for which the DAPS handover methods are not indicated may be suspended.

4> Alternatively, for the UM DRBs or AM DRBs, a PDCP layer device suspend procedure (PDCP layer device suspend) may be triggered or indicated for a lower layer device or a PDCP layer device. As another method, only some of the following procedures may be triggered or indicated. As another method, the following procedures or some of the following procedures may be performed on bearers (UM DRB or AM DRB) for which the DAPS handover method is not configured when the DAPS handover procedure fails and the fallback procedure is performed.

5> In the above, the procedures performed in the PDCP layer device of the UM DRB or AM DRB may be embodied as follows, and some or all of the following procedures may be performed.

6> When initializing the count value or the window state variable value, in order to solve a security issue caused by reusing the same count value from the beginning when performing the DAPS handover fallback procedure (when performing the DAPS handover fallback procedure, the risk of exposure of security keys caused by transmitting different data with the same security key and the same count value), the count value, the transmission window state variable (TX_NEXT), or the receiving window state variable (RX_NEXT and RX_DELIV) is not initialized and the existing variable values are continuously used or maintained.

6> In order to discard old data for efficient buffer operation, data stored in the transmitting PDCP layer device (e.g., PDCP PDU or PDCP SDU) may be discarded. As another method, when discarding the stored data above, only the PDCP PDUs are discarded, and the PDCP SDUs, which are original data, are stored or maintained as they are in order to prevent data loss, or the PDCP SDUs may be processed again through a PDCP re-establishment procedure or bearer resumption procedure in the future and transmitted.

6> In order to quickly transmit the stored data (PDCP SDU or PDCP PDU) to a higher layer device while a PDCP reordering timer is running, the PDCP reordering timer is interrupted and initialized if the PDCP reordering timer is running, and the stored data may be decompressed if the stored data is compressed and may be transmitted to the higher layer in ascending order of count values.

6> If the receiving PDCP layer device receives pieces of data from the lower layer device (RLC layer device) through the RLC re-establishment procedure, the received pieces of data are also decoded and integrity verification thereof is performed if necessary. In addition, if necessary, header decompression is performed, the PDCP reordering timer is interrupted and initialized, and thus when transmitting pieces of data to a higher layer, the data may be ordered and transmitted in ascending order of count value (this is a useful operation in a case of EN-DC (connected to the LTE base station and NR base station)) or in a case of using the NR PDCP layer device by the LTE base station, that is, when the NR PDCP layer device is connected to the LTE RLC layer device and the LTE RLC layer device is re-established).

As another method, the count value used for the security key is initialized, and the transmission window state variable (TX_NEXT) may be initialized to be the initial value so that variable synchronization with the base station is possible when reconnecting to the network later. In addition, the count value used for the security key is initialized, and the receiving window state variables (RX_NEXT and RX_DELIV) may be initialized to be the initial values so that variable synchronization with the base station is possible when reconnecting to the network later.

4> When an RLC re-establishment procedure is indicated for the UM DRBs or AM DRBs, an RLC layer device re-establishment procedure may be performed. According to the above RLC layer device re-establishment procedure, if there are pieces of received data, when the pieces of data are processed and transmitted to a higher layer device or the transmission or reception window state variables are initialized, or when pieces of transmission data are not yet transmitted, a procedure of discarding stored data (RLC SDU or RLC PDU) may be performed.

3> With regard to each SRB,

4> SRBs for a target Pcell are configured or established. Specifically, a PDCP layer device for the target PCell may be configured or established. In addition, an RLC layer device and a dedicated control channel (DCCH) logical channel for a target Pcell may be configured or established. For example, the target Pcell may be applied with the same configuration as the configuration of the source PCell. As another method, new SRB1 for the target PCell may be configured or established, and other SRBs (e.g., SRB2 or SBR3 or SRB4) may be suspended. As another method, new SRB1 for the target PCell may be configured or established when the first condition described in the disclosure is satisfied.

4> SRBs for the source PCell are suspended. Alternatively, if there are data or RRC messages stored in SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted.

2> Otherwise, or if the second handover method (for example, the second embodiment of the disclosure or the DAPS handover method) is not indicated (or is not configured) above, if the DAPS handover method is not indicated (or is not configured) for each bearer identifier or logical channel identifier, if the DAPS handover method is not configured for at least one bearer, or if the DAPS handover method is not configured for a predetermined bearer, one or more of the following operations may be performed.

3> If the DAPS handover method is configured, the MCG MAC layer device or SCG MAC layer device is initialized.

3> If the DAPS handover method is configured, the configuration or context for the uplink compressed data method is released.

3> The PDCP layer device may be re-established for all bearers (e.g., DRBs or SRBs) for which the PDCP layer device is established or configured.

3> The MCG RLC or SCG RLC layer device may be re-established for all bearers (e.g., DRBs or SRBs) for which the RLC layer device is established or configured.

1> If the MAC layer device successfully completes the random access procedure (or the first condition described in this disclosure is satisfied)

1> Alternatively, if an indicator (for example, rach-Skip) indicating skipping of the random access procedure is configured, and the MAC layer device indicates successful reception of the PDCCH transmission corresponding to the UE identifier (C-RNTI), 2> the first timer (for example, T304) is interrupted.

2> If the second handover method (for example, the second embodiment of the disclosure or DAPS handover method) is configured as above, if the DAPS handover method is indicated for each bearer identifier or logical channel identifier, if the DAPS handover method is configured for at least one bearer, or if the DAPS handover method is configured for a predetermined bearer, 3> the second timer (for example, T310) is interrupted if the second timer is running 3> the third timer (for example, T312) is interrupted if the third timer is running 3> Uplink data switching may be triggered or indicated for each bearer for which the second handover method or the DAPS handover method is configured or each bearer (or lower layer device or PDCP layer device) for which a DAPS PDCP layer device is configured. In addition, when the uplink data switching is indicated in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

3> There is a DRB for which a DAPS handover method is not configured or a list of DRBs for which DAPS handover is configured, and for a DRB, the identifier of which is not included in a list of DRBs for which the DAPS handover method is configured, 4> The PDCP layer device may be re-established. As described in the disclosure, a security key or ROHC context for a target Pcell may be applied, or data (e.g., PDCP PDU) may be generated based on a security key or ROHC context for the applied target Pcell and transmitted or retransmitted. In addition, when the PDCP layer device is re-established in the above, the PDCP status report is triggered for the AM DRB or UM DRB to enable the PDCP status report to be transmitted to the target base station, and enable the target base station to receive the PDCP status report from the UE. As a result, data transmission or reception may be continuously performed without interruption.

4> The RLC layer device may be re-established, and the RLC layer device or the connected DTCH channel may be connected to the target Pcell (or the MAC layer device of the target Pcell).

3> MCG configuration information may be released. The MCG configuration information may include configuration information of each bearer or SDAP, PDCP, RLC, MAC, or PHY layer device information, UE identifier information, security information, and the like.

3> If there is SCG configuration information, the SCG configuration information may be released. The SCG configuration information may include configuration information of each bearer or SDAP, PDCP, RLC, MAC, or PHY layer device information, UE identifier information, security information, and the like.

3> Other SRBs (for example, SRB2, SBR3, or SRB4) may re-establish a PDCP layer device or RLC layer device (used for the source PCell) and may configure or establish the same for the target PCell. As another method, new SRB1 for the target PCell may be configured or established when the first condition described in the disclosure is satisfied.

2> System information may be read from the target PCell.

1> If the first timer of this disclosure has expired (for example, if the handover procedure has failed)

2> If the first timer (for example, T304) for handover has expired or if handover has failed 3> If random access-related configuration information is configured, designated preamble information is released.

3> If the second handover method (e.g., the second embodiment of the disclosure or the DAPS handover method) is not configured (or is not indicated), if the DAPS handover method is not configured (or not indicated) for each bearer identifier or logical channel identifier, if the DAPS handover method is not configured for at least one bearer, or if the DAPS handover method is not configured for a predetermined bearer, 3> Alternatively, if the second handover method (for example, the second embodiment of the disclosure or the DAPS handover method) is configured (or indicated), if the DAPS handover method is indicated for each bearer identifier or logical channel identifier, if the DAPS handover method is configured for at least one bearer, or if the DAPS handover method is configured for a predetermined bearer and if the wireless connection between the source base station and the UE fails (or radio link failure (RLF) is detected), or if the wireless connection between the source Pcell and the UE has failed (or if the second timer or the third timer has expired, if there is a problem in random access, if the number of retransmissions has reached the maximum number of retransmissions, or if an indication indicating out-of-synchronization is received more than a predetermined number of times), 4> it is possible to perform fall back, return, or recovery by using configuration information used in the source Pcell, excluding physical layer device configuration information, MAC layer device configuration information, or transmission resource information 4> the measured frequency or cell information is configured and prepared to be reported, and the same may be reported to a cell or base station to be accessed.

4> RRC connection re-establishment procedure may be performed.

3> In the above, if the second handover method (for example, the second embodiment of the disclosure or the DAPS handover method) is configured (or indicated), if the DAPS handover method is configured (or indicated) for each bearer identifier or logical channel identifier, if the DAPS handover method is configured for at least one bearer, if the DAPS handover method is configured for a predetermined bearer and the radio connection between the source base station and the UE has not failed (or if the radio link failure (RLF) is not detected (e.g., if the second or third timer has not expired, if a random access problem has not occurred, if the number of retransmissions has not reached the maximum number of retransmissions, or if an indication indicating out-of-synchronization is not received more than a predetermined number of times)), or if the wireless connection between the source Pcell and the UE has not failed (or if the second timer or the third timer has not expired), 4> the MAC layer device for the target PCell may be initialized or released.

4> With regard to a DRB for which each DAPS handover method is configured, if there is a list of DRBs for which the DAPS handover method is configured, with regard to DRBs included in the list, or with regard to all DRBs if there is no list of DRBs for which the DAPS handover method is configured, 5> the RLC layer device for the target Pcell may be re-established and released, or an associated DTCH logical channel may be released.

5> The PDCP layer device (e.g., the DAPS PDCP layer device or the second PDCP layer device structure) may be reconfigured to be a normal PDCP layer device (e.g., the first PDCP layer device structure). In addition, when the PDCP layer device is reconfigured in the above, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption.

4> For each DRB for which the DAPS handover method is not configured, or if there is a list of DRBs for which the DAPS handover method is configured, for DRBs not included in the list, 5> The DRBs may be restored, returned, or recovered to bearer configuration information, PDCP state, RLC state, window state variables of the PDCP layer device or RLC layer device, buffer state, or ROCH context before the handover command message. Alternatively, the DRBs may be resumed. Alternatively, the suspended DRBs may be resumed. In addition, the PDCP status report is triggered for the AM DRB or UM DRB, the PDCP status report is enabled to be transmitted to the source base station, and the source base station is enabled to receive the PDCP status report from the UE. As a result, data transmission or reception may be performed continuously without interruption. In another method, when resuming the DRBs for the source base station, in order to solve a security issue caused by reusing the same count value as when performing the DAPS handover fallback procedure, the procedure for the DRBs may use by applying or maintaining the existing count value or the transmission or reception window variable value of the DRBs for the target base station to the DRBs for the source base station (or by configuring the count value or the transmission or reception window variable value of the DRBs for the target base station as the count value or the transmission or reception window variable value of the DRBs for the source base station). As another method, the original count value or the transmission or reception window variable value of the DRBs for the source base station may be recovered and used. In another method, when resuming the DRBs for the source base station or in case that a security key for the target base station is not configured, in order to solve a security issue caused by reusing the same count value as when performing the DAPS handover fallback procedure, the procedure for the DRBs may use by applying or maintaining the existing count value or the transmission or reception window variable value of the DRBs for the target base station to the DRBs for the source base station (or by configuring the count value or the transmission or reception window variable value of the DRBs for the target base station as the count value or the transmission or reception window variable value of the DRBs for the source base station). However, in case that the security key for the target base station has been configured, the original count value or the transmission or reception window variable value of the DRBs for the source base station may be recovered and used.

4> Suspended SRBs, which are configured in the MAC layer device for the source base station or with respect to the source base station (or source PCell), are resumed.

4> The MAC layer device for the source Pcell may be reconfigured. Specifically, the MAC layer device for the source Pcell may be reconfigured using original MAC layer device configuration information (for example, configuration information before receiving the handover command message) including information on a bearer for which the DAPS handover method is not configured or a logical channel again. In addition, the configuration information may include mapping information between a logical channel and a SCell.

4> The PDCP layer device for the target Pcell may be re-established or released.

4> The RLC layer device for the target PCell may be re-established or released, or an associated DTCH logical channel may be released.

4> When resuming the SRBs for the source Pcell, if there are data or RRC messages stored in the SRBs (for example, SRB1, SRB2, SRB3, or SRB4) for the source Pcell, the data or RRC messages may be discarded. Alternatively, if there are data or RRC messages stored in the PDCP layer device of the SRBs (for example, SRB1, SRB2, SRB3, or SRB4) for the source Pcell, the data or RRC messages may be discarded. Alternatively, the RLC layer device of the SRBs may be re-established. This is because an error may occur when old data or RRC messages are transmitted. In another method, when resuming the SRBs for the source base station, in order to solve a security issue caused by reusing the same count value as when performing the DAPS handover fallback procedure, the procedure for the SRBs may use by applying or maintaining the existing count value or the transmission or reception window variable value of the SRBs for the target base station to the SRBs established for the source base station (or by configuring the count value or the transmission or reception window variable value of the SRBs for the target base station as the count value or the transmission or reception window variable value of the SRBs for the source base station). As another method, the original count value or the transmission or reception window variable value of the SRBs for the source base station may be recovered and used. In another method, when resuming the SRBs for the source base station or in case that a security key for the target base station is not configured, in order to solve a security issue caused by reusing the same count value as when performing the DAPS handover fallback procedure, the procedure for the SRBs may use by applying or maintaining the existing count value or the transmission or reception window variable value of the SRBs for the target base station to the SRBs established for the source base station (or by configuring the count value or the transmission or reception window variable value of the SRBs for the target base station as the count value or the transmission or reception window variable value of the SRBs for the source base station). However, in case that the security key for the target base station has been configured, the original count value or the transmission or reception window variable value of the SRBs for the source base station may be recovered and used.

4> In order to fall back to the source base station, a procedure of re-acquiring necessary system information from the source PCell may be performed.

4> A handover failure message may be configured through the resumed SRBs and transmitted to the source base station. Alternatively, DRBs may be resumed and data transmission or reception may be resumed. Alternatively, because the handover procedure has failed, SRB1 that has been configured or established for the target Pcell may be released.

1> If the UE detects a problem in wireless connection in a physical layer device, 2> If the second handover method (for example, the second embodiment of the disclosure or the DAPS handover method) is configured, if the DAPS handover method is configured for each bearer identifier or logical channel identifier, if the DAPS handover method is configured for at least one bearer, if the DAPS handover method is configured for a predetermined bearer, and if an indicator (out-of-sync indication) indicating that radio connection signals are out of synchronization is received from a lower layer device (for example, a MAC layer device or a PHY layer device) a predetermined number of times (for example, the base station may configure the number of times) when predetermined timers (for example, T300 (a timer for RRC connection establishment procedure), T301 (a timer for RRC connection re-establishment procedure), or T311 (a timer for RRC connection re-establishment procedure)) are not running, and thus a problem in the physical layer device is detected, 3> A second timer (e.g., T310) may be started.

2> If an indicator (out-of-sync indication) indicating that radio connection signals are out of synchronization is received from a lower layer device (for example, a MAC layer device or a PHY layer device) a predetermined number of times (for example, the base station may configure the number of times) and thus a problem in the physical layer device is detected, and the first timer, T300, T301, T304, T311, or T319 timers are not running, 3> A second timer (e.g., T310) may be started. However, if the first timer is running when the DAPS handover method is not configured, the second timer is not started even when a problem in the physical layer detected.

1> If the second handover method (e.g., the second embodiment of the disclosure or DAPS handover method) is configured (or indicated) above, if the DAPS handover method is configured (or indicated) for each bearer identifier or logical channel identifier, if the DAPS handover method is configured for at least one bearer, if the DAPS handover method is configured for a predetermined bearer, and if the first timer is running (or if the handover procedure is in progress), 2> If the wireless connection between the source base station and the UE fails (or if a radio link failure (RLF) is detected (for example, if the second timer or the third timer has expired, if there is a problem in random access, if the number of times of retransmission reaches the maximum number of retransmissions, or if an out-of-sync indication is received more than a predetermined number of times)), or if the wireless connection between the source Pcell and the UE fails (or if the second timer or the third timer has expired), 3> The MAC layer device for the source PCell may be initialized or the MAC layer device configuration information may be released.

3> With regard to a DRB for which each DAPS handover method is configured, if there is a list of DRBs for which the DAPS handover method is configured, with regard to DRBs included in the list, or with regard to all DRBs if there is no list of DRBs for which the DAPS handover method is configured 4> The RLC layer device for the source Pcell may be re-established or released, or an associated DTCH logical channel may be released.

4> The PDCP layer device (for example, a DAPS PDCP layer device or a second PDCP layer device structure) may be reconfigured to be a normal PDCP layer device (for example, a first PDCP layer device structure).

3> With regard to a DRB for which each DAPS handover method is configured, if there is a list of DRBs for which the DAPS handover method is configured, or with regard to DRBs that are not included in the list, 4> The RLC layer device for the source Pcell may be re-established or released, or an associated DTCH logical channel may be released.

4> The PDCP layer device for the source PCell may be re-established or released.

3> With regard to each SRB,

4> The PDCP layer device for the source PCell may be re-established or released.

4> The RLC layer device for the source Pcell may be re-established or released, or the associated DTCH logical channel may be released.

3> Physical layer device configuration information for the source Pcell may be released.

3> Alternatively, when security configuration information is activated and SRBs or DRBs are configured, or in another method, all DRBs configured for the source Pcell may be suspended.

1> Upon receiving a handover command message (e.g., RRCReconfiguration message), or upon receiving ReconfigWithSync information (in case of NR base station) or MobilityControlInfo information (in case of LTE base station) through the RRCReconfiguration message, or if the random access procedure triggered by the target base station or the MAC layer device of a cell group is successfully completed, the RRC layer device of the UE, 2> interrupts the first timer for the source base station, target base station, or cell group.

2> interrupts the second timer if the second timer for the source base station is running (during handover). This is because when the second timer expires, an unnecessary RRC connection re-establishment procedure may be triggered.

2> If the second handover method (for example, the second embodiment of the disclosure or the DAPS handover method) is configured according to another method, or if the DAPS handover method is configured for each bearer identifier or logical channel identifier, 3> The RRC layer device of the UE interrupts the second timer if the second timer for the source base station is running. This is because when the second timer expires, an unnecessary RRC connection re-establishment procedure may be triggered.

2> the RRC layer device of the UE interrupts the third timer for the source base station, target base station, or cell group.

1> When the UE receives an RRCReconfiguration message or RRCConnectionReconfiguration message, if ReconfigWithSync information (in case of NR base station) or MobilityControlInfo information (in case of LTE base station) is not included in the RRC message, if the UE can follow the configuration information of the RRC message, or the second condition described in the disclosure is satisfied, the UE may perform operations as follows.

2> If the RRCReconfiguration message or RRCConnectionReconfiguration message received above includes an indicator indicating releasing of the connection of the source base station (or cell) in the DAPS handover procedure, 3> the UE initializes the MAC layer device for the source base station (or cell or PCell), and releases the configuration of the MAC layer device for the source PCell.

3> For a bearer for which the DAPS handover method is configured or for each DRB having the second PDCP layer device structure (DAPS PDCP layer device structure)

4> The RLC layer device for the source PCell is re-established.

4> The RLC layer device and dedicated traffic channel (DTCH) logical channel for the source PCell are released.

4> The second PDCP layer device structure (or the current PDCP layer device) is reconfigured to be or switched to the first PDCP layer device structure (or a normal PDCP layer device structure) or the third PDCP layer device structure. In addition, when the PDCP layer device is reconfigured in the above, the PDCP status report is triggered for the AM DRB or UM DRB, to enable the PDCP status report to be transmitted to the target base station, and enable the target base station to receive the PDCP status report from the UE. As a result, data transmission or reception may be performed continuously without interruption.

3> With regard to respective SRBs,

4> the PDCP layer device configured for the source PCell is released.

4> RLC layer device and dedicated traffic channel (DTCH) logical channel for the source PCell are released.

3> Configuration information for the physical channel (or physical layer device) configured for the source PCell is released.

In the disclosure, if the DAPS handover method is configured for at least one bearer or a certain bearer in the handover command message (or RRCReconfiguration message) received by the UE, the UE may maintain connection with the source base station (for example, while transmitting uplink data or receiving downlink data) and perform the random access procedure to the target base station as proposed in the disclosure. In the DAPS handover method of the disclosure, the UE may perform uplink data switching to the target base station only when the first condition is satisfied for the bearer for which the DAPS handover method is configured, that is, only when the random access procedure to the target base station is successfully completed. Therefore, there is no problem that occurs because data of the bearer for which the DAPS handover method is configured is transmitted during the random access procedure to the target base station.

However, in case that the DAPS handover method is configured for at least one bearer or a certain bearer, when the handover command message (e.g., RRCReconfiguration message) is received for a bearer for which the DAPS handover method is not configured while performing the DAPS handover procedure, if the PDCP reestablishment procedure is configured according to the bearer configuration information included in the handover command message, the UE may perform the PDCP reestablishment procedure. In the above, if the PDCP reestablishment procedure is not configured, the bearer may be used as it is. Thus, uplink data of the bearer for which the DAPS handover method is not configured in the above may be transmitted in the uplink transmission resource allocated by the target base station during the random access procedure to the target base station. In case that the target base station uses the same security key as the source base station because there is no security configuration information for the target base station in the handover command message, or in case that the security key of the source base station is not changed and is used as it is in the bearer for which the DAPS handover method is not configured, even if data of the bearer for which the DAPS handover method is not configured is transmitted in the random access procedure, the random access procedure fails, and if the UE performs the fallback procedure to the source base station, the security issue may occur. For example, the count value of the bearer for which the DAPS handover method is not configured may be 8, and encryption may be performed with the above count value and the security key for the first uplink data received from the higher layer device during handover. In the random access procedure to the target base station, the UE may transmit the preamble (message 1), receive the random access response (message 2), and in the uplink transmission resource (message 3) indicated in the random access response, transmit the first uplink data of the bearer for which the DAPS handover method is not configured. If the random access contention resolution is not made in message 4, the random access procedure may fail. If the DAPS handover method fails and the connection with the source base station is valid and thus a fallback is performed to the source base station, the bearer for which the DAPS handover method is not configured may be restored to the state before receiving the handover command message. In this case, the count value of the bearer for which the DAPS handover method is not configured becomes 8 again, the security key is used as it is, the second uplink data received from the higher layer device is re-encrypted with the above count value and the security key, and the second uplink data of the bearer for which the DAPS handover method is not configured may be transmitted to the source base station. In the above, the UE eventually transmits the first uplink data and the second uplink data that are different from each other by using the same count value and the same security key, thereby increasing the risk that the security key may be exposed to hackers.

Therefore, proposed in the following of the disclosure are methods for solving the above security issues that may occur in the DAPS handover method. The security issue can be solved by one or a combination of methods proposed below.

Method 1: In case that the DAPS handover method is configured, or in case that the DAPS handover method is configured for at least one bearer or a certain bearer, or in the DAPS handover procedure, when the UE performs the random access procedure to the target base station in the MAC layer device for the target base station, the above security issue can be prevented by making it impossible to transmit data (or data of the bearer for which the DAPS handover method is not configured) to the target base station during the random access procedure or in message 3 of the random access procedure.

Method 2: In case that the DAPS handover method is configured, or in case that the DAPS handover method is configured for at least one bearer or a certain bearer, or in the DAPS handover procedure, when the UE performs the random access procedure to the target base station in the MAC layer device for the target base station, the above security issue can be prevented by making it impossible to transmit data (or data of the bearer for which the DAPS handover method is not configured) to the target base station until the random access procedure is successfully completed.

Method 3: In case that the DAPS handover method is configured, or in case that the DAPS handover method is configured for at least one bearer or a certain bearer, or in the DAPS handover procedure, when the UE performs the random access procedure to the target base station in the MAC layer device for the target base station, the above security issue can be prevented by making it possible to transmit data (or data of the bearer for which the DAPS handover method is not configured) to the target base station only after the random access procedure is successfully completed.

Method 4: In case that the DAPS handover method is configured, or in case that the DAPS handover method is configured for at least one bearer or a certain bearer, or in the DAPS handover procedure, when the UE performs the random access procedure to the target base station in the MAC layer device for the target base station, if random access resource information preconfigured for the random access procedure to the target base station in the handover command message is configured and the UE performs a contention-free random access (CFRA) procedure, the random access procedure is successfully completed when the message 1 (preamble)

is transmitted and the message 2 (random access response) is received. Therefore, even if data of the bearer for which the DAPS handover method is not configured is transmitted in the message 3 (uplink transmission resource indicated in the message 2), no security issue occurs.

However, if random access resource information preconfigured for the random access procedure to the target base station in the handover command message is not configured and the UE performs a contention-based random access (CBRA) procedure or does not perform a CFRA procedure, the random access procedure is successfully completed only when the message 1 (preamble) is transmitted, the message 2 (random access response) is received, the message 3 is transmitted, and information (e.g., MAC control information) instructing random access contention resolution is received with the message 4. Therefore, in case that the UE performs the CBRA procedure or does not perform the CFRA procedure, the security issue can be prevented by making it impossible to transmit data (or data of the bearer for which the DAPS handover method is not configured) to the target base station in the message 3.

Method 5: In case that the DAPS handover method is configured, or in case that the DAPS handover method is configured for at least one bearer or a certain bearer, when the UE performs the random access procedure to the target base station in the MAC layer device for the target base station, if random access resource information preconfigured for the random access procedure to the target base station in the handover command message is configured and the UE performs a contention-free random access (CFRA) procedure, the random access procedure is successfully completed when the message 1 (preamble) is transmitted and the message 2 (random access response) is received. Therefore, even if data of the bearer for which the DAPS handover method is not configured is transmitted in the message 3 (uplink transmission resource indicated in the message 2), no security issue occurs.

However, if random access resource information preconfigured for the random access procedure to the target base station in the handover command message is not configured and the UE performs a contention-based random access (CBRA) procedure or does not perform a CFRA procedure, the random access procedure is successfully completed only when the message 1 (preamble) is transmitted, the message 2 (random access response) is received, the message 3 is transmitted, and information (e.g., MAC control information) instructing random access contention resolution is received with the message 4. Therefore, in case that the UE performs the CBRA procedure or does not perform the CFRA procedure, the security issue can be prevented by making it impossible to transmit data (or data of the bearer for which the DAPS handover method is not configured) to the target base station in the message 3.

1> More specifically, in the above, in case of transmitting the preamble, receiving downlink transmission resources with PDCCH for a random access identifier (RA-RNTI) upon receiving the random access response, and successfully decoding corresponding data (TB, transport block), 2> if it is considered that the random access response has been successfully received, 3> if the random access response does not include only a random access preamble identifier (RAPID), 4> if the message 1 (preamble) transmitted in the above was selected from among the preambles for the CBRA procedure, 5> and if the random access response has been successfully received for the first time during the random access procedure, and 6> the transmission is not performed on the common control channel (CCCH) logical channel, 7> it can instruct the multiplexing or reassembly device to include C-RNTI MAC control information in the subsequent uplink transmission.

6> MAC PDU can be obtained from the multiplexing or reassembly device and stored in the message 3 buffer. In case that the DAPS handover method is configured for at least one bearer or a certain bearer, or in case that the random access procedure (CBRA procedure) is performed during the DAPS handover procedure, data (or data of the bearer for which the DAPS handover method is not configured) may not be included when the MAC PDU is obtained in the above. As another method, case that the DAPS handover method is configured for at least one bearer or a certain bearer, or in case that the random access procedure (CBRA procedure) is performed during the DAPS handover procedure, the MAC PDU may be obtained in the above excluding data (or data of the bearer for which the DAPS handover method is not configured). In addition, a procedure for excluding the data of the bearer for which the DAPS handover method is not configured from the MAC PDU may be extended and applied to the HARQ transmission or retransmission procedure.

In the disclosure, a base station may refer to a cell or a PCell. That is, the source base station is a term meaning a source cell or a source PCell, and the target base station is a term meaning a target cell or a target PCell.

Figure 36:
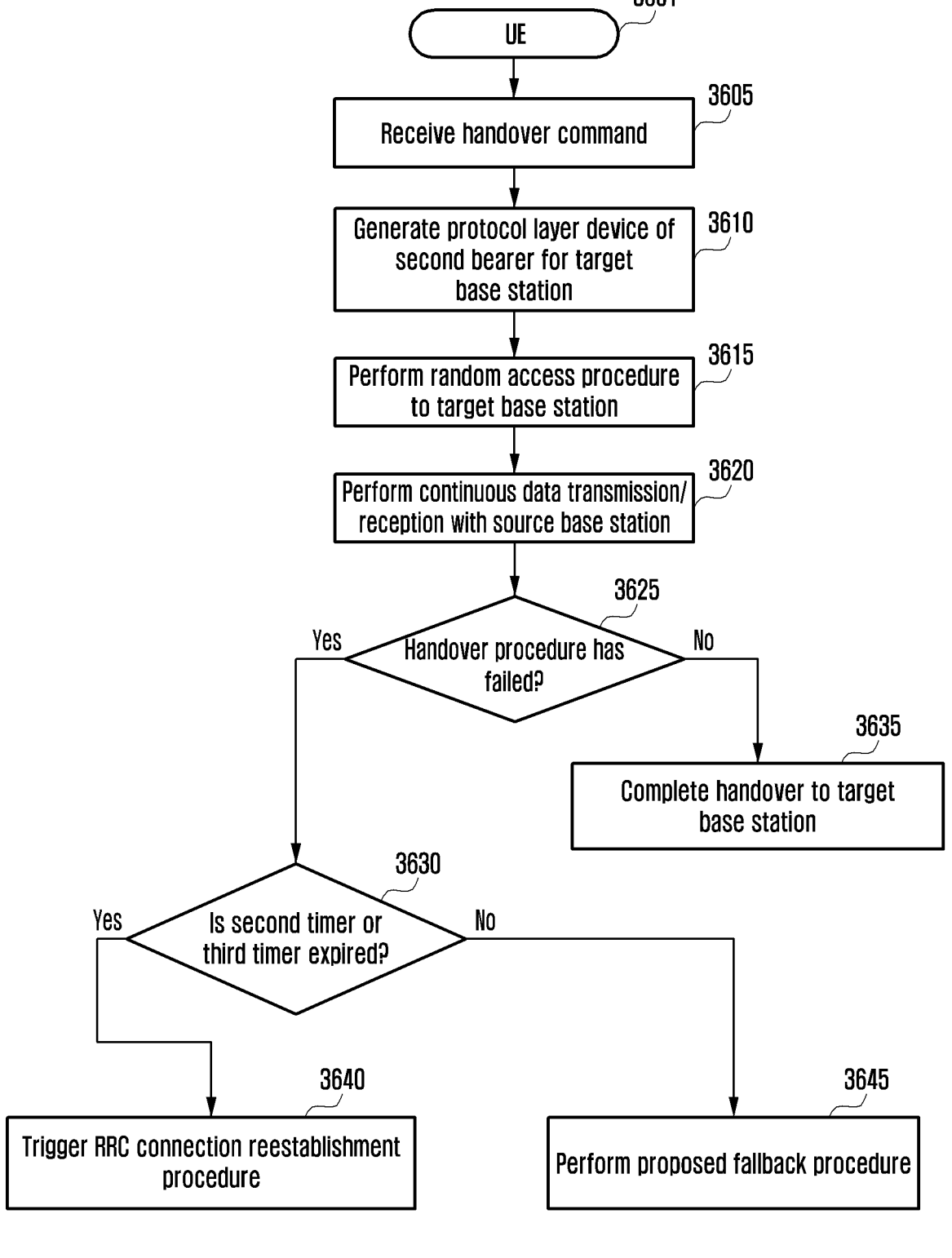
FIG. 36 is a diagram illustrating operations of a UE performing a fallback procedure when a handover fails in the DAPS handover method according to an embodiment of the disclosure.

FIG. 36 is a diagram illustrating operations of a UE performing a fallback procedure when a handover fails in the DAPS handover method according to an embodiment of the disclosure.

Referring to FIG. 36, a UE 3605 may transmit or receive data to or from a source base station through a first PDCP layer device structure for each bearer. However, when a handover command message is received and the DAPS handover method of the second embodiment of the disclosure is indicated through the handover command message, or when a DAPS handover method is indicated for each bearer, the UE switches, a target base station, which is indicated through the message, to the structure of the second PDCP layer device, for each bearer or the bearers for which the DAPS handover methods are indicated, and configures and establishes the protocol layer devices of the second bearer. In addition, even when performing the procedure of random access to the target base station through the established protocol layer devices (indicated by reference numerals 3610 and 3615), the UE transmits or receives data (uplink data transmission and downlink data reception) to or from the source base station through protocol layer devices of the first bearer (indicated by reference numeral 3620).

If the UE successfully completes the handover procedure at operation 3625, the UE completes the handover procedure according to the second embodiment (DAPS handover method) of the handover method of the disclosure.

However, if the UE fails the handover procedure at operation 3625 (for example, if the first timer above has expired (for example, if the procedure of handover to the target base station fails)); if the number of times of retransmission by the RLC layer device exceeds the maximum number of times of retransmissions; when a handover command message is received in the above, if the UE fails the handover because the configuration information of the handover command message has a value exceeding the UE capability or an error occurs in the application of the configuration information; if a problem in performing random access to the target base station occurs, and the handover procedure fails; when the second timer or the third timer is driven for the target base station above, if the second timer or the third timer expires before the handover procedure is completed (if T304 timer is interrupted or expired and it is determined that the handover procedure has failed); if the second timer or the third timer for the wireless connection between the UE and the source base station in the above has not expired (or if the second timer or the third timer for wireless connection between the UE and the source base station is not started or is running) (indicated by reference numeral 3640); or if the wireless connection between the UE and the source base station is valid, the UE may determine that the wireless connection between the UE and the source base station is valid, and may perform the fallback procedure of the disclosure (indicated by reference numeral 3645). If the second timer or the third timer for the wireless connection between the UE and the source base station in the above has expired, or if the wireless connection between the UE and the source base station is not valid (indicated by reference numeral 3630), the UE performs an RRC connection re-establishment procedure (the connection with the base station is released and the RRC connection procedure is performed again from the beginning, that is, a cell selection or reselection procedure is performed, a random access procedure is performed, and an RRC connection re-establishment request message may be transmitted) (indicated by reference numeral 3645).

Figure 37:
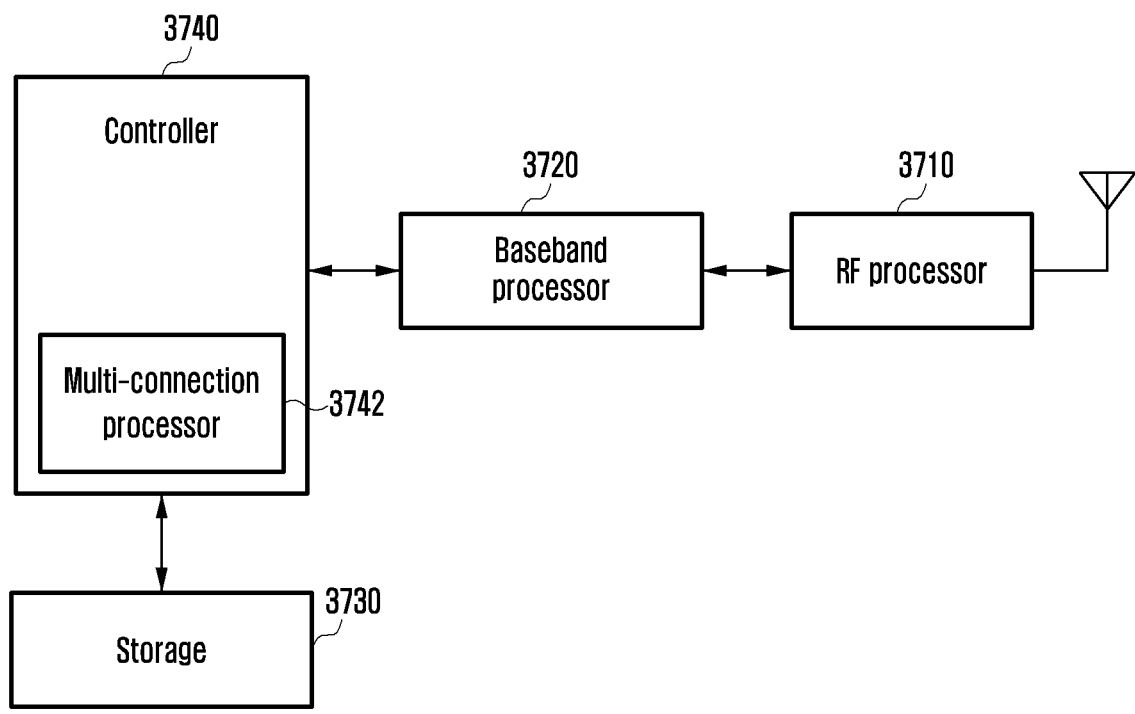
FIG. 37 is a diagram illustrating the structure of a UE according to an embodiment of the disclosure.

FIG. 37 is a diagram illustrating the structure of a UE according to an embodiment of the disclosure.

Referring to FIG. 37, the UE includes a radio frequency (RF) processor 3710, a baseband processor 3720, a storage 3730, and a controller 3740.

The RF processor 3710 performs a function for transmitting or receiving a signal through a radio channel, such as band conversion and amplification of a signal. That is, the RF processor 3710 up-converts a baseband signal provided from the baseband processor 3720 into an RF band signal and transmits the same through an antenna, and down-converts an RF band signal, received through the antenna, to a baseband signal. For example, the RF processor 3710 may include a transmission filter, a reception filter, an amplifier, a mixer, an oscillator, a digital to analog converter (DAC), an analog to digital converter (ADC), and the like. In FIG. 37, only one antenna is shown, but the UE may include a plurality of antennas. In addition, the RF processor 3710 may include a plurality of RF chains. Moreover, the RF processor 3710 may perform beamforming. In order to perform the beamforming, the RF processor 3710 may control the phase and size of each signal transmitted or received through multiple antennas or antenna elements. In addition, the RF processor may perform MIMO operation, and may receive multiple layers in the case of performing MIMO operation. The RF processor 3710 may perform reception beam sweeping by appropriately configuring a plurality of antennas or antenna elements under control of the controller, or adjust the direction and beam width of the reception beam so that the reception beam cooperates with the transmission beam.

The baseband processor 3720 performs a function for conversion between a baseband signal and a bit stream according to the physical layer standard of the system. For example, if data transmission is performed, the baseband processor 3720 generates complex symbols by encoding and modulating a transmission bit stream. In addition, if data reception is performed, the baseband processor 3720 reconstructs the received bit string by demodulating and decoding the baseband signal provided from the RF processor 3710. For example, in an orthogonal frequency division multiplexing (OFDM) scheme, if data transmission is performed, the baseband processor 3720 generates complex symbols by encoding and modulating a transmission bit stream, maps the complex symbols to subcarriers, and then configures OFDM symbols through an inverse fast Fourier transform (IFFT) operation and a cyclic prefix (CP) insertion. Further, if data reception is performed, the baseband processor 3720 divides the baseband signal provided from the RF processor 3710 in units of OFDM symbols, reconstructs the signals mapped to the subcarriers through a fast Fourier transform (FFT) operation, and then reconstructs a reception bit stream through demodulation and decoding.

The baseband processor 3720 and the RF processor 3710 transmit and receive signals as described above. Accordingly, each of the baseband processor 3720 and the RF processor 3710 may be referred to as a transmitter, a receiver, a transceiver, or a communication unit. Furthermore, at least one of the baseband processor 3720 and the RF processor 3710 may include a plurality of communication modules to support different radio access technologies. In addition, at least one of the baseband processor 3720 and the RF processor 3710 may include different communication modules to process signals of different frequency bands. For example, the different radio access technologies may include LTE network, NR network, and the like. Further, the different frequency bands may include a super high frequency (SHF) (for example, 2.5 GHz, 5 GHz) band and a millimeter (mm) wave (for example, 60 GHz) band.

The storage 3730 stores data, such as a basic program, an application, and configuration information for the operation of the UE. The storage 3730 provides stored data at the request of the controller 3740.

The controller 3740 controls the overall operation of the UE. For example, the controller 3740 transmits or receives a signal through the baseband processor 3720 and the RF processor 3710. In addition, the controller 3740 records and reads data in and from the storage 3730. To this end, the controller 3740 may include at least one processor. For example, the controller 3740 may include a communication processor (CP) for performing control for communication and an application processor (AP) for controlling a higher layer such as an application. The controller 3740 may further include a multi-connection processor 3742 supporting multi-connection.

Figure 38:
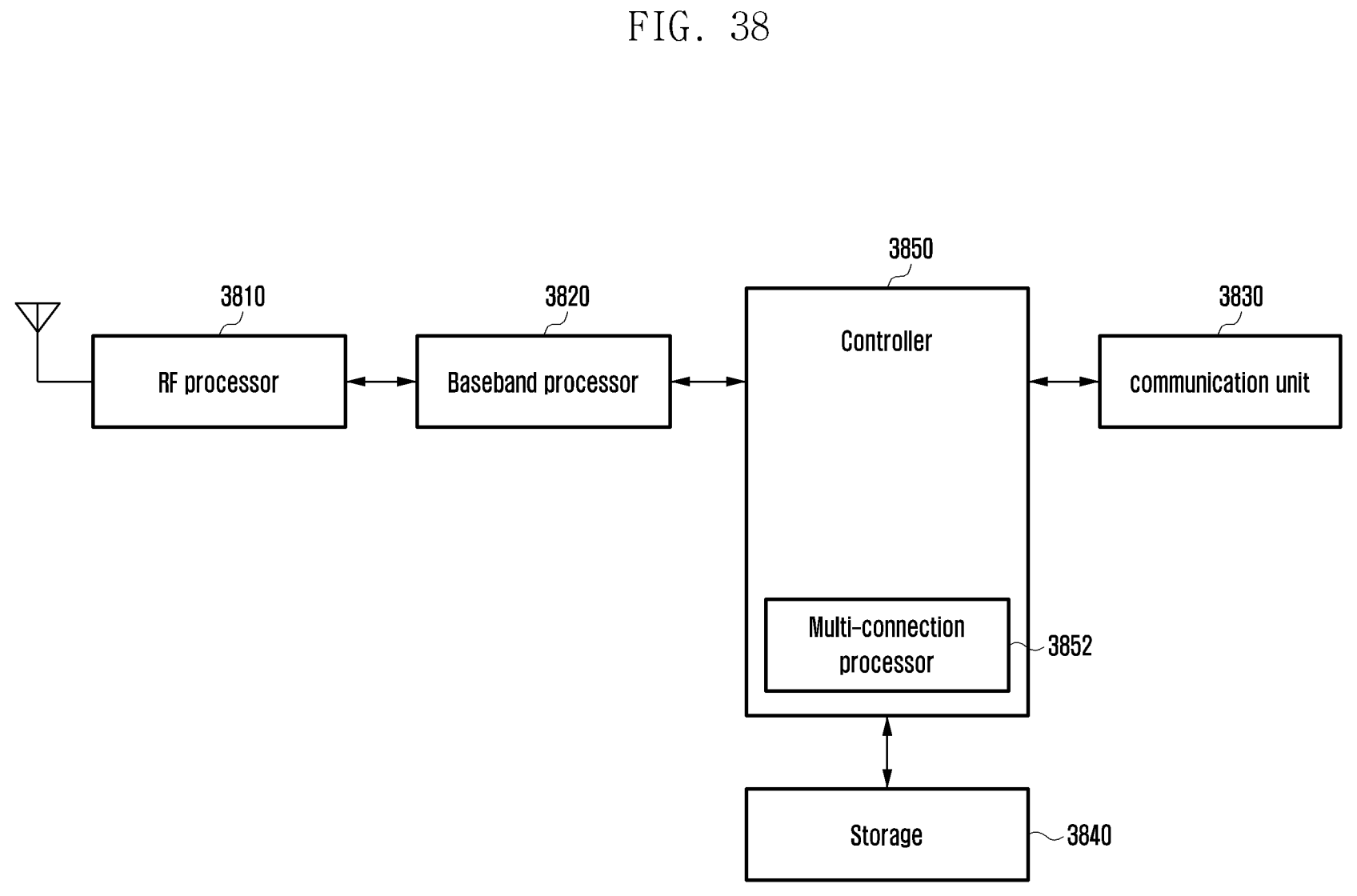

FIG. 38 is a diagram illustrating a block constitution of a TRP in a wireless communication system according to an embodiment of the disclosure.

Referring to FIG. 38, the base station includes an RF processor 3810, a baseband processor 3820, a backhaul communication unit 3830, a storage 3840, and a controller 3850.

The RF processor 3810 performs a function for transmitting or receiving a signal through a radio channel, such as band conversion and amplification of a signal. That is, the RF processor 3810 up-converts a baseband signal provided from the baseband processor 3820 into an RF band signal and then transmits the converted signal through an antenna, and down-converts an RF band signal received through the antenna into a baseband signal. For example, the RF processor 3810 may include a transmission filter, a reception filter, an amplifier, a mixer, an oscillator, a DAC, and an ADC. In FIG. 18, only one antenna is shown, but the first access node may include a plurality of antennas. In addition, the RF processor 3810 may include a plurality of RF chains. In addition, the RF processor 3810 may perform beamforming. In order to perform the beamforming, the RF processor 3810 may control the phase and size of each of the signals transmitted or received through multiple antennas or antenna elements. The RF processor 3810 may perform a downlink MIMO operation by transmitting one or more layers.

The baseband processor 3820 performs a function of conversion between the baseband signal and the bit string according to the physical layer standard of the first radio access technology. For example, if data transmission is performed, the baseband processor 3820 generates complex symbols by encoding and modulating a transmission bit stream. In addition, if data reception is performed, the baseband processor 3820 reconstructs the received bit string by demodulating and decoding the baseband signal provided from the RF processor 3810. For example, in an OFDM scheme, if data transmission is performed, the baseband processor 3820 may generate complex symbols by encoding and modulating the transmission bit stream, map the complex symbols to subcarriers, and then configure OFDM symbols through an IFFT operation and CP insertion. In addition, if data reception is performed, the baseband processor 3820 divides the baseband signal provided from the RF processor 3810 in units of OFDM symbols, reconstructs the signals mapped to the subcarriers through an FFT operation, and then reconstructs a reception bit stream through demodulation and decoding. The baseband processor 3820 and the RF processor 3810 transmit and receive signals as described above. Accordingly, each of the baseband processor 3820 and the RF processor 3810 may be referred to as a transmitter, a receiver, a transceiver, a communication unit, or a wireless communication unit.

The backhaul communication unit 3830 provides an interface for communicating with other nodes in the network.

The storage 3840 stores data, such as a basic program, an application, and configuration information for the operation of a main base station. In particular, the storage 3840 may store information on a bearer allocated to a connected UE, a measurement result reported from the connected UE, and the like. In addition, the storage 3840 may store information that is a criterion for determining whether to provide or terminate multiple connections to the UE. The storage 3840 provides stored data at the request of the controller 3850.

The controller 3850 controls the overall operation of the main base station. For example, the controller 3850 transmits or receives a signal through the baseband processor 3820 and the RF processor 3810 or through a backhaul communication unit 3830. In addition, the controller 3850 records and reads data in and from the storage 3840. To this end, the controller 3850 may include at least one processor. In addition, the controller 3850, the RF processor 3810, the baseband processor 3820, the backhaul communication unit 3830, the storage 3840, and the like may be electrically connected.

Meanwhile, although specific embodiments have been described in the detailed description of the disclosure, various modifications are possible without departing from the scope of the disclosure. Therefore, the scope of the disclosure should not be limited to the described embodiments and may have to be defined by the claims described below as well as the claims and equivalents.

The invention claimed is:

1. A method performed by a terminal in a wireless communication system, the method comprising:

receiving, from a source base station, a radio resource control (RRC) message for a dual active protocol stack (DAPS) handover;

establishing a target medium access control (MAC) entity associated with a target base station, based on the RRC message;

transmitting, to the target base station, a random access preamble;

receiving a random access response, from the target base station, in response to the random access preamble;

before a random access procedure is successfully completed, selecting, by the target MAC entity associated with the target base station, only a logical channel corresponding to a bearer for which the DAPS handover is indicated among at least one logical channel, for uplink transmission based on the random access response, wherein a logical channel corresponding to a bearer for which the DAPS handover is not indicated is not selected before the random access procedure is successfully completed; and transmitting data corresponding to the selected logical channel to the target base station.

2. The method of claim 1, wherein the random access procedure is related to contention-based random access (CBRA).

3. The method of claim 1, wherein the RRC message contains indication information indicating at least one bearer as a DAPS bearer, and wherein among the at least one logical channel, a logical channel corresponding to a bearer not indicated as the DAPS bearer is not selected as the logical channel for the uplink transmission before the random access procedure is successfully completed.

4. A method performed by a target base station in a wireless communication system, the method comprising:

transmitting, to a source base station, a command message related to a dual active protocol stack (DAPS) handover for a terminal;

receiving, from the terminal, a random access preamble, based on the command message;

transmitting, to the terminal, a random access response in response to the random access preamble; and receiving, from the terminal, data corresponding to a logical channel, wherein, before a random access procedure is successfully completed, only the logical channel corresponding to a bearer for which the DAPS handover is indicated among at least one logical channel is selected by a target medium access control (MAC) entity associated with the target base station, for uplink transmission corresponding to the random access response, and wherein a logical channel corresponding to a bearer for which the DAPS handover is not indicated is not selected before the random access procedure is successfully completed.

5. The method of claim 4, wherein the random access procedure is related to contention-based random access (CBRA).

6. The method of claim 4, wherein the command message contains indication information indicating at least one bearer as a DAPS bearer.

7. The method of claim 6, wherein among the at least one logical channel, a logical channel corresponding to a bearer not indicated as the DAPS bearer is not selected as the logical channel for the uplink transmission before the random access procedure is successfully completed.

8. A terminal in a wireless communication system, the terminal comprising:

a transceiver; and a controller configured to:

receive, from a source base station, a radio resource control (RRC) message for a dual active protocol stack (DAPS) handover, establish a target medium access control (MAC) entity associated with a target base station, based on the RRC message, transmit, to the target base station, a random access preamble, receive a random access response, from the target base station, in response to the random access preamble, before a random access procedure is successfully completed, select, by the target MAC entity associated with the target base station, only a logical channel corresponding to a bearer for which the DAPS handover is indicated among at least one logical channel, for uplink transmission based on the random access response, wherein a logical channel corresponding to a bearer for which the DAPS handover is not indicated is not selected before the random access procedure is successfully completed, and transmit data corresponding to the selected logical channel to the target base station.

9. The terminal of claim 8, wherein the random access procedure is related to contention-based random access (CBRA).

10. The terminal of claim 8, wherein the RRC message contains indication information indicating at least one bearer as a DAPS bearer, and wherein among the at least one logical channel, a logical channel corresponding to a bearer not indicated as the DAPS bearer is not selected as the logical channel for the uplink transmission before the random access procedure is successfully completed.

11. A target base station in a wireless communication system, the target base station comprising:

a transceiver; and a controller configured to:

transmit, to a source base station, a command message related to a dual active protocol stack (DAPS) handover for a terminal, receive, from the terminal, a random access preamble, based on the command message, transmit, to the terminal, a random access response in response to the random access preamble, and receive, from the terminal, data corresponding to a logical channel, wherein, before a random access procedure is successfully completed, only the logical channel corresponding to a bearer for which the DAPS handover is indicated among at least one logical channel is selected by a target medium access control (MAC) entity associated with the target base station, for uplink transmission corresponding to the random access response, and

wherein a logical channel corresponding to a bearer for which the DAPS handover is not indicated is not selected before the random access procedure is successfully completed.

12. The target base station of claim 11, wherein the random access procedure is related to contention-based random access (CBRA).

13. The target base station of claim 11, wherein the command message contains indication information indicating at least one bearer as a DAPS bearer, and wherein among the at least one logical channel, a logical channel corresponding to a bearer not indicated as the DAPS bearer is not selected as the logical channel for the uplink transmission before the random access procedure is successfully completed.

\* \* \* \* \*

228